(12) United States Patent
Khoe et al.

(10) Patent No.: US 11,023,116 B2
(45) Date of Patent: Jun. 1, 2021

(54) DEVICE, METHOD, AND GRAPHICAL USER INTERFACE FOR MOVING A USER INTERFACE OBJECT BASED ON AN INTENSITY OF A PRESS INPUT

(71) Applicant: Apple Inc., Cupertino, CA (US)

(72) Inventors: May-Li Khoe, San Francisco, CA (US); Matthew I. Brown, San Francisco, CA (US); Bianca C. Costanzo, Berlin (DE)

(73) Assignee: APPLE INC., Cupertino, CA (US)

( * ) Notice: Subject to any disclaimer, the term of this patent is extended or adjusted under 35 U.S.C. 154(b) by 386 days.

(21) Appl. No.: 15/994,843

(22) Filed: May 31, 2018

(65) Prior Publication Data

US 2018/0275862 A1 Sep. 27, 2018

Related U.S. Application Data

(63) Continuation of application No. 14/536,166, filed on Nov. 7, 2014, now Pat. No. 9,990,121, which is a
(Continued)

(51) Int. Cl.
*G06F 3/0484* (2013.01)
*G06F 3/0481* (2013.01)
(Continued)

(52) U.S. Cl.
CPC .......... *G06F 3/04847* (2013.01); *G06F 3/016* (2013.01); *G06F 3/03547* (2013.01);
(Continued)

(58) Field of Classification Search
CPC ...... G06F 3/0487; G06F 3/016; G06F 3/0488; G06F 3/4817; G06F 3/03547; G06F 3/04855; G06F 3/04883; G06F 3/4842
(Continued)

(56) References Cited

U.S. PATENT DOCUMENTS

| 4,864,520 A | 9/1989 | Setoguchi et al. |
| 5,184,120 A | 2/1993 | Schultz |

(Continued)

FOREIGN PATENT DOCUMENTS

| CA | 2780765 A1 | 5/2011 |
| CN | 1356493 A | 7/2002 |

(Continued)

OTHER PUBLICATIONS

Notice of Allowance, dated Apr. 3, 2020, received in Japanese Patent Application No. 2018-079290, which corresponds with U.S. Appl. No. 14/608,926, 5 pages.

(Continued)

*Primary Examiner* — Michael Roswell
(74) *Attorney, Agent, or Firm* — Morgan, Lewis & Bockius LLP

(57) ABSTRACT

An electronic device, with a touch-sensitive surface, displays a respective control, which is associated with respective contact intensity criteria, used to determine whether or not a function associated with the respective control will be performed. The device detects a gesture on the touch-sensitive surface, corresponding to an interaction with the respective control. In accordance with a determination that the gesture does not include a contact that meets the respective contact intensity criteria, the device changes the appearance of the respective control to indicate progress toward meeting the respective contact intensity criteria that is used to determine whether or not a function associated with the respective control will be performed. In response to detecting activation of the control, the device performs the function associated with the respective control in accordance with the detected gesture including a contact that meets the respective contact intensity criteria.

36 Claims, 87 Drawing Sheets

Related U.S. Application Data continuation of application No. PCT/US2013/040087, filed on May 8, 2013.

(60) Provisional application No. 61/778,373, filed on Mar. 12, 2013, provisional application No. 61/778,367, filed on Mar. 12, 2013, provisional application No. 61/747,278, filed on Dec. 29, 2012, provisional application No. 61/688,227, filed on May 9, 2012.

(51) Int. Cl.
  *G06F 3/0354* (2013.01)
  *G06F 3/0485* (2013.01)
  *G06F 3/0488* (2013.01)
  *G06F 3/01* (2006.01)

(52) U.S. Cl.
  CPC ........ *G06F 3/0488* (2013.01); *G06F 3/04817* (2013.01); *G06F 3/04842* (2013.01); *G06F 3/04855* (2013.01); *G06F 3/04883* (2013.01)

(58) Field of Classification Search
  USPC .................................................. 715/859, 702
  See application file for complete search history.

(56) References Cited

U.S. PATENT DOCUMENTS

| | | | |
|---|---|---|---|
| 5,374,787 A | 12/1994 | Miller et al. |
| 5,428,730 A | 6/1995 | Baker et al. |
| 5,463,722 A | 10/1995 | Venolia |
| 5,510,813 A | 4/1996 | Makinwa et al. |
| 5,555,354 A | 9/1996 | Strasnick et al. |
| 5,559,301 A | 9/1996 | Bryan, Jr. et al. |
| 5,710,896 A | 1/1998 | Seidl |
| 5,717,438 A | 2/1998 | Kim et al. |
| 5,793,360 A | 8/1998 | Fleck et al. |
| 5,793,377 A | 8/1998 | Moore |
| 5,801,692 A | 9/1998 | Muzio et al. |
| 5,805,144 A | 9/1998 | Scholder et al. |
| 5,805,167 A | 9/1998 | Van Cruyningen |
| 5,809,267 A | 9/1998 | Moran et al. |
| 5,819,293 A | 10/1998 | Comer et al. |
| 5,825,352 A | 10/1998 | Bisset et al. |
| 5,844,560 A | 12/1998 | Crutcher et al. |
| 5,872,922 A | 2/1999 | Hogan et al. |
| 5,946,647 A | 8/1999 | Miller et al. |
| 5,973,670 A | 10/1999 | Barber et al. |
| 6,002,397 A | 12/1999 | Jaaskelainen, Jr. |
| 6,031,989 A | 2/2000 | Cordell |
| 6,088,019 A | 7/2000 | Rosenberg |
| 6,088,027 A | 7/2000 | Konar et al. |
| 6,111,575 A | 8/2000 | Martinez et al. |
| 6,121,960 A | 9/2000 | Carroll et al. |
| 6,208,329 B1 | 3/2001 | Ballare |
| 6,208,340 B1 | 3/2001 | Amin et al. |
| 6,219,034 B1 | 4/2001 | Elbing et al. |
| 6,232,891 B1 | 5/2001 | Rosenberg |
| 6,243,080 B1 | 6/2001 | Molne |
| 6,252,594 B1 | 6/2001 | Xia et al. |
| 6,300,936 B1 | 10/2001 | Braun et al. |
| 6,313,836 B1 | 11/2001 | Russell, Jr. et al. |
| 6,396,523 B1 | 5/2002 | Segal et al. |
| 6,429,846 B2 | 8/2002 | Rosenberg et al. |
| 6,448,977 B1 | 9/2002 | Braun et al. |
| 6,459,442 B1 | 10/2002 | Edwards et al. |
| 6,489,978 B1 | 12/2002 | Gong et al. |
| 6,512,530 B1 | 1/2003 | Rzepkowski et al. |
| 6,563,487 B2 | 5/2003 | Martin et al. |
| 6,567,102 B2 | 5/2003 | Kung |
| 6,583,798 B1 | 6/2003 | Hoek et al. |
| 6,590,568 B1 | 7/2003 | Astala et al. |
| 6,661,438 B1 | 12/2003 | Shiraishi et al. |
| 6,735,307 B1 | 5/2004 | Volckers |
| 6,750,890 B1 | 6/2004 | Sugimoto |
| 6,806,893 B1 | 10/2004 | Kolawa et al. |
| 6,822,635 B2 | 11/2004 | Shahoian et al. |
| 6,906,697 B2 | 6/2005 | Rosenberg |
| 6,919,927 B1 | 7/2005 | Hyodo |
| 6,943,778 B1 | 9/2005 | Astala et al. |
| 7,036,088 B2 | 4/2006 | Tunney |
| 7,138,983 B2 | 11/2006 | Wakai et al. |
| 7,312,791 B2 | 12/2007 | Hoshino et al. |
| 7,411,575 B2 | 8/2008 | Hill et al. |
| 7,434,177 B1 | 10/2008 | Ording et al. |
| 7,453,439 B1 | 11/2008 | Kushler et al. |
| 7,471,284 B2 | 12/2008 | Bathiche et al. |
| 7,479,949 B2 | 1/2009 | Jobs et al. |
| 7,516,404 B1 | 4/2009 | Colby et al. |
| 7,533,352 B2 | 5/2009 | Chew et al. |
| 7,552,397 B2 | 6/2009 | Holecek et al. |
| 7,577,530 B2 | 8/2009 | Vignalou-Marche |
| 7,614,008 B2 | 11/2009 | Ording |
| 7,619,616 B2 | 11/2009 | Rimas Ribikauskas et al. |
| 7,629,966 B2 | 12/2009 | Anson |
| 7,656,413 B2 | 2/2010 | Khan et al. |
| 7,683,889 B2 | 3/2010 | Rimas Ribikauskas et al. |
| 7,702,733 B2 | 4/2010 | Fleck et al. |
| 7,743,348 B2 | 6/2010 | Robbins et al. |
| 7,760,187 B2 | 7/2010 | Kennedy |
| 7,787,026 B1 | 8/2010 | Flory et al. |
| 7,797,642 B1 | 9/2010 | Karam et al. |
| 7,801,950 B2 | 9/2010 | Eisenstadt et al. |
| 7,812,826 B2 | 10/2010 | Ording et al. |
| 7,890,862 B2 | 2/2011 | Kompe et al. |
| 7,903,090 B2 | 3/2011 | Soss et al. |
| 7,952,566 B2 | 5/2011 | Poupyrev et al. |
| 7,956,847 B2 | 6/2011 | Christie |
| 7,973,778 B2 | 7/2011 | Chen |
| 8,040,142 B1 | 10/2011 | Bokma et al. |
| 8,059,104 B2 | 11/2011 | Shahoian et al. |
| 8,059,105 B2 | 11/2011 | Rosenberg et al. |
| 8,106,856 B2 | 1/2012 | Matas et al. |
| 8,125,440 B2 | 2/2012 | Guyot-Sionnest et al. |
| 8,125,492 B1 | 2/2012 | Wainwright et al. |
| RE43,448 E | 6/2012 | Kimoto et al. |
| 8,209,628 B1 | 6/2012 | Davidson |
| 8,271,900 B2 | 9/2012 | Walizaka et al. |
| 8,300,005 B2 | 10/2012 | Tateuchi et al. |
| 8,325,398 B2 | 12/2012 | Satomi et al. |
| 8,363,020 B2 | 1/2013 | Li et al. |
| 8,390,583 B2 | 3/2013 | Forutanpour et al. |
| 8,423,089 B2 | 4/2013 | Song et al. |
| 8,446,376 B2 | 5/2013 | Levy et al. |
| 8,453,057 B2 | 5/2013 | Stallings et al. |
| 8,456,431 B2 | 6/2013 | Victor |
| 8,466,889 B2 | 6/2013 | Tong et al. |
| 8,482,535 B2 | 7/2013 | Pryor |
| 8,499,778 B2 | 7/2013 | Yuki |
| 8,508,494 B2 | 8/2013 | Moore |
| 8,542,205 B1 | 9/2013 | Keller |
| 8,553,092 B2 | 10/2013 | Tezuka et al. |
| 8,570,296 B2 | 10/2013 | Birnbaum et al. |
| 8,581,870 B2 | 11/2013 | Bokma et al. |
| 8,587,542 B2 | 11/2013 | Moore |
| 8,593,415 B2 | 11/2013 | Han et al. |
| 8,593,420 B1 | 11/2013 | Buuck |
| 8,625,882 B2 | 1/2014 | Backlund et al. |
| 8,638,311 B2 | 1/2014 | Kang et al. |
| 8,665,227 B2 | 3/2014 | Gunawan |
| 8,669,945 B2 | 3/2014 | Coddington |
| 8,698,765 B1 | 4/2014 | Keller |
| 8,706,172 B2 | 4/2014 | Priyantha et al. |
| 8,717,305 B2 | 5/2014 | Williamson et al. |
| 8,726,198 B2 | 5/2014 | Rydenhag et al. |
| 8,743,069 B2 | 6/2014 | Morton et al. |
| 8,760,425 B2 | 6/2014 | Crisan |
| 8,769,431 B1 | 7/2014 | Prasad |
| 8,773,389 B1 | 7/2014 | Freed |
| 8,788,964 B2 | 7/2014 | Shin et al. |
| 8,793,577 B2 | 7/2014 | Schellingerhout et al. |
| 8,799,816 B2 | 8/2014 | Wells et al. |
| 8,816,989 B2 | 8/2014 | Nicholson et al. |
| 8,854,316 B2 | 10/2014 | Shenfield |

(56) References Cited

U.S. PATENT DOCUMENTS

| | | |
|---|---|---|
| 8,872,729 B2 | 10/2014 | Lyons et al. |
| 8,872,773 B2 | 10/2014 | Mak et al. |
| 8,875,044 B2 | 10/2014 | Ozawa et al. |
| 8,881,062 B2 | 11/2014 | Kim et al. |
| 8,914,732 B2 | 12/2014 | Jun et al. |
| 8,952,987 B2 | 2/2015 | Momeyer et al. |
| 8,954,889 B2 | 2/2015 | Fujibayashi |
| 8,959,430 B1 | 2/2015 | Spivak et al. |
| 8,976,128 B2 | 3/2015 | Moore |
| 9,026,932 B1 | 5/2015 | Dixon |
| 9,030,419 B1 | 5/2015 | Freed |
| 9,030,436 B2 | 5/2015 | Ikeda |
| 9,032,321 B1 | 5/2015 | Cohen et al. |
| 9,043,732 B2 | 5/2015 | Nurmi et al. |
| 9,046,999 B1 | 6/2015 | Teller et al. |
| 9,052,820 B2 | 6/2015 | Jarrett et al. |
| 9,063,563 B1 | 6/2015 | Gray et al. |
| 9,063,731 B2 | 6/2015 | Heo et al. |
| 9,069,460 B2 | 6/2015 | Moore |
| 9,086,755 B2 | 7/2015 | Cho et al. |
| 9,092,058 B2 | 7/2015 | Kasahara et al. |
| 9,098,188 B2 | 8/2015 | Kim |
| 9,111,076 B2 | 8/2015 | Park et al. |
| 9,116,569 B2 | 8/2015 | Stacy et al. |
| 9,116,571 B2 | 8/2015 | Zeliff et al. |
| 9,122,364 B2 | 9/2015 | Kuwabara et al. |
| 9,128,605 B2 | 9/2015 | Nan et al. |
| 9,146,914 B1 | 9/2015 | Dhaundiyal |
| 9,164,779 B2 | 10/2015 | Brakensiek et al. |
| 9,170,607 B2 | 10/2015 | Bose et al. |
| 9,170,649 B2 | 10/2015 | Ronkainen |
| 9,218,105 B2 | 12/2015 | Mansson et al. |
| 9,244,562 B1 | 1/2016 | Rosenberg et al. |
| 9,244,576 B1 | 1/2016 | Vadagave et al. |
| 9,244,601 B2 | 1/2016 | Kim et al. |
| 9,246,487 B2 | 1/2016 | Casparian et al. |
| 9,262,002 B2 | 2/2016 | Momeyer et al. |
| 9,304,668 B2 | 4/2016 | Rezende et al. |
| 9,307,112 B2 | 4/2016 | Molgaard et al. |
| 9,349,552 B2 | 5/2016 | Huska et al. |
| 9,361,018 B2 | 6/2016 | Defazio et al. |
| 9,383,887 B1 | 7/2016 | Khafizov et al. |
| 9,389,718 B1 | 7/2016 | Letourneur |
| 9,389,722 B2 | 7/2016 | Matsuki et al. |
| 9,395,800 B2 | 7/2016 | Liu et al. |
| 9,400,581 B2 | 7/2016 | Bokma et al. |
| 9,405,367 B2 | 8/2016 | Jung et al. |
| 9,405,428 B2 | 8/2016 | Roh et al. |
| 9,417,754 B2 | 8/2016 | Smith |
| 9,423,938 B1 | 8/2016 | Morris |
| 9,436,344 B2 | 9/2016 | Kuwabara et al. |
| 9,448,694 B2 | 9/2016 | Sharma et al. |
| 9,451,230 B1 | 9/2016 | Henderson et al. |
| 9,471,145 B2 | 10/2016 | Langlois et al. |
| 9,477,393 B2 | 10/2016 | Zambetti et al. |
| 9,542,013 B2 | 1/2017 | Dearman et al. |
| 9,547,436 B2 | 1/2017 | Ohki et al. |
| 9,569,093 B2 | 2/2017 | Lipman et al. |
| 9,582,178 B2 | 2/2017 | Grant et al. |
| 9,600,114 B2 | 3/2017 | Milam et al. |
| 9,600,116 B2 | 3/2017 | Tao et al. |
| 9,612,741 B2 | 4/2017 | Brown et al. |
| 9,619,076 B2 | 4/2017 | Bernstein et al. |
| 9,625,987 B1 | 4/2017 | LaPenna et al. |
| 9,645,722 B1 | 5/2017 | Stasior et al. |
| 9,665,762 B2 | 5/2017 | Thompson et al. |
| 9,671,943 B2 | 6/2017 | Van der Velden |
| 9,678,571 B1 | 6/2017 | Robert et al. |
| 9,733,716 B2 | 8/2017 | Shaffer |
| 9,740,381 B1 | 8/2017 | Chaudhri et al. |
| 9,753,527 B2 | 9/2017 | Connell et al. |
| 9,760,241 B1 | 9/2017 | Lewbel |
| 9,785,305 B2 | 10/2017 | Alonso Ruiz et al. |
| 9,804,665 B2 | 10/2017 | DeBates et al. |
| 9,829,980 B2 | 11/2017 | Lisseman et al. |
| 10,055,066 B2 | 8/2018 | Lynn et al. |
| 10,095,396 B2 | 10/2018 | Kudurshian et al. |
| 10,133,388 B2 | 11/2018 | Sudou |
| 10,133,397 B1 | 11/2018 | Smith |
| 10,180,722 B2 | 1/2019 | Lu |
| 10,222,980 B2 | 3/2019 | Alonso Ruiz et al. |
| 10,235,023 B2 | 3/2019 | Gustafsson et al. |
| 10,275,087 B1 | 4/2019 | Smith |
| 10,331,769 B1 | 6/2019 | Hill et al. |
| 10,386,960 B1 | 8/2019 | Smith |
| 10,469,767 B2 | 11/2019 | Shikata |
| 10,496,151 B2 | 12/2019 | Kim et al. |
| 10,547,895 B1 | 1/2020 | Morris |
| 10,739,896 B2 | 8/2020 | Kim et al. |
| 10,782,871 B2 | 9/2020 | Bernstein et al. |
| 2001/0024195 A1 | 9/2001 | Hayakawa et al. |
| 2001/0045965 A1 | 11/2001 | Orbanes et al. |
| 2002/0008691 A1 | 1/2002 | Hanajima et al. |
| 2002/0015064 A1 | 2/2002 | Robotham et al. |
| 2002/0042925 A1 | 4/2002 | Ebisu et al. |
| 2002/0054011 A1 | 5/2002 | Bruneau et al. |
| 2002/0057256 A1 | 5/2002 | Flack |
| 2002/0109668 A1 | 8/2002 | Rosenberg et al. |
| 2002/0109678 A1 | 8/2002 | Marmolin et al. |
| 2002/0140680 A1 | 10/2002 | Lu |
| 2002/0140740 A1 | 10/2002 | Chen |
| 2002/0163498 A1 | 11/2002 | Chang et al. |
| 2002/0180763 A1 | 12/2002 | Kung |
| 2002/0186257 A1 | 12/2002 | Cadiz et al. |
| 2003/0001869 A1 | 1/2003 | Nissen |
| 2003/0013492 A1 | 1/2003 | Bokhari et al. |
| 2003/0086496 A1 | 5/2003 | Zhang et al. |
| 2003/0112269 A1 | 6/2003 | Lentz et al. |
| 2003/0117440 A1 | 6/2003 | Hellyar et al. |
| 2003/0122779 A1 | 7/2003 | Martin et al. |
| 2003/0128242 A1 | 7/2003 | Gordon |
| 2003/0151589 A1 | 8/2003 | Bensen et al. |
| 2003/0184574 A1 | 10/2003 | Phillips et al. |
| 2003/0189552 A1 | 10/2003 | Chuang et al. |
| 2003/0189647 A1 | 10/2003 | Kang |
| 2003/0206169 A1 | 11/2003 | Springer et al. |
| 2003/0222915 A1 | 12/2003 | Marion et al. |
| 2004/0015662 A1 | 1/2004 | Cummings |
| 2004/0021643 A1 | 2/2004 | Hoshino et al. |
| 2004/0056849 A1 | 3/2004 | Lohbihler et al. |
| 2004/0108995 A1 | 6/2004 | Hoshino et al. |
| 2004/0138849 A1 | 7/2004 | Schmidt et al. |
| 2004/0150631 A1 | 8/2004 | Fleck et al. |
| 2004/0150644 A1 | 8/2004 | Kincaid et al. |
| 2004/0155869 A1 | 8/2004 | Robinson et al. |
| 2004/0168131 A1 | 8/2004 | Blumberg |
| 2004/0174399 A1 | 9/2004 | Wu et al. |
| 2004/0219969 A1 | 11/2004 | Casey et al. |
| 2004/0267877 A1 | 12/2004 | Shiparo et al. |
| 2005/0012723 A1 | 1/2005 | Pallakoff |
| 2005/0039141 A1 | 2/2005 | Burke et al. |
| 2005/0064911 A1 | 3/2005 | Chen et al. |
| 2005/0066207 A1 | 3/2005 | Fleck et al. |
| 2005/0076256 A1 | 4/2005 | Fleck et al. |
| 2005/0078093 A1 | 4/2005 | Peterson, Jr. et al. |
| 2005/0091604 A1 | 4/2005 | Davis |
| 2005/0110769 A1 | 5/2005 | DaCosta et al. |
| 2005/0114785 A1 | 5/2005 | Finnigan et al. |
| 2005/0125742 A1 | 6/2005 | Grotjohn et al. |
| 2005/0134578 A1 | 6/2005 | Chambers et al. |
| 2005/0183017 A1 | 8/2005 | Cain |
| 2005/0190280 A1 | 9/2005 | Haas et al. |
| 2005/0204295 A1 | 9/2005 | Voorhees et al. |
| 2005/0223338 A1 | 10/2005 | Partanen |
| 2005/0229112 A1 | 10/2005 | Clay et al. |
| 2005/0283726 A1 | 12/2005 | Lunati |
| 2005/0289476 A1 | 12/2005 | Tokkonen |
| 2006/0001650 A1 | 1/2006 | Robbins et al. |
| 2006/0001657 A1 | 1/2006 | Monney et al. |
| 2006/0012577 A1 | 1/2006 | Kyrola |
| 2006/0022955 A1 | 2/2006 | Kennedy |
| 2006/0026536 A1 | 2/2006 | Hotelling et al. |
| 2006/0031776 A1 | 2/2006 | Glein et al. |
| 2006/0036971 A1 | 2/2006 | Mendel et al. |

(56) References Cited

U.S. PATENT DOCUMENTS

| | | |
|---|---|---|
| 2006/0059436 A1 | 3/2006 | Nurmi |
| 2006/0067677 A1 | 3/2006 | Tokiwa et al. |
| 2006/0101347 A1 | 5/2006 | Runov et al. |
| 2006/0109252 A1 | 5/2006 | Kolmykov-Zotov et al. |
| 2006/0109256 A1 | 5/2006 | Grant et al. |
| 2006/0119586 A1 | 6/2006 | Grant et al. |
| 2006/0132455 A1 | 6/2006 | Rimas-Ribikauskas et al. |
| 2006/0132456 A1 | 6/2006 | Anson |
| 2006/0132457 A1 | 6/2006 | Rimas-Ribikauskas et al. |
| 2006/0136834 A1 | 6/2006 | Cao et al. |
| 2006/0136845 A1 | 6/2006 | Rimas-Ribikauskas et al. |
| 2006/0161861 A1 | 7/2006 | Holecek et al. |
| 2006/0161870 A1 | 7/2006 | Hotelling et al. |
| 2006/0190834 A1 | 8/2006 | Marcjan |
| 2006/0195438 A1 | 8/2006 | Galuten |
| 2006/0197753 A1 | 9/2006 | Hotelling |
| 2006/0212812 A1 | 9/2006 | Simmons et al. |
| 2006/0213754 A1 | 9/2006 | Jarrett et al. |
| 2006/0224989 A1 | 10/2006 | Pettiross et al. |
| 2006/0233248 A1 | 10/2006 | Rynderman et al. |
| 2006/0236263 A1 | 10/2006 | Bathiche et al. |
| 2006/0274042 A1 | 12/2006 | Krah et al. |
| 2006/0274086 A1 | 12/2006 | Forstall et al. |
| 2006/0277469 A1 | 12/2006 | Chaudhri et al. |
| 2006/0282778 A1 | 12/2006 | Barsness et al. |
| 2006/0284858 A1 | 12/2006 | Rekimoto |
| 2006/0290681 A1 | 12/2006 | Ho et al. |
| 2007/0024595 A1 | 2/2007 | Baker et al. |
| 2007/0024646 A1 | 2/2007 | Saarinen et al. |
| 2007/0080953 A1 | 4/2007 | Lii |
| 2007/0113681 A1 | 5/2007 | Nishimura et al. |
| 2007/0120834 A1 | 5/2007 | Boillot |
| 2007/0120835 A1 | 5/2007 | Sato |
| 2007/0124699 A1 | 5/2007 | Michaels |
| 2007/0152959 A1 | 7/2007 | Peters |
| 2007/0157089 A1 | 7/2007 | Van Os et al. |
| 2007/0157173 A1 | 7/2007 | Klein et al. |
| 2007/0168369 A1 | 7/2007 | Bruns |
| 2007/0168890 A1 | 7/2007 | Zhao et al. |
| 2007/0176904 A1 | 8/2007 | Russo |
| 2007/0182999 A1 | 8/2007 | Anthony et al. |
| 2007/0186178 A1 | 8/2007 | Schiller |
| 2007/0200713 A1 | 8/2007 | Weber et al. |
| 2007/0222768 A1 | 9/2007 | Geurts et al. |
| 2007/0229455 A1 | 10/2007 | Martin et al. |
| 2007/0229464 A1 | 10/2007 | Hotelling et al. |
| 2007/0236450 A1 | 10/2007 | Colgate et al. |
| 2007/0236477 A1 | 10/2007 | Ryu et al. |
| 2007/0245241 A1 | 10/2007 | Bertram et al. |
| 2007/0257821 A1 | 11/2007 | Son et al. |
| 2007/0270182 A1 | 11/2007 | Gulliksson et al. |
| 2007/0288862 A1 | 12/2007 | Ording |
| 2007/0294295 A1 | 12/2007 | Finkelstein et al. |
| 2007/0299923 A1 | 12/2007 | Skelly et al. |
| 2008/0001924 A1 | 1/2008 | dos los Reyes et al. |
| 2008/0024459 A1 | 1/2008 | Poupyrev et al. |
| 2008/0034306 A1 | 2/2008 | Ording |
| 2008/0034331 A1 | 2/2008 | Josephsoon et al. |
| 2008/0036743 A1 | 2/2008 | Westerman et al. |
| 2008/0051989 A1 | 2/2008 | Welsh |
| 2008/0052945 A1 | 3/2008 | Matas et al. |
| 2008/0066010 A1 | 3/2008 | Brodersen et al. |
| 2008/0094367 A1 | 4/2008 | Van De Ven et al. |
| 2008/0094368 A1 | 4/2008 | Ording et al. |
| 2008/0094398 A1 | 4/2008 | Ng et al. |
| 2008/0106523 A1 | 5/2008 | Conrad |
| 2008/0109753 A1 | 5/2008 | Karstens |
| 2008/0136790 A1 | 6/2008 | Hio |
| 2008/0155415 A1 | 6/2008 | Yoon et al. |
| 2008/0163119 A1 | 7/2008 | Kim et al. |
| 2008/0165141 A1 | 7/2008 | Christie |
| 2008/0165160 A1 | 7/2008 | Kocienda et al. |
| 2008/0168379 A1 | 7/2008 | Forstall et al. |
| 2008/0168395 A1 | 7/2008 | Ording et al. |
| 2008/0168403 A1 | 7/2008 | Westerman et al. |
| 2008/0168404 A1 | 7/2008 | Ording |
| 2008/0189605 A1 | 8/2008 | Kay et al. |
| 2008/0202824 A1 | 8/2008 | Philipp et al. |
| 2008/0204427 A1 | 8/2008 | Heesemans et al. |
| 2008/0219493 A1 | 9/2008 | Tadmor |
| 2008/0222569 A1 | 9/2008 | Champion et al. |
| 2008/0225007 A1 | 9/2008 | Nakadaira et al. |
| 2008/0244448 A1 | 10/2008 | Goering et al. |
| 2008/0259046 A1 | 10/2008 | Carsanaro |
| 2008/0263452 A1 | 10/2008 | Tomkins |
| 2008/0284866 A1 | 11/2008 | Mizutani |
| 2008/0294984 A1 | 11/2008 | Ramsay et al. |
| 2008/0297475 A1 | 12/2008 | Woolf et al. |
| 2008/0303795 A1 | 12/2008 | Lowles et al. |
| 2008/0303799 A1 | 12/2008 | Schwesig et al. |
| 2008/0307335 A1 | 12/2008 | Chaudhri et al. |
| 2008/0307359 A1 | 12/2008 | Louch et al. |
| 2008/0317378 A1 | 12/2008 | Steinberg et al. |
| 2008/0320419 A1 | 12/2008 | Matas et al. |
| 2009/0007017 A1 | 1/2009 | Anzures et al. |
| 2009/0046110 A1 | 2/2009 | Sadler et al. |
| 2009/0058828 A1 | 3/2009 | Jiang et al. |
| 2009/0061837 A1 | 3/2009 | Chaudhri et al. |
| 2009/0066668 A1 | 3/2009 | Kim et al. |
| 2009/0073118 A1 | 3/2009 | Yamaji et al. |
| 2009/0083665 A1 | 3/2009 | Anttila et al. |
| 2009/0085878 A1 | 4/2009 | Heubel et al. |
| 2009/0085881 A1 | 4/2009 | Keam |
| 2009/0085886 A1 | 4/2009 | Huang et al. |
| 2009/0089293 A1 | 4/2009 | Garritano et al. |
| 2009/0100343 A1 | 4/2009 | Lee et al. |
| 2009/0102804 A1 | 4/2009 | Wong et al. |
| 2009/0102805 A1 | 4/2009 | Meijer et al. |
| 2009/0140985 A1 | 6/2009 | Liu |
| 2009/0150775 A1 | 6/2009 | Miyazaki et al. |
| 2009/0158198 A1 | 6/2009 | Hayter et al. |
| 2009/0160793 A1 | 6/2009 | Rekimoto |
| 2009/0160814 A1 | 6/2009 | Li et al. |
| 2009/0167507 A1 | 7/2009 | Maenpaa |
| 2009/0167508 A1 | 7/2009 | Fadell et al. |
| 2009/0167509 A1 | 7/2009 | Fadell et al. |
| 2009/0167704 A1 | 7/2009 | Terlizzi et al. |
| 2009/0169061 A1 | 7/2009 | Anderson et al. |
| 2009/0187824 A1 | 7/2009 | Hinckley et al. |
| 2009/0189866 A1 | 7/2009 | Haffenden et al. |
| 2009/0195959 A1 | 8/2009 | Ladouceur et al. |
| 2009/0198767 A1 | 8/2009 | Jakobson et al. |
| 2009/0201260 A1 | 8/2009 | Lee et al. |
| 2009/0219294 A1 | 9/2009 | Young et al. |
| 2009/0225037 A1 | 9/2009 | Williamson et al. |
| 2009/0228842 A1 | 9/2009 | Westerman et al. |
| 2009/0237374 A1 | 9/2009 | Li et al. |
| 2009/0244357 A1 | 10/2009 | Huang |
| 2009/0247112 A1 | 10/2009 | Lundy et al. |
| 2009/0247230 A1 | 10/2009 | Lundy et al. |
| 2009/0251410 A1* | 10/2009 | Mori .................. G06F 3/04812 345/157 |
| 2009/0251421 A1 | 10/2009 | Bloebaum |
| 2009/0256947 A1 | 10/2009 | Ciurea et al. |
| 2009/0259975 A1 | 10/2009 | Asai et al. |
| 2009/0267906 A1 | 10/2009 | Schroderus |
| 2009/0276730 A1 | 11/2009 | Aybes et al. |
| 2009/0280860 A1 | 11/2009 | Dahlke |
| 2009/0282360 A1 | 11/2009 | Park et al. |
| 2009/0284478 A1 | 11/2009 | De la Torre Baltierra et al. |
| 2009/0288032 A1 | 11/2009 | Chang et al. |
| 2009/0293009 A1 | 11/2009 | Meserth et al. |
| 2009/0295713 A1 | 12/2009 | Piot et al. |
| 2009/0295739 A1 | 12/2009 | Nagara |
| 2009/0303187 A1 | 12/2009 | Pallakoff |
| 2009/0307583 A1 | 12/2009 | Tonisson |
| 2009/0307633 A1 | 12/2009 | Haughay, Jr. et al. |
| 2009/0322893 A1 | 12/2009 | Stallings et al. |
| 2009/0325566 A1 | 12/2009 | Bell et al. |
| 2010/0007926 A1 | 1/2010 | Imaizumi et al. |
| 2010/0011304 A1 | 1/2010 | Van Os |
| 2010/0013613 A1 | 1/2010 | Weston |
| 2010/0013777 A1 | 1/2010 | Baudisch et al. |
| 2010/0017710 A1 | 1/2010 | Kim et al. |

(56) References Cited

U.S. PATENT DOCUMENTS

| | | |
|---|---|---|
| 2010/0020035 A1 | 1/2010 | Ryu et al. |
| 2010/0026640 A1 | 2/2010 | Kim et al. |
| 2010/0026647 A1 | 2/2010 | Abe et al. |
| 2010/0039446 A1 | 2/2010 | Hillis et al. |
| 2010/0044121 A1 | 2/2010 | Simon et al. |
| 2010/0045619 A1 | 2/2010 | Birnbaum et al. |
| 2010/0057235 A1 | 3/2010 | Wang et al. |
| 2010/0058231 A1 | 3/2010 | Duarte et al. |
| 2010/0060548 A1 | 3/2010 | Choi et al. |
| 2010/0060605 A1* | 3/2010 | Rimas-Ribikauskas ............... G06F 3/04847 345/173 |
| 2010/0061637 A1 | 3/2010 | Mochizuki et al. |
| 2010/0062803 A1 | 3/2010 | Yun et al. |
| 2010/0070908 A1 | 3/2010 | Mod et al. |
| 2010/0073329 A1 | 3/2010 | Raman et al. |
| 2010/0083116 A1 | 4/2010 | Akifusa et al. |
| 2010/0085302 A1 | 4/2010 | Fairweather et al. |
| 2010/0085314 A1 | 4/2010 | Kwok |
| 2010/0085317 A1 | 4/2010 | Park et al. |
| 2010/0088596 A1* | 4/2010 | Griffin ............... G06F 3/04845 715/702 |
| 2010/0088654 A1 | 4/2010 | Henhoeffer |
| 2010/0110082 A1 | 5/2010 | Myrick et al. |
| 2010/0111434 A1 | 5/2010 | Madden |
| 2010/0127983 A1 | 5/2010 | Irani et al. |
| 2010/0128002 A1 | 5/2010 | Stacy et al. |
| 2010/0138776 A1 | 6/2010 | Korhonen |
| 2010/0146507 A1 | 6/2010 | Kang et al. |
| 2010/0148999 A1 | 6/2010 | Casparian et al. |
| 2010/0149096 A1 | 6/2010 | Migos et al. |
| 2010/0153879 A1 | 6/2010 | Rimas-Ribikauskas et al. |
| 2010/0156807 A1 | 6/2010 | Stallings et al. |
| 2010/0156813 A1 | 6/2010 | Duarte et al. |
| 2010/0156818 A1 | 6/2010 | Burrough et al. |
| 2010/0156823 A1 | 6/2010 | Paleczny et al. |
| 2010/0156825 A1 | 6/2010 | Sohn et al. |
| 2010/0159995 A1 | 6/2010 | Stallings et al. |
| 2010/0171713 A1 | 7/2010 | Kwok et al. |
| 2010/0175023 A1 | 7/2010 | Gatlin et al. |
| 2010/0180225 A1 | 7/2010 | Chiba et al. |
| 2010/0199227 A1 | 8/2010 | Xiao et al. |
| 2010/0211872 A1 | 8/2010 | Rolston et al. |
| 2010/0214239 A1 | 8/2010 | Wu |
| 2010/0220065 A1 | 9/2010 | Ma |
| 2010/0225604 A1 | 9/2010 | Homma et al. |
| 2010/0231534 A1 | 9/2010 | Chaudhri et al. |
| 2010/0235726 A1 | 9/2010 | Ording et al. |
| 2010/0235746 A1 | 9/2010 | Anzures |
| 2010/0241955 A1 | 9/2010 | Price et al. |
| 2010/0248787 A1 | 9/2010 | Smuga et al. |
| 2010/0251168 A1 | 9/2010 | Fujita et al. |
| 2010/0259500 A1 | 10/2010 | Kennedy |
| 2010/0271312 A1 | 10/2010 | Alameh et al. |
| 2010/0271500 A1 | 10/2010 | Park et al. |
| 2010/0277419 A1 | 11/2010 | Ganey et al. |
| 2010/0277496 A1 | 11/2010 | Kawanishi et al. |
| 2010/0281379 A1 | 11/2010 | Meaney et al. |
| 2010/0281385 A1 | 11/2010 | Meaney et al. |
| 2010/0287486 A1 | 11/2010 | Coddington |
| 2010/0289807 A1 | 11/2010 | Yu et al. |
| 2010/0295805 A1 | 11/2010 | Shin et al. |
| 2010/0302177 A1 | 12/2010 | Kim et al. |
| 2010/0302179 A1 | 12/2010 | Ahn et al. |
| 2010/0306702 A1 | 12/2010 | Warner |
| 2010/0308983 A1 | 12/2010 | Conte et al. |
| 2010/0309147 A1 | 12/2010 | Fleizach et al. |
| 2010/0313050 A1 | 12/2010 | Harrat et al. |
| 2010/0313124 A1 | 12/2010 | Privault et al. |
| 2010/0313156 A1 | 12/2010 | Louch et al. |
| 2010/0313158 A1 | 12/2010 | Lee et al. |
| 2010/0313166 A1 | 12/2010 | Nakayama et al. |
| 2010/0315417 A1 | 12/2010 | Cho et al. |
| 2010/0315438 A1 | 12/2010 | Horodezky et al. |
| 2010/0317410 A1 | 12/2010 | Song et al. |
| 2010/0321301 A1 | 12/2010 | Casparian et al. |
| 2010/0321312 A1* | 12/2010 | Han ............... G06F 1/1694 345/173 |
| 2010/0325578 A1 | 12/2010 | Mital et al. |
| 2010/0328229 A1 | 12/2010 | Weber et al. |
| 2011/0010626 A1 | 1/2011 | Fino et al. |
| 2011/0012851 A1 | 1/2011 | Ciesla et al. |
| 2011/0018695 A1 | 1/2011 | Bells et al. |
| 2011/0026099 A1 | 2/2011 | Kwon et al. |
| 2011/0035145 A1 | 2/2011 | Yamasaki |
| 2011/0037706 A1 | 2/2011 | Pasquero et al. |
| 2011/0038552 A1 | 2/2011 | Lam |
| 2011/0039602 A1 | 2/2011 | McNamara et al. |
| 2011/0047368 A1 | 2/2011 | Sundaramurthy et al. |
| 2011/0050576 A1 | 3/2011 | Forutanpour et al. |
| 2011/0050588 A1 | 3/2011 | Li et al. |
| 2011/0050591 A1 | 3/2011 | Kim et al. |
| 2011/0050594 A1 | 3/2011 | Kim et al. |
| 2011/0050628 A1 | 3/2011 | Homma et al. |
| 2011/0050629 A1 | 3/2011 | Homma et al. |
| 2011/0050630 A1 | 3/2011 | Ikeda |
| 2011/0050653 A1* | 3/2011 | Miyazawa ............ G06F 3/0482 345/179 |
| 2011/0050687 A1 | 3/2011 | Alyshev et al. |
| 2011/0054837 A1 | 3/2011 | Ikeda |
| 2011/0055135 A1 | 3/2011 | Dawson et al. |
| 2011/0055741 A1 | 3/2011 | Jeon et al. |
| 2011/0057886 A1 | 3/2011 | Ng et al. |
| 2011/0057903 A1 | 3/2011 | Yamano et al. |
| 2011/0061029 A1 | 3/2011 | Yeh et al. |
| 2011/0063248 A1 | 3/2011 | Yoon |
| 2011/0069012 A1 | 3/2011 | Martensson |
| 2011/0069016 A1 | 3/2011 | Victor |
| 2011/0070342 A1 | 3/2011 | Wilkens |
| 2011/0074697 A1 | 3/2011 | Rapp et al. |
| 2011/0080349 A1 | 4/2011 | Holbein et al. |
| 2011/0080350 A1 | 4/2011 | Almalki et al. |
| 2011/0080367 A1 | 4/2011 | Marchand et al. |
| 2011/0084910 A1 | 4/2011 | Almalki et al. |
| 2011/0087982 A1 | 4/2011 | McCann et al. |
| 2011/0087983 A1 | 4/2011 | Shim |
| 2011/0093815 A1 | 4/2011 | Gobeil |
| 2011/0093817 A1 | 4/2011 | Song et al. |
| 2011/0102340 A1 | 5/2011 | Martin et al. |
| 2011/0102829 A1 | 5/2011 | Jourdan |
| 2011/0107272 A1 | 5/2011 | Aguilar |
| 2011/0109617 A1 | 5/2011 | Snook et al. |
| 2011/0116716 A1 | 5/2011 | Kwon et al. |
| 2011/0126139 A1 | 5/2011 | Jeong et al. |
| 2011/0138295 A1 | 6/2011 | Momchilov et al. |
| 2011/0141031 A1 | 6/2011 | McCullough et al. |
| 2011/0141052 A1 | 6/2011 | Bernstein et al. |
| 2011/0144777 A1 | 6/2011 | Firkins et al. |
| 2011/0145752 A1 | 6/2011 | Fagans |
| 2011/0145753 A1 | 6/2011 | Prakash |
| 2011/0145759 A1 | 6/2011 | Leffert et al. |
| 2011/0145764 A1 | 6/2011 | Higuchi et al. |
| 2011/0149138 A1 | 6/2011 | Watkins |
| 2011/0154199 A1 | 6/2011 | Maffitt et al. |
| 2011/0163971 A1 | 7/2011 | Wagner et al. |
| 2011/0163978 A1 | 7/2011 | Park et al. |
| 2011/0164042 A1 | 7/2011 | Chaudhri |
| 2011/0167369 A1 | 7/2011 | van Os |
| 2011/0169765 A1 | 7/2011 | Aono |
| 2011/0175826 A1 | 7/2011 | Moore et al. |
| 2011/0175830 A1 | 7/2011 | Miyazawa et al. |
| 2011/0175832 A1 | 7/2011 | Miyazawa et al. |
| 2011/0179368 A1 | 7/2011 | King et al. |
| 2011/0179381 A1 | 7/2011 | King |
| 2011/0181521 A1 | 7/2011 | Reid et al. |
| 2011/0181538 A1 | 7/2011 | Aono |
| 2011/0181751 A1 | 7/2011 | Mizumori |
| 2011/0185299 A1 | 7/2011 | Hinckley et al. |
| 2011/0185300 A1 | 7/2011 | Hinckley et al. |
| 2011/0185316 A1 | 7/2011 | Reid et al. |
| 2011/0191675 A1 | 8/2011 | Kauranen |
| 2011/0193788 A1 | 8/2011 | King et al. |
| 2011/0193809 A1 | 8/2011 | Walley et al. |
| 2011/0193881 A1 | 8/2011 | Rydenhag |

(56) References Cited

U.S. PATENT DOCUMENTS

| | | |
|---|---|---|
| 2011/0197160 A1 | 8/2011 | Kim et al. |
| 2011/0201387 A1 | 8/2011 | Paek et al. |
| 2011/0202834 A1 | 8/2011 | Mandryk et al. |
| 2011/0202853 A1 | 8/2011 | Mujkic |
| 2011/0202879 A1 | 8/2011 | Stovicek et al. |
| 2011/0205163 A1 | 8/2011 | Hinckley et al. |
| 2011/0209088 A1 | 8/2011 | Hinckley et al. |
| 2011/0209093 A1 | 8/2011 | Hinckley et al. |
| 2011/0209097 A1 | 8/2011 | Hinckley et al. |
| 2011/0209099 A1 | 8/2011 | Hinckley et al. |
| 2011/0209104 A1 | 8/2011 | Hinckley et al. |
| 2011/0210926 A1 | 9/2011 | Pasquero et al. |
| 2011/0210931 A1 | 9/2011 | Shai |
| 2011/0215914 A1 | 9/2011 | Edwards |
| 2011/0221684 A1 | 9/2011 | Rydenhag |
| 2011/0221776 A1 | 9/2011 | Shimotani et al. |
| 2011/0231789 A1 | 9/2011 | Bukurak et al. |
| 2011/0234639 A1 | 9/2011 | Shimotani et al. |
| 2011/0238690 A1 | 9/2011 | Arrasvouri et al. |
| 2011/0239110 A1 | 9/2011 | Garrett et al. |
| 2011/0242029 A1 | 10/2011 | Kasahara et al. |
| 2011/0246801 A1 | 10/2011 | Seethaler et al. |
| 2011/0246877 A1 | 10/2011 | Kwak et al. |
| 2011/0248916 A1 | 10/2011 | Griffin et al. |
| 2011/0248942 A1 | 10/2011 | Yana et al. |
| 2011/0248948 A1 | 10/2011 | Griffin et al. |
| 2011/0252346 A1 | 10/2011 | Chaudhri |
| 2011/0252357 A1 | 10/2011 | Chaudhri |
| 2011/0252362 A1 | 10/2011 | Cho et al. |
| 2011/0258537 A1 | 10/2011 | Rives et al. |
| 2011/0260994 A1 | 10/2011 | Saynac et al. |
| 2011/0263298 A1 | 10/2011 | Park |
| 2011/0267530 A1 | 11/2011 | Chun |
| 2011/0279380 A1 | 11/2011 | Weber et al. |
| 2011/0279381 A1 | 11/2011 | Tong et al. |
| 2011/0279395 A1 | 11/2011 | Kuwabara et al. |
| 2011/0279852 A1 | 11/2011 | Oda et al. |
| 2011/0285656 A1 | 11/2011 | Yaksick et al. |
| 2011/0285659 A1 | 11/2011 | Kuwabara et al. |
| 2011/0291945 A1 | 12/2011 | Ewing, Jr. et al. |
| 2011/0291951 A1 | 12/2011 | Tong |
| 2011/0296334 A1 | 12/2011 | Ryu et al. |
| 2011/0296351 A1 | 12/2011 | Ewing, Jr. et al. |
| 2011/0304559 A1 | 12/2011 | Pasquero |
| 2011/0304577 A1 | 12/2011 | Brown et al. |
| 2011/0310049 A1 | 12/2011 | Homma et al. |
| 2011/0319136 A1 | 12/2011 | Labowicz et al. |
| 2012/0001856 A1 | 1/2012 | Davidson |
| 2012/0005622 A1 | 1/2012 | Park et al. |
| 2012/0007857 A1 | 1/2012 | Noda et al. |
| 2012/0011437 A1 | 1/2012 | James et al. |
| 2012/0013541 A1 | 1/2012 | Boka et al. |
| 2012/0013542 A1 | 1/2012 | Shenfield |
| 2012/0013607 A1 | 1/2012 | Lee |
| 2012/0019448 A1 | 1/2012 | Pitkanen et al. |
| 2012/0026110 A1 | 2/2012 | Yamano |
| 2012/0030623 A1 | 2/2012 | Hoellwarth |
| 2012/0032979 A1 | 2/2012 | Blow et al. |
| 2012/0036441 A1 | 2/2012 | Basir et al. |
| 2012/0036556 A1 | 2/2012 | LeBeau et al. |
| 2012/0038580 A1 | 2/2012 | Sasaki |
| 2012/0044153 A1 | 2/2012 | Arrasvouri et al. |
| 2012/0047380 A1 | 2/2012 | Nurmi |
| 2012/0056837 A1 | 3/2012 | Park et al. |
| 2012/0056848 A1 | 3/2012 | Yamano et al. |
| 2012/0062470 A1 | 3/2012 | Chang |
| 2012/0062564 A1 | 3/2012 | Miyashita et al. |
| 2012/0062604 A1 | 3/2012 | Lobo |
| 2012/0062732 A1 | 3/2012 | Marman et al. |
| 2012/0066630 A1 | 3/2012 | Kim et al. |
| 2012/0066648 A1 | 3/2012 | Rolleston et al. |
| 2012/0081326 A1 | 4/2012 | Heubel et al. |
| 2012/0081375 A1 | 4/2012 | Robert et al. |
| 2012/0084644 A1 | 4/2012 | Robert et al. |
| 2012/0084689 A1 | 4/2012 | Ledet et al. |
| 2012/0084713 A1 | 4/2012 | Desai et al. |
| 2012/0089932 A1 | 4/2012 | Kano et al. |
| 2012/0089942 A1 | 4/2012 | Gammon |
| 2012/0089951 A1 | 4/2012 | Cassidy |
| 2012/0096393 A1 | 4/2012 | Shim et al. |
| 2012/0096400 A1 | 4/2012 | Cho |
| 2012/0098780 A1 | 4/2012 | Fujisawa et al. |
| 2012/0102437 A1 | 4/2012 | Worley et al. |
| 2012/0105358 A1 | 5/2012 | Momeyer et al. |
| 2012/0105367 A1 | 5/2012 | Son et al. |
| 2012/0106852 A1 | 5/2012 | Khawand et al. |
| 2012/0113007 A1 | 5/2012 | Koch et al. |
| 2012/0113023 A1 | 5/2012 | Koch et al. |
| 2012/0126962 A1 | 5/2012 | Ujii et al. |
| 2012/0131495 A1 | 5/2012 | Goossens et al. |
| 2012/0139844 A1 | 6/2012 | Ramstein et al. |
| 2012/0139864 A1 | 6/2012 | Sleeman et al. |
| 2012/0144330 A1 | 6/2012 | Flint |
| 2012/0146945 A1 | 6/2012 | Miyazawa et al. |
| 2012/0147052 A1 | 6/2012 | Homma et al. |
| 2012/0154303 A1 | 6/2012 | Lazaridis et al. |
| 2012/0154328 A1 | 6/2012 | Kono |
| 2012/0158629 A1 | 6/2012 | Hinckley et al. |
| 2012/0159380 A1 | 6/2012 | Kocienda et al. |
| 2012/0169646 A1 | 7/2012 | Berkes et al. |
| 2012/0169716 A1 | 7/2012 | Mihara |
| 2012/0176403 A1 | 7/2012 | Cha et al. |
| 2012/0179967 A1 | 7/2012 | Hayes |
| 2012/0180001 A1 | 7/2012 | Griffin et al. |
| 2012/0182226 A1 | 7/2012 | Tuli |
| 2012/0183271 A1 | 7/2012 | Forutanpour et al. |
| 2012/0192108 A1 | 7/2012 | Kolb |
| 2012/0200528 A1 | 8/2012 | Ciesla et al. |
| 2012/0206393 A1 | 8/2012 | Hillis et al. |
| 2012/0216114 A1 | 8/2012 | Privault et al. |
| 2012/0218203 A1 | 8/2012 | Kanki |
| 2012/0235912 A1 | 9/2012 | Laubach |
| 2012/0240044 A1 | 9/2012 | Johnson et al. |
| 2012/0249575 A1 | 10/2012 | Krolczyk et al. |
| 2012/0249853 A1 | 10/2012 | Krolczyk et al. |
| 2012/0250598 A1 | 10/2012 | Lonnfors et al. |
| 2012/0256829 A1 | 10/2012 | Dodge |
| 2012/0256846 A1 | 10/2012 | Mak |
| 2012/0256847 A1 | 10/2012 | Mak et al. |
| 2012/0256857 A1 | 10/2012 | Mak |
| 2012/0257071 A1 | 10/2012 | Prentice |
| 2012/0260219 A1 | 10/2012 | Piccolotto |
| 2012/0260220 A1 | 10/2012 | Griffin |
| 2012/0274578 A1 | 11/2012 | Snow et al. |
| 2012/0274591 A1 | 11/2012 | Rimas-Ribikauskas et al. |
| 2012/0274662 A1 | 11/2012 | Kim et al. |
| 2012/0278744 A1 | 11/2012 | Kozitsyn et al. |
| 2012/0284673 A1 | 11/2012 | Lamb et al. |
| 2012/0293449 A1 | 11/2012 | Dietz |
| 2012/0293551 A1 | 11/2012 | Momeyer et al. |
| 2012/0297041 A1 | 11/2012 | Momchilov |
| 2012/0303548 A1 | 11/2012 | Johnson et al. |
| 2012/0304108 A1 | 11/2012 | Jarrett et al. |
| 2012/0304132 A1 | 11/2012 | Sareen et al. |
| 2012/0304133 A1 | 11/2012 | Nan et al. |
| 2012/0306632 A1* | 12/2012 | Fleizach ........... H04M 1/72519 340/407.2 |
| 2012/0306748 A1 | 12/2012 | Fleizach et al. |
| 2012/0306764 A1 | 12/2012 | Kamibeppu |
| 2012/0306765 A1 | 12/2012 | Moore |
| 2012/0306766 A1 | 12/2012 | Moore |
| 2012/0306772 A1 | 12/2012 | Tan et al. |
| 2012/0306778 A1 | 12/2012 | Wheeldreyer et al. |
| 2012/0306927 A1 | 12/2012 | Lee et al. |
| 2012/0311429 A1 | 12/2012 | Decker et al. |
| 2012/0311437 A1 | 12/2012 | Weeldreyer et al. |
| 2012/0311498 A1 | 12/2012 | Kluttz et al. |
| 2013/0002561 A1 | 1/2013 | Wakasa |
| 2013/0014057 A1 | 1/2013 | Reinpoldt et al. |
| 2013/0016042 A1 | 1/2013 | Makinen et al. |
| 2013/0016122 A1 | 1/2013 | Bhatt et al. |
| 2013/0019158 A1 | 1/2013 | Watanabe |
| 2013/0019174 A1 | 1/2013 | Gil et al. |
| 2013/0031514 A1 | 1/2013 | Gabbert |

(56) References Cited

U.S. PATENT DOCUMENTS

| | | |
|---|---|---|
| 2013/0036386 A1 | 2/2013 | Park et al. |
| 2013/0042199 A1 | 2/2013 | Fong et al. |
| 2013/0044062 A1 | 2/2013 | Bose et al. |
| 2013/0047100 A1 | 2/2013 | Kroeger et al. |
| 2013/0050131 A1 | 2/2013 | Lee et al. |
| 2013/0050143 A1 | 2/2013 | Kim et al. |
| 2013/0061172 A1 | 3/2013 | Huang et al. |
| 2013/0063364 A1 | 3/2013 | Moore |
| 2013/0063389 A1 | 3/2013 | Moore |
| 2013/0067383 A1 | 3/2013 | Kataoka et al. |
| 2013/0067513 A1 | 3/2013 | Takami |
| 2013/0067527 A1 | 3/2013 | Ashbook et al. |
| 2013/0069889 A1 | 3/2013 | Pearce et al. |
| 2013/0074003 A1 | 3/2013 | Dolenc |
| 2013/0076676 A1 | 3/2013 | Gan |
| 2013/0077804 A1 | 3/2013 | Glebe et al. |
| 2013/0082824 A1 | 4/2013 | Colley |
| 2013/0082937 A1 | 4/2013 | Liu et al. |
| 2013/0086056 A1 | 4/2013 | Dyor et al. |
| 2013/0093691 A1 | 4/2013 | Moosavi |
| 2013/0093764 A1 | 4/2013 | Andersson et al. |
| 2013/0097520 A1 | 4/2013 | Lewin et al. |
| 2013/0097521 A1 | 4/2013 | Lewin et al. |
| 2013/0097534 A1 | 4/2013 | Lewin et al. |
| 2013/0097539 A1 | 4/2013 | Mansson et al. |
| 2013/0097556 A1 | 4/2013 | Louch |
| 2013/0097562 A1 | 4/2013 | Kermoian et al. |
| 2013/0111345 A1 | 5/2013 | Newman et al. |
| 2013/0111378 A1 | 5/2013 | Newman et al. |
| 2013/0111398 A1 | 5/2013 | Lu et al. |
| 2013/0111415 A1 | 5/2013 | Newman et al. |
| 2013/0111579 A1 | 5/2013 | Newman et al. |
| 2013/0113715 A1 | 5/2013 | Grant et al. |
| 2013/0113720 A1 | 5/2013 | Van Eerd et al. |
| 2013/0113760 A1 | 5/2013 | Gossweiler, III et al. |
| 2013/0120278 A1 | 5/2013 | Cantrell |
| 2013/0120280 A1 | 5/2013 | Kukulski |
| 2013/0120295 A1 | 5/2013 | Kim et al. |
| 2013/0120306 A1 | 5/2013 | Furukawa |
| 2013/0125039 A1 | 5/2013 | Murata |
| 2013/0127755 A1 | 5/2013 | Lynn et al. |
| 2013/0135243 A1 | 5/2013 | Hirsch et al. |
| 2013/0135288 A1 | 5/2013 | King et al. |
| 2013/0135499 A1 | 5/2013 | Song |
| 2013/0141364 A1 | 6/2013 | Lynn et al. |
| 2013/0141396 A1 | 6/2013 | Lynn et al. |
| 2013/0145313 A1 | 6/2013 | Roh et al. |
| 2013/0154948 A1 | 6/2013 | Schediwy et al. |
| 2013/0154959 A1 | 6/2013 | Lindsay et al. |
| 2013/0155018 A1 | 6/2013 | Dagdeviren |
| 2013/0159893 A1 | 6/2013 | Lewis et al. |
| 2013/0162603 A1 | 6/2013 | Peng et al. |
| 2013/0162667 A1 | 6/2013 | Eskolin et al. |
| 2013/0169549 A1 | 7/2013 | Seymour et al. |
| 2013/0174049 A1 | 7/2013 | Townsend et al. |
| 2013/0174089 A1 | 7/2013 | Ki |
| 2013/0174094 A1 | 7/2013 | Heo et al. |
| 2013/0174179 A1 | 7/2013 | Park et al. |
| 2013/0179840 A1 | 7/2013 | Fisher et al. |
| 2013/0185642 A1 | 7/2013 | Gammons |
| 2013/0187869 A1 | 7/2013 | Rydenhag et al. |
| 2013/0191791 A1 | 7/2013 | Rydenhag et al. |
| 2013/0194217 A1 | 8/2013 | Lee et al. |
| 2013/0194480 A1 | 8/2013 | Fukata et al. |
| 2013/0198690 A1 | 8/2013 | Barsoum et al. |
| 2013/0201139 A1 | 8/2013 | Tanaka |
| 2013/0212515 A1 | 8/2013 | Eleftheriou |
| 2013/0212541 A1 | 8/2013 | Dolenc et al. |
| 2013/0215079 A1 | 8/2013 | Johnson et al. |
| 2013/0222274 A1 | 8/2013 | Mori et al. |
| 2013/0222323 A1 | 8/2013 | McKenzie |
| 2013/0222333 A1 | 8/2013 | Miles et al. |
| 2013/0222671 A1 | 8/2013 | Tseng et al. |
| 2013/0227413 A1 | 8/2013 | Thorsander et al. |
| 2013/0227419 A1 | 8/2013 | Lee et al. |
| 2013/0227450 A1 | 8/2013 | Na et al. |
| 2013/0228023 A1 | 9/2013 | Drasnin et al. |
| 2013/0232353 A1 | 9/2013 | Belesiu et al. |
| 2013/0232402 A1 | 9/2013 | Lu et al. |
| 2013/0234929 A1 | 9/2013 | Libin |
| 2013/0239057 A1 | 9/2013 | Ubillos et al. |
| 2013/0246954 A1 | 9/2013 | Gray et al. |
| 2013/0249814 A1 | 9/2013 | Zeng |
| 2013/0257793 A1 | 10/2013 | Zeliff et al. |
| 2013/0257817 A1 | 10/2013 | Yliaho |
| 2013/0265246 A1 | 10/2013 | Tae |
| 2013/0265452 A1 | 10/2013 | Shin et al. |
| 2013/0268875 A1 | 10/2013 | Han et al. |
| 2013/0271395 A1 | 10/2013 | Tsai et al. |
| 2013/0275422 A1 | 10/2013 | Silber et al. |
| 2013/0278520 A1 | 10/2013 | Weng et al. |
| 2013/0293496 A1 | 11/2013 | Takamoto |
| 2013/0305184 A1 | 11/2013 | Kim et al. |
| 2013/0307790 A1 | 11/2013 | Konttori et al. |
| 2013/0307792 A1 | 11/2013 | Andres et al. |
| 2013/0314359 A1 | 11/2013 | Sudou |
| 2013/0314434 A1 | 11/2013 | Shetterly et al. |
| 2013/0321340 A1 | 12/2013 | Seo et al. |
| 2013/0321457 A1 | 12/2013 | Bauermeister et al. |
| 2013/0325342 A1 | 12/2013 | Pylappan et al. |
| 2013/0326420 A1 | 12/2013 | Liu et al. |
| 2013/0326421 A1 | 12/2013 | Jo |
| 2013/0326583 A1 | 12/2013 | Freihold et al. |
| 2013/0328770 A1 | 12/2013 | Parham |
| 2013/0328793 A1 | 12/2013 | Chowdhury |
| 2013/0328796 A1 | 12/2013 | Al-Dahle et al. |
| 2013/0332836 A1 | 12/2013 | Cho |
| 2013/0332892 A1 | 12/2013 | Matsuki |
| 2013/0335373 A1 | 12/2013 | Tomiyasu |
| 2013/0338847 A1 | 12/2013 | Lisseman et al. |
| 2013/0339001 A1 | 12/2013 | Craswell et al. |
| 2013/0339909 A1 | 12/2013 | Ha |
| 2014/0002355 A1 | 1/2014 | Lee et al. |
| 2014/0002374 A1 | 1/2014 | Hunt et al. |
| 2014/0002386 A1 | 1/2014 | Rosenberg et al. |
| 2014/0013271 A1 | 1/2014 | Moore et al. |
| 2014/0024414 A1 | 1/2014 | Fuji |
| 2014/0026098 A1 | 1/2014 | Gilman |
| 2014/0026099 A1 | 1/2014 | Reimer et al. |
| 2014/0028554 A1 | 1/2014 | De Los Reyes et al. |
| 2014/0028571 A1 | 1/2014 | St. Clair |
| 2014/0028601 A1 | 1/2014 | Moore |
| 2014/0028606 A1 | 1/2014 | Giannetta |
| 2014/0035804 A1 | 2/2014 | Dearman |
| 2014/0035826 A1 | 2/2014 | Frazier et al. |
| 2014/0049491 A1 | 2/2014 | Nagar et al. |
| 2014/0055367 A1 | 2/2014 | Dearman et al. |
| 2014/0055377 A1 | 2/2014 | Kim |
| 2014/0059460 A1 | 2/2014 | Ho |
| 2014/0059485 A1 | 2/2014 | Lehrian et al. |
| 2014/0062956 A1 | 3/2014 | Ishizone et al. |
| 2014/0063316 A1 | 3/2014 | Lee et al. |
| 2014/0063541 A1 | 3/2014 | Yamazaki |
| 2014/0067293 A1 | 3/2014 | Parivar et al. |
| 2014/0071060 A1 | 3/2014 | Santos-Gomez |
| 2014/0072281 A1 | 3/2014 | Cho et al. |
| 2014/0072283 A1 | 3/2014 | Cho et al. |
| 2014/0078318 A1 | 3/2014 | Alameh |
| 2014/0078343 A1 | 3/2014 | Dai et al. |
| 2014/0082536 A1 | 3/2014 | Costa et al. |
| 2014/0092025 A1 | 4/2014 | Pala et al. |
| 2014/0092030 A1 | 4/2014 | Van der Velden |
| 2014/0092031 A1 | 4/2014 | Schwartz et al. |
| 2014/0108936 A1 | 4/2014 | Khosropour et al. |
| 2014/0109016 A1 | 4/2014 | Ouyang et al. |
| 2014/0111456 A1 | 4/2014 | Kashiwa et al. |
| 2014/0111480 A1 | 4/2014 | Kim et al. |
| 2014/0111670 A1 | 4/2014 | Lord et al. |
| 2014/0118268 A1 | 5/2014 | Kuscher |
| 2014/0123080 A1 | 5/2014 | Gan |
| 2014/0139456 A1 | 5/2014 | Wigdor et al. |
| 2014/0139471 A1 | 5/2014 | Matsuki |
| 2014/0145970 A1 | 5/2014 | Cho |
| 2014/0152581 A1 | 6/2014 | Case et al. |

(56) References Cited

U.S. PATENT DOCUMENTS

| | | |
|---|---|---|
| 2014/0157203 A1 | 6/2014 | Jeon et al. |
| 2014/0160063 A1 | 6/2014 | Yairi et al. |
| 2014/0160073 A1 | 6/2014 | Matsuki |
| 2014/0164955 A1 | 6/2014 | Thiruvidam et al. |
| 2014/0164966 A1 | 6/2014 | Kim et al. |
| 2014/0165006 A1 | 6/2014 | Chaudhri et al. |
| 2014/0168093 A1 | 6/2014 | Lawrence |
| 2014/0168153 A1 | 6/2014 | Deichmann et al. |
| 2014/0173517 A1 | 6/2014 | Chaudhri |
| 2014/0179377 A1 | 6/2014 | Song et al. |
| 2014/0184526 A1 | 7/2014 | Cho |
| 2014/0201660 A1 | 7/2014 | Clausen et al. |
| 2014/0208271 A1 | 7/2014 | Bell et al. |
| 2014/0210758 A1 | 7/2014 | Park et al. |
| 2014/0210760 A1 | 7/2014 | Aberg et al. |
| 2014/0210798 A1 | 7/2014 | Wilson |
| 2014/0223376 A1 | 8/2014 | Tarvainen et al. |
| 2014/0223381 A1 | 8/2014 | Huang et al. |
| 2014/0237408 A1 | 8/2014 | Ohlsson et al. |
| 2014/0245202 A1 | 8/2014 | Yoon et al. |
| 2014/0245367 A1 | 8/2014 | Sasaki et al. |
| 2014/0267114 A1 | 9/2014 | Lisseman et al. |
| 2014/0267135 A1 | 9/2014 | Chhabra |
| 2014/0267362 A1 | 9/2014 | Kocienda et al. |
| 2014/0282084 A1 | 9/2014 | Murarka et al. |
| 2014/0282211 A1 | 9/2014 | Ady et al. |
| 2014/0282214 A1 | 9/2014 | Shirzadi et al. |
| 2014/0300569 A1 | 10/2014 | Matsuki et al. |
| 2014/0304599 A1 | 10/2014 | Alexandersson |
| 2014/0304651 A1 | 10/2014 | Johansson et al. |
| 2014/0306897 A1 | 10/2014 | Cueto |
| 2014/0306899 A1 | 10/2014 | Hicks |
| 2014/0310638 A1 | 10/2014 | Lee et al. |
| 2014/0313130 A1 | 10/2014 | Yamano et al. |
| 2014/0333551 A1 | 11/2014 | Kim et al. |
| 2014/0333561 A1 | 11/2014 | Bull et al. |
| 2014/0344765 A1 | 11/2014 | Hicks et al. |
| 2014/0351744 A1 | 11/2014 | Jeon et al. |
| 2014/0354845 A1 | 12/2014 | Molgaard et al. |
| 2014/0354850 A1 | 12/2014 | Kosaka et al. |
| 2014/0359438 A1 | 12/2014 | Matsuki |
| 2014/0359528 A1 | 12/2014 | Murata |
| 2014/0365945 A1 | 12/2014 | Karunamuni et al. |
| 2014/0380247 A1 | 12/2014 | Tecarro et al. |
| 2015/0002664 A1 | 1/2015 | Eppinger et al. |
| 2015/0012861 A1 | 1/2015 | Loginov |
| 2015/0015763 A1 | 1/2015 | Lee et al. |
| 2015/0019997 A1 | 1/2015 | Kim et al. |
| 2015/0020032 A1 | 1/2015 | Chen |
| 2015/0020033 A1 | 1/2015 | Newham et al. |
| 2015/0020036 A1 | 1/2015 | Kim et al. |
| 2015/0026584 A1 | 1/2015 | Kobayakov et al. |
| 2015/0026592 A1 | 1/2015 | Mohammed et al. |
| 2015/0026642 A1 | 1/2015 | Wilson et al. |
| 2015/0029149 A1 | 1/2015 | Andersson et al. |
| 2015/0033184 A1 | 1/2015 | Kim et al. |
| 2015/0040065 A1 | 2/2015 | Bianco et al. |
| 2015/0042588 A1 | 2/2015 | Park |
| 2015/0046876 A1 | 2/2015 | Goldenberg |
| 2015/0049033 A1 | 2/2015 | Kim et al. |
| 2015/0052464 A1 | 2/2015 | Chen et al. |
| 2015/0055890 A1 | 2/2015 | Lundin et al. |
| 2015/0058723 A1 | 2/2015 | Cieplinski et al. |
| 2015/0062046 A1 | 3/2015 | Cho et al. |
| 2015/0062052 A1 | 3/2015 | Bernstein et al. |
| 2015/0062068 A1 | 3/2015 | Shih et al. |
| 2015/0067495 A1 | 3/2015 | Bernstein et al. |
| 2015/0067496 A1 | 3/2015 | Missig et al. |
| 2015/0067497 A1 | 3/2015 | Cieplinski et al. |
| 2015/0067513 A1 | 3/2015 | Zambetti et al. |
| 2015/0067519 A1 | 3/2015 | Missig et al. |
| 2015/0067534 A1 | 3/2015 | Choi et al. |
| 2015/0067559 A1 | 3/2015 | Missig et al. |
| 2015/0067560 A1 | 3/2015 | Cieplinski et al. |
| 2015/0067563 A1 | 3/2015 | Bernstein et al. |
| 2015/0067596 A1 | 3/2015 | Brown et al. |
| 2015/0067601 A1 | 3/2015 | Bernstein et al. |
| 2015/0067602 A1 | 3/2015 | Bernstein et al. |
| 2015/0067605 A1 | 3/2015 | Zambetti et al. |
| 2015/0071547 A1 | 3/2015 | Keating et al. |
| 2015/0082162 A1 | 3/2015 | Cho et al. |
| 2015/0082238 A1 | 3/2015 | Meng |
| 2015/0116205 A1 | 4/2015 | Westerman et al. |
| 2015/0121218 A1 | 4/2015 | Kim et al. |
| 2015/0121225 A1 | 4/2015 | Somasundaram et al. |
| 2015/0128092 A1 | 5/2015 | Lee et al. |
| 2015/0135108 A1 | 5/2015 | Pope et al. |
| 2015/0135109 A1 | 5/2015 | Zambetti et al. |
| 2015/0138126 A1 | 5/2015 | Westerman |
| 2015/0138155 A1 | 5/2015 | Bernstein et al. |
| 2015/0139605 A1 | 5/2015 | Wiklof |
| 2015/0143273 A1 | 5/2015 | Bernstein et al. |
| 2015/0143284 A1 | 5/2015 | Bennett et al. |
| 2015/0143294 A1 | 5/2015 | Piccinato et al. |
| 2015/0143303 A1 | 5/2015 | Sarrazin et al. |
| 2015/0149899 A1 | 5/2015 | Bernstein et al. |
| 2015/0149964 A1 | 5/2015 | Bernstein et al. |
| 2015/0149967 A1 | 5/2015 | Bernstein et al. |
| 2015/0153897 A1 | 6/2015 | Huang et al. |
| 2015/0153929 A1 | 6/2015 | Bernstein et al. |
| 2015/0160729 A1 | 6/2015 | Nakagawa |
| 2015/0169059 A1 | 6/2015 | Behles et al. |
| 2015/0185840 A1 | 7/2015 | Golyshko et al. |
| 2015/0193099 A1 | 7/2015 | Murphy |
| 2015/0193951 A1 | 7/2015 | Lee et al. |
| 2015/0205495 A1 | 7/2015 | Koide et al. |
| 2015/0205775 A1 | 7/2015 | Berdahl et al. |
| 2015/0234446 A1 | 8/2015 | Nathan et al. |
| 2015/0234493 A1 | 8/2015 | Parivar et al. |
| 2015/0253866 A1 | 9/2015 | Amm et al. |
| 2015/0268786 A1 | 9/2015 | Kitada |
| 2015/0268813 A1 | 9/2015 | Bos |
| 2015/0309573 A1 | 10/2015 | Brombach et al. |
| 2015/0321607 A1 | 11/2015 | Cho et al. |
| 2015/0332107 A1 | 11/2015 | Paniaras |
| 2015/0332607 A1 | 11/2015 | Gardner, Jr. et al. |
| 2015/0378519 A1 | 12/2015 | Brown et al. |
| 2015/0378982 A1 | 12/2015 | McKenzie et al. |
| 2015/0381931 A1 | 12/2015 | Uhma et al. |
| 2016/0004373 A1 | 1/2016 | Huang |
| 2016/0004393 A1 | 1/2016 | Faaborg et al. |
| 2016/0004427 A1 | 1/2016 | Zambetti et al. |
| 2016/0004428 A1 | 1/2016 | Bernstein et al. |
| 2016/0004430 A1 | 1/2016 | Missig et al. |
| 2016/0004431 A1 | 1/2016 | Bernstein et al. |
| 2016/0004432 A1 | 1/2016 | Bernstein et al. |
| 2016/0011725 A1 | 1/2016 | D'Argenio et al. |
| 2016/0011771 A1 | 1/2016 | Cieplinski |
| 2016/0019718 A1 | 1/2016 | Mukkamala et al. |
| 2016/0021511 A1 | 1/2016 | Jin et al. |
| 2016/0041750 A1 | 2/2016 | Cieplinski et al. |
| 2016/0048326 A1 | 2/2016 | Kim et al. |
| 2016/0062466 A1 | 3/2016 | Moussette et al. |
| 2016/0062619 A1 | 3/2016 | Reeve et al. |
| 2016/0070401 A1 | 3/2016 | Kim et al. |
| 2016/0077721 A1 | 3/2016 | Laubach et al. |
| 2016/0085385 A1 | 3/2016 | Gao et al. |
| 2016/0092071 A1 | 3/2016 | Lawson et al. |
| 2016/0124924 A1 | 5/2016 | Greenberg et al. |
| 2016/0125234 A1 | 5/2016 | Ota et al. |
| 2016/0132139 A1 | 5/2016 | Du et al. |
| 2016/0188181 A1 | 6/2016 | Smith |
| 2016/0196028 A1 | 7/2016 | Kenney et al. |
| 2016/0210025 A1 | 7/2016 | Bernstein et al. |
| 2016/0246478 A1 | 8/2016 | Davis et al. |
| 2016/0259412 A1 | 9/2016 | Flint et al. |
| 2016/0259413 A1 | 9/2016 | Anzures et al. |
| 2016/0259495 A1 | 9/2016 | Butcher et al. |
| 2016/0259496 A1 | 9/2016 | Butcher et al. |
| 2016/0259498 A1 | 9/2016 | Foss et al. |
| 2016/0259499 A1 | 9/2016 | Kocienda et al. |
| 2016/0259516 A1 | 9/2016 | Kudurshian et al. |
| 2016/0259517 A1 | 9/2016 | Butcher et al. |
| 2016/0259518 A1 | 9/2016 | King et al. |

(56) References Cited

U.S. PATENT DOCUMENTS

| | | |
|---|---|---|
| 2016/0259519 A1 | 9/2016 | Foss et al. |
| 2016/0259527 A1 | 9/2016 | Kocienda et al. |
| 2016/0259528 A1 | 9/2016 | Foss et al. |
| 2016/0259536 A1 | 9/2016 | Kudurshian et al. |
| 2016/0259548 A1 | 9/2016 | Ma |
| 2016/0274686 A1 | 9/2016 | Ruiz et al. |
| 2016/0274728 A1 | 9/2016 | Luo et al. |
| 2016/0274761 A1 | 9/2016 | Ruiz et al. |
| 2016/0283054 A1 | 9/2016 | Suzuki |
| 2016/0306507 A1 | 10/2016 | Defazio et al. |
| 2016/0320906 A1 | 11/2016 | Bokma et al. |
| 2016/0357368 A1 | 12/2016 | Federighi et al. |
| 2016/0357389 A1 | 12/2016 | Dakin et al. |
| 2016/0357390 A1 | 12/2016 | Federighi et al. |
| 2016/0357404 A1 | 12/2016 | Alonso Ruiz et al. |
| 2016/0360116 A1 | 12/2016 | Penha et al. |
| 2017/0045981 A1 | 2/2017 | Karunamuni et al. |
| 2017/0046039 A1 | 2/2017 | Karunamuni et al. |
| 2017/0046058 A1 | 2/2017 | Karunamuni et al. |
| 2017/0046059 A1 | 2/2017 | Karunamuni et al. |
| 2017/0046060 A1 | 2/2017 | Karunamuni et al. |
| 2017/0075520 A1 | 3/2017 | Bauer et al. |
| 2017/0075562 A1 | 3/2017 | Bauer et al. |
| 2017/0075563 A1 | 3/2017 | Bauer et al. |
| 2017/0090699 A1 | 3/2017 | Pennington et al. |
| 2017/0091153 A1 | 3/2017 | Thimbleby |
| 2017/0109011 A1 | 4/2017 | Jiang |
| 2017/0115867 A1 | 4/2017 | Bargmann |
| 2017/0123497 A1 | 5/2017 | Yonezawa |
| 2017/0124699 A1 | 5/2017 | Lane |
| 2017/0139565 A1 | 5/2017 | Choi |
| 2017/0315694 A1 | 11/2017 | Alonso Ruiz et al. |
| 2017/0357403 A1 | 12/2017 | Geary et al. |
| 2018/0024681 A1 | 1/2018 | Bernstein et al. |
| 2018/0059866 A1 | 3/2018 | Drake et al. |
| 2018/0082522 A1 | 3/2018 | Bartosik |
| 2018/0188920 A1 | 7/2018 | Bernstein et al. |
| 2018/0275862 A1 | 9/2018 | Khoe et al. |
| 2018/0342103 A1 | 11/2018 | Schwartz et al. |
| 2018/0349362 A1 | 12/2018 | Sharp et al. |
| 2018/0364883 A1 | 12/2018 | Khoe et al. |
| 2018/0364898 A1 | 12/2018 | Chen |
| 2018/0364904 A1 | 12/2018 | Bernstein et al. |
| 2019/0004605 A1 | 1/2019 | Flint et al. |
| 2019/0012059 A1 | 1/2019 | Kwon et al. |
| 2019/0018562 A1 | 1/2019 | Bernstein et al. |
| 2019/0042075 A1 | 2/2019 | Bernstein et al. |
| 2019/0042078 A1 | 2/2019 | Bernstein et al. |
| 2019/0065043 A1 | 2/2019 | Zambetti et al. |
| 2019/0121493 A1 | 4/2019 | Bernstein et al. |
| 2019/0121520 A1 | 4/2019 | Cieplinski et al. |
| 2019/0138101 A1 | 5/2019 | Bernstein |
| 2019/0138102 A1 | 5/2019 | Missig |
| 2019/0138189 A1 | 5/2019 | Missig |
| 2019/0146643 A1 | 5/2019 | Foss et al. |
| 2019/0155503 A1 | 5/2019 | Alonso Ruiz et al. |
| 2019/0158727 A1 | 5/2019 | Penha et al. |
| 2019/0163358 A1 | 5/2019 | Dascola et al. |
| 2019/0171353 A1 | 6/2019 | Missig et al. |
| 2019/0171354 A1 | 6/2019 | Dascola et al. |
| 2019/0212896 A1 | 7/2019 | Karunamuni et al. |
| 2019/0332257 A1 | 10/2019 | Kudurshian et al. |
| 2019/0364194 A1 | 11/2019 | Penha et al. |
| 2019/0391658 A1 | 12/2019 | Missig et al. |
| 2020/0081614 A1 | 3/2020 | Zambetti |
| 2020/0142548 A1 | 5/2020 | Karunamuni et al. |
| 2020/0201472 A1 | 6/2020 | Bernstein et al. |
| 2020/0210059 A1 | 7/2020 | Hu et al. |
| 2020/0218445 A1 | 7/2020 | Alonso Ruiz et al. |
| 2020/0301556 A1 | 9/2020 | Ruiz et al. |
| 2020/0333936 A1 | 10/2020 | Khoe et al. |
| 2020/0371683 A1 | 11/2020 | Zambetti et al. |
| 2020/0396375 A1 | 12/2020 | Penha et al. |

FOREIGN PATENT DOCUMENTS

| | | |
|---|---|---|
| CN | 1620327 A | 5/2005 |
| CN | 1808362 A | 7/2006 |
| CN | 101118469 A | 2/2008 |
| CN | 101192097 A | 6/2008 |
| CN | 101202866 A | 6/2008 |
| CN | 101222704 A | 7/2008 |
| CN | 101227764 A | 7/2008 |
| CN | 101241397 A | 8/2008 |
| CN | 101320303 A | 12/2008 |
| CN | 101384977 A | 3/2009 |
| CN | 101421707 A | 4/2009 |
| CN | 101464777 A | 6/2009 |
| CN | 101498979 A | 8/2009 |
| CN | 101526876 A | 9/2009 |
| CN | 101562703 A | 10/2009 |
| CN | 101593077 A | 12/2009 |
| CN | 101604208 A | 12/2009 |
| CN | 101609380 A | 12/2009 |
| CN | 101620507 A | 1/2010 |
| CN | 101627359 A | 1/2010 |
| CN | 101630230 A | 1/2010 |
| CN | 101650615 A | 2/2010 |
| CN | 101692194 A | 4/2010 |
| CN | 101727179 A | 6/2010 |
| CN | 101739206 A | 6/2010 |
| CN | 101784981 A | 7/2010 |
| CN | 101809526 A | 8/2010 |
| CN | 101896962 A | 11/2010 |
| CN | 101937304 A | 1/2011 |
| CN | 101965549 A | 2/2011 |
| CN | 101971603 A | 2/2011 |
| CN | 101998052 A | 3/2011 |
| CN | 102004575 A | 4/2011 |
| CN | 102004576 A | 4/2011 |
| CN | 102004577 A | 4/2011 |
| CN | 102004593 A | 4/2011 |
| CN | 102004602 A | 4/2011 |
| CN | 102004604 A | 4/2011 |
| CN | 102016777 A | 4/2011 |
| CN | 102053790 A | 5/2011 |
| CN | 102112946 A | 6/2011 |
| CN | 102150018 A | 8/2011 |
| CN | 102160021 A | 8/2011 |
| CN | 102203702 A | 9/2011 |
| CN | 102214038 A | 10/2011 |
| CN | 102223476 A | 10/2011 |
| CN | 102243662 A | 11/2011 |
| CN | 102257460 A | 11/2011 |
| CN | 102301322 A | 12/2011 |
| CN | 102349038 A | 2/2012 |
| CN | 102349040 A | 2/2012 |
| CN | 102354269 A | 2/2012 |
| CN | 102365666 A | 2/2012 |
| CN | 102375605 A | 3/2012 |
| CN | 102385478 A | 3/2012 |
| CN | 102438092 A | 5/2012 |
| CN | 102460355 A | 5/2012 |
| CN | 102483666 A | 5/2012 |
| CN | 102483677 A | 5/2012 |
| CN | 102546925 A | 7/2012 |
| CN | 102566908 A | 7/2012 |
| CN | 102576251 A | 7/2012 |
| CN | 102576282 A | 7/2012 |
| CN | 102646013 A | 8/2012 |
| CN | 102662571 A | 9/2012 |
| CN | 102662573 A | 9/2012 |
| CN | 102722312 A | 10/2012 |
| CN | 102752441 A | 10/2012 |
| CN | 102792255 A | 11/2012 |
| CN | 102819331 A | 12/2012 |
| CN | 102819401 A | 12/2012 |
| CN | 102841677 A | 12/2012 |
| CN | 103019586 A | 4/2013 |
| CN | 103092386 A | 5/2013 |
| CN | 103092406 A | 5/2013 |
| CN | 103097992 A | 5/2013 |
| CN | 103186345 A | 7/2013 |

(56) References Cited

FOREIGN PATENT DOCUMENTS

| | | |
|---|---|---|
| CN | 103201714 A | 7/2013 |
| CN | 103279295 A | 9/2013 |
| CN | 103518176 A | 1/2014 |
| CN | 103649885 A | 3/2014 |
| CN | 103699295 A | 4/2014 |
| CN | 103777850 A | 5/2014 |
| CN | 103777886 A | 5/2014 |
| CN | 103793134 A | 5/2014 |
| CN | 103838465 A | 6/2014 |
| CN | 103970474 A | 8/2014 |
| CN | 104011637 A | 8/2014 |
| CN | 104020868 A | 9/2014 |
| CN | 104020955 A | 9/2014 |
| CN | 104021021 A | 9/2014 |
| CN | 104024985 A | 9/2014 |
| CN | 104077014 A | 10/2014 |
| CN | 104142798 A | 11/2014 |
| CN | 104160362 A | 11/2014 |
| CN | 104331239 A | 2/2015 |
| CN | 104392292 A | 3/2015 |
| CN | 104412201 A | 3/2015 |
| CN | 104471521 A | 3/2015 |
| CN | 104487928 A | 4/2015 |
| CN | 104487929 A | 4/2015 |
| CN | 104487930 A | 4/2015 |
| CN | 101527745 A | 9/2015 |
| CN | 105264476 A | 1/2016 |
| DE | 100 59 906 A1 | 6/2002 |
| EP | 0 859 307 A1 | 3/1998 |
| EP | 0 880 090 A2 | 11/1998 |
| EP | 1 028 583 A1 | 8/2000 |
| EP | 1 406 150 A1 | 4/2004 |
| EP | 1 674 977 A2 | 6/2006 |
| EP | 1 882 902 A1 | 1/2008 |
| EP | 2 000 896 A2 | 12/2008 |
| EP | 2 017 701 A1 | 1/2009 |
| EP | 2 028 583 A2 | 2/2009 |
| EP | 2 141 574 A2 | 1/2010 |
| EP | 2 175 357 A1 | 4/2010 |
| EP | 2 196 893 A2 | 6/2010 |
| EP | 2 214 087 A1 | 8/2010 |
| EP | 2 226 715 A2 | 9/2010 |
| EP | 2 284 675 A2 | 2/2011 |
| EP | 2 299 351 A2 | 3/2011 |
| EP | 2 302 496 A1 | 3/2011 |
| EP | 2 375 309 A1 | 10/2011 |
| EP | 2 375 314 A1 | 10/2011 |
| EP | 2 386 935 A1 | 11/2011 |
| EP | 2 407 868 A1 | 1/2012 |
| EP | 2 420 924 A2 | 2/2012 |
| EP | 2 426 580 A2 | 3/2012 |
| EP | 2 445 182 A2 | 4/2012 |
| EP | 2 447 818 A1 | 5/2012 |
| EP | 2 527 966 A2 | 11/2012 |
| EP | 2 530 677 A2 | 12/2012 |
| EP | 2 541 376 A1 | 1/2013 |
| EP | 2 555 500 A1 | 2/2013 |
| EP | 2 615 535 A1 | 7/2013 |
| EP | 2 631 737 A1 | 8/2013 |
| EP | 2 674 846 A2 | 12/2013 |
| EP | 2 708 985 A1 | 3/2014 |
| EP | 2 733 578 A2 | 5/2014 |
| EP | 2 808 764 A1 | 12/2014 |
| EP | 2 809 058 A1 | 12/2014 |
| EP | 2 813 938 A1 | 12/2014 |
| EP | 2 077 490 A2 | 3/2015 |
| GB | 2 402 105 A | 12/2004 |
| JP | 2004-288208 A | 10/1920 |
| JP | 58-182746 | 10/1983 |
| JP | H06-161647 A | 6/1994 |
| JP | H07-098769 A | 4/1995 |
| JP | H07-98769 A | 4/1995 |
| JP | H07-104915 | 4/1995 |
| JP | H07-151512 A | 6/1995 |
| JP | H08-227341 A | 9/1996 |
| JP | H09-269883 A | 10/1997 |
| JP | H09-330175 A | 12/1997 |
| JP | H11-203044 A | 7/1999 |
| JP | 2001-078137 A | 3/2001 |
| JP | 2001-202192 A | 7/2001 |
| JP | 2001-222355 A | 8/2001 |
| JP | 2001-306207 A | 11/2001 |
| JP | 2002-044536 A | 2/2002 |
| JP | 2002-149312 A | 5/2002 |
| JP | 3085481 U | 5/2002 |
| JP | 2002-182855 A | 6/2002 |
| JP | 2003-157131 A | 5/2003 |
| JP | 2003-186597 A | 7/2003 |
| JP | 2004-054861 A | 2/2004 |
| JP | 2004-062648 A | 2/2004 |
| JP | 2004-070492 A | 3/2004 |
| JP | 2004-086733 A | 3/2004 |
| JP | 2004-152217 A | 5/2004 |
| JP | 2005-031786 A | 2/2005 |
| JP | 2005-092386 A | 4/2005 |
| JP | 2005-102106 A | 4/2005 |
| JP | 2005-135106 A | 5/2005 |
| JP | 2005-157842 A | 6/2005 |
| JP | 2005-196810 A | 7/2005 |
| JP | 2005-317041 A | 11/2005 |
| JP | 2005-352927 A | 12/2005 |
| JP | 2006-059238 A | 3/2006 |
| JP | 2006-185443 A | 7/2006 |
| JP | 2007-116384 A | 5/2007 |
| JP | 2007-148104 A | 6/2007 |
| JP | 2007-264808 A | 10/2007 |
| JP | 2008-009759 A | 1/2008 |
| JP | 2008-015890 A | 1/2008 |
| JP | 2008-033739 A | 2/2008 |
| JP | 2008-516348 A | 5/2008 |
| JP | 2008-146453 A | 6/2008 |
| JP | 2008-191086 A | 8/2008 |
| JP | 2008-537615 | 9/2008 |
| JP | 2008-305174 A | 12/2008 |
| JP | 2009-500761 A | 1/2009 |
| JP | 2009-110243 A | 5/2009 |
| JP | 2009-129171 A | 6/2009 |
| JP | 2009-129443 A | 6/2009 |
| JP | 2009-169452 A | 7/2009 |
| JP | 2009-211704 A | 9/2009 |
| JP | 2009-217543 A | 9/2009 |
| JP | 2009-294688 A | 12/2009 |
| JP | 2009-545805 A | 12/2009 |
| JP | 2010-009321 A | 1/2010 |
| JP | 2010-503126 A | 1/2010 |
| JP | 2010-503130 A | 1/2010 |
| JP | 2010-055274 A | 3/2010 |
| JP | 2010-097353 A | 4/2010 |
| JP | 2010-146507 A | 7/2010 |
| JP | 2010-152716 A | 7/2010 |
| JP | 2010-176174 A | 8/2010 |
| JP | 2010-176337 A | 8/2010 |
| JP | 2010-181934 A | 8/2010 |
| JP | 2010-181940 A | 8/2010 |
| JP | 2010-198385 A | 9/2010 |
| JP | 2010-541071 A | 12/2010 |
| JP | 2011-221640 A | 1/2011 |
| JP | 2011-501307 A | 1/2011 |
| JP | 2011-028635 A | 2/2011 |
| JP | 2011-048666 A | 3/2011 |
| JP | 2011-048686 A | 3/2011 |
| JP | 2011-048762 A | 3/2011 |
| JP | 2011-048832 A | 3/2011 |
| JP | 2011-053831 A | 3/2011 |
| JP | 2011-053972 A | 3/2011 |
| JP | 2011-053973 A | 3/2011 |
| JP | 2011-053974 A | 3/2011 |
| JP | 2011-059821 A | 3/2011 |
| JP | 2011-070342 A | 4/2011 |
| JP | 2011-100290 A | 5/2011 |
| JP | 2011-107823 A | 6/2011 |
| JP | 2011-123773 A | 6/2011 |
| JP | 2011-141868 A | 7/2011 |
| JP | 2011-170538 A | 9/2011 |

(56) References Cited

FOREIGN PATENT DOCUMENTS

| | | |
|---|---|---|
| JP | 2011-192179 A | 9/2011 |
| JP | 2011-192215 A | 9/2011 |
| JP | 2011-197848 A | 10/2011 |
| JP | 2011-242386 A | 12/2011 |
| JP | 2011-250004 A | 12/2011 |
| JP | 2011-253556 A | 12/2011 |
| JP | 2011-257941 A | 12/2011 |
| JP | 2011-530101 A | 12/2011 |
| JP | 2012-027940 A | 2/2012 |
| JP | 2012-033061 A | 2/2012 |
| JP | 2012-043266 A | 3/2012 |
| JP | 2012-043267 A | 3/2012 |
| JP | 2012-053687 A | 3/2012 |
| JP | 2012-053754 | 3/2012 |
| JP | 2012-053926 A | 3/2012 |
| JP | 2012-073785 A | 4/2012 |
| JP | 2012-073873 A | 4/2012 |
| JP | 2012-509605 A | 4/2012 |
| JP | 2012-093820 A | 5/2012 |
| JP | 2011-232947 A | 6/2012 |
| JP | 2012-118825 A | 6/2012 |
| JP | 2012-118993 A | 6/2012 |
| JP | 2012-123564 A | 6/2012 |
| JP | 2012-128825 A | 7/2012 |
| JP | 2012-527685 A | 11/2012 |
| JP | 2013-025357 A | 2/2013 |
| JP | 2013-030050 A | 2/2013 |
| JP | 2013-058149 A | 3/2013 |
| JP | 2013-080521 A | 5/2013 |
| JP | 2013-093020 A | 5/2013 |
| JP | 2013-101465 A | 5/2013 |
| JP | 2013-105410 A | 5/2013 |
| JP | 2013-131185 A | 7/2013 |
| JP | 2013-529339 A | 7/2013 |
| JP | 2013-200879 A | 10/2013 |
| JP | 2013-542488 A | 11/2013 |
| JP | 2013-250602 A | 12/2013 |
| JP | 2014-504419 | 2/2014 |
| JP | 2014-052852 A | 3/2014 |
| JP | 2014-130567 A | 7/2014 |
| JP | 2014-140112 A | 7/2014 |
| JP | 2014-149833 A | 8/2014 |
| JP | 2014-519109 A | 8/2014 |
| JP | 2014-529137 A | 10/2014 |
| JP | 2015-099555 A | 5/2015 |
| JP | 2015-521315 A | 7/2015 |
| JP | 2015-153420 A | 8/2015 |
| JP | 2015-185161 A | 10/2015 |
| KR | 2006-0071353 A | 6/2006 |
| KR | 2008-0045143 A | 4/2008 |
| KR | 100823871 B1 | 4/2008 |
| KR | 2008-0054346 A | 6/2008 |
| KR | 2010-0010860 A | 2/2010 |
| KR | 2010-0014095 A | 2/2010 |
| KR | 2010 0070841 A | 6/2010 |
| KR | 2010 0133246 A | 12/2010 |
| KR | 2011 0026176 A | 3/2011 |
| KR | 2011 0086501 A | 7/2011 |
| KR | 20120135723 A | 12/2012 |
| KR | 2013 0099647 A | 9/2013 |
| KR | 2014 0016495 A | 2/2014 |
| KR | 2014 0029720 A | 3/2014 |
| KR | 2014 0043760 A | 4/2014 |
| KR | 2014 0079110 A | 6/2014 |
| KR | 2014 0122000 A | 10/2014 |
| KR | 20150013263 A | 2/2015 |
| KR | 20150021977 A | 3/2015 |
| RU | 2007145218 A | 7/2009 |
| WO | WO 2005/106637 A2 | 11/2005 |
| WO | WO 2006/013485 A2 | 2/2006 |
| WO | WO 2006/042309 A1 | 4/2006 |
| WO | WO 2007/121557 A1 | 11/2007 |
| WO | WO 2008/030976 A2 | 3/2008 |
| WO | WO 2008/064142 A2 | 5/2008 |
| WO | WO 2009/155981 A1 | 12/2009 |
| WO | WO 2009/158549 A2 | 12/2009 |
| WO | WO 2010/013876 A1 | 2/2010 |
| WO | WO 2010/032598 A1 | 2/2010 |
| WO | WO 2010/032598 A | 3/2010 |
| WO | WO 2010/090010 A1 | 8/2010 |
| WO | WO 2010/122813 A1 | 10/2010 |
| WO | WO 2010/134729 A2 | 11/2010 |
| WO | WO 2011/024389 A1 | 3/2011 |
| WO | WO 2011/024465 A1 | 3/2011 |
| WO | WO 2011/024521 A1 | 3/2011 |
| WO | WO 2011/093045 A1 | 8/2011 |
| WO | WO 2011/105009 A1 | 9/2011 |
| WO | WO 2011/108190 A1 | 9/2011 |
| WO | WO 2011/115187 A1 | 9/2011 |
| WO | WO 2011/121375 A1 | 10/2011 |
| WO | WO 2012/021417 A1 | 2/2012 |
| WO | WO 2012/037664 A1 | 3/2012 |
| WO | WO 2012/096804 A2 | 7/2012 |
| WO | WO 2012/108213 A1 | 8/2012 |
| WO | WO 2012/114760 A1 | 8/2012 |
| WO | WO 2012/137946 A1 | 10/2012 |
| WO | WO 2012/150540 A2 | 11/2012 |
| WO | WO 2012/153555 A1 | 11/2012 |
| WO | WO 2013/022486 A1 | 2/2013 |
| WO | WO 2013/035725 A1 | 3/2013 |
| WO | WO 2013/112453 A1 | 8/2013 |
| WO | WO 2013/169299 A1 | 11/2013 |
| WO | WO 2013/169300 A1 | 11/2013 |
| WO | WO 2013/169302 A1 | 11/2013 |
| WO | WO 2013/169845 A1 | 11/2013 |
| WO | WO 2013/169846 A1 | 11/2013 |
| WO | WO 2013/169849 A2 | 11/2013 |
| WO | WO 2013/169851 A2 | 11/2013 |
| WO | WO 2013/169853 A1 | 11/2013 |
| WO | WO 2013/169854 A2 | 11/2013 |
| WO | WO 2013/169870 A1 | 11/2013 |
| WO | WO 2013/169875 A2 | 11/2013 |
| WO | WO 2013/169877 A2 | 11/2013 |
| WO | WO 2013/169882 A2 | 11/2013 |
| WO | WO 2013/173838 A2 | 11/2013 |
| WO | WO 2014/105275 A1 | 7/2014 |
| WO | WO 2014/105276 A1 | 7/2014 |
| WO | WO 2014/105277 A1 | 7/2014 |
| WO | WO 2014/105278 A1 | 7/2014 |
| WO | WO 2014/105279 A1 | 7/2014 |
| WO | WO 2014/129655 A1 | 8/2014 |
| WO | WO 2014/149473 A1 | 9/2014 |
| WO | WO 2014/152601 A1 | 9/2014 |
| WO | WO 2014/200733 A1 | 12/2014 |

OTHER PUBLICATIONS

Patent, dated Apr. 14, 2020, received in Japanese Patent Application No. 2018079290, which corresponds with U.S. Appl. No. 14/608,926, 5 pages.
Certificate of Grant, dated May 21, 2020, received in Australian Patent Application No. 2018256616, which corresponds with U.S. Appl. No. 14/536,141, 3 pages.
Notice of Allowance, dated Apr. 29, 2020, received in Australian Patent Application No. 2018250481, which corresponds with U.S. Appl. No. 14/536,203, 3 pages.
Office Action, dated Apr. 20, 2020, received in Chinese Patent Application No. 201610537334.1, which corresponds with U.S. Appl. No. 14/536,267, 4 pages.
Office Action, dated Jun. 24, 2020, received in Chinese Patent Application No. 201710781246.0, which corresponds with U.S. Appl. No. 14/536,291, 5 pages.
Final Office Action, dated Jun. 15, 2020, received in U.S. Appl. No. 14/609,006, 19 pages.
Patent, dated Apr. 1, 2020, received in European Patent Application No. 16707356.8, which corresponds with U.S. Appl. No. 14/866,159, 3 pages.
Office Action, dated May 19, 2020, received in Chinese Patent Application No. 201680011338.4, which corresponds with U.S. Appl. No. 14/868,078, 4 pages.
Office Action, dated Jun. 30, 2020, received in Chinese Patent Application No. 201680011338.4, which correspondence with U.S. Appl. 14/868,078, 4 pages.

(56) References Cited

OTHER PUBLICATIONS

Patent, dated May 12, 2020, received in Chinese Patent Application No. 201610342313.4, which corresponds with U.S. Appl. No. 14/863,432, 7 pages.
Office Action, dated Apr. 24, 2020, received in Korean Patent Application No. 2020-7003065, which corresponds with U.S. Appl. No. 14/866,511, 3 pages.
Patent, dated Apr. 22, 2020, received in European Patent Application No. 18168939.9, which corresponds with U.S. Appl. No. 14/869,899, 3 pages.
Office Action, dated Jun. 30, 2020, received in Chinese Patent Application No. 201610658351.8, which corresponds with U.S. Appl. No. 14/866,992, 11 pages.
Intention to Grant, dated Apr. 7, 2020, received in European Patent Application No. 16756866.6, which corresponds with U.S. Appl. No. 15/009,676, 8 pages.
Intention to Grant, dated Apr. 14, 2020, received in European Patent Application No. 17188507.2, which corresponds with U.S. Appl. No. 14/866,361, 7 pages.
Office Action, dated Jun. 23, 2020, received in Brazilian Patent Application No. 11201701119-9, which corresponds with U.S. Appl. No. 14/871,236, 9 pages.
Notice of Allowance, dated Mar. 24, 2020, received in Chinese Patent Application No. 201610871466.8, which corresponds with U.S. Appl. No. 14/871,236, 3 pages.
Patent, dated May 19, 2020, received in Chinese Patent Application No. 201610871466.8, which corresponds with U.S. Appl. No. 14/871,236, 8 pages.
Intention to Grant, dated Apr. 30, 2020, received in European Patent Application No. 18205283.7, which corresponds with U.S. Appl. No. 15/081,771, 7 pages.
Patent, dated Apr. 7, 2020, received in Chinese Patent Application No. 201810119007.3, which corresponds with U.S. Appl. No. 15/136,782, 7 pages.
Office Action, dated May 12, 2020, received in European Patent Application No. 18171453.6, which corresponds with U.S. Appl. No. 15/136,782, 5 pages.
Certificate of Grant, dated Apr. 2, 2020, received in Australian Patent Application No. 2018204234, which corresponds with U.S. Appl. No. 15/272,327, 1 page.
Patent, dated Mar. 3, 2020, received in Chinese Patent Application No. 201810071627.4, which corresponds with U.S. Appl. No. 15/272,343, 7 pages.
Notice of Allowance, dated Apr. 22, 2020, received in U.S. Appl. No. 15/272,345, 12 pages.
Notice of Allowance, dated Jul. 6, 2020, received in Chinese Patent Application No. 201680022696.5, which corresponds with U.S. Appl. No. 15/272,345, 5 pages.
Office Action, dated May 11, 2020, received in Australian Patent Application No. 2019203776, which corresponds with U.S. Appl. No. 15/499,693, 4 pages.
Patent, dated Mar. 27, 2020, received in Korean Patent Application No. 2019-7009439, which corresponds with U.S. Appl. No. 15/499,693, 4 pages.
Notice of Allowance, dated May 19, 2020, received in U.S. Appl. No. 15/889,115, 9 pages.
Notice of Allowance, dated May 14, 2020, received in U.S. Appl. No. 16/049,725, 9 pages.
Notice of Acceptance, dated Apr. 2, 2020, received in Australian Patent Application No. 2018253539, which corresponds with U.S. Appl. No. 16/049,725, 3 pages.
Final Office Action, dated Jun. 9, 2020, received in U.S. Appl. No. 16/136,163, 10 pages.
Office Action, dated May 4, 2020, received in Australian Patent Application No. 2019203175, which corresponds with U.S. Appl. No. 16/154,591, 4 pages.
Notice of Allowance, dated Jun. 1, 2020, received in Japanese Patent Application No. 2018-202048, which corresponds with U.S. Appl. No. 16/154,591, 3 pages.
Notice of Allowance, dated Jun. 18, 2020, received in U.S. Appl. No. 16/174,170, 19 pages.
Notice of Allowance, dated May 22, 2020, received in Japanese Patent Application No. 2019-027634, which corresponds with U.S. Appl. No. 16/240,672, 5 pages.
Office Action, dated Jun. 11, 2020, received in Australian Patent Application No. 2019257437, which corresponds with U.S. Appl. No. 16/252,478, 3 pages.
Office Action, dated May 14, 2020, received in U.S. Appl. No. 16/354,035, 16 pages.
Office Action, dated May 14, 2020, received in U.S. Appl. No. 16/509,438, 16 pages.
Notice of Allowance, dated May 20, 2020, received in U.S. Appl. No. 16/534,214, 16 pages.
Notice of Allowance, dated May 4, 2020, received in Korean Patent Application No. 2019-7033444, 5 pages.
Patent, dated Jun. 3, 2020, received in Korean Patent Application No. 2019-7033444, 7 pages.
Intention to Grant, dated Jul. 6, 2018, received in European Patent Application No. 13795391.5, which corresponds with U.S. Appl. No. 14/536,426, 5 pages.
Notice of Acceptance, dated Jul. 19, 2018, received in Australian Patent Application No. 2016262773, which corresponds with U.S. Appl. No. 14/536,141, 3 pages.
Certificate of Grant, dated Jul. 5, 2018, received in Australian patent Application No. 2016201303, which corresponds with U.S. Appl. No. 14/608,942, 4 pages.
Notice of Acceptance, dated Jul. 19, 2018, received in Australian Patent Application No. 2016238917, which corresponds with U.S. Appl. No. 14/536,203, 3 pages.
Patent, dated Jul. 6, 2018, received in Chinese Patent Application No. 201380035977.0, which corresponds with U.S. Appl. No. 14/536,203, 4 pages.
Office action, dated Aug. 1, 2018, received in Chinese Patent Application No. 201380074060.1, which corresponds with U.S. Appl. No. 14/608,965, 5 pages.
Certificate of Grant, dated Jun. 28, 2018, received in Australian Patent Application No. 2016204411, which corresponds with U.S. Appl. No. 14/536,267, 4 pages.
Notice of Acceptance, dated Jul. 19, 2018, received in Australian Patent Application No. 2016216658, which corresponds with U.S. Appl. No. 14/536,291, 3 pages.
Notice of Allowance, dated Apr. 20, 2018, received in U.S. Appl. No. 14/608,985, 5 pages.
Certificate of Grant, dated Jun. 29, 2018, received in Hong Kong Patent Application No. 15112851.6, which corresponds with U.S. Appl. No. 14/608,985, 2 pages.
Final Office Action, dated Aug. 7, 2018, received in U.S. Appl. No. 14/536,648, 14 pages.
Notice of Acceptance, dated Jul. 19, 2018, received in Australian Patent Application No. 2016247194, which corresponds with U.S. Appl. No. 14/536,648, 3 pages.
Notice of Allowance, dated Aug. 3, 2018, received in U.S. Appl. No. 15/009,676, 6 pages.
Office Action, dated Jul. 19, 2018, received in Russian Patent Application No. 2017131408, which corresponds with U.S. Appl. No. 14/871,236, 8 pages.
Notice of Allowance, dated Jul. 12, 2018, received in U.S. Appl. No. 14/870,882, 5 pages.
Notice of Allowance, dated Aug. 7, 2018, received in U.S. Appl. No. 14/867,823, 8 pages.
Notice of Allowance, dated Jul. 30, 2018, received in U.S. Appl. No. 14/869,873, 8 pages.
Certificate of Grant, dated Jun. 28, 2018, received in Australian Patent Application No. 2018200705, which corresponds with U.S. Appl. No. 15/272,327, 4 pages.
Notice of Allowance, dated Jul. 30, 2018, received in Japanese Patent Application No. 2018-506989, which corresponds with U.S. Appl. No. 15/272,327, 4 pages.
Certificate of Grant, dated Jun. 28 2018, received in Australian Patent Application No. 2016304832, which corresponds with U.S. Appl. No. 15/272,345, 4 pages.

(56) References Cited

OTHER PUBLICATIONS

Extended European Search Report, dated Jul. 30, 2018, received in European Patent Application No. 18180503.7, which corresponds with U.S. Appl. No. 14/536,426, 7 pages.
International Preliminary Report on Patentability, dated Feb. 13, 2018, received in International Patent Application No. PCT/US2016/046407, which corresponds with U.S. Appl. No. 15/009,688, 20 pages.
Extended European Search Report, dated Aug. 2, 2018, received in European Patent Application No. 18168941.5, which corresponds with U.S. Appl. No. 14/871,236, 11 pages.
Certificate of Grant, dated Dec. 5, 2019, received in Australian Patent Application No. 2018256626, which corresponds with U.S. Appl. No. 14/536,646, 3 pages.
Decision to Grant, dated Jan. 23, 2020, received in European Patent Application No. 13726053.5, which corresponds with U.S. Appl. No. 14/536,141, 1 page.
Notice of Allowance dated Jan. 2, 2020, received in U.S. Appl. No. 14/608,965, 5 pages.
Office Action, dated Dec. 20, 2019, received in Chinese Patent Application No. 201610537334.1, which corresponds with U.S. Appl. No. 14/536,267, 3 pages.
Patent, dated Nov. 27, 2019, received in European Patent Application No. 17186744.3, which corresponds with U.S. Appl. No. 14/536,291, 4 pages.
Office Action, dated Jan. 7, 2020, received in U.S. Appl. No. 14/609,006, 17 pages.
Patent, dated Feb. 8, 2017, received in Chinese Patent Application No. 201620470063.8, which corresponds with U.S. Appl. No. 14/863,432, 5 pages.
Office Action, dated Jan. 10, 2020, received in Japanese Patent Application No. 2018-243773, which corresponds with U.S. Appl. No. 14/863,432, 6 pages.
Patent, dated Jan. 1, 2020, received in European Patent Application No. 16727900.9, which corresponds with U.S. Appl. No. 14/866,511, 3 pages.
Office Action, dated Jan. 13, 2020, received in Chinese Patent Application No. 201610658351.8, which corresponds with U.S. Appl. No. 14/866,992, 3 pages.
Final Office Action, dated Dec. 30, 2019, received in U.S. Appl. No. 15/009,661, 33 pages.
Notice of Allowance, dated Jan. 6, 2020, received in U.S. Appl. No. 14/856,520, 5 pages.
Office Action, dated Jan. 20, 2020, received in Japanese Patent Application No. 2017-029201, which corresponds with U.S. Appl. No. 14/857,636, 21 pages.
Patent, dated Dec. 11, 2019, received in European Patent Application No. 16189421.7, which corresponds with U.S. Appl. No. 14/866,987, 3 pages.
Office Action, dated Jan. 27, 2020, received in European Patent Application No. 18205283.7, which corresponds with U.S. Appl. No. 15/081,771, 4 pages.
Patent, dated Nov. 29, 2019, received in Japanese Patent Application No. 2018-158502, which corresponds with U.S. Appl. No. 15/231,745, 3 pages.
Notice of Acceptance, dated Dec. 10, 2019, received in Australian Patent Application No. 2018204234, which corresponds with U.S. Appl. No. 15/272,327, 3 pages.
Notice of Allowance, dated Dec. 11, 2019, received in Chinese Patent Application No. 201810071627.4, which corresponds with U.S. Appl. No. 15/272,343, 4 pages.
Notice of Allowance, dated Dec. 27, 2019, received in Korean Patent Application No. 2019-7009439, which corresponds with U.S. Appl. No. 15/499,693, 5 pages.
Office Action, dated Dec. 18, 2019, received in Australian Patent Application No. 2018282409, which corresponds with U.S. Appl. No. 16/243,834, 3 pages.
Office Action, dated Dec. 23, 2019, received in Korean Patent Application No. 2018-7037896, which corresponds with U.S. Appl. No. 16/243,834, 6 pages.
Notice of Allowance, dated Dec. 13, 2019, received in Korean Patent Application No. 2019-7033444, which corresponds with U.S. Appl. No. 16/252,478, 6 pages.
Geisler, "Enriched Links: A Framework For Improving Web Navigation Using Pop-Up Views", Journal of the American Society for Information Science, Chapel Hill, NC, Jan. 1, 2000, 13 pages.
Office Action, dated Feb. 18, 2020, received in Australian Patent Application No. 2018223021, which corresponds with U.S. Appl. No. 14/536,426, 3 pages.
Notice of Acceptance, dated Jan. 22, 2020, received in Australian Patent Application No. 2018256616, which corresponds with U.S. Appl. No. 14/536,141, 3 pages.
Certificate of Grant, dated Jan. 23, 2020, received in Australian Patent Application No. 2019200872, which corresponds with U.S. Appl. No. 14/864,580, 3 pages.
Patent, dated Jan. 31, 2020, received in Chinese Patent Application No. 201610342336.5, which corresponds with U.S. Appl. No. 14/866,987, 7 pages.
Office Action, dated Feb. 3, 2020, received in European Patent Application No. 17163309.2, which corresponds with U.S. Appl. No. 14/866,987, 6 pages.
Office Action, dated Feb. 3, 2020, received in European Patent Application No. 16189425.8, which corresponds with U.S. Appl. No. 14/866,989, 6 pages.
Office Action, dated Feb. 21, 2020, received in European Patent Application No. 16711725.8, which corresponds with U.S. Appl. No. 14/867,990, 13 pages.
Notice of Allowance, dated Feb. 20, 2020, received in U.S. Appl. No. 15/272,341, 12 pages.
Notice of Allowance, dated Feb. 20, 2020, received in U.S. Appl. No. 15/655,749, 10 pages.
Office Action, dated Feb. 3, 2020, received in Chinese Patent Application No. 201710331254.5, which corresponds with U.S. Appl. No. 15/655,749, 8 pages.
Final Office Action, dated Feb. 5, 2020, received in U.S. Appl. No. 15/785,372, 26 pages.
Patent, dated Jan. 31, 2020, received in Korean Patent Application No. 2019-7019100, 5 pages.
Agarwal, "How to Copy and Paste Text on Windows Phone 8," Guiding Tech, http://web.archive.org/web20130709204246/http://www.guidingtech.com/20280/copy-paste-text-windows-phone-8/, Jul. 9, 2013, 10 pages.
Angelov, "Sponsor Flip Wall With Jquery & CSS", Tutorialzine. N.p., Mar. 24, 2010. Web. http://tutorialzine.com/2010/03/sponsor-wall-slip-jquery-css/, Mar. 24, 2010, 8 pages.
Anonymous, "Google Android 5.0 Release Date, Specs and Editors Hands on Review—CNET", http://www.cnet.com/products/google-an-android-5-0-lollipop/, Mar. 12, 2015, 10 pages.
Anonymous, "Nokia 808 PureView screenshots", retrieved from Internet; no URL, Nov. 12, 2012, 8 pages.
Anonymous, "Nokia 808 PureView User Guide," http://download-fds.webapps.microsoft.com/supportFiles/phones/files/pdf_guides/devices/808/Nokia_808_UG_en_APAC.pdf, Jan. 1, 2012, 144 pages.
Anonymous, "Notifications, Android 4.4 and Lower", Android Developers, https://developer.android.com/design/patterns/notifications_k.html, May 24, 2015, 9 pages.
Azundris, "A Fire in the Pie," http://web.archive.org/web/20140722062639/http://blog.azundrix.com/archives/168-A-fire-in-the-sky.html, Jul. 22, 2014, 8 pages.
B-log—betriebsraum weblog, "Extremely Efficient Menu Selection: Marking Menus for the Flash Platform," http://www.betriebsraum.de/blog/2009/12/11/extremely-efficient-menu-selection-marking-for-the-flash-platform, Dec. 11, 2009, 9 pages.
Bolluyt, "5 Apple Watch Revelations from Apple's New WatchKit", http://www.cheatsheet.com/tecnology/5-apple-watch-revelations-from-apples-new-watchkit.html/?a=viewall, Nov. 22, 2014, 3 pages.
Brownlee, "Android 5.0 Lollipop Feature Review!", https//www.youtube.com/watch?v=pEDQ1z1-PvU, Oct. 27, 2014, 5 pages.
Clark, "Global Moxie, Touch Means a Renaissance for Radial Menus," http://globalmoxie.com/blog/radial-menus-for-touch-ui~print.shtml, Jul. 17, 2012, 7 pages.
Cohen, Cinemagraphs are Animated Gifs for Adults, http://www.tubefilter.com/2011/07/10/cinemagraph, Jul. 10, 2011, 3 pages.

(56) References Cited

OTHER PUBLICATIONS

CrackBerry Forums, Windows 8 Bezel Control and Gestures, http://wwwforums.crackberry.com/blackberry-playbook-f222/windows-8-bezel-control-gestures-705129/, Mar. 1, 2012, 8 pages.
Crook, "Microsoft Patenting Multi-Screen, Milti-Touch Gestures," http://techcrunch.com/2011/08/25/microsoft-awarded-patents-for-multi-screen-multi-touch-gestures/, Aug. 25, 2011, 8 pages.
Cvil.ly—a design blog, Interesting Touch Interactions on Windows 8, http://cvil.ly/2011/06/04/interesting-touch-interactions-on-windows-8/, Jun. 4, 2011, 3 pages.
Davidson, et al., "Extending 2D Object Arrangement with Pressure-Sensitive Layering Cues", Proceedings of the 21st Annual ACM Symposium on User Interface Software and Technology, Oct. 19, 2008, 4 pages.
Dinwiddie, et al., "Combined-User Interface for Computers, Television, Video Recorders, and Telephone, Etc", IP.COM Journal, Aug. 1, 1990, 3 pages.
Drinkwater, "Glossary: Pre/Post Alarm Image Buffer," http://www.networkwebcams.com/ip-camera-learning-center/2008/07/17/glossary-prepost-alarm-image-buffer/, Jul. 17, 2008, 1 page.
Dzyre, "10 Android Notification Features You Can Fiddle With", http://www.hongkiat.com/blog/android-notification-features, Mar. 10, 2014, 10 pages.
Easton-Ellett, "Three Free Cydia Utilities to Remove iOS Notification Badges", http://www.ijailbreak.com/cydia/three-free-cydia-utilities-to-remove-ios-notification-badges, Apr. 14, 2012, 2 pages.
Elliot, "Mac System 7", YouTube. Web. Mar. 8, 2017, http://www.youtube.com/watch?v=XLv22hfuuik, Aug. 3, 2011, 1 page.
Farshad, "SageThumbs—Preview and Convert Pictures From Windows Context Menu", https://web.addictivetips.com/windows-tips/sagethumbs-preview-and-convert-photos-from-windows-context-menu, Aug. 8, 2011, 5 pages.
Fenlon, "The Case for Bezel Touch Gestures on Apple's iPad," http://www.tested.com/tech/tablets/3104-the-case-for-bezel-touch-gestures-on-apples-ipad/, Nov. 2, 2011, 6 pages.
Flaherty, "Is Apple Watch's Pressure-Sensitive Screen a Bigger Deal Than the Gadget Itself?", http://www.wired.com/2014/09/apple-watchs-pressure-sensitive-screen-bigger-deal-gadget, Sep. 15, 2014, 3 pages.
Flixel, "Cinemagraph Pro for Mac", https://flixel.com/products/mac/cinemagraph-pro, 2014, 7 pages.
Flowplayer, "Slowmotion: Flowplayer," https://web.archive.org/web/20150226191526/http://flash.flowplayer.org/plugins/streaming/slowmotion.html, Feb. 26, 2015, 4 pages.
Forlines, et al., "Glimpse: a Novel Input Model for Multi-level Devices", Chi '05 Extended Abstracts on Human Factors in Computing Systems, Apr. 2, 2005, 4 pages.
Gardner, "Recenz—Recent Apps in One Tap", You Tube, https://www.youtube.com/watch?v-qailSHRgsTo, May 15, 2015, 1 page.
Gonzalo et al., "Zliding: Fluid Zooming and Sliding for High Precision Parameter Manipulation", Department of Computer Science, University of Toronto, Seattle, Washington, Oct. 23, 2005, 10 pages.
Google-Chrome, "Android 5.0 Lollipop", http://androidlover.net/android-os/android-5-0-lollipop/android-5-0-lollipop-recent-apps-card-google-search.html, Oct. 19, 2014, 10 pages.
Grant, "Android's Notification Center", https://www.objc.io/issues/11-android/android-notifications, Apr. 30, 2014, 26 pages.
IBM et al., "Pressure-Sensitive Icons", IBM Technical Disclosure Bulletin, vol. 33, No. 1B, Jun. 1, 1990, 3 pages.
ICIMS Recruiting Software, "Blackberry Playbook Review," http://www.tested.com/tech.tablets/5749-blackberry-playbook-review/, 2015, 11 pages.
IPhoneHacksTV, "Confero allows you to easily manage your Badge notifications—iPhone Hacks", youtube, https://wwwyoutube.com/watch?v=JCk61pnL4SU, Dec. 26, 2014, 3 pages.
IPhoneOperator, "Wasser Liveeffekt fur Homescreen & Lockscreen—Aquaboard (Cydia)", http://www.youtube.com/watch?v=fG9YMF-mB0Q, Sep. 22, 2012, 3 pages.
IPodHacks 142: "Water Ripple Effects on the Home and Lock Screen: AquaBoard Cydia Tweak Review", YouTube, https://www.youtube.comwatch?v-Auu_uRaYHJs, Sep. 24, 2012, 3 pages.
Kaaresoja, "Snap-Crackle-Pop: Tactile Feedback for Mobile Touch Screens," Nokia Research Center, Helsinki, Finland, Proceedings of Eurohaptics vol. 2006, Jul. 3, 2006, 2 pages.
Kiener, "Force Touch on iPhone", https://www.youtube.com/watch?v=CEMmnsU5fC8, Aug. 4, 2015, 4 pages.
Kost, "LR3-Deselect All Images But One", Julieanne Kost's Blog, blogs.adobe.com/jkost/2011/12/Ir3-deselect-all-images-but-one.html, Dec. 22, 2011, 1 page.
Kronfli, "HTC Zoe Comes to Google Play, Here's Everything You Need to Know," Know Your Mobile, http://www.knowyourmobile.com/htc/htc-one/19550/what-htc-zoe, Aug. 14, 2014, 5 pages.
Kumar, "How to Enable Ripple Effect on Lock Screen of Galaxy S2", YouTube, http, http://www.youtube.com/watch?v+B9-4M5abLXA, Feb. 12, 2013, 3 pages.
Kurdi, "XnView Shell Extension: A Powerful Image Utility Inside the Context Menu", http://www.freewaregenius.com/xnview-shell-extension-a-powerful-image-utility-inside-the-context-menu, Jul. 30, 2008, 4 pages.
Laurie, "The Power of the Right Click," http://vlaurie.com/right-click/customize-context-menu.html, 2002-2016, 3 pages.
MacKenzie et al., "The Tactile Touchpad", Chi '97 Extended Abstracts on Human Factors in Computing Systems Looking to the Future, Chi '97, Mar. 22, 1997, 5 pages.
Mahdi, Confero now available in Cydia, brings a new way to manage Notification badges [Jailbreak Tweak], http://www.iphonehacks.com/2015/01/confero/tweak-manage-notification-badges.html, Jan. 1, 2015, 2 pages.
Matthew, "How to Preview Photos and Images From Right-Click Context Menue in Windows [Tip]", http://www.dottech.org/159009/add-image-preview-in-windows-context-menu-tip, Jul. 4, 2014, 5 pages.
McRitchie, "Internet Explorer Right-Click Menus," http://web.archive.org/web-201405020/http:/dmcritchie.mvps.org/ie/rightie6.htm, May 2, 2014, 10 pages.
Microsoft, "Lumia—How to Personalize Your Start Screen", https://www.youtube.com/watch?v=6GI5Z3TrSEs, Nov. 11, 2014, 3 pages.
Microsoft, "Use Radial Menus to Display Commands in OneNote for Windows 8," https://support.office.com/en-us/article/Use-radial-menues-to-display-OneNote-commands-Od75f03f-cde7-493a-a8a0b2ed6f99fbe2, 2016, 5 pages.
Minsky, "Computational Haptics The *Sandpaper* System for Synthesizing Texture for a Force-Feedback Display," Massachusetts Institute of Technology, Jun. 1978, 217 pages.
Mitroff, "Google Android 5.0 Lollipop," http://www.cnet.com/products/google-android-5-0-lollipop, Mar. 12, 2015, 5 pages.
Mohr, "Do Not Disturb—The iPhone Feature You Should Be Using", http.www.wonderoftech.com/do-not-disturb-iphone, Jul. 14, 2014, 30 pages.
Nacca, "NiLS Lock Screen Notifications / Floating Panel—Review", https://www.youtube.com/watch?v=McT4QnS9TDY, Feb. 3, 2014, 4 pages.
Nikon, "Scene Recognition System and Advanced SRS," http://www.nikonusa.com/en.Learn-And-Explore/Article/ftlzi4rr/Scene-Recognition-System.html, Jul. 22, 2015, 2 pages.
O'Hara, et al., "Pressure-Sensitive Icons", IP.COM Journal, IP.COM Inc., West Henrietta, NY, US, Jun. 1, 1990, 2 Pages.
Pallenberg, "Wow, the new iPad had gestures." https://plus.google.com/+SaschaPallenberg/posts/aaJtJogu8ac, Mar. 7, 2012, 2 pages.
Phonebuff, "How to Pair Bluetooth on the iPhone", https://www.youtube.com/watch?v=LudNwEar9A8, Feb. 8, 2012, 3 pages.
PoliceOne.com, "COBAN Technologies Pre-Event Buffer & Fail Safe Feature," http://www.policeone.com/police-products/police-technology/mobile-computres/videos/5955587-COBAN-Technologies-Pre-Event, Nov. 11, 2010, 2 pages.
Pradeep, "Android App Development—Microsoft Awarded With Patents on Gestures Supported on Windows 8," http://mspoweruser.com/microsoft-awarded-with-patents-on-gestures-supported-on-windows-8/, Aug. 25, 2011, 16 pages.
"Quickly Preview Songs in Windows Media Player 12 in Windows 7," Quickly Preview Songs in Windows Media Player 12 in Win-

(56) References Cited

OTHER PUBLICATIONS dows 7. How-to Geek, Apr. 28, 2010, Web. May 8, 2010, http://web.archive.org/web/20100502013134/http://www.howtogeek.com/howto/16157/quickly-preview-songs-in-windows-media-center-12-in-windows-7>, 6 pages.
Quinn, et al., "Zoofing! Faster List Selections with Pressure-Zoom-Flick-Scrolling", Proceedings of the 21st Annual Conference of the Australian Computer-Human Interaction Special Interest Group on Design, Nov. 23, 2009, ACM Press, vol. 411, 8 pages.
Rekimoto, et al., "PreSense: Interaction Techniques for Finger Sensing Input Devices", Proceedings of the 16th Annual ACM Symposium on User Interface Software and Technology, Nov. 30, 2003, 10 pages.
Rekimoto, et al., "PreSensell: Bi-directional Touch and Pressure Sensing Interactions with Tactile Feedback", Conference on Human Factors in Computing Systems Archive, ACM, Apr. 22, 2006, 6 pages.
Ritchie, "How to see all the unread message notifications on your iPhone, all at once, all in the same place | iMore", https://www.imore.com/how-see-all-unread-message-notifications-your-iphone-all-once-all-same-place, Feb. 22, 2014, 2 pages.
Sony, "Intelligent Scene Recognition," https://www.sony-asia.com/article/252999/section/product/product/dsc-t77, downloaded on May 20, 2016, 5 pages.
Sood, "MultitaskingGestures", http://cydia.saurik.com/package/org.thebigboxx.multitaskinggestures/, Mar. 3, 2014, 2 pages.
Stross, "Wearing a Badge, and a Video Camera," The New York Times, http://www.nytimes.com/2013/04/07/business/wearable-video-cameras-for-police-offers.html? R=0, Apr. 6, 2013, 4 pages.
Taser, "Taser Axon Body Camera User Manual," https://www.taser.com/images/support/downloads/product- resourses/axon_body_product_manual.pdf, Oct. 1, 2013, 24 pages.
Tidwell, "Designing Interfaces," O'Reilly Media, Inc., USA, Nov. 2005, 348 pages.
VGJFeliz, "How to Master Android Lollipop Notifications in Four Minutes!", https://www.youtube.com/watch?v=S-zBRG7GJgs, Feb. 8, 2015, 5 pages.
VisioGuy, "Getting a Handle on Selecting and Subselecting Visio Shapes", http://www.visguy.com/2009/10/13/getting-a-handle-on-selecting-and-subselecting-visio-shapes/, Oct. 13, 2009, 18 pages.
Wikipedia, "AirDrop,", Wikipedia, the free encyclopedia, http://en.wikipedia.org/wiki/AirDrop, May 17, 2016, 5 pages.
Wikipedia, "Cinemagraph," Wikipedia, the free encyclopedia, http://en.wikipedia.org/wiki/Cinemagraph, Last Modified Mar. 16, 2016, 2 pages.
Wikipedia, "Context Menu," Wikipedia, the free encyclopedia https://en.wikipedia.org/wiki/Context menu, Last Modified May 15, 2016, 4 pages.
Wikipedia, "HTC One (M7)," Wikipedia, the free encyclopedia, https://en.wikipedia.org/wiki/HTC_One_(M7), Mar. 2013, 20 pages.
Wikipedia, "Mobile Ad Hoc Network," Wikipedia, the free encyclopedia, http://en.wikipedia.org/wiki/Mobile_ad_hoc_network, May 20, 2016, 4 pages.
Wikipedia, "Pie Menu," Wikipedia, the free encyclopedia, http://en.wikipedia.org/wiki/Pie_menu, Last Modified Jun. 4, 2016, 3 pages.
Wikipedia, "Quick Look," from Wikipedia, the free encyclopedia, https;//en.wikipedia.org/wiki/Quick_Look, Last Modified Jan. 15, 2016, 3 pages.
Wikipedia, "Sony Xperia Z1", Wikipedia, the free encyclopedia, https://enwikipedia.org/wiki/Sony_Experia_Z1, Sep. 2013, 10 pages.
Wilson, et al., "Augmenting Tactile Interaction with Pressure-Based Input", School of Computing Science, Glasgow, UK, Nov. 15-17, 2011, 2 pages.
YouTube, "Android Lollipop Lock-Screen Notification Tips", https://www.youtube.com/watch?v=LZTxHBOwzIU, Nov. 13, 2014, 3 pages.
YouTube, "Blackberry Playbook bezel interaction," https://www.youtube.com/watch?v=YGkzFqnOwXI, Jan. 10, 2011, 2 pages.
YouTube, "How to Master Android Lollipop Notifications in Four Minutes!", Video Gadgets Journal (VGJFelix), https://www.youtube.com/watch?v=S-zBRG7GGJgs, Feb. 8, 2015, 4 pages.
YouTube, "HTC One Favorite Camera Features", http://www.youtube.com/watch?v=sUYHfcjI4RU, Apr. 28, 2013, 3 pages.
YouTube, "Multitasking Gestures: Zephyr Like Gestures on iOS", https://www.youtube.com/watch?v=Jcod-f7Lw0I, Jan. 27, 2014, 3 pages.
YouTube, "Recentz—Recent Apps in a Tap", https://www.youtube.com/watch?v=qailSHRgsTo, May 15, 2015, 1 page.
Office Action, dated Mar. 15, 2017, received in U.S. Appl. No. 14/535,671, 13 pages.
Office Action, dated Nov. 30, 2017, received in U.S. Appl. No. 14/535,671, 21 pages.
Office Action, dated Jun. 29, 2017, received in U.S. Appl. No. 14/608,895, 30 pages.
Final Office Action, dated Feb. 22, 2018, received in U.S. Appl. No. 14/608,895, 20 pages.
Office Action, dated Dec. 18, 2015, received in Australian Patent Application No. 2013368440, which corresponds with U.S. Appl. No. 14/536,426, 3 pages.
Office Action, dated Oct. 18, 2016, received in Australian Patent Application No. 2013368440, which corresponds with U.S. Appl. No. 14/536,426, 3 pages.
Notice of Allowance, dated Dec. 20, 2016, received in Australian Patent Application No. 2013368440, which corresponds with U.S. Appl. No. 14/536,426, 3 pages.
Certificate of Grant, dated Apr. 29, 2017, received in Australian Patent Application No. 2013368440, which corresponds with U.S. Appl. No. 14/536,426, 3 pages.
Office Action, dated Nov. 6, 2017, received in Chinese Patent Application No. 201380068493.6, which corresponds with U.S. Appl. No. 14/608,895, 5 pages.
Office Action, dated Jul. 21, 2016, received in European Patent Application No. 13795391.5, which corresponds with U.S. Appl. No. 14/536,426, 9 pages.
Office Action, dated Mar. 9, 2018, received in European Patent Application No. 13795391.5, which corresponds with U.S. Appl. No. 14/536,426, 4 pages.
Office Action, dated Sep. 13, 2016, received in Japanese Patent Application No. 2015-547948, which corresponds with U.S. Appl. No. 14/536,426, 5 pages.
Patent, dated May 12, 2017, received in Japanese Patent Application No. 2015-547948, which corresponds with U.S. Appl. No. 14/536,426, 3 pages.
Office Action, dated Apr. 5, 2016, received in Korean Patent Application No. 10-2015-7018851, which corresponds with U.S. Appl. No. 14/536,426, 7 pages.
Office Action, dated Feb. 24, 2017, received in Korean Patent Application No. 10-2015-7018851, which corresponds with U.S. Appl. No. 14/536,426, 3 pages.
Patent, dated May 26, 2017, received in Korean Patent Application No. 2015-7018851, which corresponds with U.S. Appl. No. 14/536,426, 3 pages.
Office Action, dated Jul. 26, 2017, received in U.S. Appl. No. 14/536,235, 14 pages.
Final Office Action, dated Feb. 26, 2018, received in U.S. Appl. No. 14/536,235, 13 pages.
Office Action, dated Apr. 5, 2017, received in U.S. Appl. No. 14/536,367, 16 pages.
Notice of Allowance, dated Nov. 30, 2017, received in U.S. Appl. No. 14/536,367, 9 pages.
Office Action, dated Dec. 17, 2015, received in U.S. Appl. No. 14/536,426, 28 pages.
Final Office Action, dated May 6, 2016, received in U.S. Appl. No. 14/536,426, 23 pages.
Office action, dated Aug. 3, 2017, received in U.S. Appl. No. 14/536,426, 10 pages.
Office Action, dated Jul. 15, 2015, received in Australian Patent Application No. 2013259606, which corresponds with U.S. Appl. No. 14/536,426, 3 pages.

(56) References Cited

OTHER PUBLICATIONS

Notice of Allowance, dated May 23, 2016, received in Australian Patent Application No. 2013259606, which corresponds with U.S. Appl. No. 14/536,426, 3 pages.
Certificate of Grant, dated Sep. 15, 2016, received in Australian Patent Australian Patent Application No. 2013259606, which corresponds with U.S. Appl. No. 14/536,426, 1 page.
Office Action, dated Nov. 18, 2015, received in Australian Patent Application No. 2015101231, which corresponds with U.S. Appl. No. 14/536,426, 3 pages.
Office Action, dated May 15, 2017, received in Australian Patent Application No. 2016216580, which corresponds with U.S. Appl. No. 14/536,426, 3 pages.
Office Action, dated Sep. 19, 2017, received in Chinese Patent Application No. 201380035982.1, which corresponds with U.S. Appl. No. 14/536,426, 5 pages.
Office Action, dated Sep. 20, 2017, received in Chinese Patent Application No. 201510566550.4, which corresponds with U.S. Appl. No. 14/536,426, 11 pages.
Decision to Grant, dated Jul. 14, 2016, received in European Patent Application No. 13724100.6, which corresponds with U.S. Appl. No. 14/536,426, 1 page.
Letters Patent, dated Aug. 10, 2016, received in European Patent Application No. 13724100.6, which corresponds with U.S. Appl. No. 14/536,426, 1 page.
Office Action, dated Jan. 20, 2017, received in European Patent Application No. 15183980.0, which corresponds with U.S. Appl. No. 14/536,426, 5 pages.
Office Action, dated Aug. 21, 2017, received in European Patent Application No. 15183980.0, which corresponds with U.S. Appl. No. 14/536,426, 3 pages.
Intention to Grant, dated Mar. 9, 2018, received in European Patent Application No. 15183980.0, which corresponds with U.S. Appl. No. 14/536,426, 5 pages.
Certificate of Grant, dated Nov. 10, 2017, received in Hong Kong Patent Application No. 15107535.0, which corresponds with U.S. Appl. 14/536,426, 2 pages.
Office Action, dated Mar. 4, 2016, received in Japanese Patent Application No. 2015-511644, which corresponds with U.S. Appl. No. 14/536,426, 3 pages.
Office Action, dated Feb. 6, 2017, received in Japanese Patent Application No. 2015-511644, which corresponds with U.S. Appl. No. 14/536,426, 6 pages.
Notice of Allowance, dated Dec. 8, 2017, received in Japanese Patent Application No. 2015-511644, which corresponds with U.S. Appl. No. 14/536,426, 6 pages.
Patent, dated Jan. 12, 2018, received in Japanese Patent Application No. 2015-511644, which corresponds with U.S. Appl. No. 14/536,426, 3 pages.
Office Action, dated Mar. 9, 2017, received in U.S. Appl. No. 14/536,464, 21 pages.
Final Office Action, dated Aug. 25, 2017, received in U.S. Appl. No. 14/536,464, 30 pages.
Office Action, dated Feb. 12, 2018, received in U.S. Appl. No. 14/536,464, 33 pages.
Office Action, dated Sep. 25, 2017, received in U.S. Appl. No. 14/536,644, 29 pages.
Office Action, dated Oct. 19, 2017, received in U.S. Appl. No. 14/608,926, 14 pages.
Office Action, dated Feb. 1, 2016, received in Australian Patent Application No. 2013368441, which corresponds with U.S. Appl. No. 14/608,926, 3 pages.
Notice of Allowance, dated Mar. 30, 2016, received in Australian Patent Application No. 2013368441, which corresponds with U.S. Appl. No. 14/608,926, 1 page.
Certificate of Grant, dated Jul. 29, 2016, received in Australian Patent Application No. 2013368441, which corresponds with U.S. Appl. No. 14/608,926, 1 page.
Office Action, dated Jan. 3, 2017, received in Australian Patent Application No. 2016201451, which corresponds with U.S. Appl. No. 14/608,926, 3 pages.
Notice of Acceptance, dated Dec. 20, 2017, received in Australian Patent Application No. 2016201451, which corresponds with U.S. Appl. No. 14/608,926, 3 pages.
Notice of Allowance, dated Feb. 8, 2018, received in Chinese Patent Application No. 201380068414.1, which corresponds with U.S. Appl. No. 14/608,926, 2 pages.
Patent, dated May 4, 2018, received in Chinese Patent Application No. 201380068414.1, which corresponds with U.S. Appl. No. 14/608,926, 4 pages.
Office Action, dated Apr. 21, 2016, received in European Patent Application No. 13795392.3, which corresponds with U.S. Appl. No. 14/608,926, 6 pages.
Office Action, dated May 6, 2016, received in European Patent Application No. 13795392.3, which corresponds with U.S. Appl. No. 14/608,926, 6 pages.
Office Action, dated Nov. 11, 2016, received in European Patent Application No. 13795392.3, which corresponds with U.S. Appl. No. 14/608,926, 6 pages.
Office Action, dated Jul. 4, 2017, received in European Patent Application No. 13795392.3, which corresponds with U.S. Appl. No. 14/608,926, 4 pages.
Oral Summons, dated Feb. 13, 2017, received in European Patent Application No. 13795392.3, which corresponds with U.S. Appl. No. 14/608,926, 11 pages.
Office Action, dated Mar. 14, 2016, received in Japanese Patent Application No. 2015-549392, which corresponds with U.S. Appl. No. 14/608,926, 4 pages.
Notice of Allowance, dated Jan. 17, 2017, received in Japanese Patent Application No. 2015-549392, which corresponds with U.S. Appl. No. 14/608,926, 2 pages.
Patent, dated Feb. 17, 2017, received in Japanese Patent Application No. 2015-549392, which corresponds with U.S. Appl. No. 14/608,926, 3 pages.
Office Action, dated May 12, 2016, received in Korean Patent Application No. 10-2015-7018853, which corresponds with U.S. Appl. No. 14/608,926, 4 pages.
Notice of Allowance, dated Mar. 31, 2017, received in Korean Patent Application No. 2015-7018853, which corresponds with U.S. Appl. No. 14/608,926, 4 pages.
Patent, dated Jun. 30, 2017, received in Korean Patent Application No. 2015-7018853, which corresponds with U.S. Appl. No. 14/608,926, 3 pages.
Office Action, dated Aug. 22, 2017, received in Korean Patent Application No. 2017-7018250, which corresponds with U.S. Appl. No. 14/608,926, 2 pages.
Notice of Allowance, dated Dec. 29, 2017, received in Korean Patent Application No. 2017-7018250, which corresponds with U.S. Appl. No. 14/608,926, 3 pages.
Office Action, dated Jul. 17, 2015, received in Australian Patent Application No. 2013259613, which corresponds with U.S. Appl. No. 14/536,646, 5 pages.
Office Action, dated May 31, 2016, received in Australian Patent Application No. 2013259613, which corresponds with U.S. Appl. No. 14/536,646, 4 pages.
Notice of Allowance, dated Jul. 5, 2016, received in Australian Patent Application No. 2013259613, which corresponds with U.S. Appl. No. 14/536,646, 3 pages.
Office Action, dated Dec. 1, 2016, received in Chinese Patent Application No. 2013800362059, which corresponds with U.S. Appl. No. 14/536,646, 3 pages.
Notice of Allowance, dated Oct. 9, 2017, received in Chinese Patent Application No. 2013800362059, which corresponds with U.S. Appl. No. 14/536,646, 3 pages.
Office Action, dated Oct. 19, 2017, received in U.S. Appl. No. 14/536,646, 21 pages.
Office Action, dated Nov. 12, 2015, received in European Patent Application No. 13724102.2, which corresponds with U.S. Appl. No. 14/536,646, 6 pages.

(56) References Cited

OTHER PUBLICATIONS

Office Action, dated May 31, 2016, received in European Patent Application No. 13724102.2, which corresponds with U.S. Appl. No. 14/536,646, 5 pages.
Notice of Allowance, dated Jan. 4, 2017, received in European Patent Application No. 13724102.2, which corresponds with U.S. Appl. No. 14/536,646, 5 pages.
Patent, dated May 26, 2017, received in European Patent Application No. 13724102.2, which corresponds with U.S. Appl. No. 14/536,646, 1 page.
Office Action, dated Feb. 29, 2016, received in Japanese Patent Application No. 2015-511645, which corresponds with U.S. Appl. No. 14/536,646, 5 pages.
Notice of Allowance, dated Dec. 22, 2016, received in Japanese Patent Application No. 2015-511645, which corresponds with U.S. Appl. No. 14/536,646, 2 pages.
Office Action, dated Apr. 3, 2017, received in U.S. Appl. No. 14/536,141, 11 pages.
Notice of Allowance, dated Sep. 20, 2017, received in U.S. Appl. No. 14/536,141, 10 pages.
Office Action, dated Aug. 27, 2015, received in Australian Patent Application No. 2013259614, which corresponds with U.S. Appl. No. 14/536,141, 4 pages.
Notice of Allowance, dated Aug. 15, 2016, received in Australian Patent Application No. 2013259614, which corresponds with U.S. Appl. No. 14/536,141, 1 page.
Office Action, dated Jul. 21, 2017, received in Australian Patent Application No. 2016262773, which corresponds with U.S. Appl. No. 14/536,141, 3 pages.
Office Action, dated Mar. 3, 2017, received in Chinese Patent Application No. 201380035893.7, which corresponds with U.S. Appl. No. 14/536,141, 8 pages.
Office Action, dated Feb. 2, 2018, received in Chinese Patent Application No. 201380035893.7, which corresponds with U.S. Appl. No. 14/536,141, 5 pages.
Office Action, dated Jan. 7, 2016, received in European Patent Application No. 13726053.5, which corresponds with U.S. Appl. No. 14/536,141, 10 pages.
Office Action, dated Aug. 31, 2016, received in European Patent Application No. 13726053.5, which corresponds with U.S. Appl. No. 14/536,141, 10 pages.
Office Action, dated Apr. 9, 2018, received in European Patent Application No. 13726053.5, which corresponds with U.S. Appl. No. 14/536,141, 9 pages.
Office Action, dated Feb. 29, 2016, received in Japanese Patent Application No. 2015-511646, which corresponds with U.S. Appl. No. 14/536,141, 3 pages.
Office Action, dated Oct. 25, 2016, received in Japanese Patent Application No. 2015-511646, which corresponds with U.S. Appl. No. 14/536,141, 6 pages.
Notice of Allowance, dated Jun. 30, 2017, received in Japanese Patent Application No. 2015-511646, which corresponds with U.S. Appl. No. 14/536,141, 5 pages.
Patent, dated Jul. 28, 2017, received in Japanese Patent Application No. 2015-511646, which corresponds with U.S. Appl. No. 14/536,141, 3 pages.
Office Action, dated Dec. 8, 2016, received in U.S. Appl. No. 14/608,942, 9 pages.
Notice of Allowance, dated May 12, 2017, received in U.S. Appl. No. 14/608,942, 10 pages.
Office Action, dated Jan. 29, 2016, received in Australian Patent Application No. 2013368443, which corresponds with U.S. Appl. No. 14/608,942, 3 pages.
Notice of Allowance, dated Mar. 11, 2016, received in Australian Patent Application No. 2013368443, which corresponds with U.S. Appl. No. 14/608,942, 2 pages.
Certificate of Grant, dated Jul. 7, 2016, received in Australian Patent Application No. 2013368443, which corresponds with U.S. Appl. No. 14/608,942, 3 pages.

Office Action, dated Mar. 29, 2017, received in Australian patent Application No. 2016201303, which corresponds with U.S. Appl. No. 14/608,942, 3 pages.
Notice of Acceptance, dated Mar. 7, 2018, received in Australian patent Application No. 2016201303, which corresponds with U.S. Appl. No. 14/608,942, 3 pages.
Office Action, dated Jun. 16, 2017, received in Chinese Patent Application No. 201380068295.X, which corresponds with U.S. Appl. No. 14/608,942, 6 pages.
Office Action, dated Mar. 28, 2018, received in Chinese Patent Application No. 201380068295.X, which corresponds with U.S. Appl. No. 14/608,942, 5 pages.
Office Action, dated Oct. 7, 2016, received in European Patent Application No. 13798464.7, which corresponds with U.S. Appl. No. 14/608,942, 7 pages.
Office Action, dated Jul. 4, 2016, received in Japanese Patent Application No. 2015-549393, which corresponds with U.S. Appl. No. 14/608,942, 4 pages.
Notice of Allowance, dated May 12, 2017, received in Japanese Patent Application No. 2015-549393, which corresponds with U.S. Appl. No. 14/608,942, 5 pages.
Patent, dated Jun. 16, 2017, received in Japanese Patent Application No. 2015-549393, which corresponds with U.S. Appl. No. 14/608,942, 3 pages.
Office Action, dated Apr. 5, 2016, received in Korean Patent Application No. 2015-7018448, which corresponds with U.S. Appl. No. 14/608,942, 6 pages.
Office Action, dated Feb. 24, 2017, received in Korean Patent Application No. 2015-7018448, which corresponds with U.S. Appl. No. 14/608,942, 4 pages.
Office Action, dated Jul. 17, 2017, received in U.S. Appl. No. 14/536,166, 19 pages.
Notice of Allowance, dated Feb. 28, 2018, received in U.S. Appl. No. 14/536,166, 5 pages.
Office Action, dated Aug. 1, 2016, received in U.S. Appl. No. 14/536,203, 14 pages.
Notice of Allowance, dated Feb. 1, 2017, received in U.S. Appl. No. 14/536,203, 9 pages.
Office Action, dated Jul. 9, 2015, received in Australian Patent Application No. 2013259630, which corresponds with U.S. Appl. No. 14/536,203, 3 pages.
Notice of Allowance, dated Jun. 15, 2016, received in Australian Patent Application No. 2013259630, which corresponds with U.S. Appl. No. 14/536,203, 3 pages.
Certificate of Grant, dated Oct. 21, 2016, received in Australian Patent Application No. 2013259630, which corresponds with U.S. Appl. No. 14/536,203, 3 pages.
Office Action, dated Jul. 4, 2017, received in Australian Patent Application No. 2016238917, which corresponds with U.S. Appl. No. 14/536,203, 5 pages.
Office Action, dated Oct. 25, 2017, received in Chinese Patent Application No. 201380035977.0, which corresponds with U.S. Appl. No. 14/536,203, 5 pages.
Notice of Allowance, dated Apr. 4, 2018, received in Chinese Patent Application No. 201380035977.0, which corresponds with U.S. Appl. No. 14/536,203, 3 pages.
Office Action, dated Nov. 11, 2015, received in European Patent Application No. 13724104.8, which corresponds with U.S. Appl. No. 14/536,203, 5 pages.
Office Action, dated May 31, 2016, received in European Patent Application No. 13724104.8, which corresponds with U.S. Appl. No. 14/536,203, 5 pages.
Office Action, dated Dec. 6, 2017, received in European Patent Application No. 13724104.8, which corresponds with U.S. Appl. No. 14/536,203, 9 pages.
Office Action, dated Feb. 15, 2016, received in Japanese Patent Application No. 2015-511650, which corresponds with U.S. Appl. No. 14/536,203, 5 pages.
Notice of Allowance, dated Aug. 5, 2016, received in Japanese Patent Application No. 2015-511650, which corresponds with U.S. Appl. No. 14/536,203, 4 pages.

(56) References Cited

OTHER PUBLICATIONS

Certificate of Patent, dated Sep. 9, 2016, received in Japanese Patent Application No. 2015-511650, which corresponds with U.S. Appl. No. 14/536,203, 3 pages.
Office Action, dated Jun. 23, 2017, received in Japanese Patent Application No. 2016173113, which corresponds with U.S. Appl. No. 14/536,203, 5 pages.
Notice of Allowance, dated Jan. 12, 2018, received in Japanese Patent Application No. 2016173113, which corresponds with U.S. Appl. No. 14/536,203, 5 pages.
Patent, dated Feb. 16, 2018, received in Japanese Patent Application No. 2016173113, which corresponds with U.S. Appl. No. 14/536,203, 3 pages.
Office Action, dated Dec. 4, 2015, received in Korean Patent Application No. 2014-7034520, which corresponds with U.S. Appl. No. 14/536,203, 4 pages.
Notice of Allowance, dated Sep. 1, 2016, received in Korean Patent Application No. 2014-7034520, which corresponds with U.S. Appl. No. 14/536,203, 5 pages.
Office Action, dated Feb. 6, 2017, received in Korean Patent Application No. 2016-7033834, which corresponds with U.S. Appl. No. 14/536,203, 4 pages.
Notice of Allowance, dated Oct. 30, 2017, received in Korean Patent Application No. 2016-7033834, which corresponds with U.S. Appl. No. 14/536,203, 5 pages.
Patent, dated Jan. 23, 2018, received in Korean Patent Application No. 2016-7033834, which corresponds with U.S. Appl. No. 14/536,203, 4 pages.
Office Action, dated Oct. 20, 2017, received in U.S. Appl. No. 14/608,965, 14 pages.
Office action, dated Oct. 11, 2017, received in Chinese Patent Application No. 201380074060.1, which corresponds with U.S. Appl. No. 14/608,965, 5 pages.
Office Action, dated Jul. 22, 2016, received in European Office Action No. 13798465.4, which corresponds with U.S. Appl. No. 14/608,965, 8 pages.
Oral Proceedings, dated Mar. 7, 2018, received in European Office Action No. 13798465.4, which corresponds with U.S. Appl. No. 14/608,965, 5 pages.
Office Action, dated Oct. 20, 2016, received in U.S. Appl. No. 14/536,247, 10 pages.
Final Office Action, dated Mar. 24, 2017, received in U.S. Appl. No. 14/536,247, 14 pages.
Notice of Allowance, dated Nov. 22, 2017, received in U.S. Appl. No. 14/536,247, 6 pages.
Office Action, dated Mar. 24, 2017, received in U.S. Appl. No. 14/536,267, 12 pages.
Notice of Allowance, dated Nov. 9, 2017, received in U.S. Appl. No. 14/536,267, 8 pages.
Office Action, dated Aug. 10, 2015, received in Australian Patent Application No. 2013259637, which corresponds with U.S. Appl. No. 14/536,267, 3 pages.
Notice of Allowance, dated Jun. 28, 2016, received in Australian Patent Application No. 2013259637, which corresponds with U.S. Appl. No. 14/536,267, 3 pages.
Certificate of Grant, dated Oct. 21, 2016, received in Australian Patent Application No. 2013259637, which corresponds with U.S. Appl. No. 14/536,267, 3 pages.
Office Action, dated Mar. 24, 2017, received in Australian Patent Application No. 2016204411, which corresponds with U.S. Appl. No. 14/536,267, 3 pages.
Notice of Acceptance, dated Feb. 27, 2018, received in Australian Patent Application No. 2016204411, which corresponds with U.S. Appl. No. 14/536,267, 3 pages.
Office Action, dated Dec. 9, 2016, received in Chinese Patent Application No. 2016120601564130, which corresponds with U.S. Appl. No. 14/536,267, 4 pages.
Notice of Allowance, dated Jan. 29, 2018, received in Chinese Patent Application No. 201380035968.1, which corresponds with U.S. Appl. No. 14/536,267, 3 pages.
Patent, dated Apr. 20, 2018, received in Chinese Patent Application No. 201380035968.1, which corresponds with U.S. Appl. No. 14/536,267, 4 pages.
Office Action, dated Jan. 25, 2018, received in European Patent Application No. 13724106.3, which corresponds with U.S. Appl. No. 14/536,267, 5 pages.
Office Action, dated Sep. 13, 2017, received in European Patent Application No. 16177863.4, which corresponds with U.S. Appl. No. 14/536,267, 6 pages.
Office Action, dated Jan. 29, 2016, received in Japanese Patent Application No. 2015-511652, which corresponds with U.S. Appl. No. 14/536,267, 3 pages.
Notice of Allowance, dated Sep. 26, 2016, received in Japanese Patent Application No. 2015-511652, which corresponds with U.S. Appl. No. 14/536,267, 5 pages.
Office Action, dated Mar. 3, 2017, received in Japanese Patent Application No. 2016-125839, which corresponds with U.S. Appl. No. 14/536,267, 6 pages.
Notice of Allowance, dated Nov. 17, 2017, received in Japanese Patent Application No. 2016-125839, which corresponds with U.S. Appl. No. 14/536,267, 5 pages.
Office Action, dated Dec. 4, 2015, received in Korean Patent Application No. 2014-7034530, which corresponds with U.S. Appl. No. 14/536,267, 3 pages.
Notice of Allowance, dated Sep. 1, 2016, received in Korean Patent Application No. 2014-7034530, which corresponds with U.S. Appl. No. 14/536,267, 3 pages.
Office Action, dated Jan. 5, 2017, received in Korean Patent Application No. 2016-7029533, which corresponds with U.S. Appl. No. 14/536,267, 2 pages.
Notice of Allowance, dated Sep. 1, 2017, received in Korean Patent Application No. 2016-7029533, which corresponds with U.S. Appl. No. 14/536,267, 4 pages.
Patent, dated Dec. 1, 2017, received in Korean Patent Application No. 2016-7029533, which corresponds with U.S. Appl. No. 14/536,267, 2 pages.
Office Action, dated Apr. 7, 2017, received in U.S. Appl. No. 14/536,291, 11 pages.
Notice of Allowance, dated Dec. 1, 2017, received in U.S. Appl. No. 14/536,291, 19 pages.
Office Action, dated Aug. 18, 2015, received in Australian Patent Application No. 2013259642, which corresponds with U.S. Appl. No. 14/536,291, 3 pages.
Office Action, dated Jul. 25, 2016, received in Australian Patent Application No. 2013259642, which corresponds with U.S. Appl. No. 14/536,291, 3 pages.
Office Action, dated Aug. 10, 2016, received in Australian Patent Application No. 2013259642, which corresponds with U.S. Appl. No. 14/536,291, 4 pages.
Office Action, dated Jul. 21, 2017, received in Australian Patent Application No. 2016216658, which corresponds with U.S. Appl. No. 14/536,291, 3 pages.
Innovation Patent, dated Sep. 1, 2016, received in Australian Patent Application No. 2016101481, which corresponds with U.S. Appl. No. 14/536,291, 1 page.
Office Action, dated Sep. 29, 2016, received in Australian Patent Application No. 2016101481, which corresponds with U.S. Appl. No. 14/536,291, 3 pages.
Office Action, dated Oct. 23, 2017, received in Chinese Patent Application No. 201380035986.X, which corresponds with U.S. Appl. No. 14/536,291, 9 pages.
Office Action, dated Jan. 7, 2016, received in European Patent Application No. 13724107.1, which corresponds with U.S. Appl. No. 14/536,291, 11 pages.
Office Action, dated Aug. 22, 2016, received in European Patent Application No. 13724107.1, which corresponds with U.S. Appl. No. 14/536,291, 7 pages.
Office Action, dated Mar. 23, 2017, received in European Patent Application No. 13724107.1, which corresponds with U.S. Appl. No. 14/536,291, 8 pages.
Office Action, dated Mar. 8, 2016, received in Japanese Patent Application No. 2015-511655, which corresponds with U.S. Appl. No. 14/536,291, 4 pages.

(56) References Cited

OTHER PUBLICATIONS

Final Office Action, dated Dec. 22, 2016, received in Japanese Patent Application No. 2015-511655, which corresponds with U.S. Appl. No. 14/536,291, 3 pages.
Office Action, dated Oct. 19, 2017, received in U.S. Appl. No. 14/608,985, 13 pages.
Office Action, dated Jan. 15, 2016, received in Australian Patent Application No. 2013368445, which corresponds with U.S. Appl. No. 14/608,985, 3 pages.
Notice of Allowance, dated Jan. 18, 2017, received in Australian Patent Application No. 2013368445, which corresponds with U.S. Appl. No. 14/608,985, 3 pages.
Patent, dated May 18, 2017, received in Australian Patent Application No. 2013368445, which corresponds with U.S. Appl. No. 14/608,985, 1 page.
Office Action, dated May 19, 2017, received in Chinese Patent Application No. 201380068399.0, which corresponds with U.S. Appl. No. 14/608,985, 5 pages.
Notice of Allowance, dated Sep. 19, 2017, received in Chinese Patent Application No. 201380068399.0, which corresponds with U.S. Appl. No. 14/608,985, 3 pages.
Patent, dated Dec. 8, 2017, received in Chinese Patent Application No. 201380068399.0, which corresponds with U.S. Appl. No. 14/608,985, 4 pages.
Office Action, dated Jul. 25, 2016, received in European Patent Application No. 13811032.5, which corresponds with U.S. Appl. No. 14/608,985, 8 pages.
Office Action, dated Feb. 27, 2017, received in European Patent Application No. 13811032.5, which corresponds with U.S. Appl. No. 14/608,985, 6 pages.
Summons, dated Oct. 6, 2017, received in European Patent Application No. 13811032.5, which corresponds with U.S. Appl. No. 14/608,985, 6 pages.
Office Action, dated Apr. 25, 2016, received in Japanese Patent Application No. 2015-550384, which corresponds with U.S. Appl. No. 14/608,985, 4 pages.
Notice of Allowance, dated Jan. 24, 2017, received in Japanese Patent Application No. 2015-550384, which corresponds with U.S. Appl. No. 14/608,985, 5 pages.
Patent, dated Feb. 24, 2017, received in Japanese Patent Application No. 2015-550384, which corresponds with U.S. Appl. No. 14/608,985, 2 pages.
Office Action, dated Nov. 4, 2016, received in Korean Patent Application No. 2015-7019984, which corresponds with U.S. Appl. No. 14/608,985, 8 pages.
Notice of Allowance, dated Sep. 19, 2017, received in Korean Patent Application No. 2015-7019984, which corresponds with U.S. Appl. No. 14/608,985, 4 pages.
Patent, dated Dec. 19, 2017, received in Korean Patent Application No. 2015-7019984, which corresponds with U.S. Appl. No. 14/608,985, 3 pages.
Office Action, dated Mar. 24, 2017, received in U.S. Appl. No. 14/609,006, 13 pages.
Final Office Action, dated Sep. 21, 2017, received in U.S. Appl. No. 14/609,006, 17 pages.
Office Action, dated Mar. 20, 2018, received in U.S. Appl. No. 14/609,006, 13 pages.
Office Action, dated Apr. 19, 2017, received in U.S. Appl. No. 14/536,296, 12 pages.
Final Office Action, dated Nov. 2, 2017, received in U.S. Appl. No. 14/536,296, 13 pages.
Notice of Allowance, dated Mar. 14, 2018, received in U.S. Appl. No. 14/536,296, 8 pages.
Office Action, dated Nov. 1, 2017, received in U.S. Appl. No. 14/536,648, 22 pages.
Office Action, dated Jul. 21, 2017, received in Australian Patent Application No. 2016247194, which corresponds with U.S. Appl. No. 14/536,648, 3 pages.
Office Action, dated Jan. 19, 2017, received in U.S. Appl. No. 14/609,042, 12 pages.
Notice of Allowance, dated Jul. 10, 2017, received in U.S. Appl. No. 14/609,042, 8 pages.
Office Action, dated Mar. 31, 2016, received in U.S. Appl. No. 14/864,737, 17 pages.
Notice of Allowance, dated Feb. 27, 2017, received in U.S. Appl. No. 14/864,737, 9 pages.
Notice of Allowance, dated Jun. 19, 2017, received in U.S. Appl. No. 14/864,737, 8 pages.
Notice of Allowance, dated Jul. 1, 2016, received in Chinese Patent Application No. 201620214376.7, which corresponds with U.S. Appl. No. 14/864,737, 3 pages.
Patent, dated Aug. 3, 2016, received in Chinese Patent Application No. 201620214376.7, which corresponds with U.S. Appl. No. 14/864,737, 5 pages.
Certificate of Registration, dated Jun. 20, 2016, received in German Patent Application No. 202016001845.1, which corresponds with U.S. Appl. No. 14/864,737, 3 pages.
Office Action, dated Apr. 5, 2016, received in Danish Patent Application No. 201500577, which corresponds with U.S. Appl. No. 14/864,737, 7 pages.
Intention to Grant, dated Aug. 2, 2016, received in Danish Patent Application No. 201500577, which corresponds with U.S. Appl. No. 14/864,737, 2 pages.
Decision to grant, dated Mar. 29, 2018, received in European Patent Application No. 16710871.1, which corresponds with U.S. Appl. No. 14/864,737, 2 pages.
Office Action, dated May 15, 2017, received in Japanese Patent Application No. 2016-558331, which corresponds with U.S. Appl. No. 14/864,737, 5 pages.
Notice of Allowance, dated Jun. 23, 2017, received in Japanese Patent Application No. 2016-558331, which corresponds with U.S. Appl. No. 14/864,737, 5 pages.
Patent, dated Jul. 28, 2017, received in Japanese Patent Application No. 2016-558331, which corresponds with U.S. Appl. No. 14/864,737, 3 pages.
Office Action, dated Feb. 14, 2018, received in Korean Patent Application No. 2017-7030129, which corresponds with U.S. Appl. No. 14/864,737, 17 pages.
Patent, dated Jul. 12, 2017, received in Dutch Patent Application No. 2016452, which corresponds with U.S. Appl. No. 14/864,737, 2 pages.
Office Action, dated Jun. 27, 2016, received in U.S. Appl. No. 14/866,981, 22 pages.
Notice of Allowance, dated Oct. 24, 2016, received in U.S. Appl. No. 14/866,981, 7 pages.
Notice of Allowance, dated Feb. 10, 2017, received in U.S. Appl. No. 14/866,981, 5 pages.
Office Action, dated May 10, 2016, received in Australian Patent Application No. 2016100254, which corresponds with U.S. Appl. No. 14/866,981, 6 pages.
Patent, dated Nov. 2, 2016, received in Australian Patent Application No. 2016100254, which corresponds with U.S. Appl. No. 14/866,981, 1 page.
Notice of Allowance, dated Jul. 27, 2016, received in Chinese Patent Application No. 201620176169.7, which corresponds with U.S. Appl. No. 14/866,981, 3 pages.
Patent, dated Sep. 28, 2016, received in Chinese Patent Application No. 201620176169.7, which corresponds with U.S. Appl. No. 14/866,981, 4 pages.
Certificate of Registration, dated Jun. 20, 2016, received in German Patent Application No. 202016001514.2, which corresponds with U.S. Appl. No. 14/864,737, 3 pages.
Office Action, dated Mar. 18, 2016, received in Danish Patent Application No. 201500575, which corresponds with U.S. Appl. No. 14/866,981, 9 pages.
Office Action, dated Dec. 5, 2016, received in Danish Patent Application No. 201500575, which corresponds with U.S. Appl. No. 14/866,981, 3 pages.
Office Action, dated Jul. 7, 2017, received in Danish Patent Application No. 201500575, 4 pages.
Patent, Nov. 16, 2017, received in Dutch Patent Application No. 2016375, which corresponds with U.S. Appl. No. 14/866,981, 2 pages.

(56) References Cited

OTHER PUBLICATIONS

Office Action, dated Dec. 15, 2017, received in U.S. Appl. No. 14/866,159, 35 pages.
Office Action, dated May 19, 2016, received in Australian Patent Application No. 2016100251, which corresponds with U.S. Appl. No. 14/866,159, 5 pages.
Office Action, dated Jul. 5, 2016, received in Chinese Patent Application No. 201620186008.6, which corresponds with U.S. Appl. No. 14/866,159, 3 pages.
Certificate of Registration, dated Jun. 16, 2016, received in German Patent No. 202016001483.9, which corresponds with U.S. Appl. No. 14/866,159, 3 pages.
Office Action, dated Mar. 9, 2016, received in Danish Patent Application No. 201500574, which corresponds with U.S. Appl. No. 14/866,159, 11 pages.
Office Action, dated Sep. 27, 2016, received in Danish Patent Application No. 201500574, which corresponds with U.S. Appl. No. 14/866,159, 4 pages.
Office Action, dated Mar. 14, 2017, received in Danish Patent Application No. 201500574, which corresponds with U.S. Appl. No. 14/866,159, 5 pages.
Office Action, dated Jul. 6, 2017, received in Danish Patent Application No. 201500574, which corresponds with U.S. Appl. No. 14/866,159, 3 pages.
Office Action, dated Jan. 10, 2018, received in Danish Patent Application No. 201500574, which corresponds with U.S. Appl. No. 14/866,159, 2 pages.
Notice of Allowance, dated Mar. 21, 2018, received in Danish Patent Application No. 201500574, which corresponds with U.S. Appl. No. 14/866,159, 2 pages.
Patent, dated Sep. 7, 2017, received in Dutch Patent Application No. 2016377, which corresponds with U.S. Appl. No. 14/866,159, 4 pages.
Office Action, dated Oct. 6, 2017, received in U.S. Appl. No. 14/868,078, 40 pages.
Innovation Patent, dated Aug. 4, 2016, received in Australian Patent Application No. 2016101201, which corresponds with U.S. Appl. No. 14/868,078, 1 page.
Office Action, dated Oct. 12, 2016, received in Australian Patent Application No. 2016101201, which corresponds with U.S. Appl. No. 14/868,078, 3 pages.
Notice of Allowance, dated Sep. 1, 2017, received in Australian Patent Application No. 2016229421, which corresponds with U.S. Appl. No. 14/868,078, 3 pages.
Certificate of Grant, dated Jan. 3, 2018, received in Australian Patent Application No. 2016229421, which corresponds with U.S. Appl. No. 14/868,078, 1 page.
Notice of Allowance, dated Oct. 1, 2016, received in Chinese Patent Application No. 201620175847.8, which corresponds with U.S. Appl. No. 14/868,078, 1 page.
Certificate of Registration, dated Jun. 30, 2016, received in German Patent Application No. 20201600156.9, which corresponds with U.S. Appl. No. 14/868,078, 3 pages.
Office Action, dated Mar. 30, 2016, received in Danish Patent Application No. 201500588, which corresponds with U.S. Appl. No. 14/868,078, 9 pages.
Office Action, dated Sep. 2, 2016, received in Danish Patent Application No. 201500588, which corresponds with U.S. Appl. No. 14/868,078, 4 pages.
Notice of Allowance, dated Jan. 30, 2017, received in received in Danish Patent Application No. 201500588, which corresponds with U.S. Appl. No. 14/868,078, 2 pages.
Notice of Allowance, dated May 2, 2017, received in received in Danish Patent Application No. 201500588, which corresponds with U.S. Appl. No. 14/868,078, 2 pages.
Patent, dated Sep. 11, 2017, received in Danish Patent Application No. 201500588, which corresponds with U.S. Appl. No. 14/868,078, 5 pages.
Patent, dated Jul. 12, 2017, received in Dutch Patent Application No. 2016376, which corresponds with U.S. Appl. No. 14/868,078, 2 pages.
Office Action, dated May 9, 2016, received in U.S. Appl. No. 14/863,432, 26 pages.
Notice of Allowance, dated Nov. 14, 2016, received in U.S. Appl. No. 14/863,432, 7 pages.
Notice of Allowance, dated Apr. 27, 2017, received in U.S. Appl. No. 14/863,432, 7 pages.
Notice of Allowance, dated Sep. 18, 2017, received in U.S. Appl. No. 14/863,432, 8 pages.
Office Action, dated Aug. 19, 2016, received in Australian Patent Application No. 2016100647, which corresponds with U.S. Appl. No. 14/863,432, 5 pages.
Notice of Allowance, dated Jan. 12, 2017, received in Chinese Patent Application No. 201620470063.8, which corresponds with U.S. Appl. No. 14/863,432, 1 page.
Office Action, dated Apr. 4, 2016, received in Danish Patent Application No. 201500582, which corresponds with U.S. Appl. No. 14/863,432, 10 pages.
Office Action, dated Oct. 7, 2016, received in Danish Patent Application No. 201500582, which corresponds with U.S. Appl. No. 14/863,432, 6 pages.
Office Action, dated Jun. 12, 2017, received in Danish Patent Application No. 201500582, which corresponds with U.S. Appl. No. 14/863,432, 5 pages.
Grant, dated Jul. 21, 2017, received in Dutch Patent Application No. 2016801, which corresponds with U.S. Appl. No. 14/871,227, 8 pages.
Office Action, dated Oct. 13, 2016, received in U.S. Appl. No. 14/866,511, 27 pages.
Final Office Action, dated Jan. 27, 2017, received in U.S. Appl. No. 14/866,511, 26 pages.
Notice of Allowance, dated Oct. 4, 2017, received in U.S. Appl. No. 14/866,511, 37 pages.
Patent, dated Aug. 8, 2016, received in Australian Patent Application 2016100653, corresponds with U.S. Appl. No. 14/866,511, 1 page.
Notice of Allowance, dated Jan. 12, 2017, received in Chinese Patent Application No. 201620470281.1, which corresponds with U.S. Appl. No. 14/866,511, 1 page.
Office Action, dated Mar. 22, 2016, received in Danish Patent Application No. 201500576, which corresponds with U.S. Appl. No. 14/866,511, 10 pages.
Intention to Grant, dated Jun. 8, 2016, received in Danish Patent Application No. 201500576, which corresponds with U.S. Appl. No. 14/866,511, 2 pages.
Grant, dated Aug. 26, 2016, received in Danish Patent Application No. 201500576, which corresponds with U.S. Appl. No. 14/866,511, 2 pages.
Patent, dated Jan. 23, 2017, received in Danish Patent Application No. 201500576, which corresponds with U.S. Appl. No. 14/866,511, 3 pages.
Office Action, dated Nov. 24, 2017, received in European Patent Application No. 16727900.9, which corresponds with U.S. Appl. No. 14/866,511, 5 pages.
Office Action, dated Jun. 9, 2017, received in Japanese Patent Application No. 2016558214, which corresponds with U.S. Appl. No. 14/866,511, 6 pages.
Notice of Allowance, dated Jul. 14, 2017, received in Japanese Patent Application No. 2016558214, which corresponds with U.S. Appl. No. 14/866,511, 5 pages.
Patent, dated Aug. 18, 2017, received in Japanese Patent Application No. 2016558214, which corresponds with U.S. Appl. No. 14/866,511, 3 pages.
Office Action, dated May 10, 2016, received in U.S. Appl. No. 14/866,489, 15 pages.
Final Office Action, dated Sep. 16, 2016, received in U.S. Appl. No. 14/866,489, 24 pages.
Notice of Allowance, dated Apr. 27, 2017, received in U.S. Appl. No. 14/866,489, 27 pages.
Notice of Allowance, dated Jul. 6, 2017, received in U.S. Appl. No. 14/866,489, 12 pages.

(56) References Cited

OTHER PUBLICATIONS

Office Action, dated Mar. 28, 2016, received in U.S. Appl. No. 14/869,899, 17 pages.
Office Action, dated Jun. 28, 2016, received in U.S. Appl. No. 14/869,899, 5 pages.
Final Office Action, dated Sep. 2, 2016, received in U.S. Appl. No. 14/869,899, 22 pages.
Notice of Allowance, dated Feb. 28, 2017, received in U.S. Appl. No. 14/869,899, 9 pages.
Innovation Patent, dated Aug. 25, 2016, received in Australian Patent Application No. 2016101438, which corresponds with U.S. Appl. No. 14/869,899, 1 page.
Certificate of Examination, dated Oct. 11, 2016, received in Australian Patent Application No. 2016101438, which corresponds with U.S. Appl. No. 14/869,899, 1 page.
Office Action, dated Feb. 3, 2016, received in Danish Patent Application No. 201500592, which corresponds with U.S. Appl. No. 14/869,899, 9 pages.
Office Action, dated Oct. 7, 2016, received in Danish Patent Application No. 201500592, which corresponds with U.S. Appl. No. 14/869,899, 6 pages.
Office Action, dated Jul. 3, 2017, received in Danish Patent Application No. 201500592, which corresponds with U.S. Appl. No. 14/869,899, 5 pages.
Office Action, dated Jan. 29, 2018, received in Danish Patent Application No. 201500592, which corresponds with U.S. Appl. No. 14/869,899, 2 pages.
Notice of Allowance, dated Apr. 24, 2018, received in Danish Patent Application No. 201500592, which corresponds with U.S. Appl. No. 14/869,899, 2 pages.
Office Action, dated Nov. 22, 2016, received in Danish Patent Application No. 201670594, which corresponds with U.S. Appl. No. 14/869,899, 9 pages.
Office Action, dated Dec. 14, 2017, received in Danish Patent Application No. 201670594, which corresponds with U.S. Appl. No. 14/869,899, 3 pages.
Office Action, dated Mar. 4, 2016, received in U.S. Appl. No. 14/866,992, 30 pages.
Final Office Action, dated Jul. 29, 2016, received in U.S. Appl. No. 14/866,992, 35 pages.
Office Action, dated Apr. 13, 2017, received in U.S. Appl. No. 14/866,992, 34 pages.
Final Office Action, dated Oct. 3, 2017, received in U.S. Appl. No. 14/866,992, 37 pages.
Office Action, dated Jan. 29, 2018, received in U.S. Appl. No. 14/866,992, 44 pages.
Innovation Patent, dated Sep. 22, 2016, received in Australian Patent Application No. 2016101418, which corresponds with U.S. Appl. No. 14/866,992, 1 page.
Office Action, dated Nov. 22, 2016, received in Australian Patent Application No. 2016101418, which corresponds with U.S. Appl. No. 14/866,992, 7 pages.
Office Action, dated Feb. 7, 2017, received in Australian Patent Application No. 2016101418, which corresponds with U.S. Appl. No. 14/866,992, 5 pages.
Office Action, dated Mar. 26, 2018, received in Australian Patent Application No. 2016304890, which corresponds with U.S. Appl. No. 14/866,992, 3 pages.
Office Action, dated Jan. 19, 2018, received in Australian Patent Application No. 201761478, which corresponds with U.S. Appl. No. 14/866,992, 6 pages.
Office Action, dated Mar. 18, 2016, received in Danish Patent Application No. 201500593, which corresponds with U.S. Appl. No. 14/866,992, 10 pages.
Office Action, dated Jun. 27, 2016, received in Danish Patent Application No. 201500593, which corresponds with U.S. Appl. No. 14/866,992, 7 pages.
Office Action, dated Feb. 6, 2017, received in Danish Patent Application No. 201500593, which corresponds with U.S. Appl. No. 14/866,992, 4 pages.
Office Action, dated Sep. 5, 2017, received in Danish Patent Application No. 201500593, which corresponds with U.S. Appl. No. 14/866,992, 6 pages.
Office Action, dated Feb. 12, 2018, received in U.S. Appl. No. 15/009,661, 36 pages.
Office Action, dated Jan. 18, 2018, received in U.S. Appl. No. 15/009,676, 21 pages.
Office Action, dated Mar. 13, 2018, received in U.S. Appl. No. 15/009,688, 10 pages.
Office Action, dated Nov. 30, 2015, received in U.S. Appl. No. 14/845,217, 24 pages.
Final Office Action, dated Apr. 22, 2016, received in U.S. Appl. No. 14/845,217, 36 pages.
Notice of Allowance, dated Aug. 26, 2016, received in U.S. Appl. No. 14/845,217, 5 pages.
Notice of Allowance, dated Jan. 4, 2017, received in U.S. Appl. No. 14/845,217, 5 pages.
Office Action, dated Feb. 3, 2016, received in U.S. Appl. No. 14/856,517, 36 pages.
Final Office Action, dated Jul. 13, 2016, received in U.S. Appl. No. 14/856,517, 30 pages.
Office Action, dated May 2, 2017, received in U.S. Appl. No. 14/856,517, 34 pages.
Final Office Action, dated Oct. 4, 2017, received in U.S. Appl. No. 14/856,517, 33 pages.
Office Action, dated Feb. 11, 2016, received in U.S. Appl. No. 14/856,519, 34 pages.
Final Office Action, dated Jul. 15, 2016, received in U.S. Appl. No. 14/856,519, 31 pages.
Office Action, dated May 18, 2017, received in U.S. Appl. No. 14/856,519, 35 pages.
Final Office Action, dated Nov. 15, 2017, received in U.S. Appl. No. 14/856,519, 31 pages.
Notice of Allowance, dated Jan. 31, 2018, received in U.S. Appl. No. 14/856,519, 9 pages.
Office Action, dated Jun. 9, 2017, received in U.S. Appl. No. 14/856,520, 36 pages.
Final Office Action, dated Nov. 16, 2017, received in U.S. Appl. No. 14/856,520, 41 pages.
Office Action, dated Jun. 30, 2017, received in U.S. Appl. No. 14/856,522, 22 pages.
Notice of Allowance, dated Feb. 9, 2018, received in U.S. Appl. No. 14/856,522, 9 pages.
Office Action, dated Feb. 1, 2016, received in U.S. Appl. No. 14/857,645, 15 pages.
Final Office Action, dated Jun. 16, 2016, received in U.S. Appl. No. 14/857,645, 12 pages.
Notice of Allowance, dated Oct. 24, 2016, received in U.S. Appl. No. 14/857,645, 6 pages.
Notice of Allowance, dated Jun. 16, 2017, received in in U.S. Appl. No. 14/857,645, 5 pages.
Office Action, dated Nov. 30, 2017, received in U.S. Appl. No. 14/857,636, 19 pages.
Office Action, dated Jan. 17, 2018, received in Australian Patent Application No. 2017202816, which corresponds with U.S. Appl. No. 14/857,636, 3 pages.
Office Action, dated Sep. 22, 2017, received in Japanese Patent Application No. 2017-029201, which corresponds with U.S. Appl. No. 14/857,636, 8 pages.
Office Action, dated Dec. 1, 2017, received in U.S. Appl. No. 14/857,663, 15 pages.
Office Action, dated Mar. 31, 2017, received in U.S. Appl. No. 14/857,700, 14 pages.
Final Office Action, dated Oct. 11, 2017, received in U.S. Appl. No. 14/857,700, 13 pages.
Notice of Allowance, dated Feb. 12, 2018, received in U.S. Appl. No. 14/857,700, 13 pages.
Notice of Allowance, dated Apr. 9, 2018, received in U.S. Appl. No. 14/857,700, 7 pages.
Notice of Allowance, dated Apr. 19, 2018, received in U.S. Appl. No. 14/864,529, 11 pages.
Office Action, dated Jan. 25, 2016, received in U.S. Appl. No. 14/864,580, 29 pages.

(56) References Cited

OTHER PUBLICATIONS

Notice of Allowance, dated May 23, 2016, received in U.S. Appl. No. 14/864,580, 9 pages.
Notice of Allowance, dated Aug. 4, 2016, received in U.S. Appl. No. 14/864,580, 9 pages.
Notice of Allowance, dated Dec. 28, 2016, received in U.S. Appl. No. 14/864,580, 8 pages.
Office Action, dated Aug. 19, 2016, received in Australian Patent Application No. 2016100648, which corresponds with U.S. Appl. No. 14/864,580, 6 pages.
Notice of Allowance, dated Nov. 8, 2016, received in Chinese Patent Application No. 201620470247.4, which corresponds with U.S. Appl. No. 14/864,580, 3 pages.
Certificate of Registration, dated Oct. 14, 2016, received in German Patent Application No. 20201600003234.9, which corresponds with U.S. Appl. No. 14/864,580, 3 pages.
Office Action, dated Apr. 8, 2016, received in Danish Patent Application No. 201500584, which corresponds with U.S. Appl. No. 14/864,580, 9 pages.
Office Action, dated Oct. 7, 2016, received in Danish Patent Application No. 201500584, which corresponds with U.S. Appl. No. 14/864,580, 3 pages.
Office Action, dated May 5, 2017, received in Danish Patent Application No. 201500584, which corresponds with U.S. Appl. No. 14/864,580, 3 pages.
Office Action, dated Dec. 15, 2017, received in Danish Patent Application No. 201500584, which corresponds with U.S. Appl. No. 14/864,580, 4 pages.
Notice of Allowance, dated Nov. 23, 2016, received in U.S. Appl. No. 14/864,601, 12 pages.
Notice of Allowance, dated Apr. 20, 2017, received in U.S. Appl. No. 14/864,601, 13 pages.
Office Action, dated Apr. 19, 2016, received in U.S. Appl. No. 14/864,627, 9 pages.
Notice of Allowance, dated Jan. 31, 2017, received in U.S. Appl. No. 14/864,627, 7 pages.
Office Action, dated Apr. 8, 2016, received in Danish Patent Application No. 201500585, which corresponds with U.S. Appl. No. 14/864,627, 9 pages.
Office Action, dated Oct. 7, 2016, received in. Danish Patent Application No. 201500585, which corresponds with U.S. Appl. No. 14/864,627, 3 pages.
Office Action, dated May 5, 2017, received in Danish Patent Application No. 201500585, which corresponds with U.S. Appl. No. 14/864,627, 4 pages.
Office Action, dated Dec. 15, 2017, received in Danish Patent Application No. 201500585, which corresponds with U.S. Appl. No. 14/864,627, 5 pages.
Office Action, dated Mar. 29, 2016, received in U.S. Appl. No. 14/866,361, 22 pages.
Notice of Allowance, dated Jul. 19, 2016, received in U.S. Appl. No. 14/866,361, 8 pages.
Office Action, dated Jun. 10, 2016, received in Australian Patent Application No. 2016100292, which corresponds with U.S. Appl. No. 14/866,361, 4 pages.
Certificate of Examination, dated Dec. 8, 2016, received in Australian Patent Application No. 2016100292, which corresponds with U.S. Appl. No. 14/866,361, 1 page.
Notice of Allowance/Grant, dated Jul. 1, 2016, received in Chinese Patent Application No. 201620251706.X, which corresponds with U.S. Appl. No. 14/866,361, 3 pages.
Letters Patent, dated Aug. 3, 2016, received in Chinese Patent Application No. 201620251706.X, which corresponds with U.S. Appl. No. 14/866,361, 3 pages.
Certificate of Registration, dated Jun. 24, 2016, received in German Patent Application No. 202016001819.2, which corresponds with U.S. Appl. No. 14/866,361, 3 pages.
Office Action, dated Apr. 7, 2016, received in Danish Patent Application No. 201500579, which corresponds with U.S. Appl. No. 14/866,361, 10 pages.
Office Action, dated Oct. 28, 2016, received in Danish Patent Application No. 201500579, which corresponds with U.S. Appl. No. 14/866,361, 3 pages.
Office Action, dated Jun. 15, 2017, received in Danish Patent Application No. 201500579, which corresponds with U.S. Appl. No. 14/866,361, 2 pages.
Office Action, dated Jan. 4, 2018, received in Danish Patent Application No. 201500579, which corresponds with U.S. Appl. No. 14/866,361, 2 pages.
Notice of Allowance, dated Mar. 16, 2018, received in Danish Patent Application No. 201500579, which corresponds with U.S. Appl. No. 14/866,361, 2 pages.
Office Action, dated Jan. 22, 2018, received in U.S. Appl. No. 14/866,987, 22 pages.
Patent, dated Aug. 8, 2016, received in Australian Patent Application No. 2016100649, which corresponds with U.S. Appl. No. 14/866,987, 1 page.
Office Action, dated Oct. 19, 2016, received in Chinese Patent Application No. 2016201470246.X, which corresponds with U.S. Appl. No. 14/866,987, 4 pages.
Patent, dated May 3, 2017, received in Chinese Patent Application No. 2016201470246.X, which corresponds with U.S. Appl. No. 14/866,987, 2 pages.
Patent, dated Sep. 19, 2016, received in German Patent Application No. 202016002908.9, which corresponds with U.S. Appl. No. 14/866,987, 3 pages.
Office Action, dated Mar. 22, 2016, received in Danish Patent Application No. 201500587, which corresponds with U.S. Appl. No. 14/866,987, 8 pages.
Intention to Grant, dated Jun. 10, 2016, received in Danish Patent Application No. 201500587, which corresponds with U.S. Appl. No. 14/866,987, 2 pages.
Notice of Allowance, dated Nov. 1, 2016, received in Danish Patent Application No. 201500587, which corresponds with U.S. Appl. No. 14/866,987, 2 pages.
Office Action, dated Sep. 9, 2016, received in Danish Patent Application No. 201670463, which corresponds with U.S. Appl. No. 14/866,987, 7 pages.
Notice of Allowance, dated Jan. 31, 2017, received in Danish Patent Application No. 201670463, which corresponds with U.S. Appl. No. 14/866,987, 3 pages.
Office Action, dated Apr. 19, 2017, received in Danish Patent Application No. 201670463, which corresponds with U.S. Appl. No. 14/866,987, 3 pages.
Notice of Allowance, dated Sep. 29, 2017, received in Danish Patent Application No. 201670463, which corresponds with U.S. Appl. No. 14/866,987, 2 pages.
Patent, dated Nov. 6, 2017, received in Danish Patent Application No. 201670463, which corresponds with U.S. Appl. No. 14/866,987, 6 pages.
Notice of Allowance, dated Sep. 22, 2017, received in Japanese Patent Application No. 2016-233449, which corresponds with U.S. Appl. No. 14/866,987, 5 pages.
Patent, dated Oct. 27, 2017, received in Japanese Patent Application No. 2016-233449, which corresponds with U.S. Appl. No. 14/866,987, 3 pages.
Office Action, dated Jul. 31, 2017, received in Japanese Patent Application No. 2017-126445, which corresponds with U.S. Appl. No. 14/866,987, 6 pages.
Notice of Allowance, dated Mar. 6, 2018, received in Japanese Patent Application No. 2017-126445, which corresponds with U.S. Appl. No. 14/866,987, 5 pages.
Office Action, dated Nov. 29, 2017, received in U.S. Appl. No. 14/866,989, 31 pages.
Certificate of Exam, dated Jul. 21, 2016, received in Australian Patent Application No. 2016100652, which corresponds with U.S. Appl. No. 14/866,989, 1 page.
Office Action, dated Feb. 26, 2018, received in Australian Patent Application No. 2017201079, which corresponds with U.S. Appl. No. 14/866,989, 6 pages.
Office Action, dated Jun. 16, 2017, received in Japanese Patent Application No. 2016-233450, which corresponds with U.S. Appl. No. 14/866,989, 6 pages.

(56) References Cited

OTHER PUBLICATIONS

Patent, dated Mar. 9, 2018, received in Japanese Patent Application No. 2016-233450, which corresponds with U.S. Appl. No. 14/866,989, 4 pages.
Office Action, dated Apr. 1, 2016, received in Danish Patent Application No. 201500589, which corresponds with U.S. Appl. No. 14/866,989, 8 pages.
Intention to Grant, dated Jun. 10, 2016, received in Danish Patent Application No. 201500589, which corresponds with U.S. Appl. No. 14/866,989, 2 pages.
Notice of Allowance, dated Nov. 1, 2016, received in Danish Patent Application No. 201500589, which corresponds with U.S. Appl. No. 14/866,989, 2 pages.
Notice of Allowance, dated Feb. 5, 2018, received in Japanese Patent Application No. 2016-233450, which corresponds with U.S. Appl. No. 14/866,989, 5 pages.
Office Action, dated Apr. 11, 2016, received in U.S. Appl. No. 14/871,236, 23 pages.
Office Action, dated Jun. 28, 2016, received in U.S. Appl. No. 14/871,236, 21 pages.
Final Office Action, dated Nov. 4, 2016, received in U.S. Appl. No. 14/871,236, 24 pages.
Notice of Allowance, dated Feb. 28, 2017, received in U.S. Appl. No. 14/871,236, 9 pages.
Innovation Patent, dated Aug. 25, 2016, received in Australian Patent Application No. 2016101433, which corresponds with U.S. Appl. No. 14/871,236, 1 page.
Office Action, dated Oct. 14, 2016, received in Australian Patent Application No. 2016101433, which corresponds with U.S. Appl. No. 14/871,236, 3 pages.
Office Action, dated Apr. 8, 2016, received in Danish Patent Application No. 201500595, which corresponds with U.S. Appl. No. 14/871,236, 12 pages.
Office Action, dated May 26, 2016, received in Danish Patent Application No. 201500595, which corresponds with U.S. Appl. No. 14/871,236, 14 pages.
Office Action, dated Sep. 30, 2016, received in Danish Patent Application No. 201500595, which corresponds with U.S. Appl. No. 14/871,236, 10 pages.
Office Action, dated Jun. 15, 2017, received in Danish Patent Application No. 201500595, which corresponds with U.S. Appl. No. 14/871,236, 4 pages.
Office Action, dated Jan. 29, 2018, received in Danish Patent Application No. 201500595, which corresponds with U.S. Appl. No. 14/871,236, 2 pages.
Office Action, dated Sep. 1, 2017, received in U.S. Appl. No. 14/870,754, 22 pages.
Final Office Action, dated Mar. 9, 2018, received in U.S. Appl. No. 14/870,754, 19 pages.
Office Action, dated Nov. 14, 2017, received in U.S. Appl. No. 14/870,882, 25 pages.
Innovation Patent, dated Aug. 25, 2016, received in Australian Patent Application No. 2016101436, which corresponds with U.S. Appl. No. 14/871,236, 1 page.
Office Action, dated Oct. 31, 2016, received in Australian Patent Application No. 2016101438, which corresponds with U.S. Appl. No. 14/871,236, 6 pages.
Office Action, dated Apr. 6, 2016, received in Danish Patent Application No. 201500596, which corresponds with U.S. Appl. No. 14/870,882, 7 pages.
Office Action, dated Jun. 9, 2016, received in Danish Patent Application No. 201500596, which corresponds with U.S. Appl. No. 14/870,882, 9 pages.
Notice of Allowance, dated Oct. 31, 2017, received in Danish Patent Application No. 201500596, which corresponds with U.S. Appl. No. 14/870,882, 2 pages.
Patent, dated Jan. 29, 2018, received in Danish Patent Application No. 201500596, which corresponds with U.S. Appl. No. 14/870,882, 4 pages.
Office Action, dated Sep. 1, 2017, received in U.S. Appl. No. 14/870,988, 14 pages.
Final Office Action, dated Feb. 16, 2018, received in U.S. Appl. No. 14/870,988, 18 pages.
Office Action, dated Nov. 22, 2017, received in U.S. Appl. No. 14/871,227, 24 pages.
Office Action, dated Oct. 17, 2016, received in Australian Patent Application No. 2016203040, which corresponds with U.S. Appl. No. 14/871,227, 7 pages.
Office Action, dated Oct. 16, 2017, received in Australian Patent Application No. 2016203040, which corresponds with U.S. Appl. No. 14/871,227, 5 pages.
Office Action, dated Oct. 18, 2016, received in Australian Patent Application No. 2016101431, which corresponds with U.S. Appl. No. 14/871,227, 3 pages.
Office Action, dated Apr. 13, 2017, received in Australian Patent Application No. 2016101431, which corresponds with U.S. Appl. No. 14/871,227, 4 pages.
Intention to Grant, dated Apr. 7, 2016, received in Danish Patent Application No. 201500597, which corresponds with U.S. Appl. No. 14/871,227, 7 pages.
Grant, dated Jun. 21, 2016, received in Danish Patent Application No. 201500597, which corresponds with U.S. Appl. No. 14/871,227, 2 pages.
Patent, dated Sep. 26, 2016, received in Danish Patent Application No. 201500597, which corresponds with U.S. Appl. No. 14/871,227, 7 pages.
Office Action, dated Mar. 24, 2017, received in Japanese Patent Application No. 2016-533201, which corresponds with U.S. Appl. No. 14/871,227, 6 pages.
Office Action, dated Aug. 4, 2017, received in Japanese Patent Application No. 2016-533201, which corresponds with U.S. Appl. No. 14/871,227, 6 pages.
Notice of Allowance, dated Jan. 4, 2018, received in Japanese Patent Application No. 2016-533201, which corresponds with U.S. Appl. No. 14/871,227, 4 pages.
Patent, dated Feb. 9, 2018, received in Japanese Patent Application No. 2016-533201, which corresponds with U.S. Appl. No. 14/871,227, 4 pages.
Office Action, dated Feb. 20, 2018, received in Korean Patent Application No. 2016-7019816, which corresponds with U.S. Appl. No. 14/871,227, 8 pages.
Office Action, dated Oct. 26, 2017, received in U.S. Appl. No. 14/871,336, 22 pages.
Final Office Action, dated Mar. 15, 2018, received in U.S. Appl. No. 14/871,336, 23 pages.
Office Action, dated Oct. 14, 2016, received in Australian Patent Application No. 2016101437, which corresponds with U.S. Appl. No. 14/871,336, 2 pages.
Office Action, dated Apr. 11, 2017, received in Australian Patent Application No. 2016101437, which corresponds with U.S. Appl. No. 14/871,336, 4 pages.
Office Action, dated Apr. 18, 2016, received in Danish Patent Application No. 201500601, which corresponds with U.S. Appl. No. 14/871,336, 8 pages.
Office Action, dated Oct. 18, 2016, received in Danish Patent Application No. 201500601, which corresponds with U.S. Appl. No. 14/871,336, 3 pages.
Notice of Allowance, dated Mar. 23, 2017, received in Danish Patent Application No. 201500601, which corresponds with U.S. Appl. No. 14/871,336, 2 pages.
Patent, dated Oct. 30, 2017, Danish Patent Application No. 201500601, which corresponds with U.S. Appl. No. 14/871,336, 5 pages.
Office Action, dated Apr. 2, 2018, received in Japanese Patent Application No. 2018-020324, which corresponds with U.S. Appl. No. 14/874,336, 4 pages.
Office Action, dated Oct. 16, 2017, received in U.S. Appl. No. 14/871,462, 26 pages.
Innovation Patent, dated Aug. 25, 2016, received in Australian Patent Application No. 2016101435, which corresponds with U.S. Appl. No. 14/871,462, 1 page.

(56) References Cited

OTHER PUBLICATIONS

Office Action, dated Oct. 4, 2016, received in Australian Patent Application No. 2016101435, which corresponds with U.S. Appl. No. 14/871,462, 3 pages.
Office Action, dated Oct. 4, 2016, received in Australian Patent Application No. 2016231505, which corresponds with U.S. Appl. No. 14/871,462, 3 pages.
Office Action, dated Sep. 29, 2017, received in Australian Patent Application No. 2016231505, which corresponds with U.S. Appl. No. 14/871,462, 5 pages.
Innovation Patent, dated Oct. 11, 2017, received in Australian Patent Application No. 2016231505, which corresponds with U.S. Appl. No. 14/871,462, 1 page.
Office Action, dated Apr. 20, 2017, received in Chinese Patent Application No. 201621044346.2, which corresponds with U.S. Appl. No. 14/871,462, 3 pages.
Intention to Grant, dated Apr. 18, 2016, received in Danish Patent Application No. 201500600, which corresponds with U.S. Appl. No. 14/871,462, 7 pages.
Grant, dated Aug. 30, 2016, received in Danish Patent Application No. 201500600, which corresponds with U.S. Appl. No. 14/871,462, 2 pages.
Office Action, dated Mar. 13, 2017, received in Japanese Patent Application No. 2016-183289, which corresponds with U.S. Appl. No. 14/871,462, 5 pages.
Office Action, dated Nov. 13, 2017, received in Japanese Patent Application No. 2016-183289, which corresponds with U.S. Appl. No. 14/871,462, 5 pages.
Office Action, dated Apr. 29, 2016, received in U.S. Appl. No. 14/867,823, 28 pages.
Final Office Action, dated Sep. 28, 2016, received in U.S. Appl. No. 14/867,823, 31 pages.
Office Action, dated May 11, 2017, received in U.S. Appl. No. 14/867,823, 42 pages.
Final Office Action, dated Nov. 29, 2017, received in U.S. Appl. No. 14/867,823, 47 pages.
Notice of Allowance, dated Apr. 18, 2018, received in U.S. Appl. No. 14/867,823, 10 pages.
Office Action, dated Mar. 18, 2016, received in Danish Patent Application No. 201500594, which corresponds with U.S. Appl. No. 14/867,823, 10 pages.
Office Action, dated Sep. 7, 2016, received in Danish Patent Application No. 201500594, which corresponds with U.S. Appl. No. 14/867,823, 4 pages.
Office Action, dated May 15, 2017, received in Danish Patent Application No. 201500594, which corresponds with U.S. Appl. No. 14/867,823, 4 pages.
Office Action, dated Jan. 23, 2018, received in Danish Patent Application No. 201500594, which corresponds with U.S. Appl. No. 14/867,823, 8 pages.
Office Action, dated May 10, 2016, received in U.S. Appl. No. 14/867,892, 28 pages.
Final Office Action, dated Nov. 2, 2016, received in U.S. Appl. No. 14/867,892, 48 pages.
Office Action, dated Jul. 6, 2017, received in U.S. Appl. No. 14/867,892, 55 pages.
Final Office Action, dated Dec. 14, 2017, received in U.S. Appl. No. 14/867,892, 53 pages.
Office Action, dated Apr. 24, 2018, received in U.S. Appl. No. 14/867,892, 63 pages.
Office Action, dated Mar. 21, 2016, received in Danish Patent Application No. 201500598, which corresponds with U.S. Appl. No. 14/867,892, 9 pages.
Office Action, dated Sep. 14, 2016, received in Danish Patent Application No. 201500598, which corresponds with U.S. Appl. No. 14/867,892, 4 pages.
Office Action, dated May 4, 2017, received in Danish Patent Application No. 201500598, which corresponds with U.S. Appl. No. 14/867,892, 4 pages.
Office Action, dated Oct. 31, 2017, received in Danish Patent Application No. 201500598, which corresponds with U.S. Appl. No. 14/867,892, 2 pages.
Notice of Allowance, dated Jan. 26, 2018, received in Danish Patent Application. No. 201500598, which corresponds with U.S. Appl. No. 14/867,892, 2 pages.
Office Action, dated Feb. 28, 2018, received in U.S. Appl. No. 14/869,261, 26 pages.
Office Action, dated Mar. 1, 2017, received in U.S. Appl. No. 14/869,855, 14 pages.
Final Office Action, dated Oct. 10, 2017, received in U.S. Appl. No. 14/869,855, 16 pages.
Office Action, dated Jan. 23, 2018, received in U.S. Appl. No. 14/869,855, 24 pages.
Office Action, dated Feb. 9, 2017, received in U.S. Appl. No. 14/869,873, 17 pages.
Final Office Action, dated Aug. 18, 2017, received in U.S. Appl. No. 14/869,873, 20 pages.
Office Action, dated Jan. 18, 2018, received in U.S. Appl. No. 14/869,873, 25 pages.
Office Action, dated Jan. 11, 2018, received in U.S. Appl. No. 14/869,997, 17 pages.
Notice of Allowance, dated Jan. 17, 2018, received in U.S. Appl. No. 14/867,990, 12 pages.
Notice of Allowance, dated Mar. 30, 3018, received in U.S. Appl. No. 14/867,990, 5 pages.
Office Action, dated May 23, 2016, received in Australian Patent Application No. 2016100253, which corresponds with U.S. Appl. No. 14/867,990, 5 pages.
Office Action, dated Jul. 5, 2016, received in Chinese Patent Application No. 201620176221.9, which corresponds with U.S. Appl. No. 14/867,990, 4 pages.
Office Action, dated Oct. 25, 2016, received in Chinese Patent Application No. 201620176221.9, which corresponds with U.S. Appl. No. 14/867,990, 7 pages.
Certificate of Registration, dated Jun. 16, 2016, received in German Patent No. 202016001489.8, which corresponds with U.S. Appl. No. 14/867,990, 3 pages.
Office Action, dated Mar. 18, 2016, received in Danish Patent Application No. 201500581, which corresponds with U.S. Appl. No. 14/867,990, 9 pages.
Office Action, dated Sep. 26, 2016, received in Danish Patent Application No. 201500581, which corresponds with U.S. Appl. No. 14/867,990, 5 pages.
Office Action, dated May 3, 2017, received in Danish Patent Application No. 201500581, which corresponds with U.S. Appl. No. 14/867,990, 5 pages.
Office Action, dated Feb. 19, 2018, received in Danish Patent Application No. 201500581, which corresponds with U.S. Appl. No. 14/867,990, 4 pages.
Office Action, dated Apr. 19, 2018, received in U.S. Appl. No. 14/869,703, 19 pages.
Office Action, dated Dec. 12, 2017, received in U.S. Appl. No. 15/009,668, 32 pages.
Office Action, dated Nov. 25, 2016, received in U.S. Appl. No. 15/081,771, 17 pages.
Final Office Action, dated Jun. 2, 2017, received in U.S. Appl. No. 15/081,771, 17 pages.
Notice of Allowance, dated Dec. 4, 2017, received in U.S. Appl. No. 15/081,771, 10 pages.
Office Action, dated Feb. 1, 2018, received in Australian Patent Application No. 2017202058, which corresponds with U.S. Appl. No. 15/081,771, 4 pages.
Office Action, dated Jan. 26, 2018, received in Japanese Patent Application No. 2017-086460, which corresponds with U.S. Appl. No. 15/081,771, 6 pages.
Office Action, dated Aug. 29, 2017, received in Korean Patent Application No. 2017-7014536, which corresponds with U.S. Appl. No. 15/081,771, 5 pages.
Final Office Action, dated May 1, 2017, received in U.S. Appl. No. 15/136,782, 18 pages.
Notice of Allowance, dated Oct. 20, 2017, received in U.S. Appl. No. 15/136,782, 9 pages.

(56) References Cited

OTHER PUBLICATIONS

Office Action, dated May 23, 2017, received in Danish Patent Application No. 201770190, which corresponds with U.S. Appl. No. 15/136,782, 7 pages.
Office Action, dated Jan. 8, 2018, received in Danish Patent Application No. 201770190, which corresponds with U.S. Appl. No. 15/136,782, 2 pages.
Notice of Allowance, dated Mar. 19, 2018, received in Danish Patent Application No. 201770190, which corresponds with U.S. Appl. No. 15/136,782, 2 pages.
Office Action, dated Jan. 20, 2017, received in U.S. Appl. No. 15/231,745, 21 pages.
Notice of Allowance, dated Jul. 6, 2017, received in U.S. Appl. No. 15/231,745, 18 pages.
Office Action, dated Oct. 17, 2016, received in Danish Patent Application No. 201670587, which corresponds with U.S. Appl. No. 15/231,745, 9 pages.
Office Action, dated Jun. 29, 2017, received in Danish Patent Application No. 201670587, which corresponds with U.S. Appl. No. 15/231,745, 4 pages.
Office Action, dated Feb. 22, 2018, received in Danish Patent Application No. 201670587, which corresponds with U.S. Appl. No. 15/231,745, 4 pages.
Office Action, dated Dec. 14, 2016, received in Danish Patent Application No. 201670590, which corresponds with U.S. Appl. No. 15/231,745, 9 pages.
Office Action, dated Jul. 6, 2017, received in Danish Patent Application No. 201670590, which corresponds with U.S. Appl. No. 15/231,745, 3 pages.
Office Action, dated Jan. 10, 2018, received in Danish Patent Application No. 201670590, which corresponds with U.S. Appl. No. 15/231,745, 2 pages.
Office Action, dated Nov. 10, 2016, received in Danish Patent Application No. 201670591, which corresponds with U.S. Appl. No. 15/231,745, 12 pages.
Office Action, dated Apr. 11, 2018, received in Danish Patent Application No. 201670591, which corresponds with U.S. Appl. No. 15/231,745, 3 pages.
Office Action, dated Oct. 26, 2016, received in Danish Patent Application No. 201670592, which corresponds with U.S. Appl. No. 15/231,745, 8 pages.
Office Action, dated Jan. 5, 2017, received in Danish Patent Application No. 201670592, which corresponds with U.S. Appl. No. 15/231,745, 3 pages.
Office Action, dated Jan. 30, 2018, received in Danish Patent Application No. 201670592, which corresponds with U.S. Appl. No. 15/231,745, 2 pages.
Notice of Allowance, dated Mar. 27, 2018, received in Danish Patent Application No. 201670592, which corresponds with U.S. Appl. No. 15/231,745, 2 pages.
Office Action, dated Oct. 12, 2016, received in Danish Patent Application No. 201670593, which corresponds with U.S. Appl. No. 15/231,745, 7 pages.
Patent, dated Oct. 30, 2017, received in Danish Patent Application No. 201670593, which corresponds with U.S. Appl. No. 15/231,745, 3 pages.
Notice of Acceptance, dated Mar. 2, 2018, received in Australian Patent Application No. 2018200705, which corresponds with U.S. Appl. No. 15/272,327, 3 pages.
Office Action, dated Jul. 27, 2017, received in Australian Patent Application No. 2017100535, which corresponds with U.S. Appl. No. 15/272,341, 4 pages.
Notice of Acceptance, dated Mar. 2, 2018, received in Australian Patent Application No. 2016304832, which corresponds with U.S. Appl. No. 15/272,345, 3 pages.
Office Action, dated Apr. 20, 2018, received in European Patent Application No. 16756862.5, which corresponds with U.S. Appl. No. 15/272,345, 15 pages.
Office Action, dated Mar. 7, 2018, received in U.S. Appl. No. 15/482,618, 7 pages.

Office Action, dated Apr. 23, 2018, received in U.S. Appl. No. 15/499,691, 29 pages.
Office Action, dated Aug. 30, 2017, received in U.S. Appl. No. 15/655,749, 22 pages.
Office Action, dated Oct. 31, 2017, received in U.S. Appl. No. 15/723,069, 7 pages.
Notice of Allowance, dated Dec. 21, 2017, received in U.S. Appl. No. 15/723,069, 7 pages.
International Search Report and Written Opinion dated May 26, 2014, received in International Application No. PCT/US2013/040053, which corresponds to U.S. Appl. No. 14/535,671, 32 pages.
International Preliminary Report on Patentability dated Nov. 20, 2014, received in International Application No. PCT/US2013/040053, which corresponds to U.S. Appl. No. 14/535,671, 26 pages.
International Search Report and Written Opinion dated Apr. 7, 2014, received in International Application No. PCT/US2013/069472, which corresponds to U.S. Appl. No. 14/608,895, 24 pages.
International Preliminary Report on Patentability, dated Jun. 30, 2015, received in International Patent Application No. PCT/US2013/069472, which corresponds with U.S. Appl. No. 14/608,895, 18 pages.
International Search Report and Written Opinion dated Aug. 7, 2013, received in International Application No. PCT/US2013/040054, which corresponds to U.S. Appl. No. 14/536,235, 12 pages.
International Preliminary Report on Patentability dated Nov. 20, 2014, received in International Application No. PCT/US2013/040054, which corresponds to U.S. Appl. No. 14/536,235, 11 pages.
International Search Report and Written Opinion dated Aug. 7, 2013, received in International Application No. PCT/US2013/040056, which corresponds to U.S. Appl. No. 14/536,367, 12 pages.
International Preliminary Report on Patentability dated Nov. 20, 2014, received in International Application No. PCT/US2013/040056, which corresponds to U.S. Appl. No. 14/536,367, 11 pages.
Extended European Search Report, dated Nov. 6, 2015, received in European Patent Application No. 15183980.0, which corresponds with U.S. Appl. No. 14/536,426, 7 pages.
International Search Report and Written Opinion dated Aug. 6, 2013, received in International Application No. PCT/US2013/040058, which corresponds to U.S. Appl. No. 14/536,426, 12 pages.
International Preliminary Report on Patentability dated Nov. 20, 2014, received in International Application No. PCT/US2013/040058, which corresponds to U.S. Appl. No. 14/536,426, 11 pages.
International Search Report and Written Opinion dated Feb. 5, 2014, received in International Application No. PCT/US2013/040061, which corresponds to U.S. Appl. No. 14/536,464, 30 pages.
International Preliminary Report on Patentability dated Nov. 20, 2014, received in International Application No. PCT/US2013/040061, which corresponds to U.S. Appl. No. 14/536,464, 26 pages.
International Search Report and Written Opinion dated May 8, 2014, received in International Application No. PCT/US2013/040067, which corresponds to U.S. Appl. No. 14/536,644, 45 pages.
International Preliminary Report on Patentability dated Nov. 20, 2014, received in International Application No. PCT/US2013/040067, which corresponds to U.S. Appl. No. 14/536,644, 36 pages.
International Search Report and Written Opinion dated Mar. 12, 2014, received in International Application No. PCT/US2013/069479, which corresponds with U.S. Appl. No. 14/608,926, 14 pages.
International Preliminary Report on Patentability, dated Jun. 30, 2015, received in International Patent Application No. PCT/US2013/069479, which corresponds with U.S. Appl. No. 14/608,926, 11 pages.
International Search Report and Written Opinion dated Aug. 7, 2013, received in International Application No. PCT/US2013/040070, which corresponds to U.S. Appl. No. 14/535,646, 12 pages.
International Preliminary Report on Patentability dated Nov. 20, 2014, received in International Application No. PCT/US2013/040070, which corresponds to U.S. Appl. No. 14/535,646, 10 pages.
International Search Report and Written Opinion dated Apr. 7, 2014, received in International Application No. PCT/US2013/040072, which corresponds to U.S. Appl. No. 14/536,141, 38 pages.

(56) References Cited

OTHER PUBLICATIONS

International Preliminary Report on Patentability dated Nov. 20, 2014, received in International Application No. PCT/US2013/040072, which corresponds to U.S. Appl. No. 14/536,141, 32 pages.
International Search Report and Written Opinion dated Apr. 7, 2014, received in International Application No. PCT/US2013/069483, which corresponds with U.S. Appl. No. 14/608,942, 18 pages.
International Preliminary Report on Patentability, dated Jun. 30, 2015, received in International Application No. PCT/US2013/069483, which corresponds to U.S. Appl. No. 14/608,942, 13 pages.
International Search Report and Written Opinion dated Mar. 3, 2014, received in International Application No. PCT/US2013/040087, which corresponds to U.S. Appl. No. 14/536,166, 35 pages.
International Preliminary Report on Patentability dated Nov. 20, 2014, received in International Application No. PCT/2013/040087, which corresponds to U.S. Appl. No. 14/536,166, 29 pages.
International Search Report and Written Opinion dated Aug. 7, 2013, received in International Application No. PCT/US2013/040093, which corresponds to U.S. Appl. No. 14/536,203, 11 pages.
International Preliminary Report on Patentability dated Nov. 20, 2014, received in International Application No. PCT/2013040093, which corresponds to U.S. Appl. No. 14/536,203, 9 pages.
International Search Report and Written Opinion dated Jul. 9, 2014, received in International Application No. PCT/US2013/069484, which corresponds with U.S. Appl. No. 14/608,965, 17 pages.
International Preliminary Report on Patentability, dated Jun. 30, 2015, received in International Patent Application No. PCT/US2013/069484, which corresponds with U.S. Appl. No. 14/608,965, 12 pages.
International Search Report and Written Opinion dated Feb. 5, 2014, received in International Application No. PCT/US2013/040098, which corresponds to U.S. Appl. No. 14/536,247, 35 pages.
International Preliminary Report on Patentability dated Nov. 20, 2014, received in International Application No. PCT/2013/040098, which corresponds to U.S. Appl. No. 14/536,247, 27 pages.
Extended European Search Report, dated Oct. 7, 2016, received in European Patent Application No. 16177863.4, which corresponds with U.S. Appl. No. 14/536,267, 12 pages.
International Search Report and Written Opinion dated Jan. 27, 2014, received in International Application No. PCT/US2013/040101, which corresponds to U.S. Appl. No. 14/536,267, 30 pages.
International Preliminary Report on Patentability dated Nov. 20, 2014, received in International Application No. PCT/2013/040101, which corresponds to U.S. Appl. No. 14/536,267, 24 pages.
Extended European Search Report, dated Nov. 24, 2017, received in European Patent Application No. 17186744.3, which corresponds with U.S. Appl. No. 14/536,291, 10 pages.
International Search Report and Written Opinion dated Jan. 8, 2014, received in International Application No. PCT/US2013/040108, which corresponds to U.S. Appl. No. 14/536,291, 30 pages.
International Preliminary Report on Patentability dated Nov. 20, 2014, received in International Application No. PCT/2013/040108, which corresponds to U.S. Appl. No. 14/536,291, 25 pages.
International Search Report and Written Opinion dated Jun. 2, 2014, received in International Application No. PCT/US2013/069486, which corresponds with U.S. Appl. No. 14/608,985, 7 pages.
International Preliminary Report on Patentability, dated Jun. 30, 2015, received in International Patent Application No. PCT/US2013/069486, which corresponds with U.S. Appl. No. 14/608,985, 19 pages.
International Search Report and Written Opinion dated Mar. 6, 2014, received in International Application No. PCT/US2013/069489, which corresponds with U.S. Appl. No. 14/609,006, 12 pages.
International Preliminary Report on Patentability, dated Jun. 30, 2015, received in International Patent Application No. PCT/US2013/069489, which corresponds with U.S. Appl. No. 14/609,006, 10 pages.

Extended European Search Report, dated Mar. 15, 2017, received in European Patent Application No. 17153418.3, which corresponds with U.S. Appl. No. 14/536,648, 7 pages.
Search Report, dated Apr. 13, 2017, received in Dutch Patent Application No. 2016452, which corresponds with U.S. Appl. No. 14/864,737, 22 pages.
Search Report, dated Jun. 22, 2017, received in Dutch Patent Application No. 2016375, which corresponds with U.S. Appl. No. 14/866,981, 17 pages.
International Search Report and Written Opinion, dated Oct. 14, 2016, received in International Patent Application No. PCT/US2016/020697, which corresponds with U.S. Appl. No. 14/866,981, 21 pages.
Search Report, dated Jun. 19, 2017, received in Dutch Patent Application No. 2016377, which corresponds with U.S. Appl. No. 14/866,159, 13 pages.
International Search Report and Written Opinion, dated Apr. 25, 2016, received in International Patent Application No. PCT/US2016/018758, which corresponds with U.S. Appl. No. 14/866,159, 15 pages.
Extended European Search Report, dated Oct. 17, 2017, received in European Patent Application No. 17184437.6, Which corresponds with U.S. Appl. No. 14/868,078, 8 pages.
Search Report, dated Apr. 13, 2017, received in Dutch Patent Application No. 2016376, which corresponds with U.S. Appl. No. 14/868,078, 15 pages.
International Search Report and Written Opinion, dated Jul. 21, 2016, received in International Patent Application No. PCT/US2016/019913, which corresponds with U.S. Appl. No. 14/868,078, 16 pages.
Search Report, dated Apr. 18, 2017, received in Dutch Patent Application No. 2016801, which corresponds with U.S. Appl. No. 14/863,432, 34 pages.
International Search Report and Written Opinion, dated Oct. 31, 2016, received in International Patent Application No. PCT/US2016/033578, which corresponds with U.S. Appl. No. 14/863,432, 36 pages.
International Search Report and Written Opinion, dated Nov. 14, 2016, received in International Patent Application No. PCT/US2016/033541, which corresponds with U.S. Appl. No. 14/866,511, 29 pages.
International Search Report and Written Opinion, dated Aug. 29, 2016, received in International Patent Application No. PCT/US2016/021400, which corresponds with U.S. Appl. No. 14/869,899, 48 pages.
International Search Report and Written Opinion, dated Jan. 12, 2017, received in International Patent No. PCT/US2016/046419, which corresponds with U.S. Appl. No. 14/866,992, 23 pages.
International Search Report and Written Opinion, dated Dec. 15, 2016, received in International Patent Application No. PCT/US2016/046403, which corresponds with U.S. Appl. No. 15/009,661, 17 pages.
International Search Report and Written Opinion, dated Feb. 27, 2017, received in International Patent Application No. PCT/US2016/046407, which corresponds with U.S. Appl. No. 15/009,688, 30 pages.
Search Report, dated Feb. 15, 2018, received in Dutch Patent Application No. 2019215, which corresponds with U.S. Appl. No. 14/864,529, 13 pages.
Search Report, dated Feb. 15, 2018, received in Dutch Patent Application No. 2019214, which corresponds with U.S. Appl. No. 14/864,601, 12 pages.
Extended European Search Report, dated Oct. 10, 2017, received in European Patent Application No. 17188507.2, which corresponds with U.S. Appl. No. 14/866,361, 9 pages.
Extended European Search Report, dated Jun. 22, 2017, received in European Patent Application No. 16189421.7, which corresponds with U.S. Appl. No. 14/866,987, 7 pages.
Extended European Search Report, dated Sep. 11, 2017, received in European Patent Application No. 17163309.2, which corresponds with U.S. Appl. No. 14/866,987, 8 pages.

(56) References Cited

OTHER PUBLICATIONS

Extended European Search Report, dated Jun. 8, 2017, received in European Patent Application No. 16189425.8, which corresponds with U.S. Appl. No. 14/866,989, 8 pages.
Extended European Search Report, dated Jul. 25, 2017, received in European Patent Application No. 17171972.7, which corresponds with U.S. Appl. No. 14/870,882, 12 pages.
Extended European Search Report, dated Jul. 25, 2017, received in European Patent Application No. 17172266.3, which corresponds with U.S. Appl. No. 14/871,336, 9 pages.
Extended European Search Report, dated Dec. 21, 2016, received in European Patent Application No. 16189790.5, which corresponds with U.S. Appl. No. 14/871,462, 8 pages.
International Search Report and Written Opinion, dated Jan. 3, 2017, received in International Patent Application No. PCT/US2016/046214, which corresponds with U.S. Appl. No. 15/231,745, 25 pages.
Extended European Search Report, dated Mar. 2, 2018, received in European Patent Application No. 17206374.5, which corresponds with U.S. Appl. No. 15/272,343, 11 pages.
Borowska, "6 Types of Digital Affordance that Impact Your Ux", https://www.webdesignerdepot.com/2015/04/6-types-of-digital-affordance-that-implact-your-ux, Apr. 7, 2015, 6 pages.
Yang, et al., "Affordance Application on Visual Interface Design of Desk-Top Virtual Experiments", 2014 International Conference on Information Science, Electronics and Electrical Engineering, IEEE, vol. 1, Apr. 26, 2014, 5 pages.
Office Action, dated Nov. 18, 2019, received in Australian Patent Application No. 2018223021, which corresponds with U.S. Appl. No. 14/536,426, 3 pages.
Patent, dated Nov. 22, 2019, received in Hong Kong Patent Application No. 16107033.6, which corresponds with U.S. Appl. No. 14/536,426, 6 pages.
Intention to Grant, dated Nov. 8, 2019, received in European Patent Application No. 18194127.9, which corresponds with U.S. Appl. No. 14/608,942, 7 pages.
Notice of Allowance dated Nov. 7, 2019, received in U.S. Appl. No. 14/608,965, 17 pages.
Patent, dated Nov. 8, 2019, received in Hong Kong Patent Application No. 15108890.7, which corresponds with U.S. Appl. No. 14/536,267, 4 pages.
Patent, dated Sep. 27, 2019, received in Japanese Patent Application No. 2017-237035, which corresponds with U.S. Appl. No. 14/536,267, 3 pages.
Decision to Grant, dated Oct. 31, 2019, received in European Patent Application No. 17186744.3, which corresponds with U.S. Appl. No. 14/536,291, 3 pages.
Intention to Grant, dated Oct. 28, 2019, received in European Patent Application No. 16707356.8, which corresponds with U.S. Appl. No. 14/866,159, 7 pages.
Certificate of Grant, dated Oct. 17, 2019, received in Australian Patent Application No. 2017258967, which corresponds with U.S. Appl. No. 14/868,078, 4 pages.
Office Action, dated Nov. 21, 2019, received in Chinese Patent Application No. 201680011338.4, which corresponds with U.S. Appl. No. 14/868,078, 8 pages.
Patent, dated Oct. 9, 2019, received in European Patent Application No. 16708916.8, which corresponds with U.S. Appl. No. 14/868,078, 3 pages.
Patent, dated Oct. 16, 2019, received in European Patent Application No. 17184437.6, which corresponds with U.S. Appl. No. 14/868,078, 3 pages.
Office Action, dated Nov. 5, 2019, received in Chinese Patent Application No. 201610342313.4, which corresponds with U.S. Appl. No. 14/863,432, 4 pages.
Notice of Allowance, dated Nov. 28, 2019, received in Chinese Patent Application No. 201610342264.4, which corresponds with U.S. Appl. No. 14/866,511, 3 pages.
Decision to Grant, dated Dec. 5, 2019, received in European Patent Application No. 16727900.9, which corresponds with U.S. Appl. No. 14/866,511, 2 pages.
Intention to Grant, dated Oct. 25, 2019, received in European Patent Application No. 18168939.9, which corresponds with U.S. Appl. No. 14/869,899, 8 pages.
Oral Summons, dated Dec. 6, 2019, received in European Patent Application No. 18175195.9, which corresponds with U.S. Appl. No. 14/869,899, 9 pages.
Patent, dated Oct. 11, 2019, received in Korean Patent Application No. 2018-7003890, which corresponds with U.S. Appl. No. 14/866,992, 5 pages.
Office Action, dated Nov. 11, 2019, received in Japanese Patent Application No. 2018-201076, which corresponds with U.S. Appl. No. 14/857,663, 7 pages.
Patent, dated Nov. 12, 2019, received in Korean Patent Application No. 2019-7018317, which corresponds with U.S. Appl. No. 14/864,580, 6 pages.
Patent, dated Oct. 9, 2019, received in European Patent Application No. 16730554.9, which corresponds with U.S. Appl. No. 14/864,601, 3 pages.
Patent, dated Nov. 8, 2019, received in Japanese Patent Application No. 2017-141962, which corresponds with U.S. Appl. No. 14/866,361, 4 pages.
Notice of Allowance, dated Dec. 3, 2019, received in Chinese Patent Application No. 201610342336.5, which corresponds with U.S. Appl. No. 14/866,987, 3 pages.
Intention to Grant, dated Oct. 25, 2019, received in European Patent Application No. 16189421.7, which corresponds with U.S. Appl. No. 14/866,987, 7 pages.
Decision to Grant, dated Nov. 14, 2019, received in European Patent Application No. 16189421.7, which corresponds with U.S. Appl. No. 14/866,987, 2 pages.
Intention to Grant, dated Nov. 4, 2019, received in European Patent Application No. 18168941.5, which corresponds with U.S. Appl. No. 14/871,236, 8 pages.
Office Action, dated Nov. 28, 2019, received in Chinese Patent Application No. 201610870912.3, which corresponds with U.S. Appl. No. 14/870,882, 10 pages.
Office Action, dated Nov. 4, 2019, received in Chinese Patent Application No. 201610871323.7, which corresponds with U.S. Appl. No. 14/871,336, 12 pages.
Notice of Allowance, dated Nov. 1, 2019, received in Japanese Patent Application No. 2018-158502, which corresponds with U.S. Appl. No. 15/231,745, 5 pages.
Patent, Oct. 9, 2019, received in European Patent Application No. 17206374.5, which corresponds with U.S. Appl. No. 15/272,343, 3 pages.
Office Action, dated Oct. 22, 2019, received in Chinese Patent Application No. 201680022696.5, which corresponds with U.S. Appl. No. 15/272,345, 7 pages.
Final Office Action, dated Oct. 28, 2019, received in U.S. Appl. No. 15/889,115, 12 pages.
Office Action, dated Nov. 25, 2019, received in U.S. Appl. No. 16/049,725, 9 pages.
Office Action, dated Nov. 29, 2019, received in U.S. Appl. No. 16/136,163, 9 pages.
Office Action, dated Dec. 2, 2019, received in Japanese Patent Application No. 2018-202048, which corresponds with U.S. Appl. No. 16/154,591, 6 pages.
Office Action, dated Nov. 25, 2019, received in U.S. Appl. No. 16/174,170, 31 pages.
Notice of Allowance, dated Nov. 6, 2019, received in U.S. Appl. No. 16/258,394, 8 pages.
Notice of Allowance, dated Nov. 1, 2019, received in Korean Patent Application No. 2019-7019100, 5 pages.
Extended European Search Report, dated Nov. 14, 2019, received in European Patent Application No. 19194418.0, which corresponds with U.S. Appl. No. 14/864,580, 8 pages.
Extended European Search Report, dated Oct. 28, 2019, received in European Patent Application No. 19195414.8, which corresponds with U.S. Appl. No. 16/240,672, 6 pages.

(56) References Cited

OTHER PUBLICATIONS

Extended European Search Report, dated Nov. 13, 2019, received in European Patent Application No. 19194439.6, which corresponds with U.S. Appl. No. 16/262,800, 12 pages.
Patent, dated Feb. 19, 2020, received in European Patent Application No. 13726053.5, which corresponds with U.S. Appl. No. 14/536,141, 4 page.
Decision to Grant, dated Mar. 5, 2020, received in European Patent Application No. 16707356.8, which corresponds with U.S. Appl. No. 14/866,159, 2 pages.
Notice of Allowance, dated Mar. 4, 2020, received in U.S. Appl. No. 14/856,520, 6 pages.
Office Action, dated Mar. 17, 2020, received in Mx/a/2017/011610, which corresponds with U.S. Appl. No. 14/871,236, 4 pages.
Office Action, dated Jan. 31, 2020, received in European Patent Application No. 16753795.0, which corresponds with U.S. Appl. No. 15/009,668, 9 pages.
Office Action, dated Feb. 26, 2020, received in Chinese Patent Application No. 201810119007.3, which corresponds with U.S. Appl. No. 15/136,782, 3 pages.
Patent, dated Feb. 7, 2020, received in Hong Kong Patent Application No. 18101477.0, which corresponds with U.S. Appl. No. 15/272,345, 6 pages.
Final Office Action, dated Feb. 27, 2020, received in U.S. Appl. No. 15/979,347, 19 pages.
Office Action, dated Mar. 9, 2020, received in U.S. Appl. No. 16/145,954, 15 pages.
Office Action, dated Mar. 6, 2020, received in U.S. Appl. No. 16/154,591, 16 pages.
Office Action, dated Feb. 27, 2020, received in Korean Patent Application No. 2019-7019946, which corresponds with U.S. Appl. No. 16/154,591, 5 pages.
Final Office Action, dated Mar. 19, 2020, received in U.S. Appl. No. 16/174,170, 35 pages.
Office Action, dated Mar. 6, 2020, received in U.S. Appl. No. 16/243,834, 19 pages.
Patent, dated Mar. 12, 2020, received in Korean Patent Application No. 2019-7033444, which corresponds with U.S. Appl. No. 16/252,478, 6 pages.
Apple, "Apple—September Event 2014", https://www.youtube.com/watch?v=38lqQpqwPe7s, Sep. 10, 2014, 5 pages.
Nickinson, "Inside Android 4.2: Notifications and Quick Settings", https://www.andrloidcentral.com/inside-android-42-notifications-and-quick-settings, Nov. 3, 2012, 3 pages.
Viticci, "Apple Watch: Our Complete Overview—MacStories", https://www.macstories.net, Sep. 10, 2014, 21 pages.
Notice of Allowance, dated May 24, 2019, received in Korean Patent Application No. 2018-7028236, which corresponds with U.S. Appl. No. 14/608,895, 4 pages.
Patent, dated Jul. 9, 2019, received in Korean Patent Application No. 2018-7028236, which corresponds with U.S. Appl. No. 14/608,895, 4 pages.
Certificate of Grant, dated Jul. 5, 2019, received in Hong Kong Patent Application No. 15108892.5, which corresponds with U.S. Appl. No. 14/536,426, 5 pages.
Notice of Allowance, dated Jul. 2, 2019, received in U.S. Appl. No. 14/536,644, 5 pages.
Notice of Allowance, dated Apr. 10, 2019, received in U.S. Appl. No. 14/608,926, 16 pages.
Notice of Allowance, dated May 21, received in U.S. Appl. No. 14/608,926, 5 pages.
Office Action, dated Jun. 6, 2019, received in Australian Patent Application No. 2018256626, which corresponds with U.S. Appl. No. 14/536,646, 3 pages.
Certificate of Grant, dated Jan. 25, 2019, received in Hong Kong Patent Application No. 2015-511645, which corresponds with U.S. Appl. No. 14/536,646, 4 pages.
Office Action, dated Jun. 5, 2019, received in Australian Patent Application No. 2018256616, which corresponds with U.S. Appl. No. 14/536,141, 3 pages.
Office Action, dated Jul. 5, 2019, received in Japanese Patent Application No. 2017-141953, which corresponds with U.S. Appl. No. 14/536,141, 6 pages.
Notice of Allowance, dated May 7, 2019, received in Chinese Patent Application No. 201380068295.X, which corresponds with U.S. Appl. No. 14/608,942, 3 pages.
Patent, dated Jul. 5, 2019, received in Chinese Patent Application No. 201380068295.X, which corresponds with U.S. Appl. No. 14/608,942, 8 pages.
Patent, dated May 17, 2019, received in Chinese Patent Application No. 201380074060.1, which corresponds with U.S. Appl. No. 14/608,965, 6 pages.
Notice of Acceptance, dated Apr. 29, 2019, received in Australian Patent Application No. 2018204236, which corresponds with U.S. Appl. No. 14/5326,267, 3 pages.
Office Action, dated Jul. 11, 2019, received in Chinese Patent Application No. 201610537334.1, which corresponds with U.S. Appl. No. 14/536,267, 3 pages.
Final Office Action, dated May 23, 2019, received in U.S. Appl. No. 14/609,006, 14 pages.
Notice of Allowance, dated Jul. 2, 2019, received in U.S. Appl. No. 14/536,648, 5 pages.
Patent, dated Apr. 19, 2019, received in Japanese Patent Application No. 2017-113598, which corresponds with U.S. Appl. No. 14/609,042, 2 pages.
Certificate of Grant, dated Jul. 4, 2019, received in Australian Patent Application No. 2016233792, which corresponds with U.S. Appl. No. 14/864,737, 1 page.
Patent, dated May 31, 2019, received in Chinese Patent Application No. 201610159295.6, which corresponds with U.S. Appl. No. 14/864,737, 7 pages.
Office Action, dated Jul. 16, 2019, received in Chinese Patent Application No. 201610131415.1, which corresponds with U.S. Appl. No. 14/866,981, 4 pages.
Notice of Acceptance, dated Jun. 21, 2019, received in Australian Patent Application No. 2017258967, which corresponds with U.S. Appl. No. 14/868,078, 3 page.
Notice of Allowance, dated May 6, 2019, received in Chinese Patent Application No. 01610130348.1, which corresponds with U.S. Appl. No. 14/868,078, 3 pages.
Patent, dated Jul. 5, 2019, received in Chinese Patent Application No. 201610130348.1, which corresponds with U.S. Appl. No. 14/868,078, 6 pages.
Intention to Grant, dated May 10, 2019, received in European Patent Application No, 16708916.8, which corresponds with U.S. Appl. No. 14/868,078, 5 pages.
Intention to Grant, dated May 22, 2019, received in European Patent Application No. 17184437.6, which corresponds with U.S. Appl. No. 14/868,078, 7 pages.
Office Action, dated Jun. 17, 2019, received in Chinese Patent Application No. 201610342313.4, which corresponds with U.S. Appl. No. 14/863,432, 4 pages.
Office Action, dated Jul. 11, 2019, received in Chinese Patent Application No. 201610342264.4, which corresponds with U.S. Appl. No. 14/866,511, 4 pages.
Intention to Grant, dated Jul. 5, 2019, received in European Patent Application No. 16727900.9, which corresponds with U.S. Appl. No. 14/866,511, 5 pages.
Office Action, dated May 8, 2019, received in European Patent Application No. 18168939.9, which corresponds with U.S. Appl. No. 14/869,899, 10 pages.
Office Action, dated May 23, 2619, received in European Patent Application No. 18175195.9, which corresponds with U.S. Appl. No. 14/869,899, 10 pages.
Patent, dated May 10, 2019, received in Korean Patent Application No. 2018-7017213, which corresponds with U.S. Appl. No. 14/869,899, 8 pages.
Examiner's Answer, dated May 9, 2019, received in U.S. Appl. No. 14/866,992, 26 pages.
Certificate of Grant, dated Jul. 4, 2019, received in Australian Patent Application No. 2016304890, which corresponds with U.S. Appl. No. 14/866,992, 1 page.

(56) References Cited

OTHER PUBLICATIONS

Certificate of Grant, dated May 9, 291 9, received in Australian Patent Application No. 201761478, which corresponds with U.S. Appl. No. 14/866,992, 3 pages.
Summons, dated May 6, 2019, received in European Patent Application No. 16758008.3, which corresponds with U.S. Appl. No. 14/866,992, 14 pages.
Notice of Allowance, dated Jun. 18, 2019, received in Japanese Patent Application No. 2018-506425, which corresponds with U.S. Appl. No. 14/866,992, 5 pages.
Office Action, dated Jun. 28, 2019, received in U.S. Appl. No. 15/009,661, 33 pages.
Certificate of Grant, dated May 16, 2019, received in Australian Patent Application No. 2017202816, which corresponds with U.S. Appl. No. 14/857,636, 4 pages.
Notice of Allowance, dated May 10, 2019, received in Korean Patent Application No. 20177036645, which corresponds with U.S. Appl. No. 14/857,636, 4 pages.
Office Action, dated Jul. 1, 2019, received in Australian Patent Application No. 2019200872, which corresponds with U.S. Appl. No. 14/864,580, 6 pages.
Notice of Allowance, dated Jun. 14, 2019, received in Chinese Patent Application No. 201610342151.4, which corresponds with U.S. Appl. No. 14/864,580, 3 pages.
Intention to Grant, dated Jul. 18, 2019, received in European Patent Application No. 16730554.9, which corresponds with U.S. Appl. No. 14/864,601, 6 pages.
Notice of Allowance, dated May 29, 2019, received in Korean Patent Application No. 2017-7033756, which corresponds with U.S. Appl. No. 14/864,601, 6 pages.
Patent, dated Jun. 25, 2019, received in Korean Patent Application No. 2017-7033756, which corresponds with U.S. Appl. No. 14/864,601, 8 pages.
Notice of Allowance, dated May 23, 2019, received in Chinese Patent Application No. 201610189298.4, which corresponds with U.S. Appl. No. 14/866,301, 3 pages.
Office Action, dated Jun. 10, 2019, received in Japanese Patent Application No. 2017-141962, which corresponds with U.S. Appl. No. 14/866,361, 6 pages.
Rejection Decision, dated Apr. 28, 2019, received in Chinese Patent Application No. 201610342336.5, which corresponds with U.S. Appl. No. 14/866,987, 4 pages.
Intention to Grant, dated Jun. 14, 2019, received in European Patent Application No. 16189421.7, which corresponds with U.S. Appl. No. 14/866,987, 7 pages.
Certificate of Grant, dated Jun. 13, 2019, received in Australian Patent Application No. 2017201079, which corresponds with U.S. Appl. No. 14/866,989, 1 page.
Rejection Decision, dated Apr. 24, 2019, received in Chinese Patent Application No. 201610342314.9, which corresponds with U.S. Appl. No. 14/866,989, 3 pages.
Notice of Allowance, dated Jun. 5, 2019, received in Chinese Patent Application No. 201680000466.9, which corresponds with U.S. Appl. No. 14/871,227, 5 pages.
Examiner's Answer, dated Jul. 18, 2019, received in U.S. Appl. No. 14/867,892, 17 pages.
Notice of Allowance, dated May 21, 2019, received in Chinese Patent Application No. 201610131507.X, which corresponds with U.S. Appl. No. 14/867,990, 3 pages.
Notice of Allowance, dated May 1, 2019, received in U.S. Appl. No. 15/009,468, 12 pages.
Certificate of Grant, dated May 23, 2019, received in Australian Patent Application No. 2017202058, which corresponds with U.S. Appl. No. 15/081,371, 1 page.
Decision to Grant, dated Apr. 26, 2019, received in European Patent Application No. 15155939.4, which corresponds with U.S. Appl. No. 15/272,327, 2 pages.
Patent, dated May 22, 2019, received in European Patent Application No. 15155939.4, which corresponds with U.S. Appl. No. 15/272,327, 1 page.
Office Action, dated Jun. 5, 2019, received in Chinese Patent Application No. 201810071627.4, which corresponds with U.S. Appl. No. 15/272,343, 6 pages.
Intenton to Grant, dated May 13, 2019, received in European Patent Application No. 17206374.5, which corresponds with U.S. Appl. No. 15/272,343, 7 pages.
Final Office Action, dated Jul. 1, 2019, received in U.S. Appl. No. 15/655,749, 24 pages.
Patent, dated Jul. 3, 2019, received in Korean Patent Application No. 2017-7034248, which corresponds with U.S. Appl. No. 15/655,749, 5 pages.
Office Action, dated Jul. 25, 2019, received in U.S. Appl. No. 15/979,347, 14 pages.
Office Action, dated May 31, 2019, received in Australian Patent Application No. 2018253539, which corresponds with U.S. Appl. No. 16/049,725, 3 pages.
Office Action, dated May 22, 2019, received in U.S. Appl. No. 16/230,743, 7 pages.
Office Action, dated Jul. 5, 2019, received in Korean Patent Application No. 2018-7037896, which corresponds with U.S. Appl. No. 16/243,834, 2 pages.
Office Action, dated Jul. 15, 2019, received in U.S. Appl. No. 16/258,394, 8 pages.
Notice of Allowance, dated Mar. 27, 2020, received in Australian Patent Application No. 2018223021, which corresponds with U.S. Appl. No. 14/536,426, 3 pages.
Office Action, dated Mar. 16, 2020, received in Chinese Patent Application No. 201610131415.1, which corresponds with U.S. Appl. No. 14/866,981, 3 pages.
Notice of Allowance, dated Mar. 20, 2020, received in Chinese Patent Application No. 201610342313.4, which corresponds with U.S. Appl. No. 14/863,432, 6 pages.
Patent, dated Feb. 7, 2020, received in Chinese Patent Application No. 201610342264.4, which corresponds with U.S. Appl. No. 14/866,511, 7 pages.
Decision to Grant, dated Mar. 26, 2020, received in European Patent Application No. 18168939.9, which corresponds with U.S. Appl. No. 14/869,899, 3 pages.
Intention to Grant, dated Mar. 16, 2020, received in European Patent Application No. 16753796.8, which corresponds with U.S. Appl. No. 15/009,688, 6 pages.
Patent, dated Mar. 13, 2020, received in Korean Patent Application No. 2018-7037896, which corresponds with U.S. Appl. No. 16/243,834, 7 pages.
Office Action, dated Sep. 6, 2019, received in European Patent Application No. 18180503.7, which corresponds with U.S. Appl. No. 14/536,426, 5 pages.
Office Action, dated Sep. 30, 2019, received in Japanese Patent Application No. 2018-079290, which corresponds with U.S. Appl. No. 14/608,926, 5 pages.
Intention to Grant, dated Sep. 6, 2019, received in European Patent Application No. 13726053.5, which corresponds with U.S. Appl. No. 14/536,141, 7 pages.
Certificate of Grant, dated Sep. 4, 2019, received in European Patent Application No. 13724104.8, which corresponds with U.S. Appl. No. 14/536,203, 4 pages.
Office Action, dated Sep. 30, 2019, received in Japanese Patent Application No. 2018-022394, which corresponds with U.S. Appl. No. 14/536,203, 5 pages.
Certificate of Grant, dated Aug. 28, 2019, received in Australian Patent Application No. 2018204236, which corresponds with U.S. Appl. No. 14/5326,267, 4 pages.
Grant Certificate, dated Sep. 11 2019, in European Patent Application No. 17153418.3, which corresponds with U.S. Appl. No. 14/536,648, 1 page.
Office Action, dated Aug. 29, 2019, received in European Patent Application No. 18183789.9, which corresponds with U.S. Appl. No. 16/262,800, 9 pages.
Notice of Allowance, dated Sep. 9, 2019, received in Japanese Patent Application No. 2017-237035, which corresponds with U.S. Appl. No. 14/536,267, 5 pages.

(56) References Cited

OTHER PUBLICATIONS

Certificate of Grant, dated Aug. 28, 2019, received in European Patent Application No. 13811032.5, which corresponds with U.S. Appl. No. 14/608,985, 4 pages.
Decision to Grant, dated Sep. 12, 2019, received in European Patent Application No. 16708916.8, which corresponds with U.S. Appl. No. 14/868,078, 2 pages.
Decision to Grant, dated Sep. 19, 2019, received in European Patent Application No. 17184437.6, which corresponds with U.S. Appl. No. 14/868,078, 2 pages.
Office Action, dated Sep. 17, 2019, received in Chinese Patent Application No. 201610342264.4, which corresponds with U.S. Appl. No. 14/866,511, 3 pages.
Office Action, dated Sep. 12, 2019, received in Chinese Patent Application No. 201610658351.8, which corresponds with U.S. Appl. No. 14/866,992, 5 pages.
Notice of Allowance, dated Sep. 10, 2019, received in Korean Patent Notice Application No. 2018-7003890, which corresponds with U.S. Appl. No. 14/866,992, 5 pages.
Notice of Acceptance, dated Sep. 19, 2019, received in Australian Patent Application No. 2019200872, which corresponds with U.S. Appl. No. 14/864,580, 3 pages.
Decision to Grant, dated Sep. 12, 2019, received in European Patent Application No. 16730554.9, which corresponds with U.S. Appl. No. 14/864,601, 2 pages.
Office Action, dated Sep. 27, 2019, received in Chinese Patent Application No. 201810119007.3, which corresponds with U.S. Appl. No. 15/136,782, 6 pages.
Office Action, dated Oct. 2, 2019, received in European Patent Application No. 18171453.6, which corresponds with U.S. Appl. No. 15/136,782, 5 pages.
Decision to Grant, dated Sep. 12, 2019, received in European Patent Application No. 17206374.5, which corresponds with U.S. Appl. No. 15/272,343, 3 pages.
Notice of Allowance, dated Sep. 11, 2019, received in U.S. Appl. No. 16/230,743, 5 pages.
Office Action, dated Aug. 30, 2019, received in Korean Patent Application No. 2019-7019100, 2 pages.
Extended European Search Report, dated Oct. 9, 2019, received in European Patent Application No. 19181042.3, which corresponds with U.S. Appl. No. 15/272,343, 10 pages.
Certificate of Grant, dated Jul. 23, 2020, received in Australian Patent Application No. 2018223021, which corresponds with U.S. Appl. No. 14/536,426, 4 pages.
Office Action, dated Jul. 3, 2020, received in Chinese Patent Application No. 201711425148.X, which corresponds with U.S. Appl. No. 14/536,646, 13 pages.
Patent, dated Jul. 31, 2020, received in Chinese Patent Application No. 201710781246.0, which corresponds with U.S. Appl. No. 14/536,291, 6 pages.
Office Action, dated Jul. 17, 2020, received in Chinese Patent Application No. 2018100116175.X, which corresponds with U.S. Appl. No. 14/536,291, 15 pages.
Office Action, dated Jul. 24, 2020, received in Chinese Patent Application No. 201711422121.5, which corresponds with U.S. Appl. No. 14/536,648, 10 pages.
Office Action, dated Jul. 17, 2020, received in Japanese Patent Application No. 2018-243773, which corresponds with U.S. Appl. No. 14/863,432, 5 pages.
Notice of Allowance, dated Jul. 13, 2020, received in Korean Patent Application No. 2020-7015964, which corresponds with U.S. Appl. No. 14/863,432, 6 pages.
Notice of Allowance, dated Jul. 29, 2020, received in Korean Patent Application No. 2020-7003065, which corresponds with U.S. Appl. No. 14/866,511, 5 pages.
Office Action, dated Jul. 24, 2020, received in Chinese Patent Application No. 201680041559.6, which corresponds with U.S. Appl. No. 14/866,992, 13 pages.
Office Action, dated Jul. 15, 2020, received in Chinese Patent Application No. 201680047125.7, which corresponds with U.S. Appl. No. 15/009,676, 11 pages.
Office Action, dated Jun. 29, 2020, received in Chinese Patent Application No. 201680047164.7, which corresponds with U.S. Appl. No. 15/009,688, 7 pages.
Office Action, dated Jul. 1, 2020, received in Chinese Patent Applcation No. 201711262953.5, which corresponds with U.S. Appl. No. 14/857,636, 13 pages.
Office Action, dated Jul. 14, 2020, received in Chinese Patent Application No. 201711261143.8, which corresponds with U.S. Appl. No. 14/857,663, 12 pages.
Office Action, dated Aug. 3, 2020, received in Chinese Patent Application No. 201610870912.3, which corresponds with U.S. Appl. No. 14/870,882, 4 pages.
Office Action, dated Jul. 20, 2020, received in Indian Patent Application No. 201617032293, which corresponds with U.S. Appl. No. 14/871,227, 9 pages.
Office Action, dated Aug. 4, 2020, received in Chinese Patent Application No. 201610871323.7, which corresponds with U.S. Appl. No. 14/871,336, 18 pages.
Notice of Acceptance, dated Jul. 22, 2020, received in Australian Patent Application No. 2019203776, which corresponds with U.S. Appl. No. 15/499,693, 3 pages.
Office Action, dated Jul. 23, 2020, received in U.S. Appl. No. 15/785,372, 23 pages.
Office Action, dated Jul. 14, 2020, received in U.S. Appl. No. 15/979,347, 10 pages.
Patent, dated Jun. 25, 2020, received in Japanese Patent Application No. 2018-202048, which corresponds with U.S. Appl. No. 16/154,591, 4 pages.
Office Action, dated Aug. 10, 2020, received in U.S. Appl. No. 16/240,672, 13 pages.
Patent, dated Jun. 23, 2020, received in Japanese Patent Application No. 2019-027634, which corresponds with U.S. Appl. No. 16/240,672, 4 pages.
Office Action, dated Aug. 7, 2020, received in Japanese Patent Application No. 2019-058800, which corresponds with U.S. Appl. No. 16/243,834, 8 pages.
Notice of Allowance, dated Jul. 6, 2020, received in Australian Patent Application No. 2019202417, 3 pages.
U.S. Appl. No. 10/057,490, filed Aug. 21, 2018, Shin et al.
Anonymous, "Acer Liquid Z5 Duo User's Manual", https://global-download.acer.com, Feb. 21, 2014, 65 pages.
Anonymous, "Android—What SHould Status Bar Toggle Button Behavior Be?", https://ux.stackechange.com/questions/34814, Jan. 15, 2015, 2 pages.
Anonymous, "Event Handling Guide for iOS", https://github.com/lonfee88/iOSDevelopeLibrary/raw/master/EventHandlingiPhoneOS.pdf, Mar. 9, 2015, 74 pages.
Anonymous, "Event Handling Guide for iOS—GitHub", https://github.com/lonfee88/iOSDevelopeLibrary/blob/master/EventHandlingiPhoneOS.pdf, Apr. 15, 2015, 3 pages.
Anonymous, "How Do I Add Contextual Menu to My Apple Watch App?", http://www.tech-recipes.com/rx/52578/how-do-i-add-contextual-menu-to-my-apple-watch-app, Jan. 13, 2015, 3 pages.
Bilibili, "Android 5.0 Lollipop", https://www.bilibili.com/video/av1636064?from=search&seid=312814023577889512, Oct. 19, 2014, 3 pages.
Dachis, "All the Awesome Things You Can Do With a Long Press on Your iPhone, iPad, or iPad Touch", www.lifehacker.com, Jan. 25, 2012, 4 pages.
Jauregui et al, "Design and Evaivation of 3D Cursors and Motion Parallax for the Exploration of Desktop Virtual Environments", IEEE Symposium on 3D User Interface 2012, Mar. 4, 2012, 8 pages.
Kleinman, "Phone 6s Said to Sport Force Touch Display, 2GB of RAM", https://www.technobuffalo.com/2015/01/15/iphone-6s-said-to-sport-force-touch-display-2gb-of-ram, Jan. 15, 2015, 2 pages.
McGarry, "Everything You Can Do With Force Touch on Apple Watch", Macworld, www.macworld.com, May 6, 2015, 4 pages.
Neuburg, "Detailed Explanation iOS SDK", Oreilly Japan, Dec. 22, 2014, vol. 4, P175-186, 15 pages.

(56) References Cited

OTHER PUBLICATIONS

Nickinson, "How to use Do Not Disturb on the HTC One M8", Android Central (Year: 2014), Apr. 7, 2014, 9 pages.
Ogino, iOS 7 Design Standard, Japan, Impress Japan Corporation, Nov. 21, 2013, 1st edition, pp. 58-59.
Plaisant et al, "Touchscreen Toggle Design", Proceedings of CHI '92, pp. 667-668, May 3-7, 1992, 2 pages.
Rubino et al., "How to Enable 'Living Images' on your Nokia Lumia with Windows Phone 8.1", https://www.youtube.com/watch?v=RX7vpoFy1Dg, Jun. 6, 2014, 5 pages.
Tweak, UltimateiDeviceVids, Cydia Tweak: Quick Center—Add 3-Touch Shortcuts to ControlCenter, https://www.youtube.com/watch?v=8rHOFpGvZFM, Mar. 22, 2016, 2 pages.
Tweak, "iCrackUriDevice, iOS 9.0.2 Jailbreak & 9.2.1-9.3 Support: QuickCenter 3D Touch Cydia Tweak!", https://www.youtube.com/watch?v=op-OBr3O_Fkl, Mar. 6, 2016, 3 pages.
UpDown-G, "Using Multiple Selection Mode in Android 4.0 / Getting Started", https://techbooster.org/android/13946, Mar. 7, 2012, 7 pages.
Yatani, et al., SemFeel: A User Interface with Semantic Tactile Feedback for Mobile Touch-Screen Devices, Proceedings of the 22nd annual ACM symposium on user interface software and technology (UIST '09). Oct. 2009, 10 pages.
YouTube, "How to Use 3D Touch Multitasking on iPhone", https://www.youtube.com/watch?v=kDq05uRdrCg, Sep. 29, 2015, 1 page.
Notice of Allowance, dated Sep. 5, 2018, received in U.S. Appl. No. 14/535,671, 5 pages.
Office Action, dated Oct. 9, 2018, received in Chinese Patent Application No. 201380068493.6, which corresponds with U.S. Appl. No. 14/608,695, 3 pages.
Patent, dated Dec. 25, 2018, received in Chinese Patent Application No. 201380068493.6, which corresponds with U.S. Appl. No. 14/608,895, 4 pages.
Certificate of Grant, dated Dec. 26, 2018, received in European Patent Application No. 13795391.5, which corresponds with U.S. Appl. No. 14/536,426, 4 pages.
Office Action, dated Oct. 5, 2018, received in Korean Patent Application No. 2018-7028236, which corresponds with U.S. Appl. No. 14/608,895, 6 pages.
Notice of Allowance, dated Aug. 15, 2018, received in U.S. Appl. No. 14/536,235, 5 pages.
Certificate of Grant, dated Sep. 13, 2018, received in Australian Patent Application No. 2016216580, which corresponds with U.S. Appl. No. 14/536,426, 1 page.
Office Action, dated Apr. 12, 2019, received in Australian Patent Application No. 2018223021, which corresponds with U.S. Appl. No. 14/536,426, 3 pages.
Patent, dated Aug. 17, 2018, received in Chinese Patent Application No. 201380035982.1, which corresponds with U.S. Appl. No. 14/536,426, 4 pages.
Notice of Allowance, dated Aug. 8, 2018, received in Chinese Patent Application No. 201510566550.4, which corresponds with U.S. Appl. No. 14/536,426, 3 pages.
Patent, dated Oct. 23, 2018, received in Chinese Patent Application No. 201510566550.4, which corresponds with U.S. Appl. No. 14/536,426, 4 pages.
Intention to Grant, dated Aug. 14, 2018, received in European Patent Application No. 15183980.0, which corresponds with U.S. Appl. No. 14/536,426, 5 pages.
Decision to Grant, dated Jan. 10, 2019, received in European Patent Application No. 15183980.0, which corresponds with U.S. Appl. No. 14/536,426, 4 pages.
Patent, dated Feb. 6, 2019, received in European Patent Application No. 15183980.0, which corresponds with U.S. Appl. No. 14/536,426, 4 pages.
Office Action, dated Nov. 6, 2018, received in Japanese Patent Application No. 2018-000753, which corresponds with U.S. Appl. No. 14/536,426, 8 pages.
Office Action, dated Nov. 2, 2018, received in U.S. Appl. No. 14/536,644, 24 pages.
Office Action, dated Feb. 22, 2019, received in Japanese Patent Application No. 2018-079290, which corresponds with U.S. Appl. No. 14/608,926, 7 pages.
Notice of Allowance, dated Aug. 9, 2018, received in U.S. Appl. No. 14/536,646, 5 pages.
Notice of Allowance, dated Aug. 31, 2018, received in Chinese Patent Application No. 201380035893.7, which corresponds with U.S. Appl. No. 14/536,141, 6 pages.
Patent, dated Oct. 23, 2018, received in Chinese Patent Application No. 201380035893.7, which corresponds with U.S. Appl. No. 14/536,141, 4 pages.
Office Action, dated Mar. 7, 2019, received in European Patent Application No. 13726053.5, which corresponds with U.S. Appl. No. 14/536,141, 5 pages.
Office Action, dated Aug. 13, 2018, received in Japanese Patent Application No. 2017-141953, which corresponds with U.S. Appl. No. 14/536,141, 6 pages.
Office Action, dated Oct. 8, 2018, received in Chinese Patent Application No. 201380068295.X, which corresponds with U.S. Appl. No. 14/608,942, 3 pages.
Decision to Grant, dated Sep. 13, 2018, received in European Patent Application No. 13798464.7, which corresponds with U.S. Appl. No. 14/608,942, 2 pages.
Notice of Allowance, dated Jan. 15, 2019, received in Korean Patent Application No. 2015-7018448, which corresponds with U.S. Appl. No. 14/608,942, 5 pages.
Patent, dated Mar. 8, 2019, received in Korean Patent Application No. 2015-7018448, which corresponds with U.S. Appl. No. 14/608,942, 4 pages.
Certificate of Grant, dated Nov. 1, 2018, received in Australian Patent Application No. 2016238917, which corresponds with U.S. Appl. No. 14/536,203, 1 page.
Decision to Grant, dated Oct. 24, 2018, received in European Patent Application No. 13724104.8, which corresponds with U.S. Appl. No. 14/536,203, 5 pages.
Intention to Grant, dated Mar. 18, 2019, received in European Patent Application No. 13724104.8, which corresponds with U.S. Appl. No. 14/535,203, 9 pages.
Office Action, dated Oct. 19, 2018, received in Japanese Patent Application No. 2018-022394, which corresponds with U.S. Appl. No. 14/536,203, 4 pages.
Final Office Action, dated Jan. 10, 2019, received in U.S. Appl. No. 14/608,965, 17 pages.
Office action, dated Nov. 1, 2018, received in Chinese Patent Application No. 201380074060.1, which corresponds with U.S. Appl. No. 14/608,966, 3 pages.
Office action, dated Apr. 3, 2019, received in Chinese Patent Application No. 201380074060.1, which corresponds with U.S. Appl. No. 14/608,965, 3 pages.
Decision to Grant, dated Sep. 6. 2018, received in European Office Action No. 13798465.4, which corresponds with U.S. Appl. No. 14/608,965, 2 pages.
Office Action, dated Mar. 15, 2019, received in Australian Patent Application No. 2018204236, which corresponds with U.S. Appl. No. 14/5326,267, 5 pages.
Office Action, dated Nov. 28, 2018, received in Chinese Patent Application No. 201610537334.1, which corresponds with U.S. Appl. No. 14/536,267, 5 pages.
Decision to Grant, dated Oct. 18, 2018, received in European Patent Application No. 13724106.3, which corresponds with U.S. Appl. No. 14/536,267, 3 pages.
Grant Certificate, dated Nov. 14, 2018, received in European Patent Application No. 13724106.3, which corresponds with U.S. Appl. No. 14/536,267, 3 pages. 4 pages.
Decision to Grant, dated Nov. 29, 2018, received in European Patent Application No. 16177863.4, which corresponds with U.S. Appl. No. 14/536,267, 4 pages.
Patent, dated Dec. 26, 2018, received in European Patent Application No. 16177863.4, which corresponds with U.S. Appl. No. 14/536,267, 4 pages.
Office Action, dated Feb. 4, 2019, received in Japanese Patent Application No. 2017-237035, which corresponds with U.S. Appl. No. 14/536,267, 7 pages.

(56) References Cited

OTHER PUBLICATIONS

Office Action, dated Jan. 29, 2018, received in Korean Patent Application No. 2017-7034838, which corresponds with U.S. Appl. No. 14/536,267, 4 pages.
Notice of Allowance, dated Dec. 3, 2018, received in Korean Patent Application No. 2017-7034838, which corresponds with U.S. Appl. No. 14/536,267, 5 pages.
Patent, dated Mar. 4, 2019, received in Korean Patent Application No. 2017-7034838, which corresponds with U.S. Appl. No. 14/536,267, 4 pages.
Patent, dated Nov. 30, 2018, received in Australian Patent Application No. 2016216658, which corresponds with U.S. Appl. No. 14/536,291, 4 pages.
Intention to Grant, dated Jan. 8, 2019, received in European Patent Application No. 17186744.3, which corresponds with U.S. Appl. No. 14/536,291, 7 pages.
Patent, dated Feb. 22, 2019, received in Japanese Patent Application No. 2017-083027, which corresponds with U.S. Appl. No. 14/536,291, 3 pages.
Notice of Allowance, dated Jan. 15, 2019, received in Japanese Patent Application No. 2017-083027, which corresponds with U.S. Appl. No. 14/536,291, 5 pages.
Intention to Grant, dated Jan. 16, 2019, received in European Patent Application No. 13811032.5, which corresponds with U.S. Appl. No. 14/608,985, 9 pages.
Office Action, dated Oct. 11, 2018, received in U.S. Appl. No. 14/609,006, 12 pages.
Office Action, dated Jan. 2, 2019, received in U.S. Appl. No. 14/536,648 12 pages.
Intention to Grant, dated Apr. 1, 2019, received in European Patent Application No. 17153418.3, which corresponds with U.S. Appl. No. 14/536,648, 7 pages.
Notice of Allowance, dated Feb. 4, 2019, received in Japanese Patent Application No. 2017-008764, which corresponds with U.S. Appl. No. 14/536,648, 5 pages.
Patent, dated Mar. 1, 2019, received in Japanese Patent Application No. 2017-008764, which corresponds with U.S. Appl. No. 14/536,648, 3 pages.
Office Action, dated Aug. 24, 2018, received in Japanese Patent Application No. 2017-113598, which corresponds with U.S. Appl. No. 14/609,042, 6 pages.
Notice of Allowance, dated Apr. 9, 2019, received in Japanese Patent Application No. 2017-113598, which corresponds with U.S. Appl. No. 14/609,042, 5 pages.
Notice of Allowance, dated Dec. 17, 2018, received in Korean Patent Application No. 2017-7008614, which corresponds with U.S. Appl. No. 14/609,042, 5 pages.
Patent, dated Mar. 8, 2019, received in Korean Patent Application No. 2017-7008614, which corresponds with U.S. Appl. No. 14/609,042, 4 pages.
Notice of Acceptance, dated Mar. 12, 2019, received in Australian Patent Application No. 2016233792, which corresponds with U.S. Appl. No. 14/864,737, 5 pages.
Office Action, dated Sep. 11, 2018, received in Chinese Patent Application No. 201610159295.6, which corresponds with U.S. Appl. No. 14/864,737, 6 pages.
Notice of Allowance, dated Apr. 17, 2019, received in Chinese Patent Application No. 201610159295.6, which corresponds with U.S. Appl. No. 14/864,737, 3 pages.
Patent, dated Dec. 26, 2018, received in Korean Patent Application No. 2017-7030129, which corresponds with U.S. Appl. No. 14/864,737, 4 pages.
Office Action, dated Nov. 5, 2018, received in Chinese Patent Application No. 201610131415.1, which corresponds with U.S. Appl. No. 14/866,981, 6 pages.
Notice of Allowance, dated Dec. 6, 2018, received in Chinese Patent Application No. 201610137839.9, which corresponds with U.S. Appl. No. 14/866,159, 3 pages.
Patent, dated Feb. 19, 2019, received in Chinese Patent Application No. 201610137839.9, which corresponds with U.S. Appl. No. 14/866,159, 6 pages.
Office Action, dated Feb. 7, 2019, received in Australian Patent Application No. 2017258967, which corresponds with U.S. Appl. No. 14/868,078, 3 page.
Office Action, dated Aug. 20, 2018, received in Chinese Patent Application No. 01610130348.1, which corresponds with U.S. Appl. No. 14/868,078, 6 pages.
Office Action, dated Feb. 26, 2019, received in Chinese Patent Application No. 01610130348.1, which corresponds with U.S. Appl. No. 14/868,078, 4 pages.
Office Action, dated Oct. 25, 2018, received in European Patent Application No. 17184437.6, which corresponds with U.S. Appl. No. 14/868,078, 6 pages.
Office Action, dated Dec. 4, 2018, received in Chinese Patent Application No. 201610342313.4, which corresponds with U.S. Appl. No. 14/863,432, 5 pages.
Office Action, dated Dec. 5, 2018, received in Chinese Patent Application No. 201610342264.4, which corresponds with U.S. Appl. No. 14/866,511, 4 pages.
Office Action, dated Jan. 2, 2019, received in European Patent Application No. 16727900.9, which corresponds with U.S. Appl. No. 14/866,511, 5 pages.
Notice of Acceptance, dated Aug. 23, 2018, received in Australian Patent Application No. 2018204611, which corresponds with U.S. Appl. No. 14/869,899, 3 pages.
Office Action, dated Oct. 9, 2018, received in Danish Patent Applicaiton No. 201670594, which corresponds with U.S. Appl. No. 14/869,899, 2 pages.
Patent, dated Feb. 26, 2019, received in Danish Patent Application No. 201670594, which corresponds with U.S. Appl. No. 14/869,899, 3 pages.
Office Action, dated Sep. 21, 2018, received in Japanese Patent Application No. 2018-100827, which corresponds with U.S. Appl. No. 14/869,899, 4 pages.
Notice of Allowance, dated Mar. 1, 2019, received in Japanese Patent Application No. 2018-100827, which corresponds with U.S. Appl. No. 14/869,899, 5 pages.
Patent, dated Apr. 5, 2019, received in Japanese Patent Application No. 2018-100827, which corresponds with U.S. Appl. No. 14/869,899, 5 pages.
Office Action, dated Oct. 5, 2018, received in Korean Patent Application No. 2018-7017213, which corresponds with U.S. Appl. No. 14/869,899, 3 pages.
Office Action, dated Mar. 22, 2019, received in Korean Patent Applicaiton No. 2018-7017213, which corresponds with U.S. Appl. No. 14/869,899, 6 pages.
Final Office Action, dated Aug. 28, 2018, received in U.S. Appl. No. 14/866,992, 52 pages.
Notice of Acceptance, dated Mar. 12, 2019, received in Australian Patent Application No. 2016304890, which corresponds with U.S. Appl. No. 14/866,992, 5 pages.
Office Action, dated Oct. 12, 2018, received in European Patent Application No. 16758008.3, which corresponds with U.S. Appl. No. 14/866,992, 11 pages.
Office Action, dated Jan. 11, 2019, received in Japanese Patent Application No. 2018-506425, which corresponds with U.S. Appl. No. 14/866,992, 6 pages.
Final Office Action, dated Sep. 19, 2018, received in U.S. Appl. No. 15/009,661, 28 pages.
Notice of Allowance, dated Nov. 15, 2018, received in U.S. Appl. No. 15/009,676, 6 pages.
Notice of Allowance, dated Nov. 6, 2018, received in U.S. Appl. No. 15/009,688, 10 pages.
Office Action, dated Nov. 20, 2018, received in U.S. Appl. No. 14/856,520, 36 pages.
Final Office Action, dated Apr. 17, 2019, received in U.S. Appl. No. 14/856,520, 38 pages.
Notice of Allowance, dated Aug. 16, 2018, received in U.S. Appl. No. 14/857,636, 5 pages.

(56) References Cited

OTHER PUBLICATIONS

Notice of Allowance, dated Jan. 15, 2019, received in Australian Patent Application No. 2017202816, which corresponds with U.S. Appl. No. 14/857,636, 3 pages.
Office Action, dated Nov. 28, 2018, received in Korean Patent Application No. 20177036645, which corresponds with U.S. Appl. No. 14/857,636, 6 pages.
Notice of Allowance, dated Aug. 16, 2018, received in U.S. Appl. No. 14/857,663, 5 pages.
Notice of Allowance, dated Oct. 9, 2018, received in U.S. Appl. No. 14/864,529, 11 pages.
Office Action, dated Nov. 7, 2018, received in Chinese Patent Application No. 201610342151.4, which corresponds with U.S. Appl. No. 14/864,580, 3 pages.
Office Action, dated Aug. 31, 2018, received in Australian Patent Application No. 2016276030, which corresponds with U.S. Appl. No. 14/864,601, 3 pages.
Certificate of Grant, dated Feb. 21, 2019, received in Australian Patent Application No. 2016276030, which corresponds with U.S. Appl. No. 14/864,601, 4 pages.
Office Action, dated Feb. 4, 2019, received in European Patent Application No. 16730554.9, which corresponds with U.S. Appl. No. 14/864,601, 10 pages.
Notice of Allowance, dated Dec. 10, 2018, received in Japanese Patent Application No. 2017-561375, which corresponds with U.S. Appl. No. 14/864,601, 5 pages.
Patent, dated Jan. 11, 2019, received in Japanese Patent Application No. 2017-561375, which corresponds with U.S. Appl. No. 14/864,601, 3 pages.
Office Action, dated Jan. 25, 2019, received in Korean Patent Application No. 2017-7033756, which corresponds with U.S. Appl. No. 14/864,601, 8 pages.
Office Action, dated Oct. 19, 2018, received in Chinese Patent Application No. 201610189298.4, which corresponds with U.S. Appl. No. 14/866,361, 6 pages.
Office Action, dated Jan. 30, 2019, received in European Patent Application No. 17188507.2, which corresponds with U.S. Appl. No. 14/866,361, 13 pages.
Office Action, dated Oct. 12, 2018, received in Japanese Patent Application No. 2017-141962, which corresponds with U.S. Appl. No. 14/866,361, 6 pages.
Office Action, dated Sep. 14, 2018, received in Korean Patent Application No. 2018-7013039, which corresponds with U.S. Appl. No. 14/866,361, 2 pages.
Notice of Allowance, dated Jan. 30, 2019, received in Korean Patent Application No. 2018-7013039, which corresponds with U.S. Appl. No. 14/866,361, 5 pages.
Patent, dated Apr. 3, 2019, received in Korean Patent Application No. 2018-7013039, which corresponds with U.S. Appl. No. 14/866,361, 4 pages.
Final Office Action, dated Oct. 11, 2018, received in U.S. Appl. No. 14/866,987, 20 pages.
Notice of Allowance, dated Apr. 4, 2019, received in U.S. Appl. No. 14/866,987, 5 pages.
Office Action, dated Dec. 4, 2018, received in Chinese Patent Application No. 201610342336.5, which corresponds with U.S. Appl. No. 14/866,987, 5 pages.
Office Action, dated Dec. 11, 2018, received in European Patent Application No. 16189421.7, which corresponds with U.S. Appl. No. 14/866,987, 6 pages.
Notice of Allowance, dated Jan. 17, 2019, received in U.S. Appl. No. 14/866,989, 8 pages.
Notice of Acceptance, dated Feb. 14, 2019, received in Australian Patent Application No. 2017201079, which corresponds with U.S. Appl. No. 14/868,989, 3 pages.
Office Action, dated Sep. 19, 2018, received in Chinese Patent Application No. 201610342314.9, which corresponds with U.S. Appl. No. 14/866,989, 6 pages.

Office Action, dated Feb. 25, 2019, received in Chinese Patent Application No. 201610342314.9, which corresponds with U.S. Appl. No. 14/866,989, 3 pages.
Patent, dated Feb. 15, 2019, received in Russian Patent Application No. 2017131408, which corresponds with U.S. Appl. No. 14/871,236, 2 pages.
Notice of Allowance, dated Dec. 3, 2018, received in U.S. Appl. No. 14/870,754, 8 pages.
Notice of Allowance, dated Dec. 5, 2018, received in U.S. Appl. No. 14/870,882, 8 pages.
Office Action, dated Feb. 11, 2019, received in European Patent Application No. 17171972.7, which corresponds with U.S. Appl. No. 14/870,882, 7 pages.
Notice of Allowance, dated Aug. 27, 2018, received in U.S. Appl. No. 14/870,988, 11 pages.
Notice of Acceptance, dated Oct. 30, 2018, received in Australian Patent Application No. 2016203040, which corresponds with U.S. Appl. No. 14/871,227, 4 pages.
Certificate of Grant, dated Feb. 28, 2019, received in Australian Patent Application No. 2016203040, which corresponds with U.S. Appl. No. 14/871,227, 1 page.
Office Action, dated Oct. 11, 2018, received in Australian Patent Application No. 2017245442, which corresponds with U.S. Appl. No. 14/871,227, 4 pages.
Office Action, dated Nov. 16, 2018, received in Chinese Patent Application No. 201680000466.9, which corresponds with U.S. Appl. No. 14/871,227, 5 pages.
Intent to Grant, dated Sep. 17, 2018, received in European Patent No. 16711743.1, which corresponds with U.S. Appl. No. 14/871,227, 5 pages.
Patent, dated Nov. 28, 2018, received in European Patent No. 16711743.1, which corresponds with U.S. Appl. No. 14/871,227, 1 page.
Notice of Allowance, dated Oct. 1, 2018, received in Korean Patent Application No. 2016-7019816, which corresponds with U.S. Appl. No. 14/871,227, 6 pages.
Patent, dated Dec. 28, 2018, received in Korean Patent Application No. 2016-7019816, which corresponds with U.S. Appl. No. 14/871,227, 8 pages.
Office Action, dated Nov. 5.2018, received in U.S. Appl. No. 14/871,336, 24 pages.
Notice of Allowance, dated Feb. 5, 2019, received in U.S. Appl. No. 14/871,336, 10 pages.
Office Action, dated Feb. 12, 2019, received in European Patent Application No. 17172266.3, which corresponds with U.S. Appl. No. 14/871,336, 6 pages.
Notice of Allowance, dated Oct. 12, 2018 received in Japanese Patent Application No. 2018-020324, which corresponds with U.S. Appl. No. 14/871,336, 5 pages.
Patent, dated Nov. 16, 2018, received in Japanese Patent Application No. 2018-020324, which corresponds with U.S. Appl. No. 14/871,336, 4 pages.
Final Office Action, dated Oct. 17, 2018, received in U.S. Appl. No. 14/867,492, 48 pages.
Final Office Action, dated Oct. 4, 2018, received in U.S. Appl. No. 14/869,861, 28 pages.
Office Action, dated Feb. 27, 2019, received in U.S. Appl. No. 14/869,361, 28 pages.
Office Action, dated Sep. 7, 2018, received in U.S. Appl. No. 14/869,997, 23 pages.
Notice of Allowance, dated Apr. 4, 2019, received in U.S. Appl. No. 14/869,997, 9 pages.
Final Office Action, dated Oct. 26, 2018, received in U.S. Appl. No. 14/869,703, 19 pages.
Notice of Allowance, dated Mar. 12, 2019, received in U.S. Appl. No. 14/869,703, 6 pages.
Office Action, dated Jan. 10, 2019, received in U.S. Appl. No. 15/009,668, 17 pages.
Notice of Acceptance, dated Jan. 24, 2019, received in Australian Patent Application No. 2017202058, which corresponds with U.S. Appl. No. 15/081,771, 3 pages.

(56) References Cited

OTHER PUBLICATIONS

Notice of Allowance, dated Oct. 12, 2018, received in Japanese Patent Application No. 2017-086460, which corresponds with U.S. Appl. No. 15/081,771, 5 pages.
Patent, dated Sep. 28, 2018, received in Korean Patent Application No. 2017-7014536, which corresponds with U.S. Appl. No. 15/081,771, 3 pages.
Notice of Acceptance, dated Sep. 10, 2018, received in Australian Patent Application No. 2018202855, which corresponds with U.S. Appl. No. 15/136,782, 3 pages.
Certificate of Grant, dated Jan. 17, 2019, received in Australian Patent Application No. 2018202855, which corresponds with U.S. Appl. No. 15/136,782, 4 pages.
Office Action, dated Apr. 17, 2019, received in European Patent Application No. 18171453.6, which corresponds with U.S. Appl. No. 15/136,782, 4 pages.
Office Action, dated Nov. 12, 2018, received in Japanese Patent Application No. 2018-062161, which corresponds with U.S. Appl. No. 15/136,782, 5 pages.
Notice of Allowance, dated Feb. 18, 2019, received in Japanese Patent Application No. 2018-062161, which corresponds with U.S. Appl. No. 15/136,782, 5 pages.
Patent, dated Mar. 22, 2019, received in Japanese Patent Application No. 2018-062161, which corresponds with U.S. Appl. No. 15/136,782, 5 pages.
Office Action, dated Oct. 31, 2018, received in Korean Patent Application No. 2018-7020659, which corresponds with U.S. Appl. No. 15/136,782, 5 pages.
Notice of Allowance, dated Feb. 25, 2019, received in Korean Patent Application No. 2018-7020659, which corresponds with U.S. Appl. No. 15/136,782, 5 pages.
Patent, dated Apr. 3, 2019, received in Korean Patent Application No. 2018-7020659, which corresponds with U.S. Appl. No. 15/136,782, 5 pages.
Office Action, dated Dec. 18, 2018, received in Danish Patent Application No. 201670587, which corresponds with U.S. Appl. No. 15/231,745, 4 pages.
Office Action, dated Nov. 23, 2018, received in Danish Patent Application No. 201670591, which corresponds with U.S. Appl. No. 15/231,745, 7 pages.
Notice of Allowance, dated Oct. 4, 2018, received in U.S. Appl. No. 15/272,327, 46 pages.
Office Action, dated Mar. 22, 2019, received in Australian Patent Application No. 2018204234, which corresponds with U.S. Appl. No. 15/272,327, 7 pages.
Office Action, dated Sep. 14, 2018, received in European Patent Application No. 15155939.4, which corresponds with U.S. Appl. No. 15/272,327, 5 pages.
Intention to Grant, dated Mar. 19, 2019, received in European Patent Application No. 15155939.4, which corresponds with U.S. Appl. No. 15/272,327, 6 pages.
Patent, dated Aug. 31, 2018, received in Japanese Patent Application No. 2018-506989, which corresponds with U.S. Appl. No. 15/272,327, 3 pages.
Office Action, dated Oct. 26, 2018, received in U.S. Appl. No. 15/272,341, 22 pages.
Final Office Action, dated Mar. 25, 2019, received in U.S. Appl. No. 15/272,341, 25 pages.
Notice of Allowance, dated Sep. 20, 2018, received in U.S. Appl. No. 15/272,343, 44 pages.
Office Action, dated Jan. 8, 2019, received in European Patent Application No. 17206374.5, which corresponds with U.S. Appl. No. 15/272,343, 5 pages.
Office Action, dated Oct. 15, 2018, received in U.S. Appl. No. 15/272,345. 31 pages.
Final Office Action, dated Apr. 2, 2019, received in U.S. Appl. No. 15/272,345. 28 pages.
Office Action, dated Nov. 13, 2018, received in European Patent Application No. 16756862.5, which corresponds with U.S. Appl. No. 15/272,345, 5 pages.
Decision to Grant, dated Jan. 31, 2019, received in European Patent Application No. 16756862.5, which corresponds with U.S. Appl. No. 15/272,345, 5 pages.
Patent, dated Feb. 27, 2019, received in European Patent Application No. 16756862.5, which corresponds with U.S. Appl. No. 15/272,345, 3 pages.
Notice of Allowance, dated Aug. 15, 2018, received in U.S. Appl. No. 15/482,618, 7 pages.
Notice of Allowance, dated Oct. 12, 2018, received in U.S. Appl. No. 15/499,693, 8 pages.
Office Action, dated Jan. 24, 2019, received in U.S. Appl. No. 15/655,749, 25 pages.
Notice of Allowance, dated Apr. 18, 2019 received in Korean Patent Application No. 2017-7034248, which corresponds with U.S. Appl. No. 15/655,749, 5 pages.
Office Action, dated Apr. 11, 2019, received in U.S. Appl. No. 15/889,115, 9 pages.
Notice of Allowance, dated Apr. 19, 2019, received in U.S. Appl. No. 16/252,478, 11 pages.
Extended European Search Report, dated Dec. 5, 2018, received in European Patent Application No. 18194127.9, which corresponds with U.S. Appl. No. 14/608,942, 8 pages.
Extended European Search Report, dated Oct. 30, 2018, received in European Patent Application No. 18183789.9, which corresponds with U.S. Appl. No. 14/536,267, 11 pages.
Extended European Search Report, dated Aug. 17, 2018, received in European Patent Application No. 18175195.9, which corresponds with U.S. Appl. No. 14/869,899, 13 pages.
Extended European Search Report, dated Mar. 8, 2019, received in European Patent Application No. 18205283.7, which corresponds with U.S. Appl. No. 15/081,771, 15 pages.
Extended European Search Report, dated Aug. 24, 2018, received in European Patent Application No. 18171453.6, which corresponds with U.S. Appl. No. 15/136,782, 9 pages.
Decision to Grant, dated Aug. 20, 2020, received in European Patent Application No. 18194127.9, which corresponds with U.S. Appl. No. 14/608,942, 4 pages.
Office Action, dated Aug. 21, 2020, received in European Patent Application No. 18183789.9, which corresponds with U.S. Appl. No. 16/262,800, 9 pages.
Decision to Grant, dated Aug. 27, 2020, received in European Patent Application No. 16756866.6, which corresponds with U.S. Appl. No. 15/009,676, 4 pages.
Office Action, dated Aug. 26, 2020, received in Indian Application No. 201617032291, which corresponds with U.S. Appl. No. 14/866,987, 9 pages.
Notice of Allowance, dated Sep. 7, 2020, received in Mx/a/2017/011610, which corresponds with U.S. Appl. No. 14/871,236, 12 pages.
Office Action, dated Aug. 20, 2020, received in Chinese Patent Application No. 201680046985.9, which corresponds with U.S. Appl. No. 15/009,668, 15 pages.
Decision to Grant, dated Aug. 27, 2020, received in European Patent Application No. 18205283.7, which corresponds with U.S. Appl. No. 15/081,771, 4 pages.
Office Action, dated Aug. 31, 2020, received in Chinese Patent Application No. 201810151593.X, which corresponds with U.S. Appl. No. 15/272,327, 10 page.
Notice of Allowance, dated Aug. 26 2020, received in U.S. Appl. No. 16/240,669, 18 pages.
Office action, dated Aug. 27, 2020, received in U.S. Appl. No. 16/241,883, 11 pages.
Notice of Allowance, dated Aug. 25, 2020, received in U.S. Appl. No. 16/354,035, 14 pages.
Office Action, dated Aug. 21, 2020, received in Japanese Patent Application No. 2019-047319, which corresponds with U.S. Appl. No. 16/896,141, 6 pages.
Office Action, dated Oct. 7, 2019, received in Japanese Patent Application No. 2018-000753, which corresponds with U.S. Appl. No. 14/536,426, 5 pages.
Patent, dated Sep. 27, 2019, received in Hong Kong Patent Application No. 15108904.1, which corresponds with U.S. Appl. No. 14/536,203, 6 pages.

(56) References Cited

OTHER PUBLICATIONS

Office Action, dated Sep. 30, 2019, received in Chinese Patent Application No. 201610537334.1, which corresponds with U.S. Appl. No. 14/536,267, 3 pages.
Patent, dated Aug. 30, 2019, received in Hong Kong Patent Application No. 15107537.8, which corresponds with U.S. Appl. No. 14/536,267, 9 pages.
Office Action, dated Oct. 8, 2019, received in European Patent Application No. 17188507.2, which corresponds with U.S. Appl. No. 14/866,361, 6 pages.
Notice of Allowance, dated Oct. 7, 2019, received in Japanese Patent Application No. 2017-141962, which corresponds with U.S. Appl. No. 14/866,361, 5 pages.
Office Action, dated Sep. 30, 2019, received in Chinese Patent Application No. 201610871466.8, which corresponds with U.S. Appl. No. 14/871,236, 4 pages.
Notice of Allowance, dated Oct. 10, 2019, received in U.S. Appl. No. 16/102,409, 9 pages.
Office Action, dated Oct. 11, 2019, received in Australian Patent Application No. 2019202417, 4 pages.
Anonymous, "1-Click Installer for Windows Media Taskbar Mini-Player for Windows 7, 8, 8.1 10", http://metadataconsulting.blogspot.de/2014/05/installer-for-windows-media-taskbar.htm, May 5, 2014, 6 pages.
Anonymous, "[new] WMP12 with Taskbar Toolbar for Windows 7—Windows Customization—WinMatrix", hrrp://www.winmatrix.com/forums/index/php?/topic/25528-new-wmp12-with-taskbar-toolbar-for-windows-7, Jan. 27, 2013, 6 pages.
Anonymous, "Taskbar Extensions", https://web.archive.org/web/20141228124434/http://msdn.microsoft.com:80/en-us/library/windows/desktop/dd378460(v=vs.85).aspx, Dec. 28, 2014, 8 pages.
Oh, et al., "Moving Objects with 2D Input Devices in CAD Systems and Destop Virtual Environments", Proceedings of Graphics Interface 2005, 8 pages, May 2005.
Stewart, et al., "Characteristics of Pressure-Based Input for Mobile Devices", Proceedings of the SIGCHI Conference on Human Factors in Computing Systems, Apr. 2010, 10 pages.
Notice of Allowance, dated Jun. 26, 2018, received in U.S. Appl. No. 14/608,895, 9 pages.
Notice of Allowance, dated May 16, 2018, received in U.S. Appl. No. 14/536,367, 5 pages.
Office Action, dated May 8, 2018, received in Australian Patent Application No. 2016216580, which corresponds with U.S. Appl. No. 14/536,426, 5 pages.
Notice of Allowance, dated May 17, 2018, received in Australian Patent Application No. 2016216580, which corresponds with U.S. Appl. No. 14/536,426, 3 pages.
Notice of Allowance, dated May 10, 2018, received in Chinese Patent Application No. 201380035982.1, which corresponds with U.S. Appl. No. 14/536,426, 2 pages.
Final Office Action, dated Jun. 22, 2018, received in U.S. Appl. No. 14/536,464, 32 pages.
Final Office Action, dated May 3, 2018, received in U.S. Appl. No. 14/536,644, 28 pages.
Final Office Action, dated Jun. 6, 2018, received in U.S. Appl. No. 14/608,926, 19 pages.
Certificate of Grant, dated May 3, 2018, received in Australian Patent Application No. 2016201451, which corresponds with U.S. Appl. No. 14/608,926, 1 page.
Patent, dated Apr. 27, 2018, received in Japanese Patent Application No. 2017-024234, which corresponds with U.S. Appl. No. 14/608,926, 3 pages.
Office Action, dated Jul. 2, 2018, received in U.S. Appl. No. 14/608,965, 16 pages.
Notice of Allowance, dated Jun. 1, 2018, received in U.S. Appl. No. 14/536,267, 5 pages.
Intention to Grant, dated Jun. 27, 2018, received in European Patent Application No. 13724106.3, which corresponds with U.S. Appl. No. 14/536,267, 5 pages.
Notice of Allowance, dated Mar. 20, 2018, received in U.S. Appl. No. 14/536,291, 5 pages.
Office Action, dated Jun. 29, 2018, received in Japanese Patent Application No. 2017-083027, which corresponds with U.S. Appl. No. 14/536,291, 5 pages.
Office Action, dated Apr. 27, 2018, received in Japanese Patent Application No. 2017-008764, which corresponds with U.S. Appl. No. 14/536,648, 5 pages.
Office Action, dated Apr. 16, 2018, received in Australian Patent Application No. 2016233792, which corresponds with U.S. Appl. No. 14/864,737, 2 pages.
Grant Certificate, dated Apr. 25, 2018, received in European Patent Application No. 16710871.1, which corresponds with U.S. Appl. No. 14/864,737, 2 pages.
Notice of Allowance, dated May 18, 2018, received in U.S. Appl. No. 14/866,159, 8 pages.
Office Action, dated Jun. 5, 2018, received in Chinese Patent Application No. 201610137839.9, which corresponds with U.S. Appl. No. 14/866,159, 11 pages.
Patent, dated May 22, 2018, received in Danish Patent Application No. 201500574, which corresponds with U.S. Appl. No. 14/866,159, 2 pages.
Notice of Allowance, dated May 24, 2018, received in U.S. Appl. No. 14/868,078, 6 pages.
Office Action, dated Apr. 25, 2018, received in European Patent Application No. 16708916.8, which corresponds with U.S. Appl. No. 14/868,078, 6 pages.
Office Action, dated May 24, 2018, received in European Patent Application No. 16727900.9, which corresponds with U.S. Appl. No. 14/866,511, 7 pages.
Patent, dated May 28, 2018, received in Danish Patent Application No. 201500592, which corresponds with U.S. Appl. No. 14/869,899, 2 pages.
Office Action, dated May 1, 2018, received in Danish Patent Application No. 201670594, which corresponds with U.S. Appl. No. 14/869,899, 2 pages.
Notice of Allowance, dated Jun. 29, 2018, received in U.S. Appl. No. 14/856,517, 11 pages.
Notice of Allowance, dated May 2, 2018, received in U.S. Appl. No. 14/856,519, 10 pages.
Office Action, dated Jun. 25, 2018, received in Japanese Patent Application No. 2017-029201, which corresponds with U.S. Appl. No. 14/857,636, 4 pages.
Grant of Patent, dated Apr. 16, 2018, received in Dutch Patent Application No. 2019215, 2 pages.
Patent, dated May 22, 2018, received in Danish Patent Application No. 201500579, which corresponds with U.S. Appl. No. 14/866,361, 2 pages.
Office Action, dated Jun. 11, 2018, received in European Patent Application No. 17188507.2, which corresponds with U.S. Appl. No. 14/866,361, 10 pages.
Office Action, dated May 7, 2018, received in European Patent Application No. 16189421.7, which corresponds with U.S. Appl. No. 14/866,987, 5 pages.
Patent, dated Apr. 6, 2018, received in Japanese Patent Application No. 2017-126445, which corresponds with U.S. Appl. No. 14/866,987, 3 pages.
Final Office Action, dated Jul. 3, 2018, received in U.S. Appl. No. 14/866,989, 17 pages.
Notice of Allowance, dated Apr. 26, 2018, received in Danish Patent Application No. 201500595, which corresponds with U.S. Appl. No. 14/871,236, 2 pages.
Patent, dated Jun. 18, 2018, received in Danish Patent Application No. 201500595, which corresponds with U.S. Appl. No. 14/871,236, 3 pages.
Notice of Allowance, dated Jul. 2, 2018, received in U.S. Appl. No. 14/870,754, 9 pages.
Final Office Action, dated Apr. 20, 2018, received in U.S. Appl. No. 14/870,882, 7 pages.
Notice of Allowance, dated Jun. 11, 2018, received in U.S. Appl. No. 14/871,227, 11 pages.
Notice of Allowance, dated May 31, 2018, received in U.S. Appl. No. 14/869,855, 10 pages.

(56) References Cited

OTHER PUBLICATIONS

Final Office Action, dated May 23, 2018, received in U.S. Appl. No. 14/869,873, 18 pages.
Final Office Action, dated Jul. 3, 2018, received in U.S. Appl. No. 15/009,668, 19 pages.
Notice of Allowance, dated Jun. 28, 2018, received in Korean Patent Application No. 2017-7014536, which corresponds with U.S. Appl. No. 15/081,771, 4 pages.
Office Action, dated May 4, 2018, received in Australian Patent Application No. 2018202855, which corresponds with U.S. Appl. No. 15/136,782, 3 pages.
Patent, dated May 22, 2018, received in Danish Patent Application No. 201770190, which corresponds with U.S. Appl. No. 15/136,782, 2 pages.
Office Action, dated Jun. 1, 2018, received in Japanese Patent Application No. 2018-062161, which corresponds with U.S. Appl. No. 15/136,782, 5 pages.
Patent, dated May 28, 2018, received in Danish Patent Application No. 201670590, which corresponds with U.S. Appl. No. 15/231,745, 2 pages.
Patent, dated May 28, 2018, received in Danish Patent Application No. 201670592, which corresponds with U.S. Appl. No. 15/231,745, 2 pages.
Final Office Action, dated May 10, 2018, received in U.S. Appl. No. 15/655,749, 19 pages.
International Preliminary Report on Patentability, dated Sep. 12, 2017, received in International Patent Application No. PCT/US2016/021400, which corresponds with U.S. Appl. No. 14/869,899, 39 pages.
Extended European Search Report, dated May 30, 2018, received in International Patent Application No. 18155939.4, which corresponds with U.S. Appl. No. 15/272,327, 8 pages.
Notice of Acceptance, dated Aug. 1, 2019, received in Australian Patent Application No. 2018256626, which corresponds with U.S. Appl. No. 14/536,646, 3 pages.
Certificate of Grant, dated Jul. 26, 2019, received in Hong Kong, which corresponds with U.S. Appl. No. 14/608,942, 4 pages.
Office Action, dated Aug. 20, 2018, received in Australian Patent Application No. 2018250481, which corresponds with U.S. Appl. No. 14/536,203, 2 pages.
Decision to Grant, dated Aug. 8, 2019, received in European Patent Application No. 13724104.8, which corresponds with U.S. Appl. No. 14/536,203, 1 page.
Decision Grant, dated Aug. 1, 2019, received in European Patent Application No. 13811032.5, which corresponds with U.S. Appl. No. 14/608,985, 2 pages.
Decision to Grant, dated Aug. 16, 2019, received in European Patent Application No. 17153418.3, which corresponds with U.S. Appl. No. 14/536,648, 1 page.
Patent, dated Jul. 26, 2019, received in Japanese Patent Application No. 2018-506425, which corresponds with U.S. Appl. No. 14/866,992, 3 pages.
Patent, dated Jul. 11, 2019, received in Korean Patent Application No. 20177036645, which corresponds with U.S. Appl. No. 14/857,636, 8 pages.
Patent, dated Jul. 30, 2019, received in Chinese Patent Application No. 201610342151.4, which corresponds with U.S. Appl. No. 14/864,580, 3 pages.
Noticce of Allowance, dated Aug. 14, 2019, received in Korean Patent Application No. 2019-7018317, which corresponds with U.S. Appl. No. 14/864,580, 6 pages.
Patent, dated Jul. 23, 2019, received in Chinese Patent Application No. 201610189298.4, which corresponds with U.S. Appl. No. 14/866,361, 7 pages.
Office Action, dated Aug. 15, 2019, received in Chinese Patent Application No. 201610342336.5, which corresponds with U.S. Appl. No. 14/866,987, 3 pages.
Patent, dated Aug. 9, 2019, received in Chinese Patent Application No. 201680000466.9, which corresponds with U.S. Appl. No. 14/871,227, 8 pages.
Patent, dated Jul. 19, 2019, received in Chinese Patent Application No. 20161013507.X, which corresponds with U.S. Appl. No. 14/867,990, 6 pages.
Office Action, dated Aug. 2, 2019, received in Korean Patent Application No. 2019-7009439, which corresponds with U.S. Appl. No. 15/499,693, 3 pages.
Office Action, dated Aug. 1, 2019, received in U.S. Appl. No. 15/785,372, 22 pages.
Office Action, dated Aug. 20, 2019, received in Korean Patent Application No. 2019-7019946, which corresponds with U.S. Appl. No. 16/154,591, 6 pages.
Office Action, dated Jan. 4, 2021, received in Chinese Patent Application No. 201810826224.6, which corresponds with U.S. Appl. No. 14/536,426, 6 pages.
Office Action, dated Feb. 8, 2021, received in Japanese Patent Application No. 2018-000753, which corresponds with U.S. Appl. No. 14/536,426, 2 pages.
Office Action, dated Jan. 22, 2021, received in Japanese Patent Application No. 2018-022394, which corresponds with U.S. Appl. No. 14/536,203, 2 pages.
Office Action, dated Jan. 20, 2021, received in Chinese Patent Application No. 201810332044.2, which corresponds with U.S. Appl. No. 14/536,267, 15 pages.
Notice of Allowance, dated Feb. 2, 2021, received in Chinese Patent Application No. 201711422121.5, which corresponds with U.S. Appl. No. 14/536,648, 1 page.
Patent, dated Jan. 22, 2021, received in Chinese Patent Application No. 201610131415.1, which corresponds with U.S. Appl. No. 14/866,981, 6 pages.
Patent, dated Jan. 5, 2021, received in Japanese Patent Application No. 2018-243773, which corresponds with U.S. Appl. No. 14/863,432, 4 pages.
Notice of Allowance, dated Feb. 24, 2021, received in Chinese Patent Application No. 201680047125.7, which corresponds with U.S. Appl. No. 15/009,676, 1 page.
Patent, dated Jan. 22, 2021, received in Chinese Patent Application No. 201711261143.8, which corresponds with U.S. Appl. No. 14/857,663, 6 pages.
Intention to Grant, dated Feb. 3, 2021, received in European Patent Application No. 17188507.2, which corresponds with U.S. Appl. No. 14/866,361, 7 pages.
Patent, dated Jan. 8, 2021, received in Hong Kong Patent Application No. 18100151.5, which corresponds with U.S. Appl. No. 14/866,987, 6 pages.
Decision to Grant, dated Feb. 25, 2021, received in European Patent Application No. 16189425.8, which corresponds with U.S. Appl. No. 14/866,989, 1 pages.
Office Action, dated Feb. 9, 2021, received in Chinese Patent Application No. 201610871323.7, which corresponds with U.S. Appl. No. 14/871,336, 1 page.
Notice of Allowance, dated Jan. 27, 2021, received in Chinese Patent Application No. 201810151593.X, which corresponds with U.S. Appl. No. 15/272,327, 3 pages.
Office Action, dated Jan. 28, 2021, received in Australian Patent Application No. 2019268116, which corresponds with U.S. Appl. No. 16/240,672, 4 pages.
Office Action, dated Feb. 12, 2021, received in Japanese Patent Application No. 2019-058800, which corresponds with U.S. Appl. No. 16/243,834, 2 pages.
Office action, dated Feb. 25, 2021, received in Australian Patent Application No. 2020201648, which corresponds with U.S. Appl. No. 16/262,784, 3 pages.
Office Action, dated Feb. 23, 2021, received in Korean Patent Application No. 2020-7031330, which corresponds with U.S. Appl. No. 15/272,398, 6 pages.
Patent, dated Sep. 16, 2020, received in European Patent Application No. 18194127.9, which corresponds with U.S. Appl. No. 14/608,942, 4 pages.
Patent, dated Sep. 23, 2020, received in European Patent Application No. 16756866.6, which corresponds with U.S. Appl. No. 15/009,676, 4 pages.

(56) References Cited

OTHER PUBLICATIONS

Certificate of Grant, dated Oct. 21, 2020, received in European Patent Application No. 16753796.8, which corresponds with U.S. Appl. No. 15/009,688, 4 pages.
Patent, dated Dec. 2, 2020, received in Mx/a/2017/011610, which corresponds with U.S. Appl. No. 14/871,236, 4 pages.
Patent, dated Sep. 23, 2020, received in European Patent Application No. 18205283.7, which corresponds with U.S. Appl. No. 15/081,771, 4 pages.
Garcia-Hernandez et al., "Orientation Discrimination of Patterned Surfaces through an Actuated and Non-Actuated Tactile Display", 2011 IEEE World Haptics Conference, Istanbul, 2011, 6 pages.
Notice of Allowance, dated Jan. 25, 2021, received in U.S. Appl. No. 14/536,464, 5 pages.
Notice of Allowance, dated Feb. 23, 2021, received in U.S. Appl. No. 14/536,464, 5 pages.
Final Office Action, dated Feb. 26, 2021, received in U.S. Appl. No. 15/009,661, 46 pages.
Final Office Action, dated Jan. 25, 2021, received in U.S. Appl. No. 15/979,347, 12 pages.
Office Action, dated Mar. 4, 2021, received in U.S. Appl. No. 16/154,591, 20 pages.
Notice of Allowance, dated Feb. 18, 2021, received in U.S. Appl. No. 16/230,707, 9 pages.
Office Action, dated Feb. 5, 2021, received in U.S. Appl. No. 16/262,800, 53 pages.
Final Office Action, dated Feb. 2, 2021, received in U.S. Appl. No. 16/685,773, 20 pages.
Notice of Allowance, dated Feb. 24, 2021, received in U.S. Appl. No. 16/824,490, 8 pages.
Brewster, "The Design and Evaluation of a Vibrotactile Progress Bar", Glasgow Interactive Systems Group, University of Glasgow, Glasgow, G12 8QQ, UK, 2005, 2 pages.
Jones, "Touch Screen with Feeling", IEEE Spectrum, spectrum.ieee.org/commuting/hardware/touch-screens-with-feeling, May 1, 2009, 2 pages.
Nishino, "A Touch Screen Interface Design with Tactile Feedback", Computer Science, 2011 International Conference on Complex, Intelligent, and Software Intensive Systems, 2011, 4 pages.
Office Action, dated Dec. 1, 2020, received in Chinese Patent Application No. 201810369259.1, which corresponds with U.S. Appl. No. 14/608,926, 14 pages.
Office Action, dated Oct. 26, 2020, received in Chinese Patent Application No. 201711422092.2, which corresponds with U.S. Appl. No. 14/536,646, 20 pages.
Certificate of Grant, dated Sep. 3, 2020, received in Australian Patent Application No. 2018250481, which corresponds with U.S. Appl. No. 14/536,203, 4 pages.
Patent, dated Sep. 29, 2020, received in Chinese Patent Application No. 201610537334.1, which corresponds with U.S. Appl. No. 14/536,267, 7 pages.
Office Action, dated Nov. 17, 2020, received in Chinese Patent Application No. 2018100116175.X, which corresponds with U.S. Appl. No. 14/536,291, 16 pages.
Notice of Allowance, dated Dec. 4, 2020, received in Chinese Patent Application No. 201610131415.1, which corresponds with U.S. Appl. No. 14/866,981, 3 pages.
Patent, dated Dec. 11, 2020, received in Chinese Patent Application No. 201680011338.4, which correspondence with U.S. Appl. No. 14/868,078, 3 pages.
Notice of Allowance, dated Dec. 4, 2020, received in Japanese Patent Application No. 2018-243773, which corresponds with U.S. Appl. No. 14/863,432, 5 pages.
Patent, dated Oct. 12, 2020, received in Korean Patent Application No. 2020-7015964, which corresponds with U.S. Appl. No. 14/863,432, 8 pages.
Patent, dated Oct. 29, 2020, received in Korean Patent Application No. 2020-7003065, which corresponds with U.S. Appl. No. 14/866,511, 5 pages.
Office Action, dated Nov. 6, 2020, received in Chinese Patent Application No. 201610871595.7, which corresponds with U.S. Appl. No. 14/869,899, 15 pages.
Office Action, dated Nov. 25, 2020, received in Chinese Patent Application No. 201610658351.8, which corresponds with U.S. Appl. No. 14/866,992, 9 pages.
Office Action, dated Sep. 16, 2020, received in U.S. Appl. No. 15/009,661, 37 pages.
Office Action, dated Nov. 30, 2020, received in Chinese Patent Application No. 201680047125.7, which corresponds with U.S. Appl. No. 15/009,676, 11 pages.
Notice of Allowance, dated Oct. 9, 2020, received in Chinese Patent Application No. 201680047164.7, which corresponds with U.S. Appl. No. 15/009,688, 5 pages.
Patent, dated Nov. 10, 2020, received in Chinese Patent Application No. 201680047164.7, which corresponds with U.S. Appl. No. 15/009,688, 6 pages.
Decision to Grant, dated Sep. 24, 2020), received in European Patent Application No. 16753796.8, which corresponds with U.S. Appl. No. 15/009,688, 4 pages.
Notice of Allowance, dated Oct. 1, 2020, received in U.S. Appl. No. 14/856,520, 5 pages.
Patent, dated Nov. 27, 2020, received in Chinese Patent Application No. 201711262953.5, which corresponds with U.S. Appl. No. 14/857,636, 6 pages.
Notice of Allowance, dated Oct. 16, 2020, received in Japanese Patent Application No. 2017-029201, which corresponds with U.S. Appl. No. 14/857,636, 4 pages.
Patent, dated Nov. 12, 2020, received in Japanese Patent Application No. 2017-029201, which corresponds with U.S. Appl. No. 14/857,636, 3 pages.
Notice of Allowance, dated Dec. 2, 2020, received in Chinese Patent Application No. 201711261143.8, which corresponds with U.S. Appl. No. 14/857,663, 3 pages.
Notice of Allowance, dated Sep. 18, 2020, received in Japanese Patent Application No. 2018-201076, which corresponds with U.S. Appl. No. 14/857,663, 5 pages.
Patent, dated Oct. 19, 2020, received in Japanese Patent Application No. 2018-201076, which corresponds with U.S. Appl. No. 14/857,663, 4 pages.
Office Action, dated Dec. 21, 2020, received in Korean Patent Application No. 2020-7029178, which corresponds with U.S. Appl. No. 14/870,882, 2 pages.
Intention to Grant, dated Dec. 3, 2020, received in European Patent Application No. 16189425.8, which corresponds with U.S. Appl. No. 14/866,989, 7 pages.
Intention to Grant, dated Oct. 5, 2020, received in European Patent Application No. 18168941.5, which corresponds with U.S. Appl. No. 14/871,236, 8 pages.
Office Action, dated Dec. 21, 2020, received in Chinese Patent Application No. 201610870912.3, which corresponds with U.S. Appl. No. 14/870,882, 5 pages.
Patent, dated Sep. 18, 2020, received in Chinese Patent Application No. 201680022696.5, which corresponds with U.S. Appl. No. 15/272,345, 6 pages.
Office Action, dated Dec. 4, 2020, received in Japanese Patent Application No. 2019-212493, which corresponds with U.S. Appl. No. 15/272,345, 5 pages.
Certificate of Grant, dated Nov. 26, 2020, received in Australian Patent Application No. 2019203776, which corresponds with U.S. Appl. No. 15/499,693, 3 pages.
Office action, dated Nov. 20, 2020, received in Japanese Patent Application No. 2019-200174, which corresponds with U.S. Appl. No. 15/499,693, 6 pages.
Final Office Action, dated Nov. 18, 2020, received in U.S. Appl. No. 15/785,372, 27 pages.
Office Action, dated Sep. 17, 2020, received in U.S. Appl. No. 16/136,163, 13 pages.
Office Action, dated Dec. 10, 2020, received in U.S. Appl. No. 16/145,954, 5 pages.
Final Office Action, dated Oct. 1, 2020, received in U.S. Appl. No. 16/154,591, 19 pages.

(56) References Cited

OTHER PUBLICATIONS

Office Action, dated Oct. 13, 2020, received in Australian Patent Application No. 2019203175, which corresponds with U.S. Appl. No. 16/154,591, 5 pages.
Office Action, dated Oct. 30, 2020, received in U.S. Appl. No. 16/230,707, 20 pages.
Final Office Action, dated Nov. 27, 2020, received in U.S. Appl. No. 16/240,672, 12 pages.
Office Action, dated Sep. 24, 2020, received in Australian Patent Application No. 2019268116, which corresponds with U.S. Appl. No. 16/240,672, 4 pages.
Notice of Allowance, dated Sep. 24, 2020, received in U.S. Appl. No. 16/243,834, 10 pages.
Office Action, dated Sep. 18, 2020, received in Australian Patent Application No. 2018282409, which corresponds with U.S. Appl. No. 16/243,834, 3 pages.
Notice of Acceptance, dated Oct. 21, 2020, received in Australian Patent Application No. 2018282409, which corresponds with U.S. Appl. No. 16/243,834, 3 pages.
Notice of Allowance, dated Nov. 20, 2020, received in U.S. Appl. No. 16/262,784, 8 pages.
Office Action, dated Sep. 15, 2020, received in European Patent Application No. 19194439.6, which corresponds with U.S. Appl. No. 16/262,800, 6 pages.
Notice of Allowance, dated Sep. 15, 2020, received in Australian Patent Application No. 2019257437, which corresponds with U.S. Appl. No. 16/252,478, 3 pages.
Notice of Allowance, dated Sep. 28, 2020, received in U.S. Appl. No. 16/241,883, 10 pages.
Certificate of Grant, dated Nov. 5, 2020, received in Australian Patent Application No. 2019202417, which corresponds with U.S. Appl. No. 16/896,141, 4 pages.
Notice of Allowance, dated Jan. 6, 2021, received in U.S. Appl. No. 16/509,438, 5 pages.
Office Action, dated Oct. 7, 2020, received in U.S. Appl. No. 16/563,505, 20 pages.
Office Action, dated Oct. 19, 2020, received in U.S. Appl. No. 16/685,773, 15 pages.
Office Action, dated Oct. 30, 2020, received in U.S. Appl. No. 16/824,490, 15 pages.
Office Action, dated Sep. 21, 2020, received in U.S. Appl. No. 16/803,904, 5 pages.
Notice of Allowance, dated Jan. 6, 2021, received in U.S. Appl. No. 16/803,904, 9 pages.
Extended European Search Report, dated Oct. 6, 2020, received in European Patent Application No. 20188553.0, which corresponds with U.S. Appl. No. 15/499,693, 11 pages.

\* cited by examiner

| Detect, on the touch-sensitive surface, a second input associated with the bidirectional user interface. The second input includes a single contact detected while the focus selector is over a respective portion of the bidirectional user interface. | 16328 |

| In response to detecting the second input, perform an operation associated with the respective portion of the bidirectional user interface | 16330 |

| Detect, on the touch-sensitive surface, a second input associated with the bidirectional user interface. The second input includes movement of a contact across the touch-sensitive surface in a respective direction. | 16332 |

| Adjust the bidirectional user interface in accordance with the respective direction of the movement of the contact | 16334 |

Figure 12C

While a focus selector is at a location on the display that corresponds to the respective control: ~14504

Change the appearance of the respective control to indicate progress toward meeting the respective contact intensity criteria ~14516

> The respective contact intensity criteria include a respective contact intensity threshold and a respective delay time period
>
> Changing the appearance of the control includes displaying an indication of an amount of time remaining before the respective delay time period has elapsed

~14518

> The respective contact intensity criteria include a respective contact intensity threshold
>
> Changing the appearance of the control includes displaying an indication of a difference between a current intensity of a contact on the touch-sensitive surface and the respective contact intensity threshold

~14520

> Changing the appearance of the control includes displaying a progress bar in the control

~14522

> Changing the appearance of the control includes changing color of at least a portion of the control in accordance with the intensity of the contact

~14524

> Changing the appearance of the control includes changing color of at least a portion of the control in accordance with a length of time that the contact has continuously met a respective contact intensity threshold

~14526

> Changing the appearance of the control includes changing color of at least a portion of the control in accordance with a length of time since the contact met a respective contact intensity threshold

~14528

Figure 15B

DEVICE, METHOD, AND GRAPHICAL USER INTERFACE FOR MOVING A USER INTERFACE OBJECT BASED ON AN INTENSITY OF A PRESS INPUT

RELATED APPLICATIONS

This application is a continuation of U.S. application Ser. No. 14/536,166, filed Nov. 7, 2014, which is a continuation of PCT Patent Application Serial No. PCT/US2013/040087, filed on May 8, 2013, entitled "Device, Method, and Graphical User Interface for Moving a User Interface Object Based on an Intensity of a Press Input," which claims the benefit of and priority to U.S. Provisional Patent Application Ser. No. 61/778,373, filed on Mar. 12, 2013, entitled "Device, Method, and Graphical User Interface for Managing Activation of a Control Based on Contact Intensity;" U.S. Provisional Patent Application Ser. No. 61/778,367, filed on Mar. 12, 2013, entitled "Device, Method, and Graphical User Interface for Moving a User Interface Object Based on an Intensity of a Press Input;" U.S. Provisional Patent Application No. 61/747,278, filed Dec. 29, 2012, entitled "Device, Method, and Graphical User Interface for Manipulating User Interface Objects with Visual and/or Haptic Feedback;" and U.S. Provisional Patent Application No. 61/688,227, filed May 9, 2012, entitled "Device, Method, and Graphical User Interface for Manipulating User Interface Objects with Visual and/or Haptic Feedback," which applications are incorporated by reference herein in their entireties.

This application is also related to the following: U.S. Provisional Patent Application Ser. No. 61/778,092, filed on Mar. 12, 2013, entitled "Device, Method, and Graphical User Interface for Selecting Object within a Group of Objects;" U.S. Provisional Patent Application Ser. No. 61/778,125, filed on Mar. 12, 2013, entitled "Device, Method, and Graphical User Interface for Navigating User Interface Hierarchies;" U.S. Provisional Patent Application Ser. No. 61/778,156, filed on Mar. 12, 2013, entitled "Device, Method, and Graphical User Interface for Manipulating Framed Graphical Objects;" U.S. Provisional Patent Application Ser. No. 61/778,179, filed on Mar. 12, 2013, entitled "Device, Method, and Graphical User Interface for Scrolling Nested Regions;" U.S. Provisional Patent Application Ser. No. 61/778,171, filed on Mar. 12, 2013, entitled "Device, Method, and Graphical User Interface for Displaying Additional Information in Response to a User Contact;" U.S. Provisional Patent Application Ser. No. 61/778,191, filed on Mar. 12, 2013, entitled "Device, Method, and Graphical User Interface for Displaying User Interface Objects Corresponding to an Application;" U.S. Provisional Patent Application Ser. No. 61/778,211, filed on Mar. 12, 2013, entitled "Device, Method, and Graphical User Interface for Facilitating User Interaction with Controls in a User Interface;" U.S. Provisional Patent Application Ser. No. 61/778,239, filed on Mar. 12, 2013, entitled "Device, Method, and Graphical User Interface for Forgoing Generation of Tactile Output for a Multi-Contact Gesture;" U.S. Provisional Patent Application Ser. No. 61/778,284, filed on Mar. 12, 2013, entitled "Device, Method, and Graphical User Interface for Providing Tactile Feedback for Operations Performed in a User Interface;" U.S. Provisional Patent Application Ser. No. 61/778,287, filed on Mar. 12, 2013, entitled "Device, Method, and Graphical User Interface for Providing Feedback for Changing Activation States of a User Interface Object;" U.S. Provisional Patent Application Ser. No. 61/778,363, filed on Mar. 12, 2013, entitled "Device, Method, and Graphical User Interface for Transitioning between Touch Input to Display Output Relationships;" U.S. Provisional Patent Application Ser. No. 61/778,265, filed on Mar. 12, 2013, entitled "Device, Method, and Graphical User Interface for Transitioning between Display States in Response to a Gesture;" U.S. Provisional Patent Application Ser. No. 61/778,412, filed on Mar. 13, 2013, entitled "Device, Method, and Graphical User Interface for Displaying Content Associated with a Corresponding Affordance;" U.S. Provisional Patent Application Ser. No. 61/778,413, filed on Mar. 13, 2013, entitled "Device, Method, and Graphical User Interface for Selecting User Interface Objects;" U.S. Provisional Patent Application Ser. No. 61/778,414, filed on Mar. 13, 2013, entitled "Device, Method, and Graphical User Interface for Moving and Dropping a User Interface Object;" U.S. Provisional Patent Application Ser. No. 61/778,416, filed on Mar. 13, 2013, entitled "Device, Method, and Graphical User Interface for Determining Whether to Scroll or Select Content;" and U.S. Provisional Patent Application Ser. No. 61/778,418, filed on Mar. 13, 2013, entitled "Device, Method, and Graphical User Interface for Switching between User Interfaces," which are incorporated herein by reference in their entireties.

This application is also related to the following: U.S. Provisional Patent Application Ser. No. 61/645,033, filed on May 9, 2012, entitled "Adaptive Haptic Feedback for Electronic Devices;" U.S. Provisional Patent Application Ser. No. 61/665,603, filed on Jun. 28, 2012, entitled "Adaptive Haptic Feedback for Electronic Devices;" and U.S. Provisional Patent Application Ser. No. 61/681,098, filed on Aug. 8, 2012, entitled "Adaptive Haptic Feedback for Electronic Devices," which are incorporated herein by reference in their entireties.

TECHNICAL FIELD

This relates generally to electronic devices with touch-sensitive surfaces, including but not limited to electronic devices with touch-sensitive surfaces that detect inputs for manipulating user interfaces.

BACKGROUND

The use of touch-sensitive surfaces as input devices for computers and other electronic computing devices has increased significantly in recent years. Exemplary touch-sensitive surfaces include touch pads and touch screen displays. Such surfaces are widely used to manipulate user interface objects on a display.

Exemplary manipulations include adjusting the position and/or size of one or more user interface objects or activating buttons or opening files/applications represented by user interface objects, as well as associating metadata with one or more user interface objects or otherwise manipulating user interfaces. Exemplary user interface objects include digital images, video, text, icons, control elements such as buttons and other graphics. A user will, in some circumstances, need to perform such manipulations on user interface objects in a file management program (e.g., Finder from Apple Inc. of Cupertino, Calif.), an image management application (e.g., Aperture or iPhoto from Apple Inc. of Cupertino, Calif.), a digital content (e.g., videos and music) management application (e.g., iTunes from Apple Inc. of Cupertino, Calif.), a drawing application, a presentation application (e.g., Keynote from Apple Inc. of Cupertino, Calif.), a word processing application (e.g., Pages from Apple Inc. of Cupertino, Calif.), a website creation application (e.g., iWeb from Apple Inc. of Cupertino, Calif.), a disk authoring application (e.g., iDVD from Apple Inc. of Cupertino, Calif.), or a spreadsheet application (e.g., Numbers from Apple Inc. of Cupertino, Calif.).

But existing methods for performing these manipulations are cumbersome and inefficient. In addition, existing methods take longer than necessary, thereby wasting energy. This latter consideration is particularly important in battery-operated devices.

SUMMARY

Accordingly, there is a need for electronic devices with faster, more efficient methods and interfaces for manipulating user interfaces. Such methods and interfaces optionally complement or replace conventional methods for manipulating user interfaces. Such methods and interfaces reduce the cognitive burden on a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. In some embodiments, the functions optionally include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions are, optionally, included in a non-transitory computer readable storage medium or other computer program product configured for execution by one or more processors.

There is a need for electronic devices with faster, more efficient methods and interfaces for moving user interface objects (such as a handle of a slider control) at varying speeds or through varying displacements using a press input, such that the extent of motion of the user interface object (e.g., speed and/or displacement of the user interface object) varies with or depends on the intensity or pressure of the press input on a track pad or touch screen. Such methods and interfaces may complement or replace conventional methods for moving user interface objects. Such methods and interfaces reduce the cognitive burden on a user and produce a more efficient human-machine interface. For battery-operated devices, such methods and interfaces conserve power and increase the time between battery charges.

In accordance with some embodiments, a method is performed at an electronic device with a display, a touch-sensitive surface and one or more sensors to detect intensity of contacts with the touch-sensitive surface. The method includes displaying a user interface object on the display.

The method further includes detecting a press input on the touch-sensitive surface while a focus selector is at a first location in a user interface. The method also includes in response to detecting the press input on the touch-sensitive surface: in accordance with a determination that the press input has an intensity above a predefined activation threshold, moving the user interface object directly to the first location in the user interface; and in accordance with a determination that the press input has an intensity below the predefined activation threshold and meets gradual-movement criteria, moving the user interface object toward the first location in the user interface in accordance with the intensity of the press input.

In accordance with some embodiments, an electronic device includes a display unit configured to display a user interface object, a touch-sensitive surface unit configured to receive a press input on the touch-sensitive surface unit, one or more sensor units configured to detect intensity of contacts with the touch-sensitive surface unit, a processing unit coupled to the display unit, the touch-sensitive surface unit, and the sensor units. The processing unit is configured to: display a user interface object on the display unit; detect a press input on the touch-sensitive surface unit while a focus selector is at a first location in a user interface. In response to detecting the press input on the touch-sensitive surface unit, the processing unit is configured to: in accordance with a determination that the press input has an intensity above a predefined activation threshold, move the user interface object directly to the first location in the user interface; and in accordance with a determination that the press input has an intensity below the predefined activation threshold and meets gradual-movement criteria, move the user interface object toward the first location in the user interface in accordance with the intensity of the press input.

Thus, electronic devices with displays, touch-sensitive surfaces and one or more sensors to detect intensity of contacts with the touch-sensitive surface are provided with faster, more efficient methods and interfaces for moving user interface objects, such as a handle of a slider control, at varying speeds or through varying displacements based on variable intensities of a press input, thereby increasing the effectiveness, efficiency, and user satisfaction with such devices. Such methods and interfaces may complement or replace conventional methods for moving user interface objects on displays.

An electronic device with a display, a touch-sensitive surface and one or more sensors to detect intensity of contacts with the touch-sensitive surface detects an input on the touch-sensitive surface while the display is in a low-power mode, where detecting the input includes detecting a contact on the touch-sensitive surface and detecting a change in a characteristic of the contact. In response to detecting the input, in accordance with a determination that the input meets display-activation criteria, the device gradually displays a respective user interface on the display in accordance with the change in the characteristic of the contact, where the respective user interface was not displayed on the display when the display was in the low-power mode.

There is a need for electronic devices with faster, more efficient methods and interfaces for providing an indication to a user on how a control responds to inputs. Such methods and interfaces may complement or replace conventional methods for providing an indication to a user on how a control responds to inputs. Such methods and interfaces reduce the cognitive burden on a user and produce a more efficient human-machine interface. For battery-operated devices, such methods and interfaces conserve power and increase the time between battery charges.

In accordance with some embodiments, a method is performed at an electronic device with a touch-sensitive surface and a display, where the device includes one or more sensors to detect intensity of contacts with the touch-sensitive surface. The method includes displaying, on the display, a plurality of controls for controlling operations of the device, where the plurality of controls include one or more controls of a first type of control that respond to inputs by incrementally adjusting a corresponding parameter in accordance with intensity of the inputs, and one or more controls of a second type of control that respond to inputs that reach a predefined intensity threshold by performing a corresponding discrete operation. When a focus selector is remote from the plurality of controls, the plurality of controls have a two-dimensional appearance. The method further includes detecting a gesture on the touch-sensitive surface that corresponds to movement of a focus selector over a respective control having a two-dimensional appearance and, in response to detecting the gesture, in accordance with a determination that the respective control is a control of the first type, changing the appearance of the respective control to have a three-dimensional appearance, and in accordance with a determination that the respective control is a control of the second type, maintaining the two-dimensional appearance of the respective control.

In accordance with some embodiments, an electronic device includes a display unit configured to display a plurality of controls for controlling operations of the device, where the plurality of controls include one or more controls of a first type of control that respond to inputs by incrementally adjusting a corresponding parameter in accordance with intensity of the inputs, and one or more controls of a second type of control that respond to inputs that reach a predefined intensity threshold by performing a corresponding discrete operation, and when a focus selector is remote from the plurality of controls, the plurality of controls have a two-dimensional appearance. The electronic device further includes a touch-sensitive surface unit configured to receive user gestures, one or more sensor units configured to detect intensity of contacts with the touch-sensitive surface unit; and a processing unit coupled to the display unit, the touch-sensitive surface unit, and the one or more sensor units. The processing unit is configured to detect a gesture on the touch-sensitive surface unit that corresponds to movement of a focus selector over a respective control having a two-dimensional appearance and, in response to detecting the gesture, in accordance with a determination that the respective control is a control of the first type, change the appearance of the respective control to have a three-dimensional appearance, and in accordance with a determination that the respective control is a control of the second type, maintain the two-dimensional appearance of the respective control.

Thus, electronic devices with displays, touch-sensitive surfaces and one or more sensors to detect intensity of contacts with the touch-sensitive surface are provided with faster, more efficient methods and interfaces for providing an indication to a user on how a control responds to inputs, thereby increasing the effectiveness, efficiency, and user satisfaction with such devices. Such methods and interfaces may complement or replace conventional methods for providing an indication to a user on how a control responds to inputs.

There is a need for electronic devices with faster, more efficient methods and interfaces for adjusting bidirectional user interface elements. Such methods and interfaces may complement or replace conventional methods for adjusting bidirectional user interface elements. Such methods and interfaces reduce the cognitive burden on a user and produce a more efficient human-machine interface. For battery-operated devices, such methods and interfaces conserve power and increase the time between battery charges.

In accordance with some embodiments, a method is performed at an electronic device with a touch-sensitive surface and a display, where the device includes one or more sensors to detect intensity of contacts with the touch-sensitive surface. The method includes displaying a bidirectional user interface element on the display, where the bidirectional user interface element is configured to be adjusted in a first direction or a second direction that is opposite to the first direction. The method further includes, while the bidirectional user interface element has focus, detecting a first input on the touch-sensitive surface that includes a first contact and a second contact and determining a difference between an intensity of the first contact and an intensity of the second contact. The method further includes, in response to detecting the first input, in accordance with a determination that the first input meets first adjustment criteria, including that the intensity of the first contact is greater than the intensity of the second contact, adjusting the bidirectional user interface element in the first direction and, in accordance with a determination that the first input meets second adjustment criteria, including that the intensity of the first contact is less than the intensity of the second contact, adjusting the bidirectional user interface element in the second direction.

In accordance with some embodiments, an electronic device includes a display unit configured to display a bidirectional user interface element, where the bidirectional user interface element is configured to be adjusted in a first direction or a second direction that is opposite to the first direction, a touch-sensitive surface unit configured to receive user inputs, one or more sensor units configured to detect intensity of contacts with the touch-sensitive surface unit; and a processing unit coupled to the display unit, the touch-sensitive surface unit, and the sensor units. The processing unit is configured to, while the bidirectional user interface element has focus, detect a first input on the touch-sensitive surface unit that includes a first contact and a second contact and determine a difference between an intensity of the first contact and an intensity of the second contact. The processing unit is further configured to, in response to detecting the first input, in accordance with a determination that the first input meets first adjustment criteria, including that the intensity of the first contact is greater than the intensity of the second contact, adjust the bidirectional user interface element in the first direction, and in accordance with a determination that the first input meets second adjustment criteria, including that the intensity of the first contact is less than the intensity of the second contact, adjust the bidirectional user interface element in the second direction.

Thus, electronic devices with displays, touch-sensitive surfaces and one or more sensors to detect intensity of contacts with the touch-sensitive surface are provided with faster, more efficient methods and interfaces for adjusting bidirectional user interface elements, thereby increasing the effectiveness, efficiency, and user satisfaction with such devices. Such methods and interfaces may complement or replace conventional methods for adjusting bidirectional user interface elements.

There is a need for electronic devices with faster, more efficient methods and interfaces for managing activation of controls that provide users with an indication of progress toward activating a respective control. Such methods and interfaces may complement or replace conventional methods for managing activation of controls. Such methods and interfaces reduce the cognitive burden on a user and produce a more efficient human-machine interface. For battery-operated devices, such methods and interfaces conserve power and increase the time between battery charges.

In accordance with some embodiments, a method is performed at an electronic device with a display, a touch-sensitive surface and one or more sensors to detect intensity of contacts with the touch-sensitive surface. The method includes: displaying, on the display, a respective control associated with respective contact intensity criteria. The method further includes while a focus selector is at a location on the display that corresponds to the respective control: detecting a gesture, on the touch-sensitive surface, that corresponds to an interaction with the respective control; and while detecting the gesture, in accordance with a determination that the gesture does not include a contact that meets the respective contact intensity criteria, changing the appearance of the respective control to indicate progress toward meeting the respective contact intensity criteria.

In accordance with some embodiments, an electronic device includes a display unit configured to display on the display unit, a respective control associated with respective contact intensity criteria; a touch-sensitive surface unit configured to receive a contact on the touch-sensitive surface unit; one or more sensor units configured to detect intensity of contacts with the touch-sensitive surface unit; and a processing unit coupled to the display unit, the sensor units and the touch-sensitive surface unit. The processing unit is configured to: while a focus selector is at a location on the display unit that corresponds to the respective control: detect a gesture, on the touch-sensitive surface unit, that corresponds to an interaction with the respective control; and while detecting the gesture, in accordance with a determination that the gesture does not include a contact that meets the respective contact intensity criteria, change the appearance of the respective control to indicate progress toward meeting the respective contact intensity criteria.

Thus, electronic devices with displays, touch-sensitive surfaces and one or more sensors to detect intensity of contacts with the touch-sensitive surface are provided with faster, more efficient methods and interfaces for managing activation of controls based on the intensity (e.g., pressure) and/or duration of a contact, thereby increasing the effectiveness, efficiency, and user satisfaction with such devices. Such methods and interfaces may complement or replace conventional methods for managing activation of controls.

In accordance with some embodiments, an electronic device includes a display, a touch-sensitive surface, optionally one or more sensors to detect intensity of contacts with the touch-sensitive surface, one or more processors, memory, and one or more programs; the one or more programs are stored in the memory and configured to be executed by the one or more processors and the one or more programs include instructions for performing the operations of any of the methods referred to in the fifth paragraph of the Description of Embodiments. In accordance with some embodiments, a graphical user interface on an electronic device with a display, a touch-sensitive surface, optionally one or more sensors to detect intensity of contacts with the touch-sensitive surface, a memory, and one or more processors to execute one or more programs stored in the memory includes one or more of the elements displayed in any of the methods referred to in the fifth paragraph of the Description of Embodiments, which are updated in response to inputs, as described in any of the methods referred to in the fifth paragraph of the Description of Embodiments. In accordance with some embodiments, a computer readable storage medium has stored therein instructions which when executed by an electronic device with a display, a touch-sensitive surface, and optionally one or more sensors to detect intensity of contacts with the touch-sensitive surface, cause the device to perform the operations of any of the methods referred to in the fifth paragraph of the Description of Embodiments. In accordance with some embodiments, an electronic device includes: a display, a touch-sensitive surface, and optionally one or more sensors to detect intensity of contacts with the touch-sensitive surface; and means for performing the operations of any of the methods referred to in the fifth paragraph of the Description of Embodiments. In accordance with some embodiments, an information processing apparatus, for use in an electronic device with a display and a touch-sensitive surface, optionally one or more sensors to detect intensity of contacts with the touch-sensitive surface, includes means for performing the operations of any of the methods referred to in the fifth paragraph of the Description of Embodiments.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 12A-12C are flow diagrams illustrating a method of adjusting bidirectional user interface elements in accordance with some embodiments.

FIGS. 15A-15D are flow diagrams illustrating a method of managing activation of controls based on the intensity and/or duration of a contact in accordance with some embodiments.

DESCRIPTION OF EMBODIMENTS

Figure 1A:
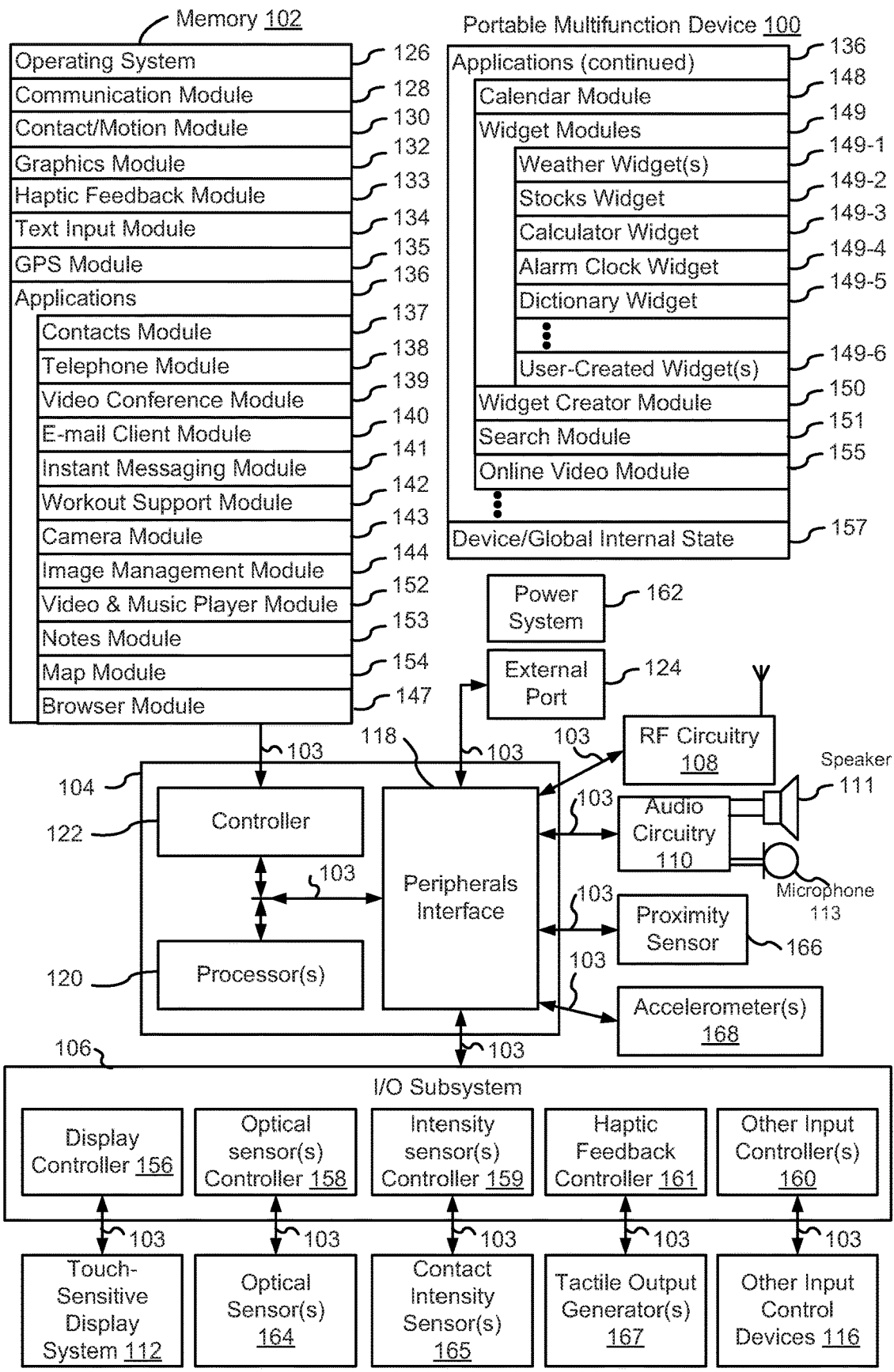
FIG. 1A is a block diagram illustrating a portable multifunction device with a touch-sensitive display in accordance with some embodiments.

The methods, devices and GUIs described herein provide visual and/or haptic feedback that makes manipulation of user interface objects more efficient and intuitive for a user. For example, in a system where the clicking action of a trackpad is decoupled from the contact intensity (e.g., contact force, contact pressure, or a substitute therefore) that is needed to reach an activation threshold, the device can generate different tactile outputs (e.g., "different clicks") for different activation events (e.g., so that clicks that accomplish a particular result are differentiated from clicks that do not produce any result or that accomplish a different result from the particular result). Additionally, tactile outputs can be generated in response to other events that are not related to increasing intensity of a contact, such as generating a tactile output (e.g., a "detent") when a user interface object is moved to a particular position, boundary or orientation, or when an event occurs at the device.

Additionally, in a system where a trackpad or touch-screen display is sensitive to a range of contact intensity that includes more than one or two specific intensity values (e.g., more than a simple on/off, binary intensity determination), the user interface can provide responses (e.g., visual or tactile cues) that are indicative of the intensity of the contact within the range. In some implementations, a pre-activation-threshold response and/or a post-activation-threshold response to an input are displayed as continuous animations. As one example of such a response, a preview of an operation is displayed in response to detecting an increase in contact intensity that is still below an activation threshold for performing the operation. As another example of such a response, an animation associated with an operation continues even after the activation threshold for the operation has been reached. Both of these examples provide a user with a continuous response to the force or pressure of a user's contact, which provides a user with visual and/or haptic feedback that is richer and more intuitive. More specifically, such continuous force responses give the user the experience of being able to press lightly to preview an operation and/or press deeply to push "past" or "through" a predefined user interface state corresponding to the operation.

Additionally, for a device with a touch-sensitive surface that is sensitive to a range of contact intensity, multiple contact intensity thresholds can be monitored by the device and different functions can be mapped to different contact intensity thresholds. This serves to increase the available "gesture space" providing easy access to advanced features for users who know that increasing the intensity of a contact at or beyond a second "deep press" intensity threshold will cause the device to perform a different operation from an operation that would be performed if the intensity of the contact is between a first "activation" intensity threshold and the second "deep press" intensity threshold. An advantage of assigning additional functionality to a second "deep press" intensity threshold while maintaining familiar functionality at a first "activation" intensity threshold is that inexperienced users who are, in some circumstances, confused by the additional functionality can use the familiar functionality by just applying an intensity up to the first "activation" intensity threshold, whereas more experienced users can take advantage of the additional functionality by applying an intensity at the second "deep press" intensity threshold.

Additionally, for a device with a touch-sensitive surface that is sensitive to a range of contact intensity, the device can provide additional functionality by allowing users to perform complex operations with a single continuous contact. For example, when selecting a group of objects, a user can move a continuous contact around the touch-sensitive surface and can press while dragging (e.g., applying an intensity greater than a "deep press" intensity threshold) to add additional elements to a selection. In this way, a user can intuitively interact with a user interface where pressing harder with a contact causes objects in the user interface to be "stickier."

Figure 5A:
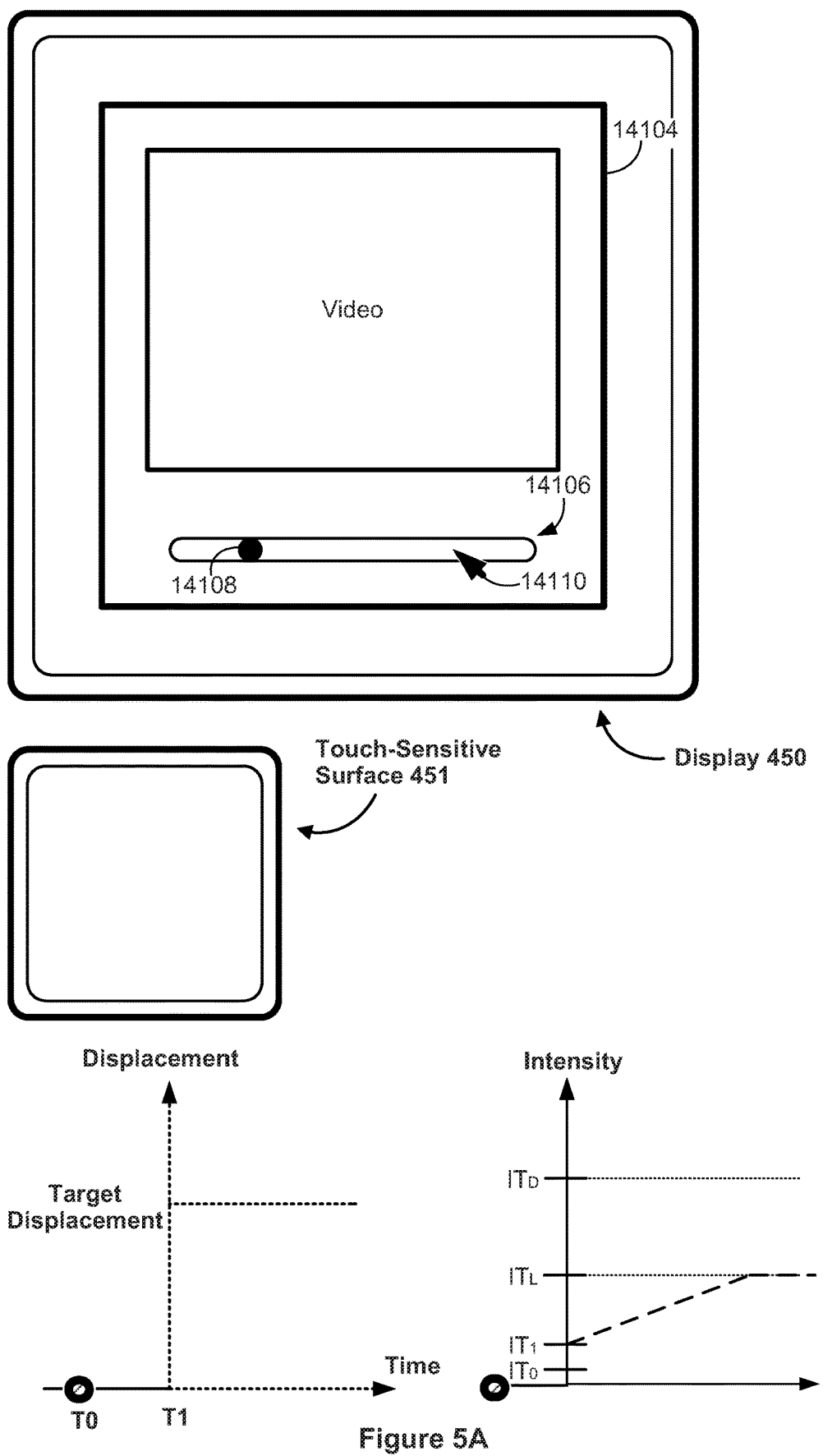
FIGS. 5A-5Y illustrate exemplary user interfaces for moving user interface objects at varying speeds or through varying displacements based on variable intensities of a press input, in accordance with some embodiments.
Figure 5B:
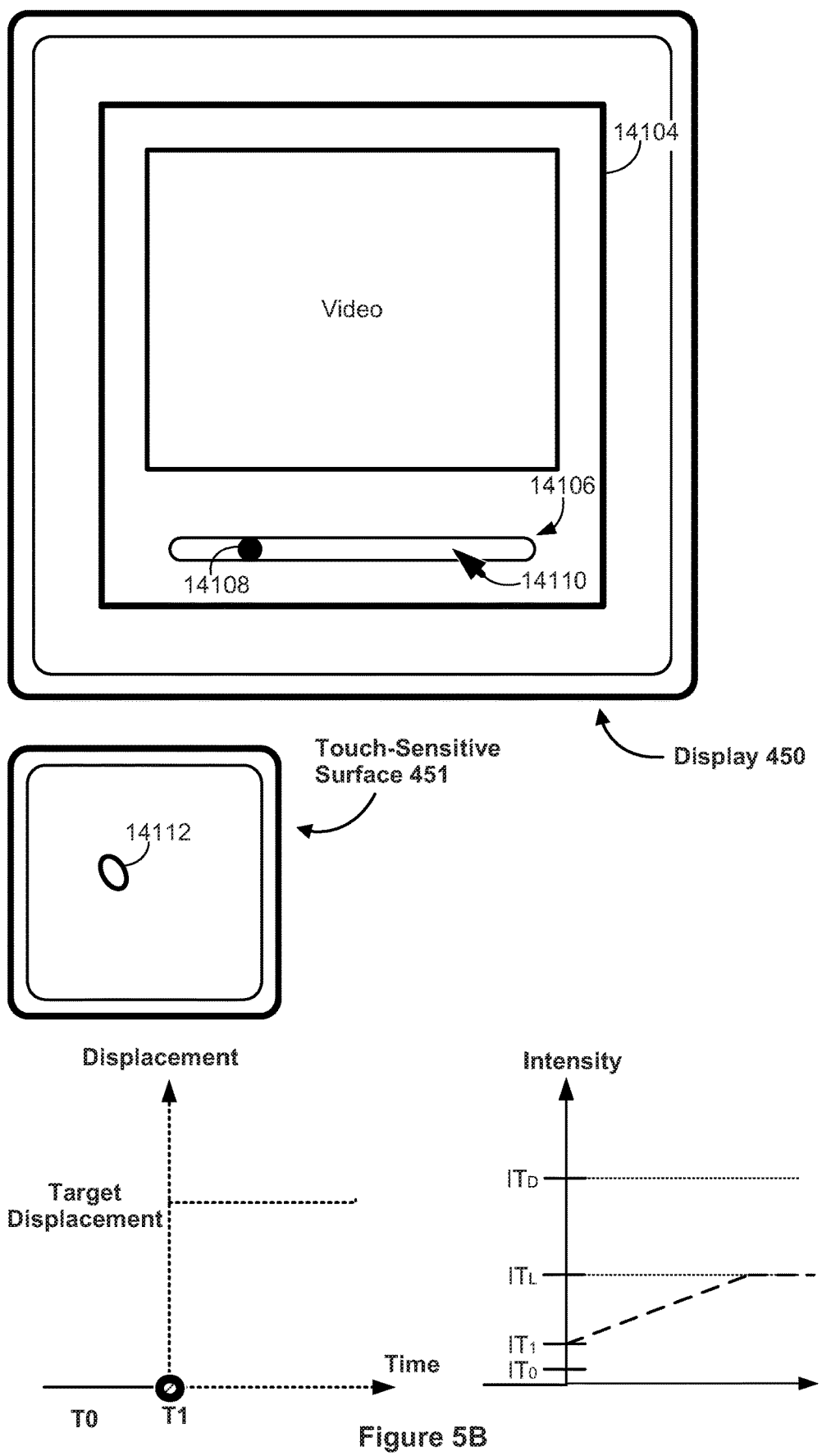
Figure 5C:
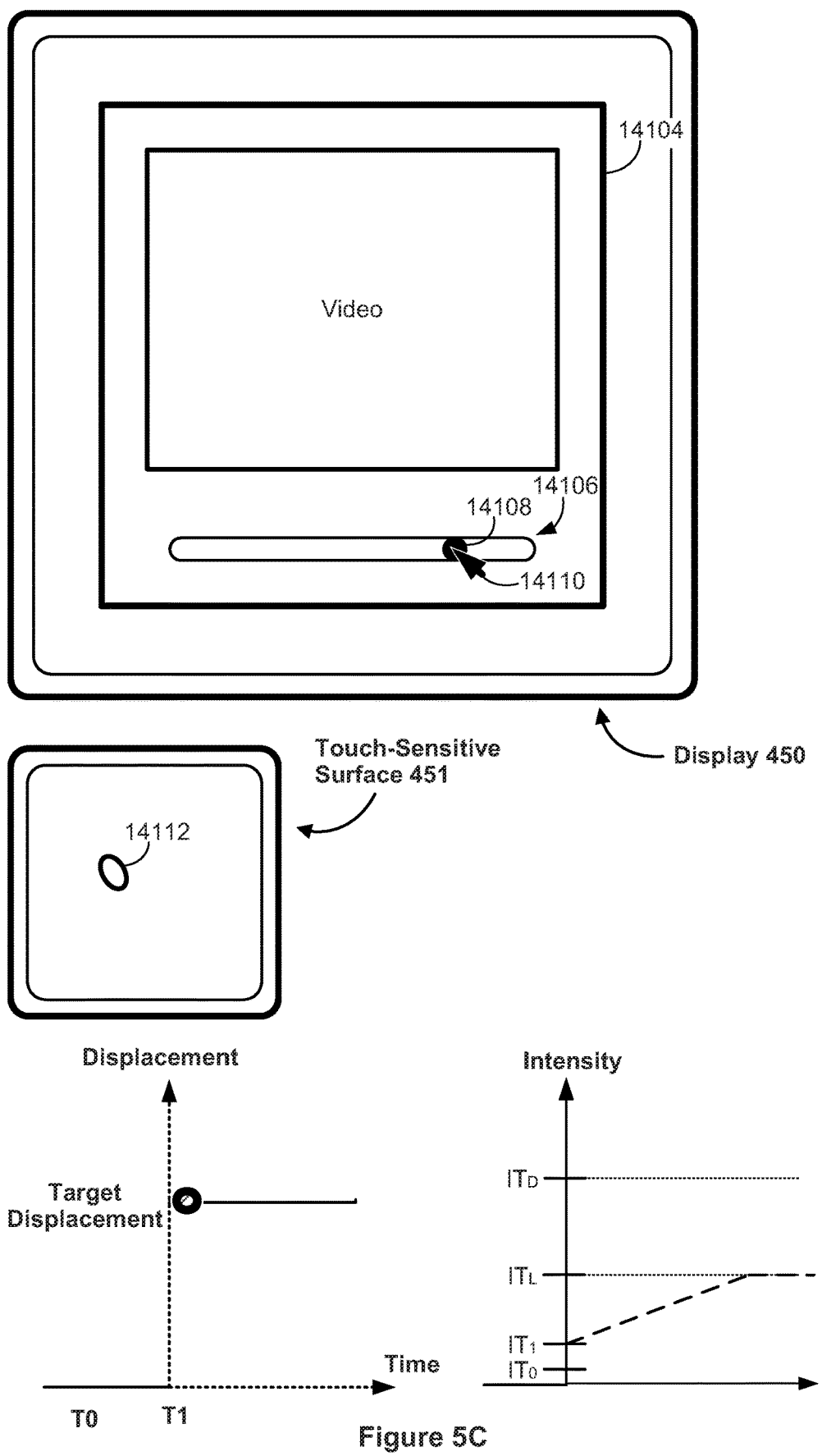

A number of different approaches to providing an intuitive user interface on a device where a clicking action is decoupled from the force that is needed to reach an activation threshold and/or the device is sensitive to a wide range of contact intensities are described below. Using one or more of these approaches (optionally in conjunction with each other) helps to provide a user interface that intuitively provides users with additional information and functionality, thereby reducing the user's cognitive burden and improving the human-machine interface. Such improvements in the human-machine interface enable users to use the device faster and more efficiently. For battery-operated devices, these improvements conserve power and increase the time between battery charges. For ease of explanation, systems, methods and user interfaces for including illustrative examples of some of these approaches are described below, as follows:

Many electronic devices have graphical user interfaces with moveable user interface objects, such as sliders or scrubbers, that move along a predefined path. Sometimes, a user moves these user interface objects by "clicking-and-dragging" or by selecting a desired location along the predefined path. However, this can be difficult and frustrating for users, for example, because it is sometimes difficult to accurately control the position or speed that the user interface object is being moved (e.g., when the display is small). The embodiments described below provide an intuitive and accurate way of moving a user interface object based on variable intensities of a press input. In particular, FIGS. 5A-5Y illustrate exemplary user interfaces for moving user interface objects at varying speeds or through varying displacements based on variable intensities of a press input. FIGS. 6A-6D are flow diagrams illustrating a method of moving user interface objects at varying speeds or through varying displacements based on variable intensities of a press input. The user interfaces in FIGS. 5A-5Y are used to illustrate the processes in FIGS. 6A-6D.

Many electronic devices have graphical user interfaces that include various types of controls. It is often desirable to have different control types respond to inputs in different manners (e.g., by adjusting a semi-continuous parameter, such as brightness of a display, or by performing a discrete operation, such as activating an "airplane mode"). Therefore, there is a need to distinguish (e.g., in a visual manner) between various types of controls. The embodiments described below provide a fast, efficient, and convenient way of providing an indication to a user on how a control responds to inputs (e.g., indicating whether a control responds differently to inputs with a variety of different intensity levels or responds to inputs in accordance with a particular intensity level) by changing an appearance of a control. In particular, FIGS. 8A-8I illustrate exemplary user interfaces for providing an indication to a user on how a control responds to inputs. FIGS. 9A-9E are flow diagrams illustrating a method of providing an indication to a user on how a control responds to inputs. The user interfaces in FIGS. 8A-8I are further used to illustrate the processes described below with reference to FIGS. 9A-9E.

Figure 11A:
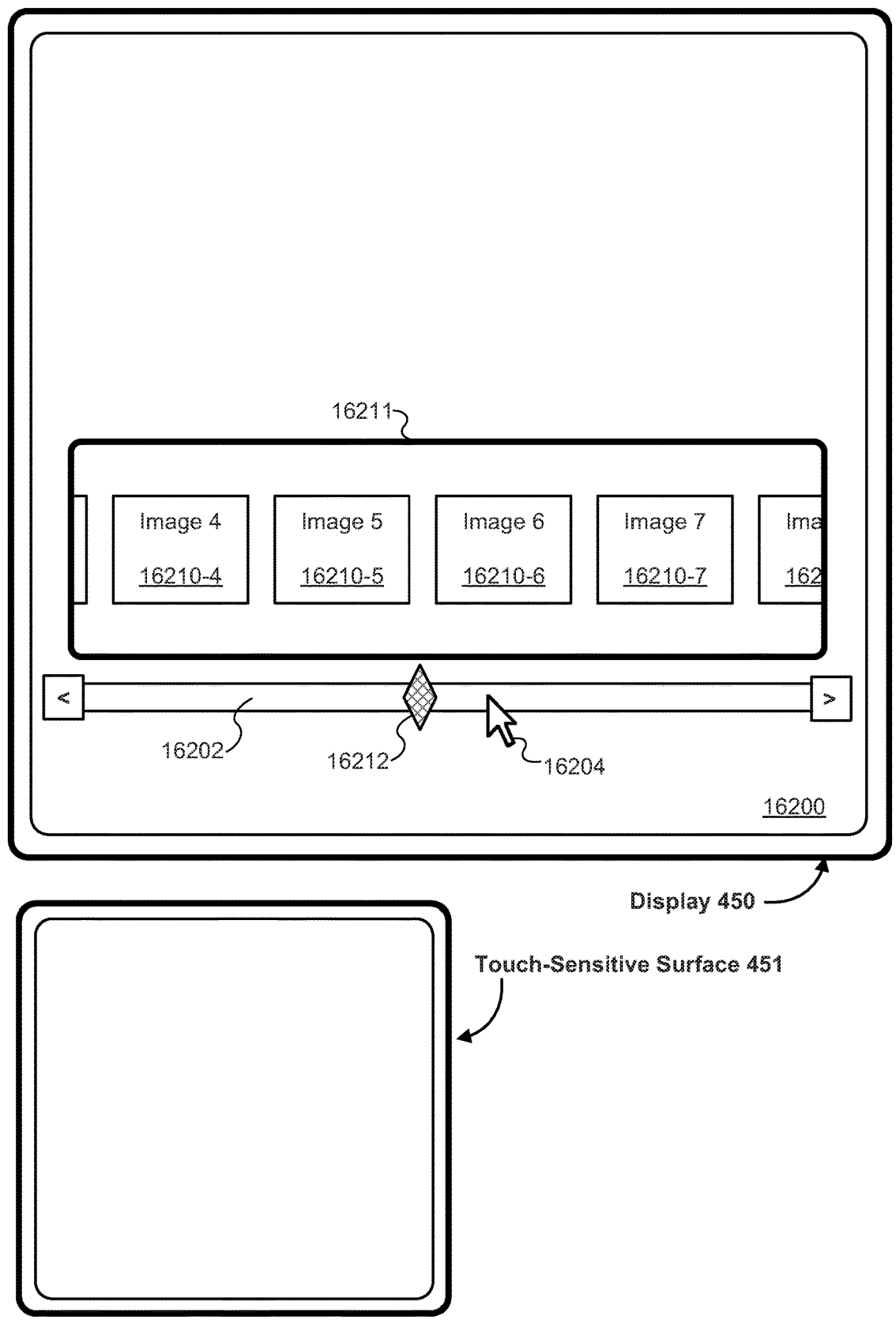
FIGS. 11A-11N illustrate exemplary user interfaces for adjusting bidirectional user interface elements in accordance with some embodiments.

Many electronic devices have graphical user interfaces that include bidirectional user interface elements, such as sliders or scrubbers, that move along a predefined path. Sometimes, a user moves these bidirectional user interface elements by "clicking-and-dragging" or by selecting a desired location along the predefined path. This can be difficult and frustrating for users, for example, because it is sometimes difficult to accurately control the position or speed that the bidirectional user interface element is being moved (e.g., when the display is small). The embodiments described below provide a fast, efficient, and convenient way for users to adjust a bidirectional user interface element (e.g., scrolling the photo album so as to view additional photos in the photo album) in accordance with a difference in intensity between two detected inputs. FIGS. 11A-11N illustrate exemplary user interfaces for adjusting bidirectional user interface elements. FIGS. 12A-12C are flow diagrams illustrating a method of adjusting bidirectional user interface elements. The user interfaces in FIGS. 11A-11N are further used to illustrate the processes described below with reference to FIGS. 12A-12C.

Many electronic devices have graphical user interfaces with controls which, upon activation, perform various operations at the device. Some controls are linked to more important functions than other controls (e.g., a button in a user interface that allows users to permanently delete user accounts, modify security settings on files or folders, change account passwords, and the like). It would be helpful to provide a user with feedback indicating whether or not a particular control is linked to an important function, for example, by making some controls harder to activate than others. However, when different controls have different activation requirements, the user may be confused as to the requirements to activate a particular control. The embodiments described below provide a convenient and intuitive interface that provides an indication of progress toward activating a control by providing feedback to the user based on intensity of a contact. In particular, FIGS. 14A-14M illustrate exemplary user interfaces for managing activation of controls based on the intensity (e.g., pressure) and/or duration of a contact. FIGS. 15A-15D are flow diagrams illustrating a method of managing activation of controls based on the intensity (e.g., pressure) and/or duration of a contact. The user interfaces in FIGS. 14A-14M are used to illustrate the processes in FIGS. 15A-15D.

Exemplary Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), are, optionally, used. It should also be understood that, in some embodiments, the device is not a portable communications device, but is a desktop computer with a touch-sensitive surface (e.g., a touch screen display and/or a touch pad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive displays 112 in accordance with some embodiments. Touch-sensitive display 112 is sometimes called a "touch screen" for convenience, and is sometimes known as or called a touch-sensitive display system. Device 100 includes memory 102 (which optionally includes one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch sensitive surface, or to a substitute (proxy) for the force or pressure of a contact on the touch sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU 120 and the peripherals interface 118, is, optionally, controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161 and one or more input controllers 160 for other input or control devices. The one or more input controllers 160 receive/send electrical signals from/to other input or control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, infrared port, USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output corresponds to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device, so that the touch screen display is enabled for use as a viewfinder for still and/or video image acquisition. In some embodiments, another optical sensor is located on the front of the device so that the user's image is, optionally, obtained for videoconferencing while the user views the other video conference participants on the touch screen display.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112 which is located on the front of device 100.

Device 100 optionally also includes one or more proximity sensors 166. FIG. 1A shows proximity sensor 166 coupled to peripherals interface 118. Alternately, proximity sensor 166 is coupled to input controller 160 in I/O subsystem 106. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112 which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
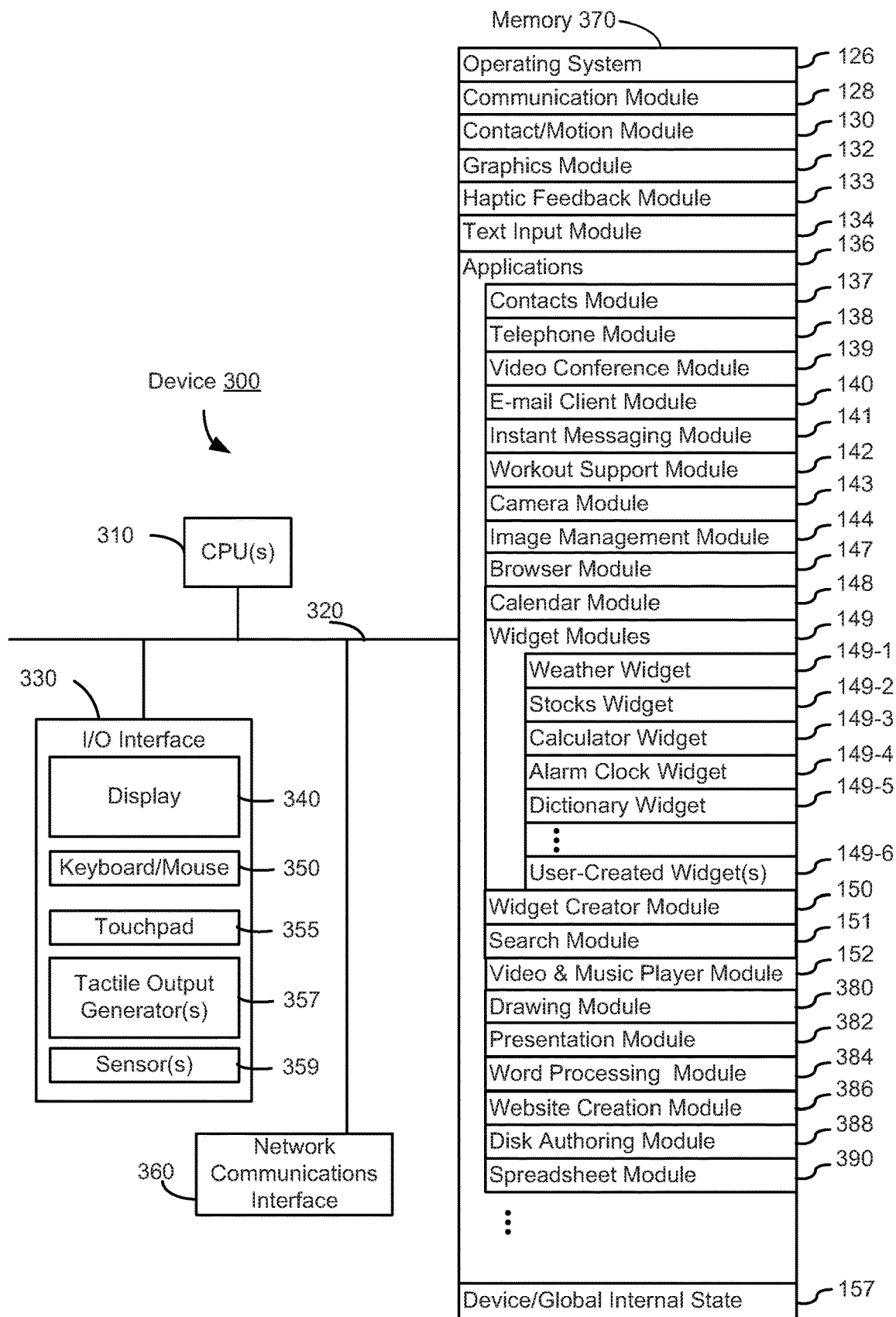
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 optionally detects contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact) determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined thresholds values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns and intensities. Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
  contacts module 137 (sometimes called an address book or contact list);
  telephone module 138;
  video conferencing module 139;
  e-mail client module 140;
  instant messaging (IM) module 141;
  workout support module 142;
  camera module 143 for still and/or video images;
  image management module 144;
  browser module 147;
  calendar module 148;
  widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  widget creator module 150 for making user-created widgets 149-6;
  search module 151;
  video and music player module 152, which is, optionally, made up of a video player module and a music player module;
  notes module 153;
  map module 154; and/or
  online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 are, optionally, used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 are, optionally, used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 are, optionally, used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
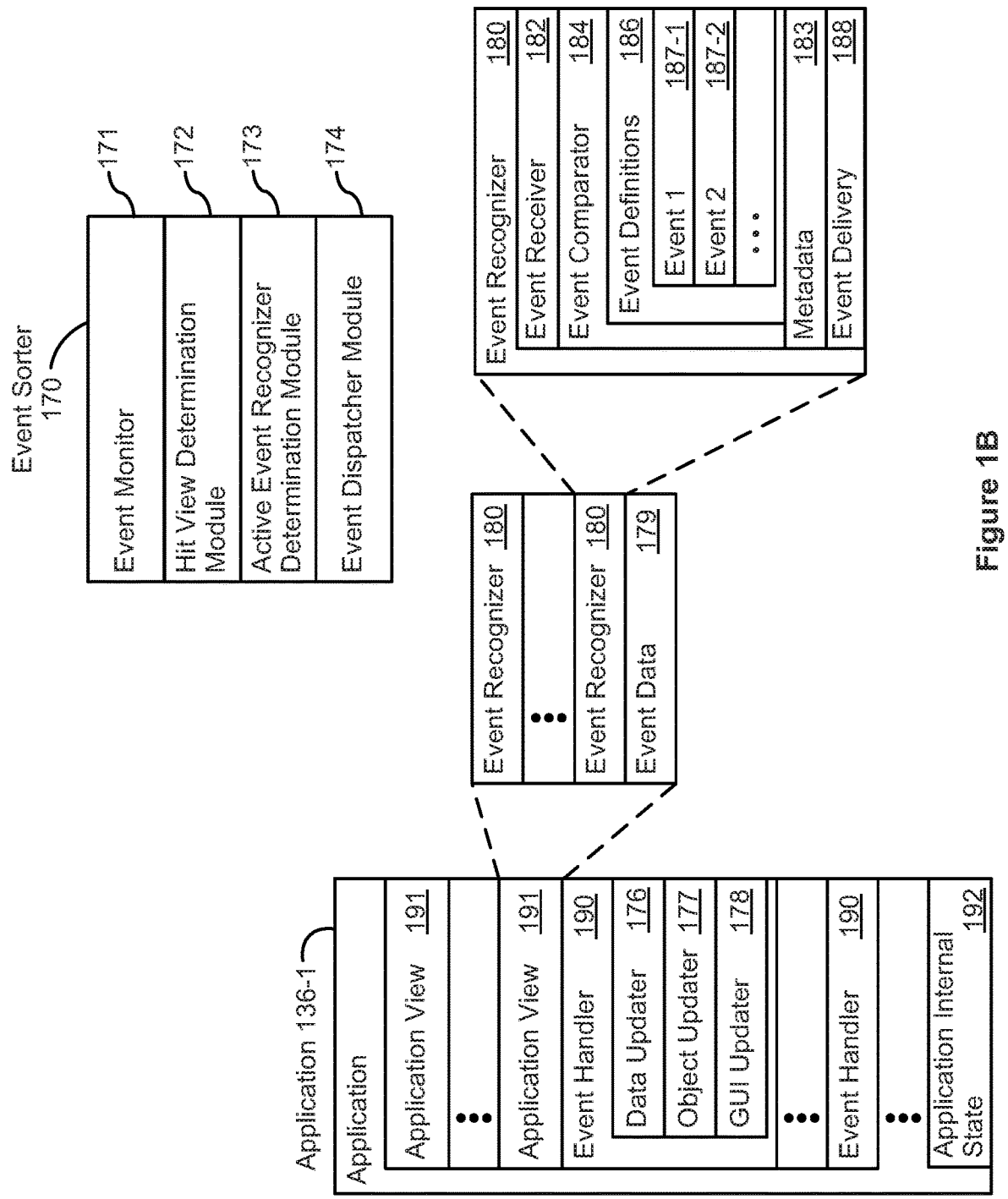
FIG. 1B is a block diagram illustrating exemplary components for event handling in accordance with some embodiments.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
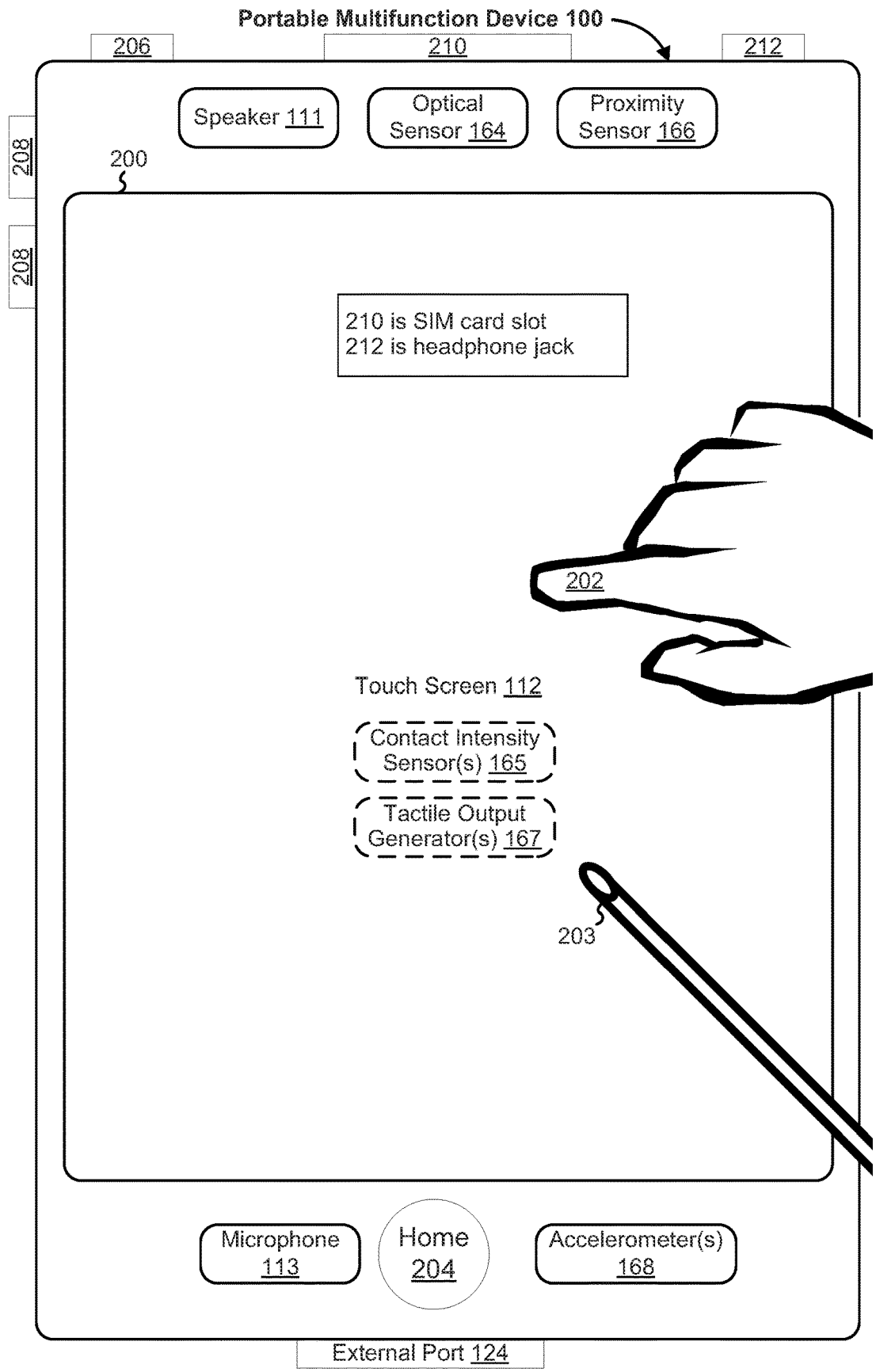
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that is, optionally, implemented on portable multifunction device 100.

Figure 4A:
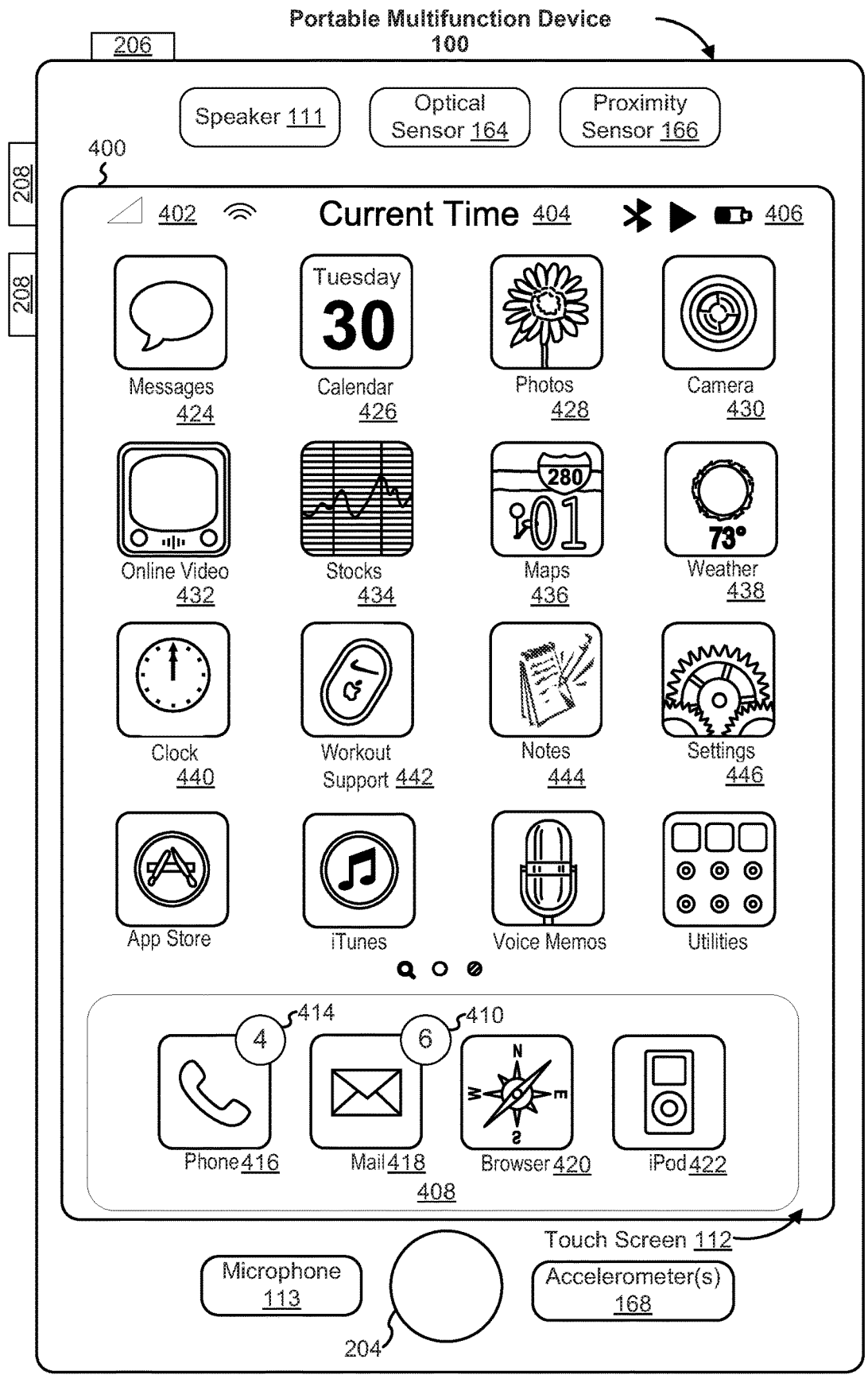
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and Icons for other applications, such as:
  Icon 424 for IM module 141, labeled "Text;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video"
  Icon 434 for stocks widget 149-2, labeled "Stocks;"
  Icon 436 for map module 154, labeled "Map;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, which provides access to settings for device 100 and its various applications 136.

It should be noted that the icon labels illustrated in FIG. 4A are merely exemplary. For example, icon 422 for video and music player module 152 are labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
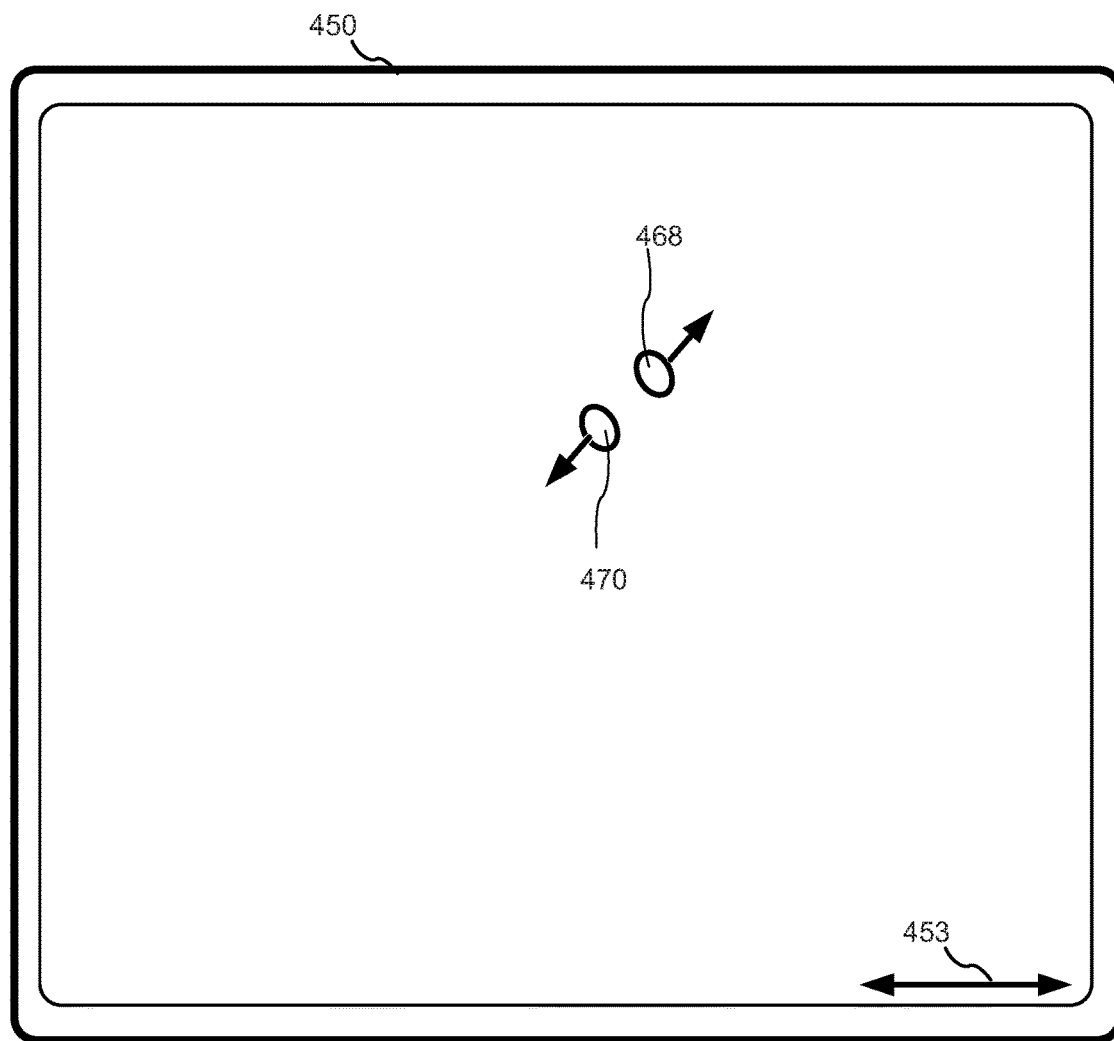
FIG. 4B illustrates an exemplary user interface for a multifunction device with a touch-sensitive surface that is separate from the display in accordance with some embodiments.
Figure 4B:
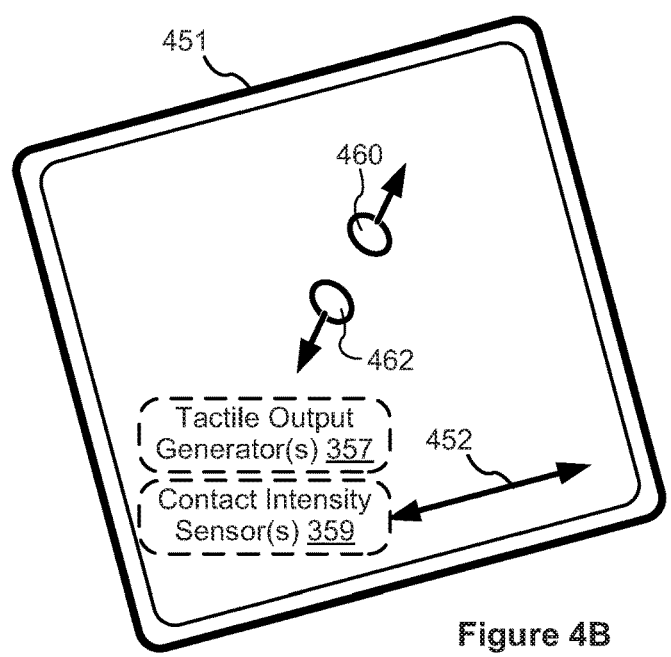

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although some of the examples which follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments the touch sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or touch screen 112 in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact or a selection box) over a respective button while a press input is detected on the touch-sensitive surface (e.g., a touchpad or touch screen) will indicate that the user is intending to activate the respective button (as opposed to other user interface elements shown on a display of the device).

The user interface figures described below include various intensity diagrams that show the current intensity of the contact on the touch-sensitive surface relative to one or more intensity thresholds (e.g., a contact detection intensity threshold $IT_0$, a light press intensity threshold $IT_L$, a deep press intensity threshold $IT_D$, and/or one or more other intensity thresholds). This intensity diagram is typically not part of the displayed user interface, but is provided to aid in the interpretation of the figures. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with an intensity below the light press intensity threshold (e.g., and above a nominal contact-detection intensity threshold $IT_0$ below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of intensity of the contact from an intensity below the light press intensity threshold $IT_L$ to an intensity between the light press intensity threshold $IT_L$ and the deep press intensity threshold $IT_D$ is sometimes referred to as a "light press" input. An increase of intensity of the contact from an intensity below the deep press intensity threshold $IT_D$ to an intensity above the deep press intensity threshold $IT_D$ is sometimes referred to as a "deep press" input. An increase of intensity of the contact from an intensity below the contact-detection intensity threshold $IT_0$ to an intensity between the contact-detection intensity threshold $IT_0$ and the light press intensity threshold $IT_L$ is sometimes referred to as detecting the contact on the touch-surface. A decrease of intensity of the contact from an intensity above the contact-detection intensity threshold $IT_0$ to an intensity below the contact intensity threshold $IT_0$ is sometimes referred to as detecting liftoff of the contact from the touch-surface. In some embodiments $IT_0$ is zero. In some embodiments $IT_0$ is greater than zero. In some illustrations a shaded circle or oval is used to represent intensity of a contact on the touch-sensitive surface. In some illustrations a circle or oval without shading is used represent a respective contact on the touch-sensitive surface without specifying the intensity of the respective contact.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90% or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

User Interfaces and Associated Processes

Moving a User Interface Object Based on an Intensity of a Press Input

Many electronic devices have graphical user interfaces with moveable user interface objects (e.g., a handle of a slider control, such as a thumb of a volume or content slider or scrubber; an application window; an icon on a desktop or file manager application; or an image). Typically, such electronic devices allow the user to interact with and move the moveable user interface objects by physically dragging the user interface objects, along a desired and/or predefined trajectory, to a desired location. For example, a user can physically move or displace the thumb of a volume control slider to achieve a desired volume or loudness of sound emanating from the device. In such designs, the user is required to physically move a contact (e.g., a contact on a touch screen or a touch sensitive surface) in order to move the moveable user interface object on the display. Alternatively, when a user interface object is confined to a predefined path, selecting a location on the predefined path will move the user interface object to the location on the predefined path. For example, a user can select (e.g., "click on") a middle of a volume slider control to adjust a volume level of the device to a volume level corresponding to the middle of the volume slider control. Additionally, it would be advantageous to provide an intuitive and accurate way of moving a user interface object along a predefined path while maintaining the ability of the user to move the user interface object to a selected location on the predefined path.

The disclosed embodiments describe a system and method for moving user interface objects at varying speeds or through varying displacements using a press input (e.g., a contact on a touch screen or a touch sensitive surface), such that the extent of motion of the user interface object (e.g., speed and/or displacement of the user interface object) varies in accordance with (e.g., depends on) the intensity or pressure of the press input on a touch screen or touch sensitive surface, rather than on a physical displacement of the contact on the touch-sensitive surface. Accordingly, the disclosed embodiments reduce cognitive burden on the user associated with moving a physical contact on a touch screen or touch sensitive surface by eliminating the need for the user move the contact in order to move a user interface object on a display.

FIGS. 5A-5Y illustrate exemplary user interfaces for moving user interface objects at varying speeds or through varying displacements based on variable intensities of a press input, in accordance with some embodiments. The user interfaces in these figures are used to illustrate the processes described below, including the processes in FIGS. 6A-6D. FIGS. 5A-5Y include intensity diagrams that show changes in the current intensity of the contact on the touch-sensitive surface relative to a plurality of intensity thresholds (e.g., "$IT_0$," "$IT_1$," "$IT_L$," and "$IT_D$"). In some embodiments, operations similar to those described below with reference to $IT_L$ are performed with reference to a different intensity threshold (e.g., "$IT_D$").

FIG. 5A illustrates user interface 14104 (e.g., a video in a video player application), with a moveable user interface object 14108 (e.g., a "handle" or "thumb" of a slider control for adjusting a playback position of video content in the video player that is constrained to a predefined path associated with the slider control), that is displayed on display 450. FIGS. 5A-5C illustrate moving user interface object 14108, in response to a press input (e.g., an increase in intensity of a contact detected on a touch-sensitive surface) detected on touch-sensitive surface 451, directly to a first location (e.g., the location of focus selector 14110) when the press input has an intensity that is above (e.g., greater than) a predefined activation threshold (e.g., an activation threshold that corresponds to a "mouse click" intensity threshold in other portions of the user interface, such as $IT_L$).

In FIG. 5A, at a time T0, prior to T1, no contact is present or detected on touch-sensitive surface 451 and focus selector 14110 is at a first location in user interface 14104. In FIG. 5B, at time T1, a contact (e.g., contact 14112 in FIG. 5B) is detected on the touch-sensitive surface 451 while focus selector 14110 is at the first location in user interface 14104. As shown in FIG. 5B, contact 14112 has an intensity that is above (e.g., greater than) predefined activation threshold (e.g., intensity threshold $IT_L$). In FIG. 5C, at a time shortly after or subsequent to T1 (e.g., a few milliseconds after T1 or some other time period that is short enough that the movement appears, to the user, to happen substantially instantaneously in response to increasing the intensity of the contact above the predefined activation threshold), when the contact has an intensity that is above the predefined activation threshold (e.g., intensity threshold $IT_L$, FIG. 5C), user interface object 14108 (e.g., the handle of the slider control) is moved directly to the first location (corresponding to the location of the focus selector 14110).

In other words, when the device detects a contact on the touch-sensitive surface and an increase in intensity of the contact (e.g., a press input) that is above the predefined activation threshold, the user interface object is moved directly to the location of the focus selector.

FIGS. 5D-5G illustrate, in response to the detected press input, moving the user interface object toward the first location in the user interface in accordance with (or based on) the intensity of the press input when the press input has an intensity that is below (e.g., lower than) the predefined activation threshold and when gradual-movement criteria are met (e.g., when the contact corresponding to the press input has an intensity above a movement-initiation intensity threshold).

Figure 5D:
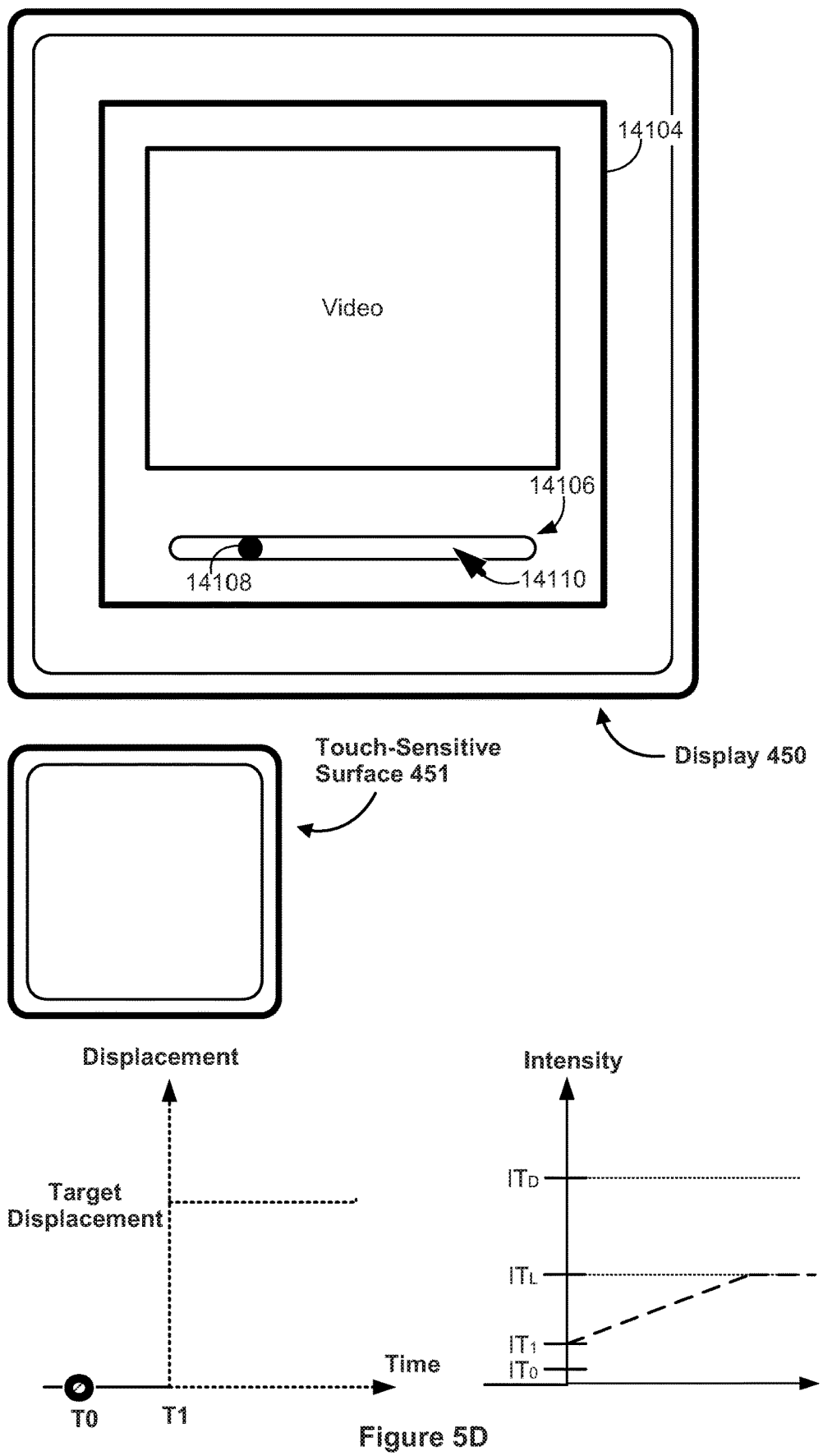
Figure 5E:
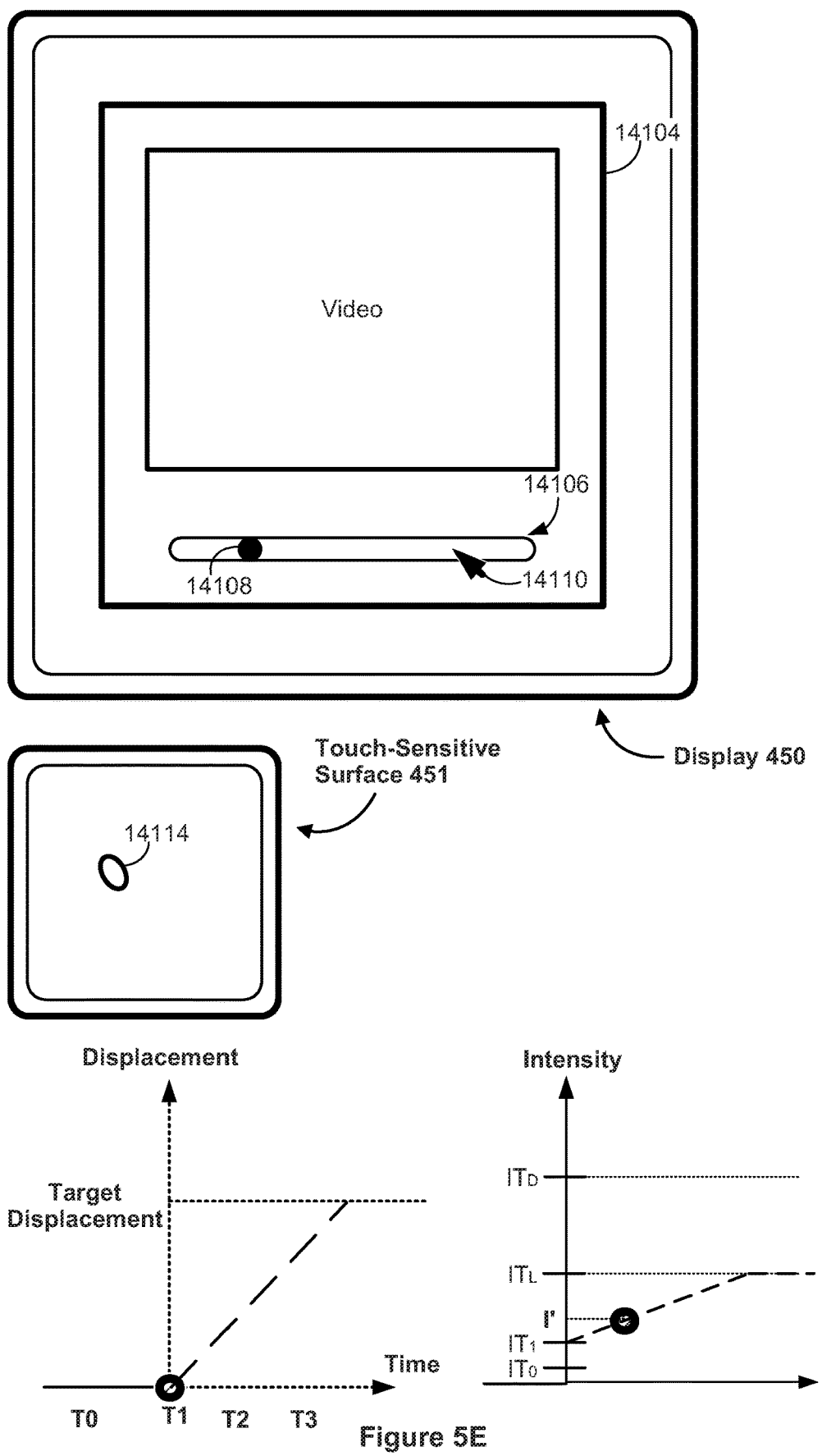
Figure 5F:
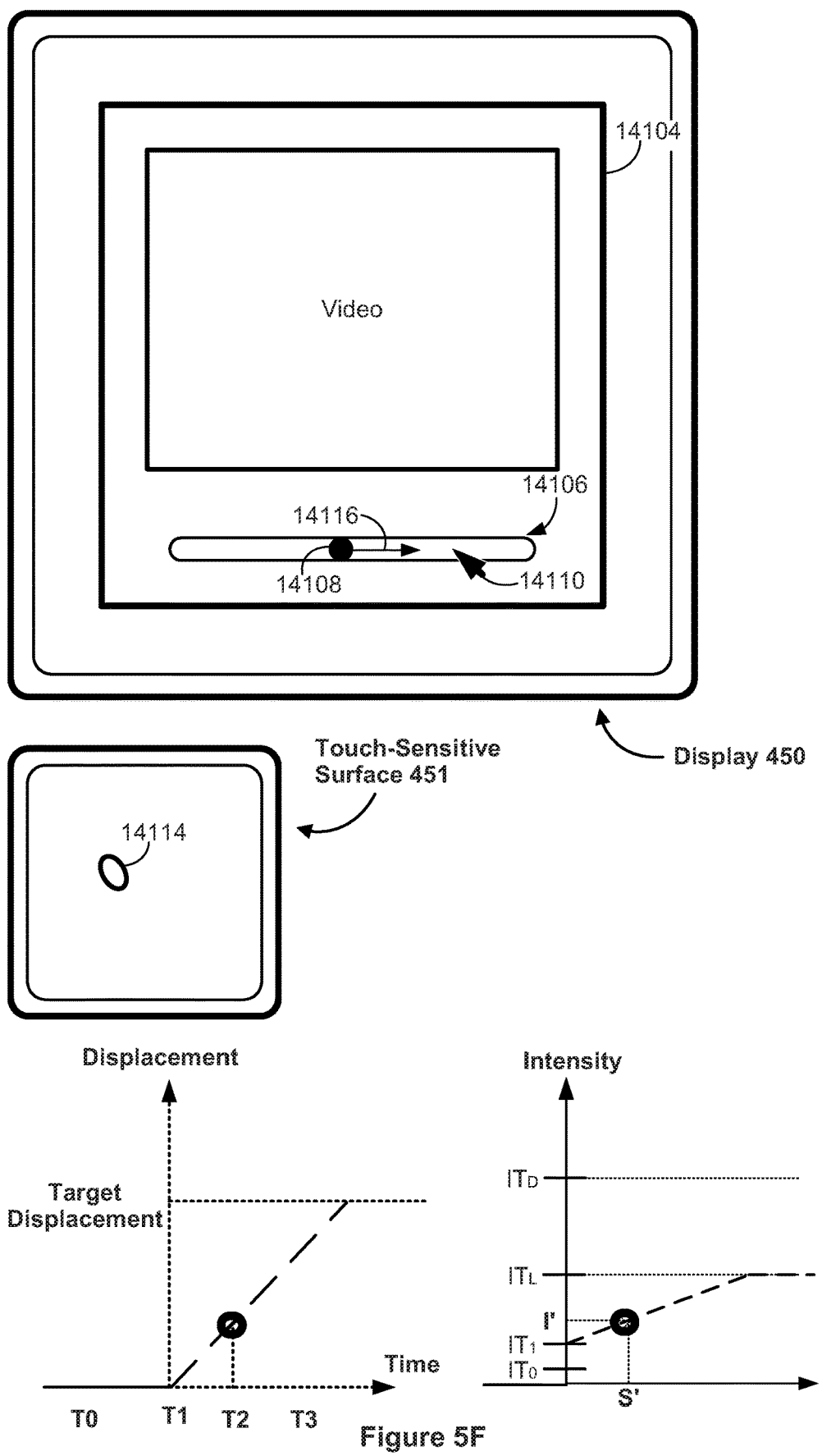
Figure 5G:
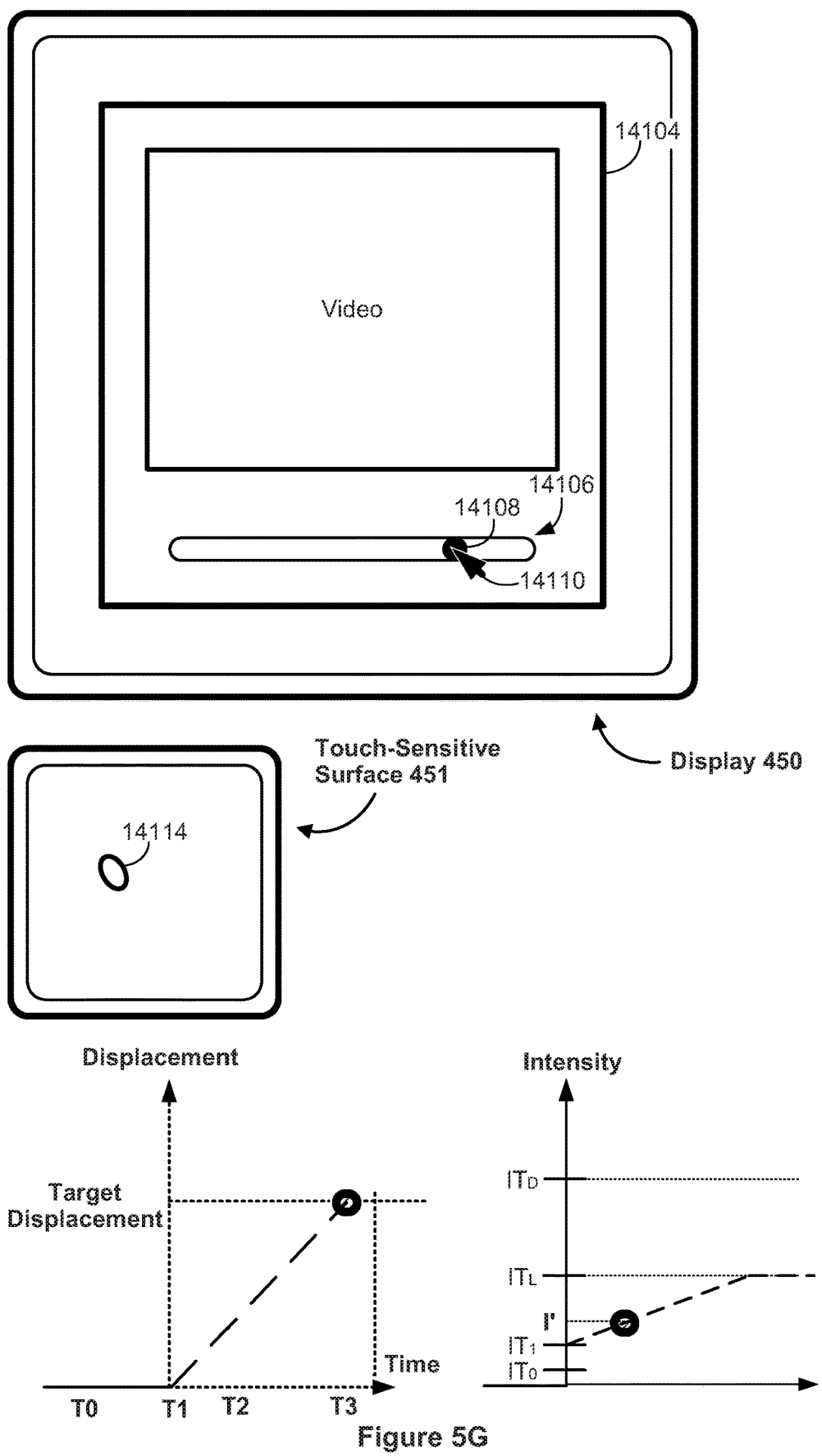

In FIG. 5D, at a time T0, prior to T1, no contact is present or detected on touch-sensitive surface 451 and focus selector 14110 is at a first location in user interface 14104. In FIG. 5E, at time T1, a press input (e.g., an increase in intensity of contact 14114 in FIG. 5E) is detected on the touch-sensitive surface 451 while focus selector 14110 is at the first location in user interface 14104. As shown in FIG. 5E, contact 14114 has an intensity I' that is below (e.g., lower than) predefined activation threshold (e.g., intensity threshold $IT_L$) and meets gradual-movement criteria (e.g., intensity I' is greater than or above a movement-initiation intensity threshold $IT_1$). In FIG. 5F, at a time T2, after or subsequent to T1, when contact 14114 has an intensity I' that is below (e.g., lower than) predefined activation threshold (e.g., intensity threshold $IT_L$) and meets gradual-movement criteria (e.g., intensity I' is greater than or above a movement-initiation intensity threshold $IT_1$), user interface object 14108 (e.g., the handle of the slider control) is moved, from its preliminary location to an intermediate location in accordance with the intensity of the contact (e.g., at a speed S' corresponding to the intensity I' of contact 14114), toward the first location (corresponding to the location of the focus selector 14110). In FIG. 5G, at a time T3, after or subsequent to T2, when the contact 14114 continues to have an intensity I" that is below (e.g., lower than) predefined activation threshold (e.g., intensity threshold $IT_L$) and continues to meet gradual-movement criteria (e.g., intensity I' is greater than or above a movement-initiation intensity threshold $IT_1$), user interface object 14108 is moved, from its intermediate location (shown in FIG. 5F) to the first location (e.g., corresponding to the location of the focus selector 14110), in accordance with the intensity of contact 14114 (e.g., at a speed S' corresponding to the intensity I' of the contact).

In other words, when the device detects a contact on the touch-sensitive surface and an increase in intensity of the contact (e.g., a press input) that is below the predefined activation threshold but still meets gradual-movement criteria (e.g., if the contact has an intensity greater than a movement-initiation intensity threshold), the user interface object is moved toward the location of the focus selector in accordance with the intensity of the contact.

FIGS. 5H-5L illustrate, in response to the detected contact, moving the user interface object toward the first location in the user interface in accordance with (or based on) the intensity of the contact such that a speed at which the user interface object is moved corresponds to the intensity of the contact, when the contact has an intensity that is below (e.g., lower than) the predefined activation threshold and when gradual-movement criteria are met (e.g., when the press input has an intensity above a movement-initiation intensity threshold).

Figure 5H:
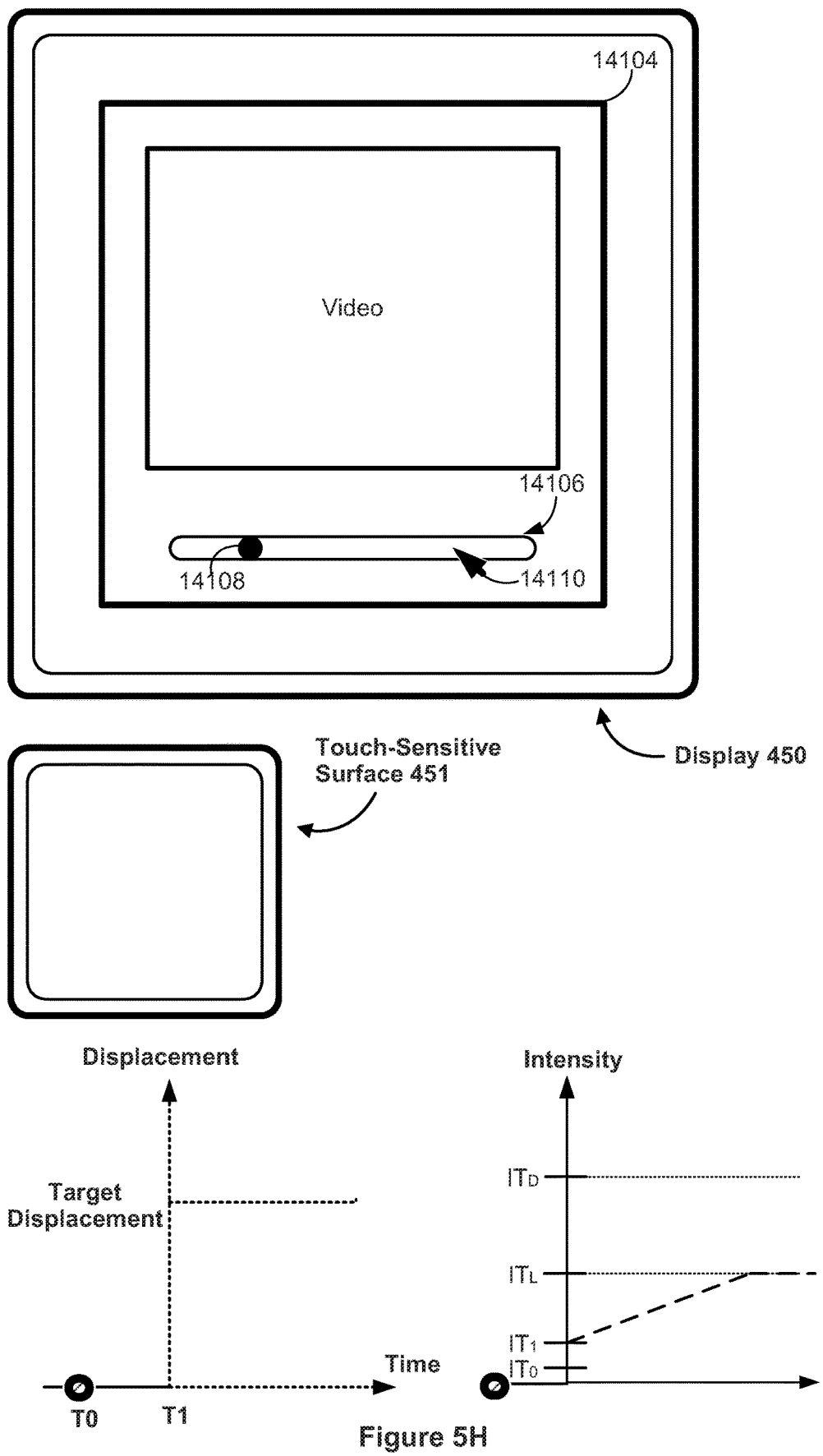
Figure 5I:
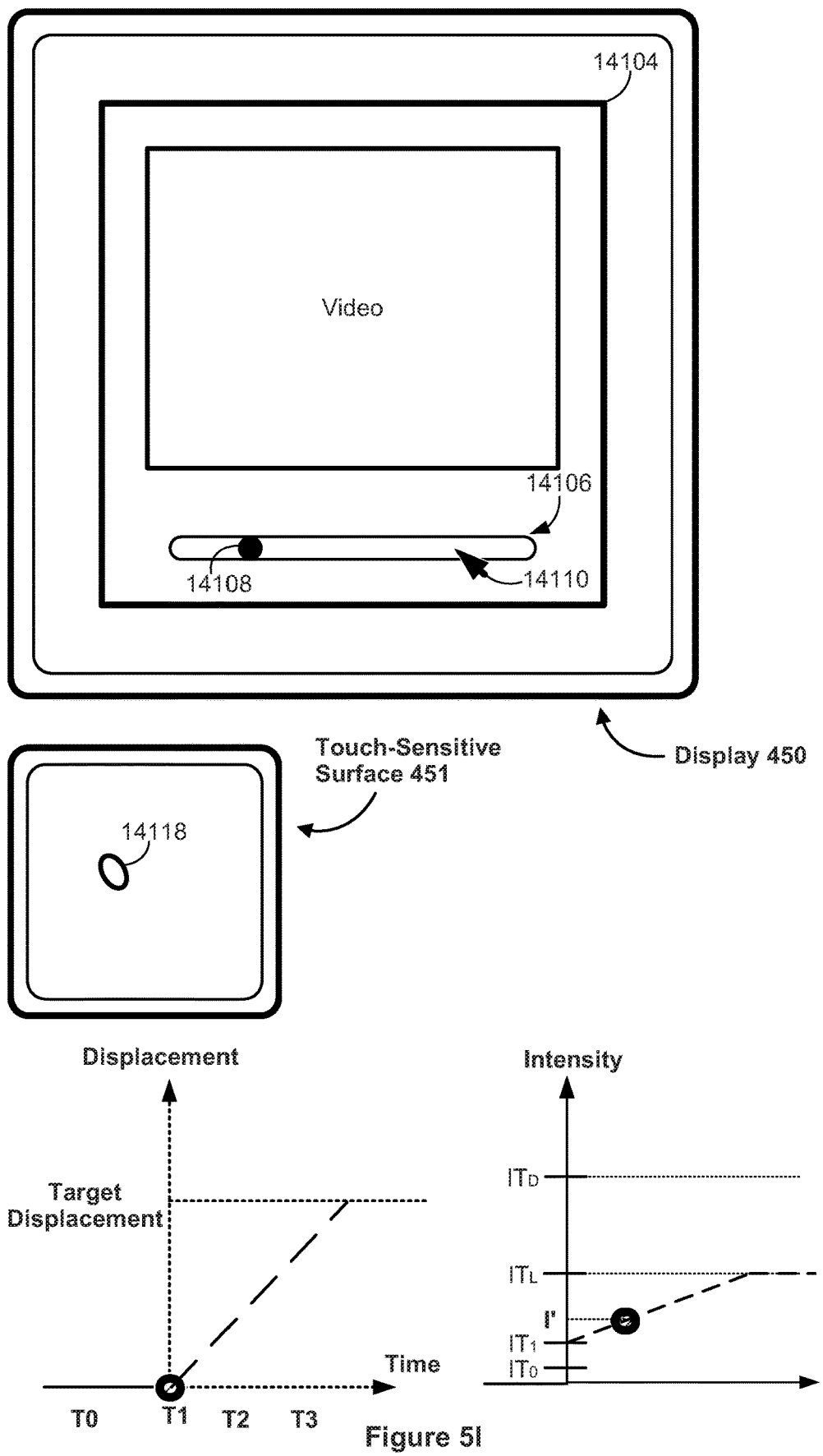
Figure 5J:
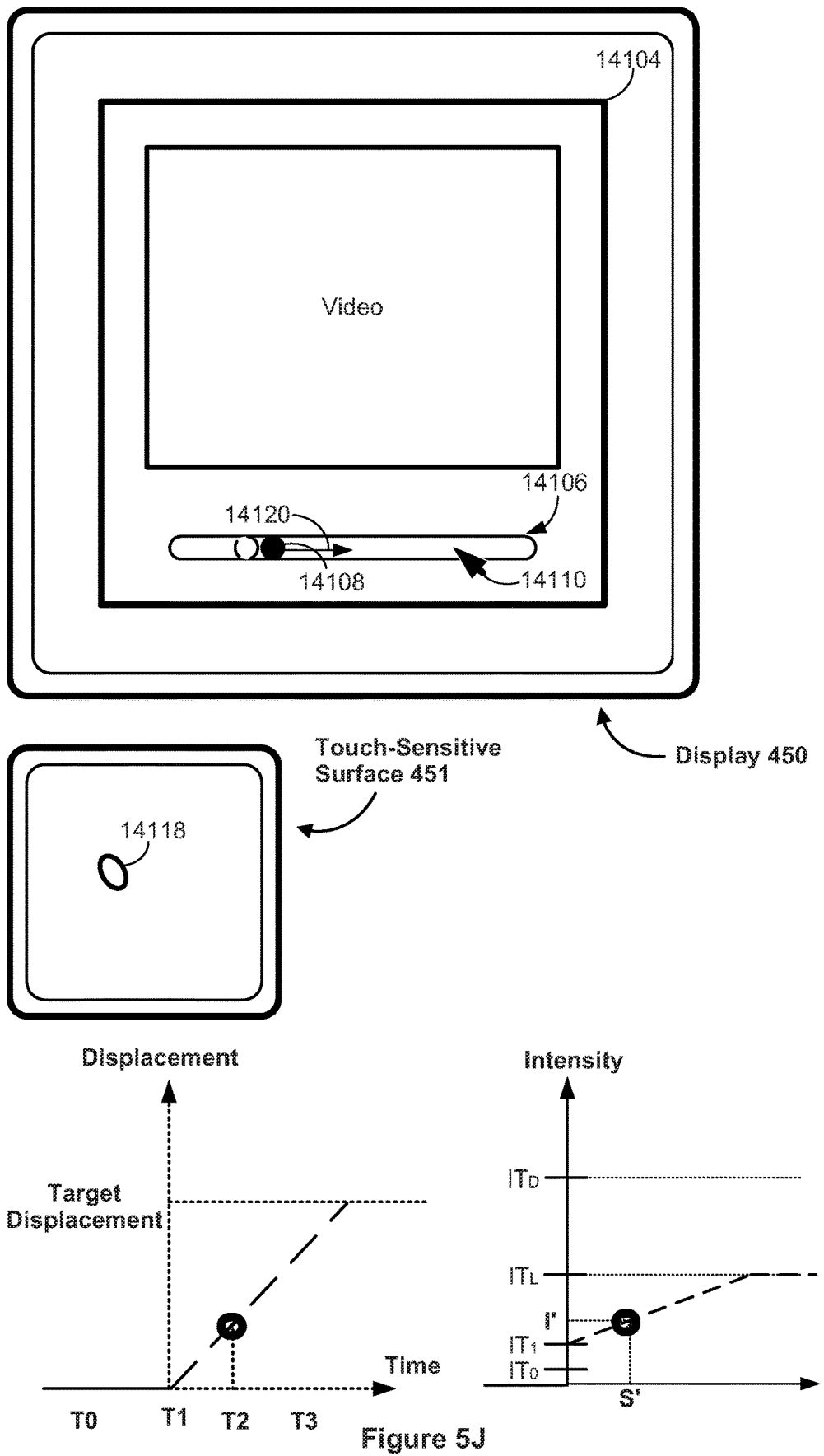

In FIG. 5H, at a time T0, prior to T1, no contact is present or detected on touch-sensitive surface 451 and focus selector 14110 is at a first location in user interface 14104. In FIG. 5I, at time T1, a contact (e.g., contact 14118 in FIG. 5I) is detected on the touch-sensitive surface 451 while focus selector 14110 is at the first location in user interface 14104. As shown in FIG. 5I, contact 14118 has an intensity I' that is below (e.g., lower than) predefined activation threshold (e.g., intensity threshold $IT_L$) and meets gradual-movement criteria (e.g., intensity I' is greater than or above a movement-initiation intensity threshold $IT_1$). In FIG. 5J, at a time T2, after T1, when the contact has an intensity I' that is below (e.g., lower than) predefined activation threshold (e.g., intensity threshold $IT_L$) and meets gradual-movement criteria (e.g., intensity I' is greater than or above a movement-initiation intensity threshold $IT_1$), user interface object 14108 (e.g., the handle of the slider control) is moved, from its preliminary location to a first intermediate location in accordance with the intensity of contact 14118 (e.g., at speed S' corresponding to the intensity I' of the contact), toward the first location (e.g., corresponding to the location of the focus selector 14110).

Figure 5K:
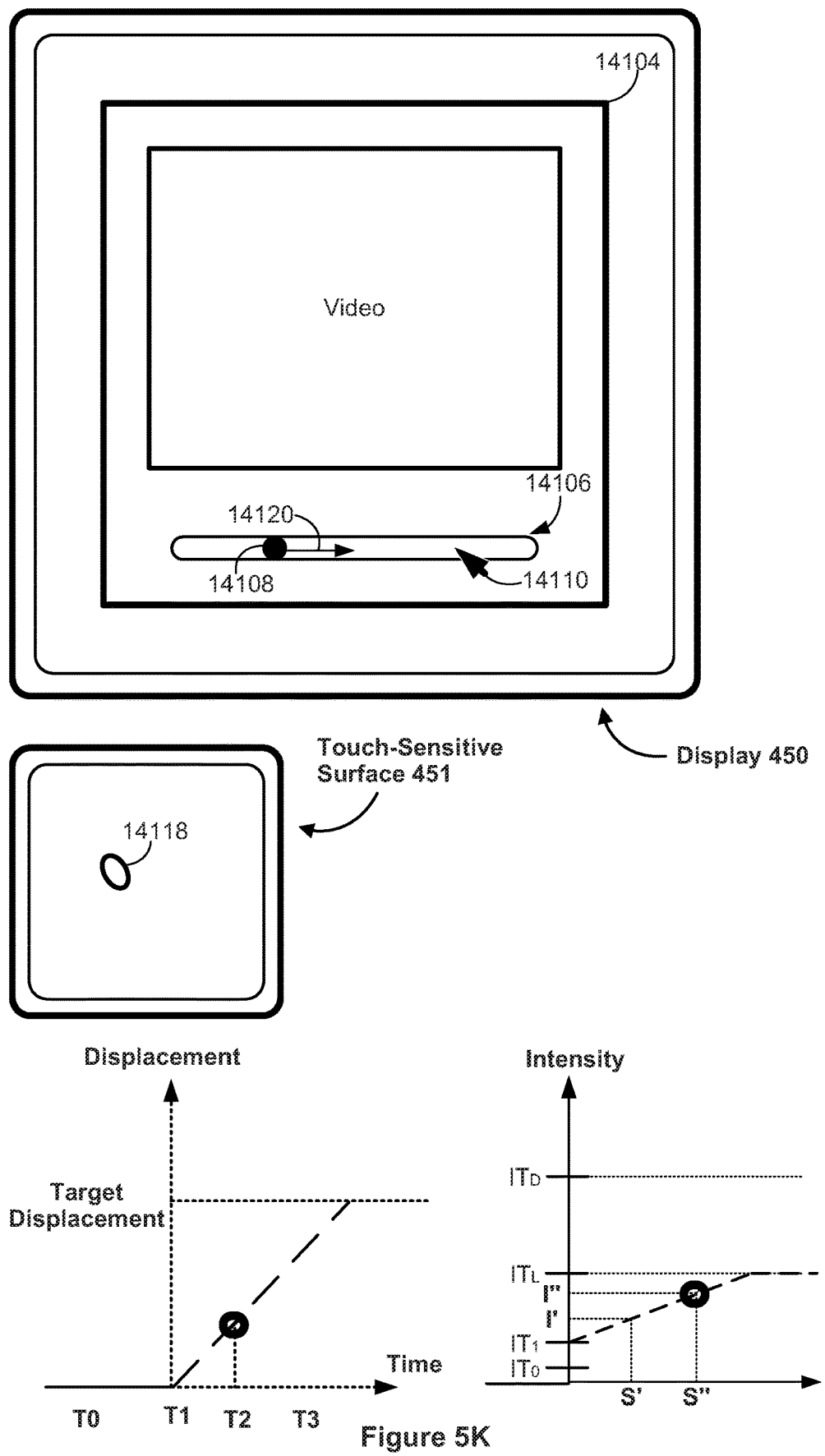
Figure 5L:
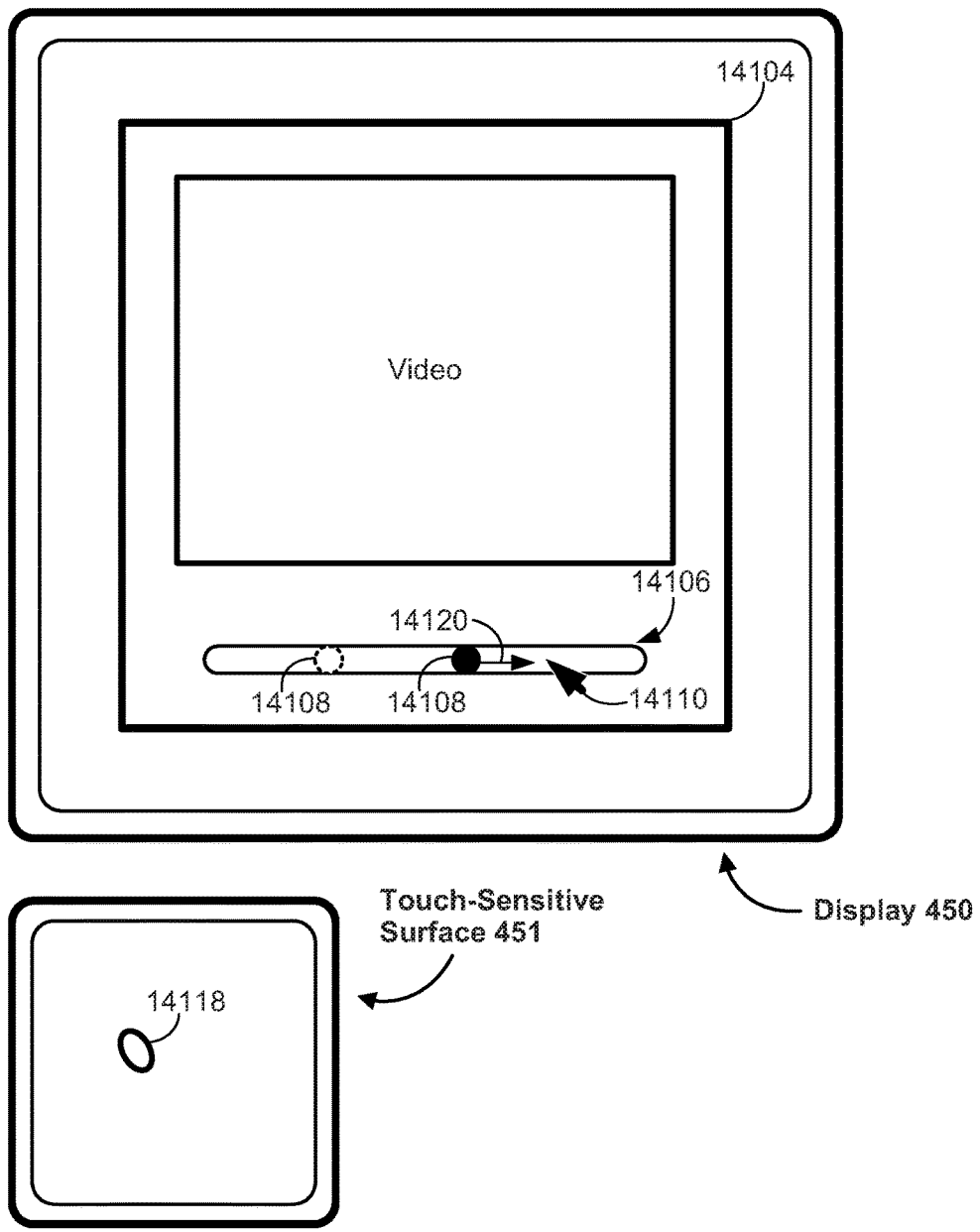
Figure 5L:
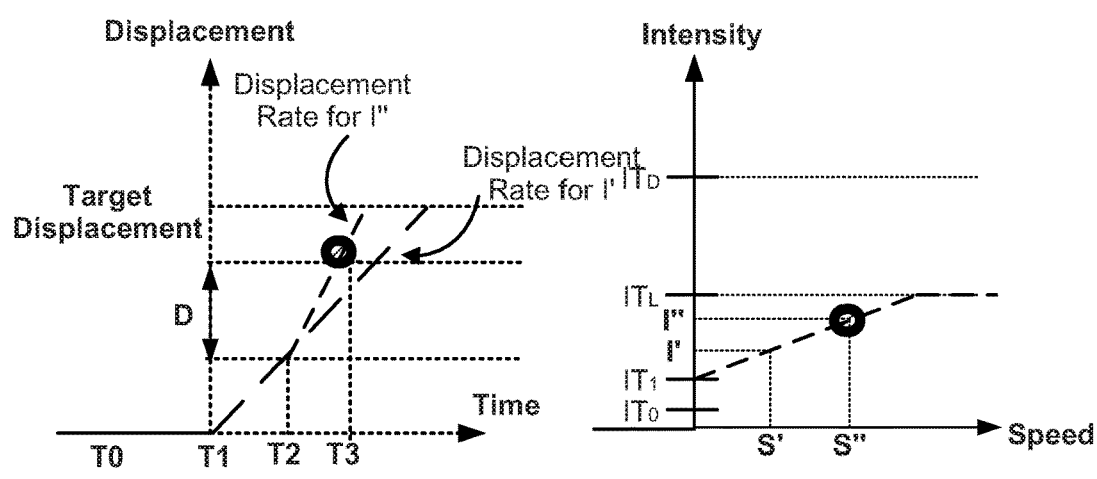

In FIG. 5K, contact 14118 has an intensity I", above intensity I' (described with reference to FIGS. 5I-5J), that is below (e.g., lower than) predefined activation threshold (e.g., intensity threshold $IT_L$) and meets gradual-movement criteria (e.g., intensity I" is greater than or above a movement-initiation intensity threshold $IT_1$). For example, a user pressed down harder on touch-sensitive surface 451 at time T2. In FIG. 5L, at a time T3, after T2, when contact 14118 continues to have an intensity I"" that is below (e.g., lower than) predefined activation threshold (e.g., intensity threshold $IT_L$) and continues to meet gradual-movement criteria (e.g., intensity I" is greater than or above a movement-initiation intensity threshold $IT_1$), user interface object 14108 is moved, from its first intermediate location (shown in FIG. 5J) to a second intermediate location, in accordance with the intensity of contact 14118 (e.g., at a speed S" corresponding to the intensity I" of contact 14118). As shown in FIG. 5L, since intensity I" is greater than intensity I', the corresponding speed S" with which user interface object 14108 is moved when contact has intensity I" is greater than the speed S' at which user interface object 14108 is moved when the contact has intensity I'. Although the intensity-to-speed mapping or correspondence shown in FIGS. 5K-5L is a linear function, in some embodiments, the intensity of the contact corresponding to the press input) is mapped to the speed of the user interface object as any monotonically increasing function (e.g., a quadratic function, an exponential function, a piece-wise linear function, and the like).

In other words, when the device detects a contact on the touch-sensitive surface and an increase in intensity of the contact (e.g., a press input) that is below the predefined activation threshold but still meets the gradual-movement criteria (e.g., if the contact has an intensity greater than a movement-initiation intensity threshold), the user interface object is moved toward the location of the focus selector in accordance with the intensity of the contact such that a speed at which the user interface object is moved corresponds to an intensity of the contact.

Figure 5M:
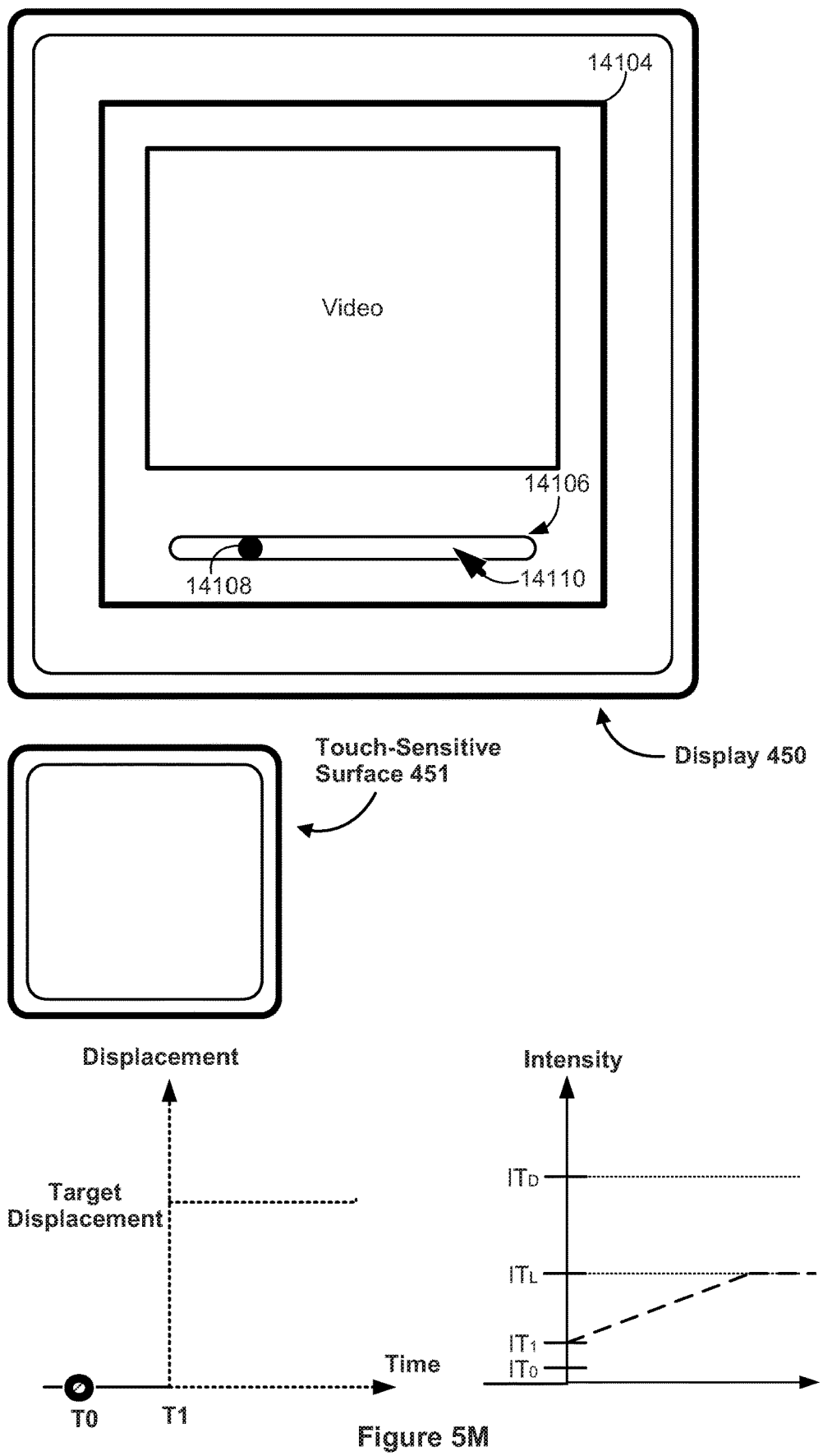
Figure 5N:
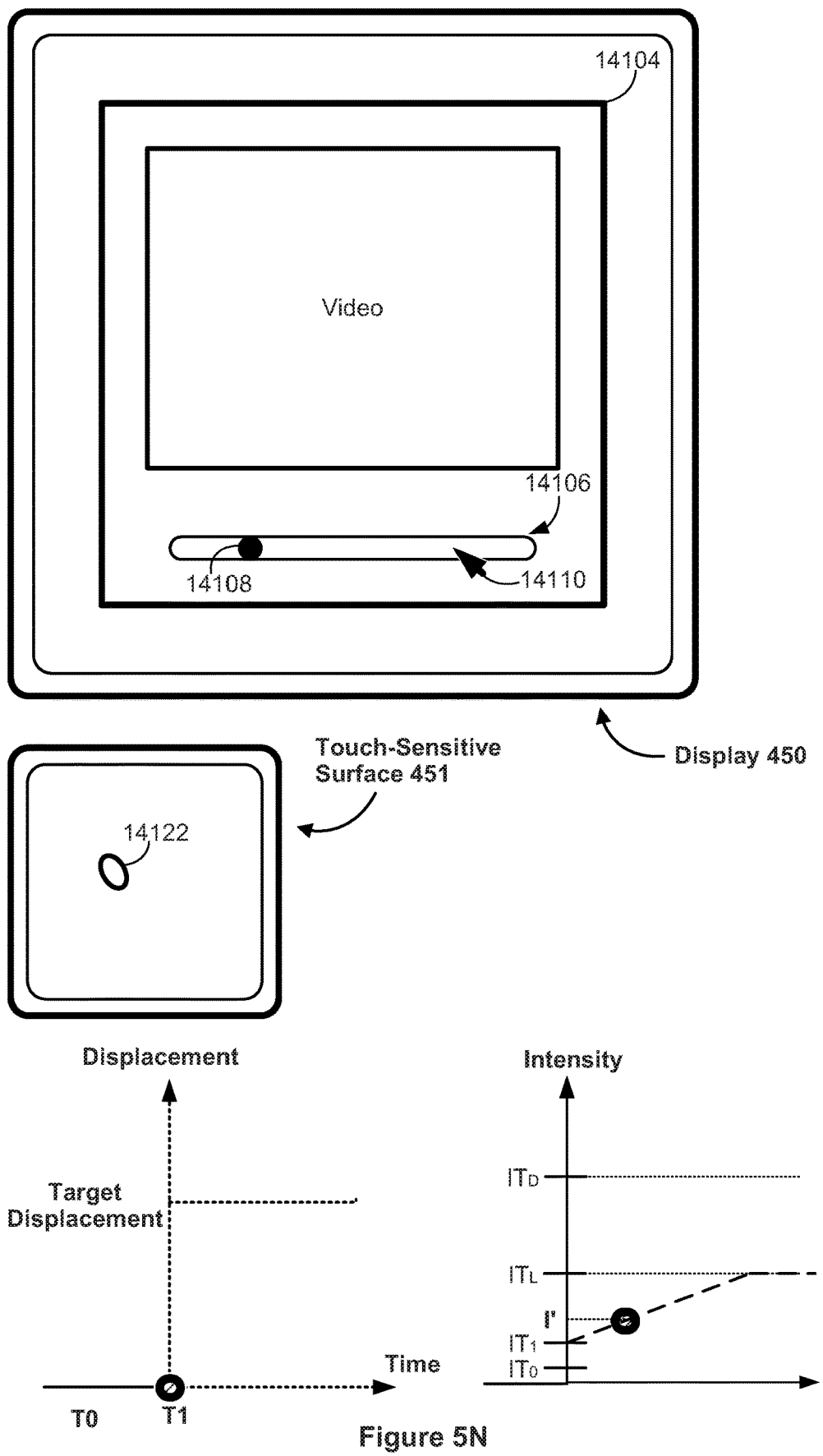
Figure 5O:
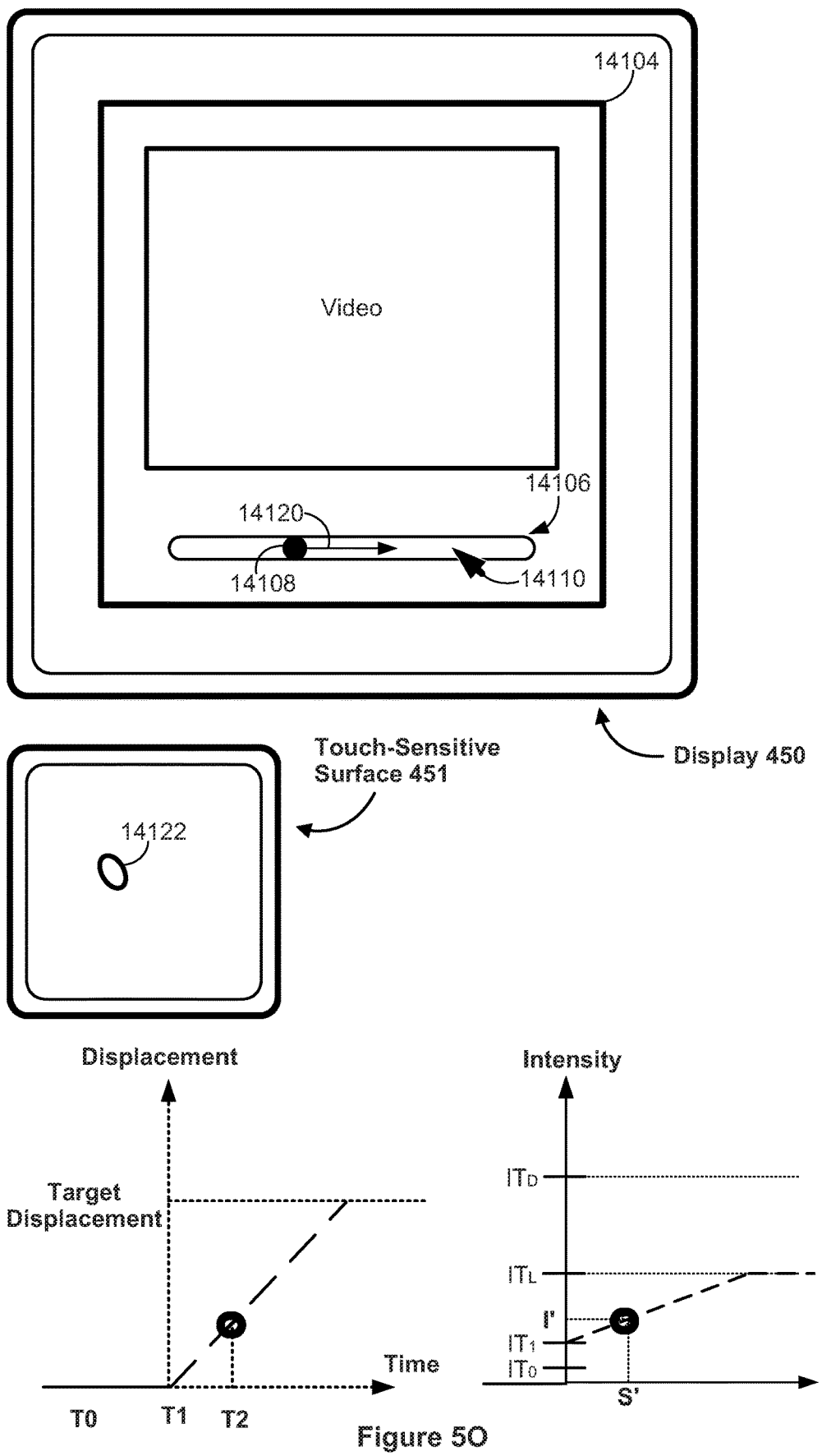
Figure 5P:
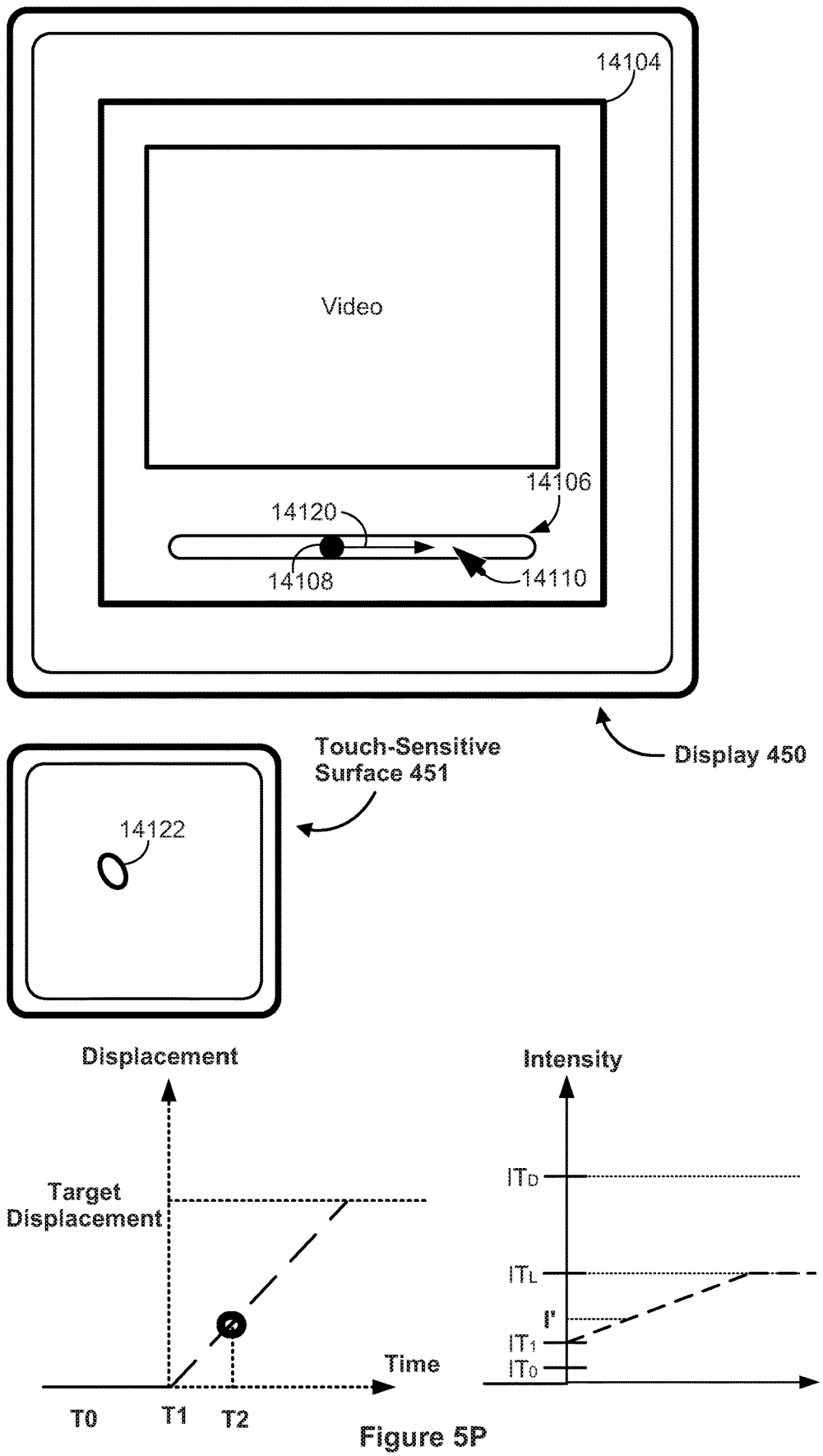
Figure 5Q:
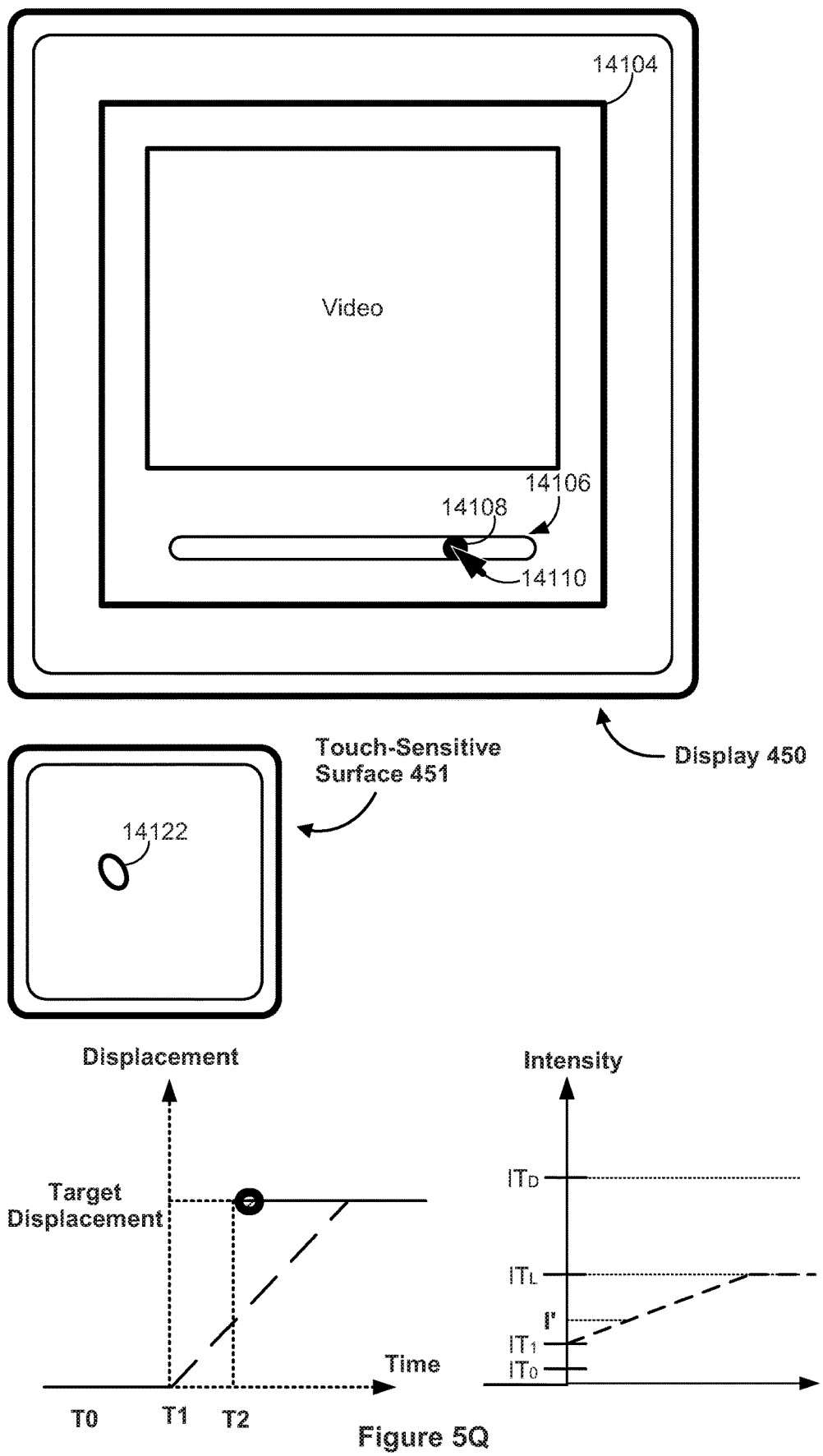

FIGS. 5M-5Q illustrate, moving the user interface object in response to two portions of a detected press input. FIGS. 5M-5O illustrate moving the user interface object toward the first location (e.g., the location of focus selector 14110) in the user interface in the first portion of the contact, in accordance with (or based on) the intensity of the contact, when the contact has an intensity that is below (e.g., lower than) the predefined activation threshold and when gradual-movement criteria are met (e.g., when the press input has an intensity above a movement-initiation intensity threshold). FIGS. 5P-5Q illustrate moving the user interface object in the second portion of the contact directly to the first location when the contact has an intensity that is above (e.g., greater than) a predefined activation threshold.

In the first portion of the press input, as shown in FIG. 5M, at a time T0 prior to T1, no contact is present or detected on touch-sensitive surface 451 and focus selector 14110 is at a first location in user interface 14104. In FIG. 5N, at time T1, a contact (e.g., contact 14122, FIG. 5N) is detected on the touch-sensitive surface 451 while focus selector 14110 is at the first location in user interface 14104. As shown in FIG. 5N, contact 14122 has an intensity I' that is below (e.g., lower than) predefined activation threshold (e.g., intensity threshold $IT_L$) and meets gradual-movement criteria (e.g., intensity I' is greater than or above a movement-initiation intensity threshold $IT_1$). In FIG. 5O, at a time T2, after T1, when the contact 14122 has an intensity I' that is below (e.g., lower than) predefined activation threshold (e.g., intensity threshold $IT_L$) and meets gradual-movement criteria (e.g., intensity I' is greater than or above a movement-initiation intensity threshold $IT_1$), user interface object 14108 (e.g., the handle of the slider control) is moved, from its preliminary location to an intermediate location in accordance with the intensity of contact 14122 (e.g., at a speed S' corresponding to the intensity I' of the contact), toward the first location (corresponding to the location of the focus selector 14110).

In the second portion of the press input, as shown in FIG. 5P, contact 14122 has an intensity that is above (e.g., greater than) predefined activation threshold (e.g., intensity threshold $IT_L$). In FIG. 5Q, at a time shortly after T2 (e.g., a few milliseconds after T2 or some other time period that is short enough that the movement appears, to the user, to happen substantially instantaneously in response to increasing the intensity of the contact above the predefined activation threshold), when contact 14122 has an intensity that is above the predefined activation threshold (e.g., above intensity threshold $IT_L$ in FIG. 5Q), user interface object 14108 (e.g., the handle of the slider control) is moved directly to the first location (corresponding to the location of the focus selector 14110).

Figure 5R:
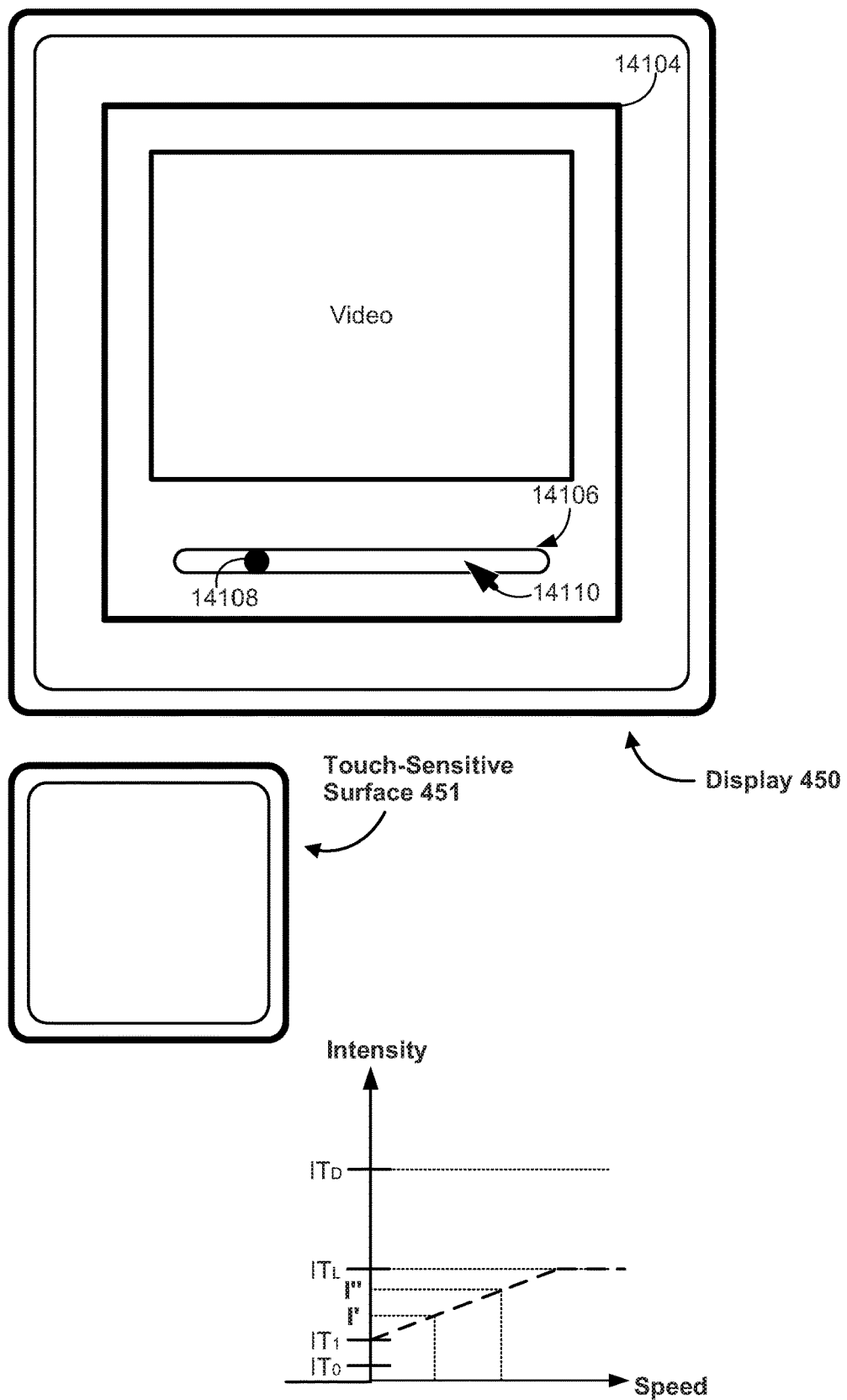
Figure 5S:
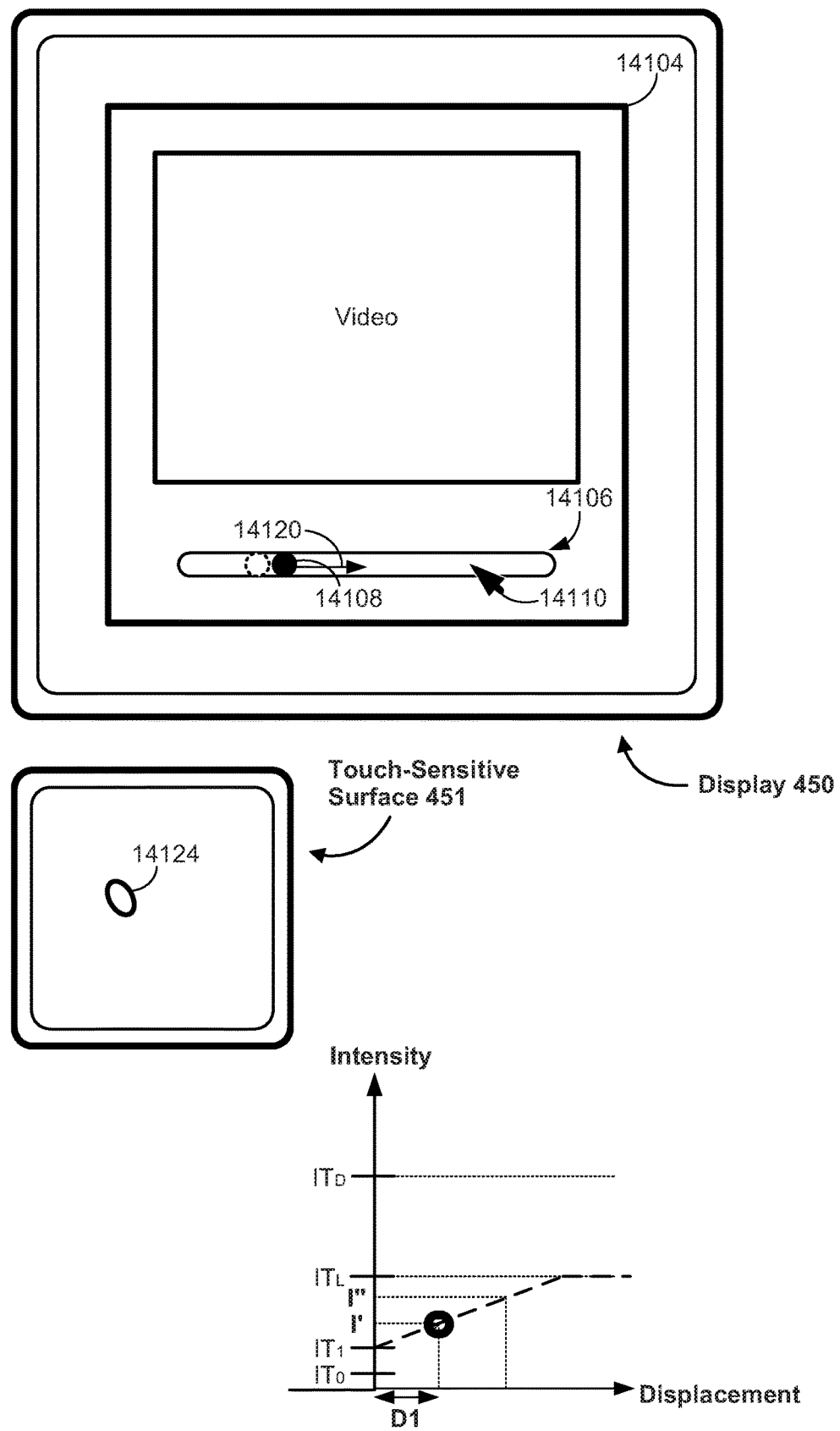
Figure 5T:
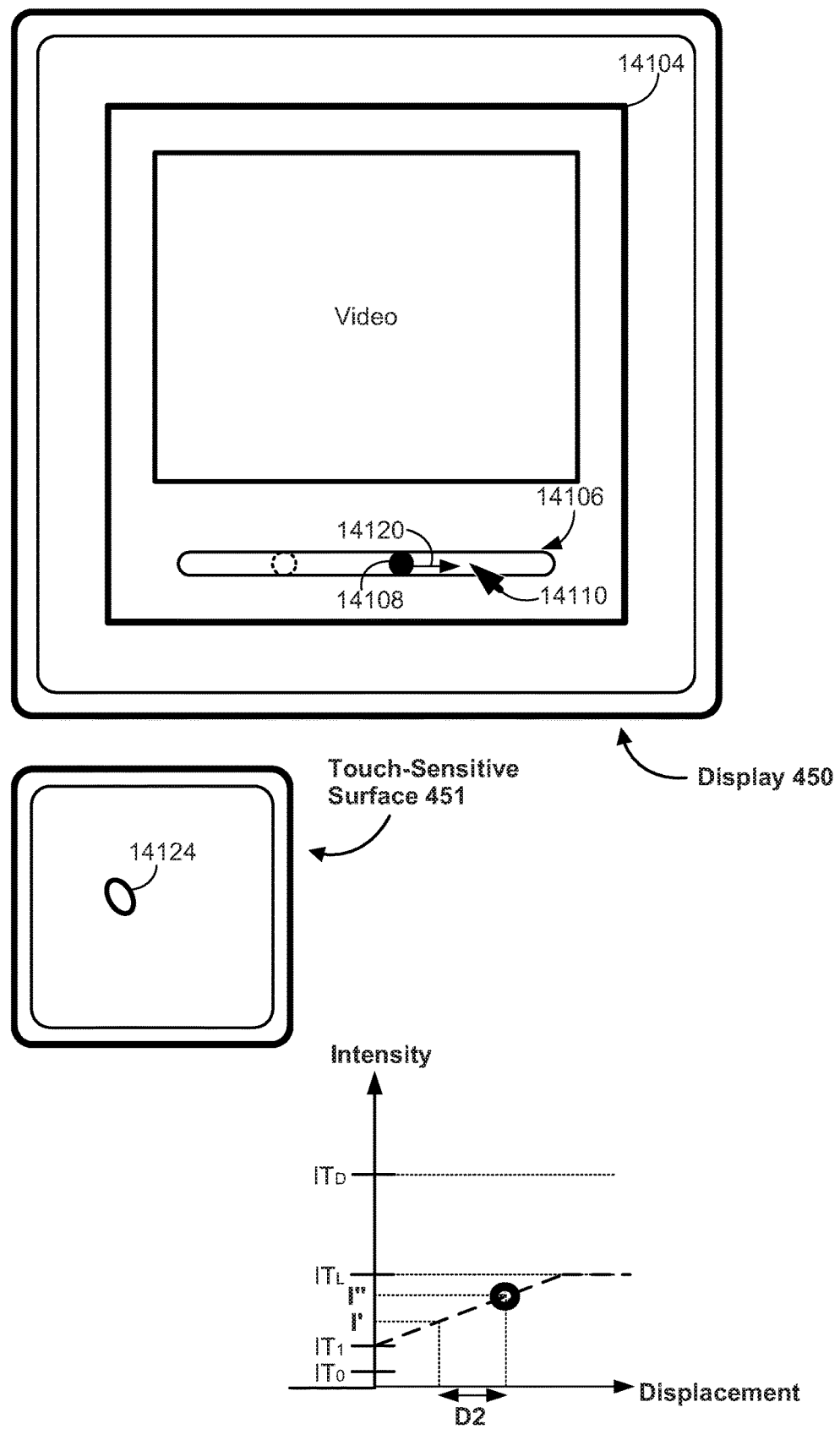

FIGS. 5R-5T illustrate, in response to the detected press input, moving the user interface object toward the first location in the user interface in accordance with (or based on) a change (e.g., increase) in intensity of the contact such that a displacement of (or distance moved by) the user interface object corresponds to the change (e.g., increase) in intensity of the contact, when the contact has an intensity that is below (e.g., lower than) the predefined activation threshold and when gradual-movement criteria are met (e.g., when the press input has an intensity above a movement-initiation intensity threshold).

In FIG. 5R, no contact is present or detected on touch-sensitive surface 451 and focus selector 14110 is at a first location in user interface 14104. In FIG. 5S, a contact (e.g., contact 14124 in FIG. 5S) is detected on the touch-sensitive surface 451 while focus selector 14110 is at the first location in user interface 14104. As shown in FIG. 5S, contact 14124 has an intensity I' that is below (e.g., lower than) predefined activation threshold (e.g., intensity threshold $IT_L$) and meets gradual-movement criteria (e.g., intensity I' is greater than or above a movement-initiation intensity threshold $IT_1$). As shown in FIG. 5S, when the contact has an intensity I' that is below (e.g., lower than) predefined activation threshold (e.g., intensity threshold $IT_L$) and meets gradual-movement criteria (e.g., intensity I' is greater than or above a movement-initiation intensity threshold $IT_1$), user interface object 14108 (e.g., the handle of the slider control) is moved, from its preliminary location to a first intermediate location in accordance with the intensity of contact 14124 (e.g., by a distance or displacement D1 corresponding to the intensity I' of contact 14124), toward the first location (e.g., corresponding to the location of the focus selector 14110).

In FIG. 5T, contact 14124 has an intensity I'', above intensity I' (described with reference to FIG. 5S), that is below (e.g., lower than) predefined activation threshold (e.g., intensity threshold $IT_L$) and meets gradual-movement criteria (e.g., intensity I'' is greater than or above a movement-initiation intensity threshold $IT_1$). As shown in FIG. 5T, user interface object 14108 is moved, from its first intermediate location (shown in FIG. 5S) to a second intermediate location, in accordance with the change in intensity of contact 14124 (e.g., by a distance or displacement D2 corresponding to the change in intensity of contact 14124). As a result, when the intensity of the contact increases from a first intensity (e.g., I') to a second intensity (e.g., I''), the distance (e.g., D2) by which the user interface object travels toward the first location corresponds to a difference between the first and the second intensity (e.g., D2 corresponds to the difference in intensity (I''−I')).

In other words, when the device detects a contact on the touch-sensitive surface and an increase in intensity of the contact (e.g., a press input) that is below the predefined activation threshold but still meets the gradual-movement criteria (e.g., if the contact has an intensity greater than a movement-initiation intensity threshold), the user interface object is moved toward the location of the focus selector in accordance with the intensity of the contact such that the displacement of (or the distance moved by) the user interface object corresponds to an increase in intensity of the contact. Specifically, when the user changes the intensity of the contact from a first intensity to a second intensity, the distance by which the user interface object travels toward the first location corresponds to a difference between the first and the second intensity.

Figure 5U:
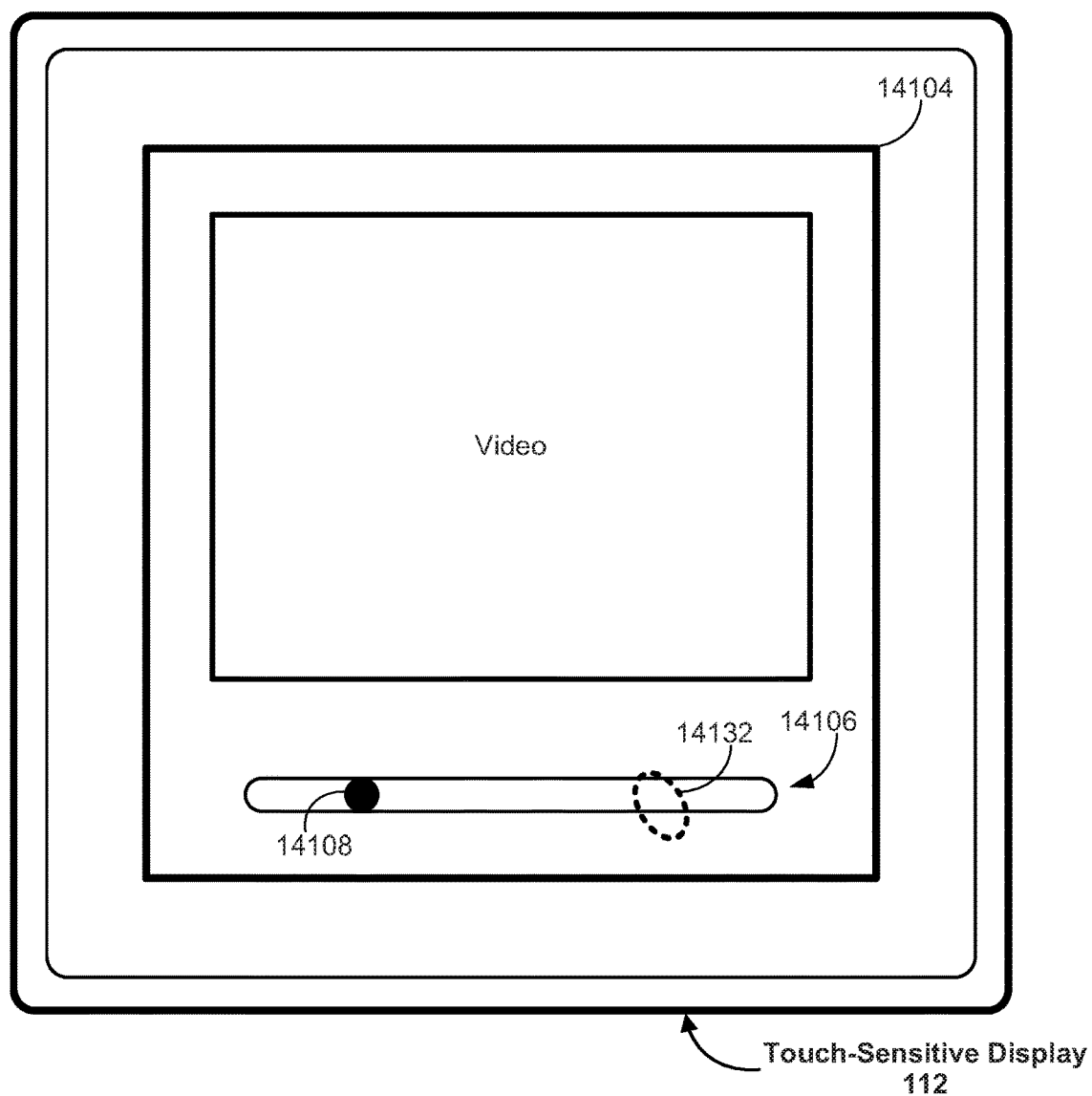
Figure 5U:
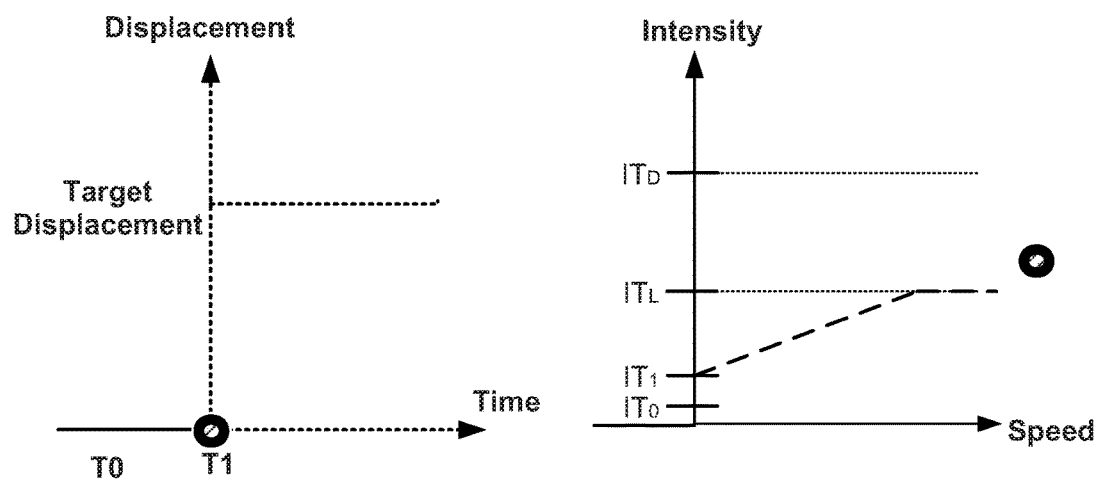
Figure 5V:
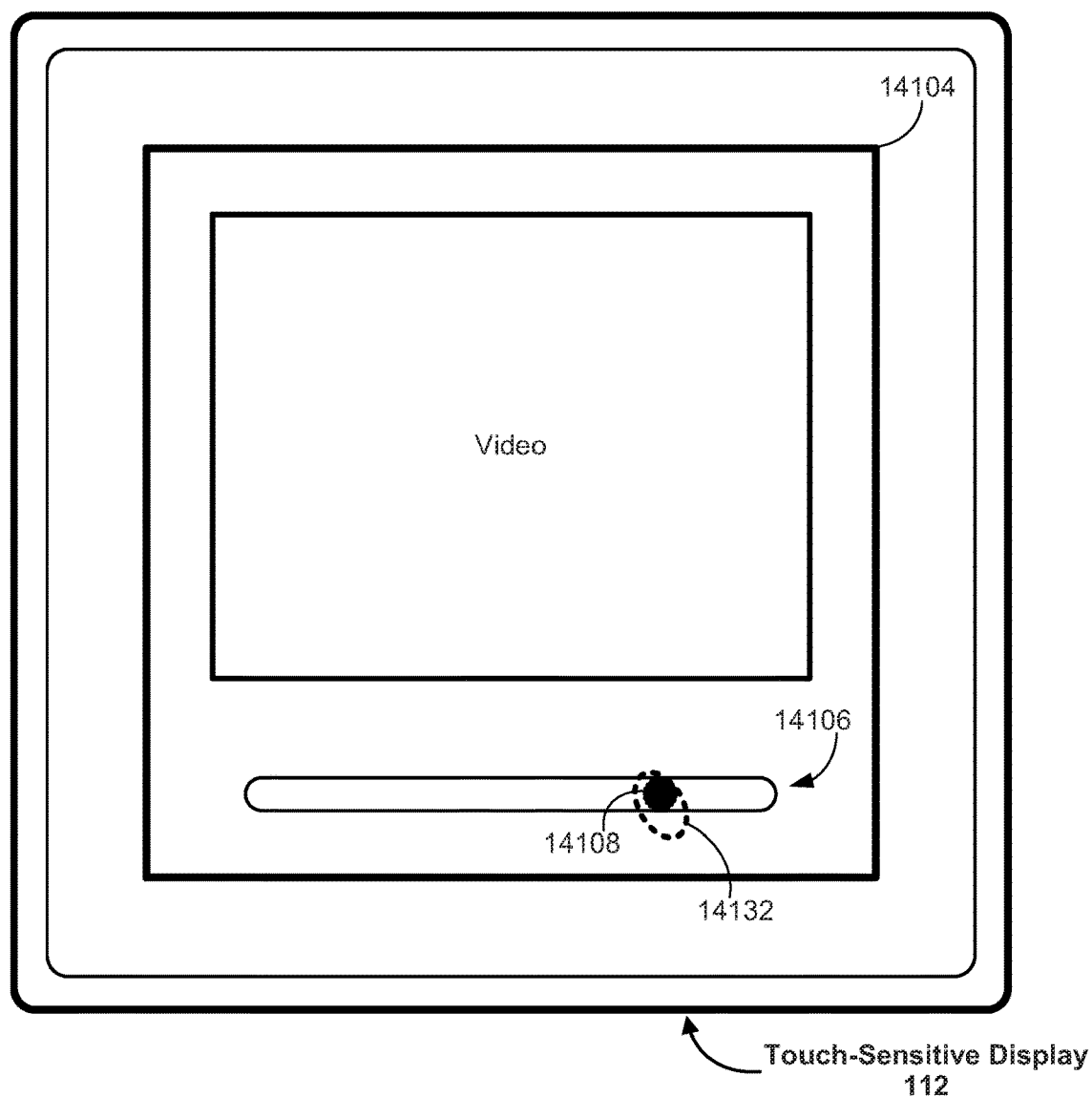
Figure 5V:
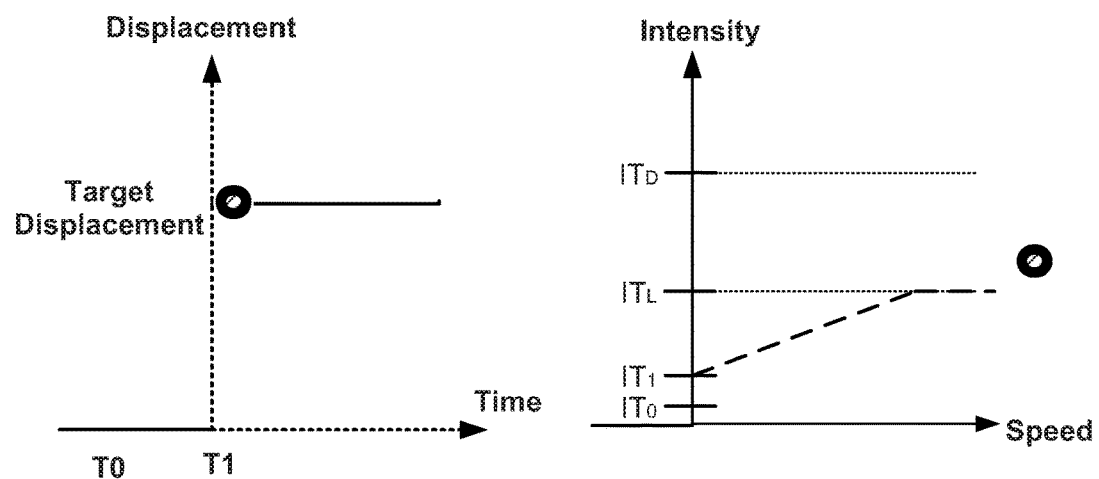

FIGS. 5U-5V illustrate moving user interface object 14108 in response to a press input (e.g., an increase in intensity of a contact detected on a touch-sensitive surface), for example contact 14132 detected on touch-sensitive display 112 directly to a first location of a focus selector (e.g., the location of contact 14132 on the touch-sensitive display 112), when the press input has an intensity that is above (e.g., greater than) a predefined activation threshold.

In FIG. 5U, at time T1, a contact (e.g., contact 14132 in FIG. 5U) is detected on the touch-sensitive display 112 while the focus selector (corresponding to contact 14132) is at the first location in user interface 14104. As shown in FIG. 5U, contact 14132 has an intensity that is above (e.g., greater than) predefined activation threshold (e.g., intensity threshold $IT_L$). In FIG. 5V, at a time shortly after T1 (e.g., a few milliseconds after T1 or some other time period that is short enough that the movement appears, to the user, to happen substantially instantaneously in response to increasing the intensity of the contact above the predefined activation threshold), when contact 14132 has an intensity that is above the predefined activation threshold (e.g., intensity threshold $IT_L$, FIG. 5V), user interface object 14108 (e.g., the handle of the slider control) is moved directly to the first location corresponding to the location of the focus selector (e.g., contact 14132).

Figure 5W:
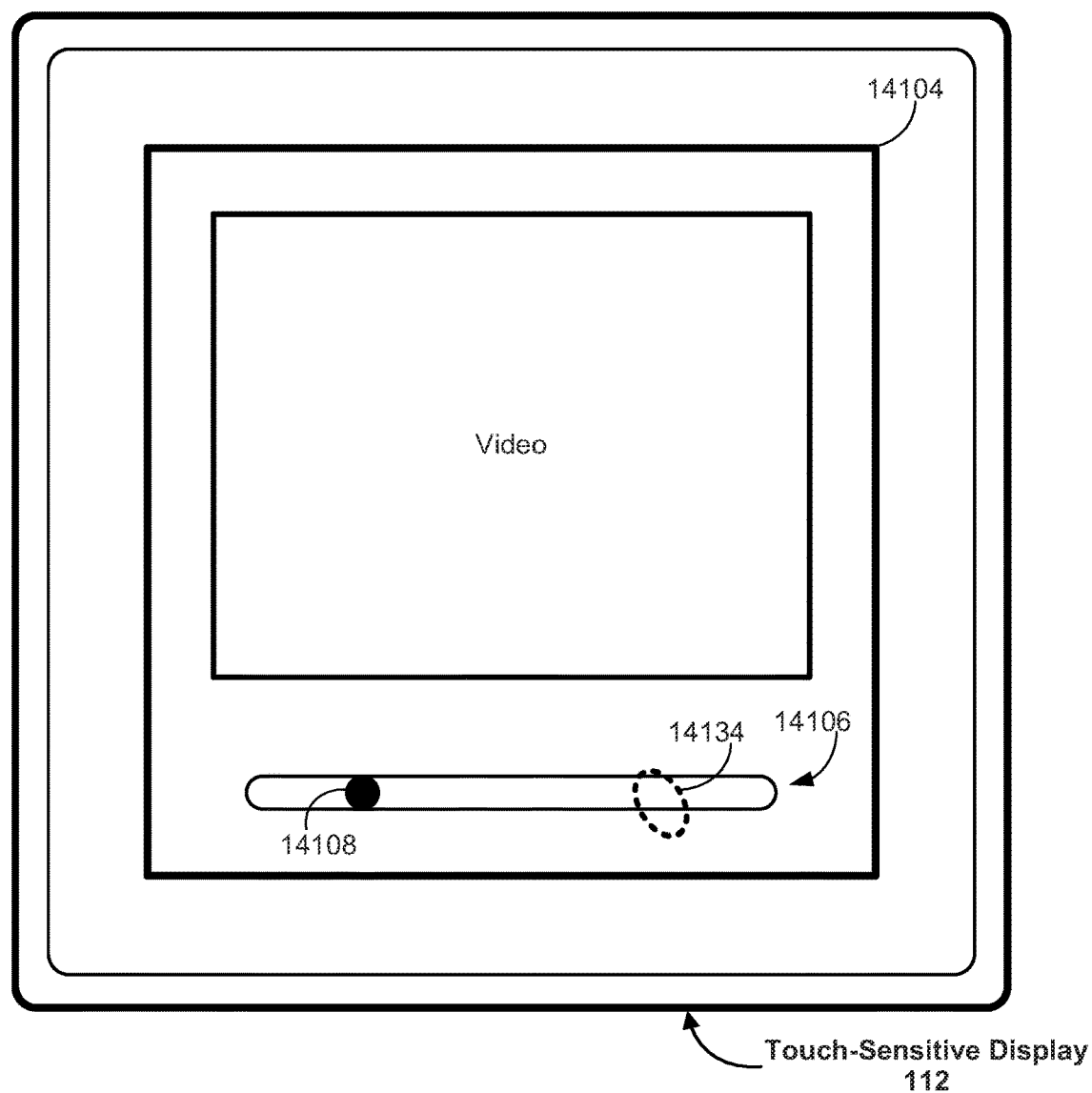
Figure 5W:
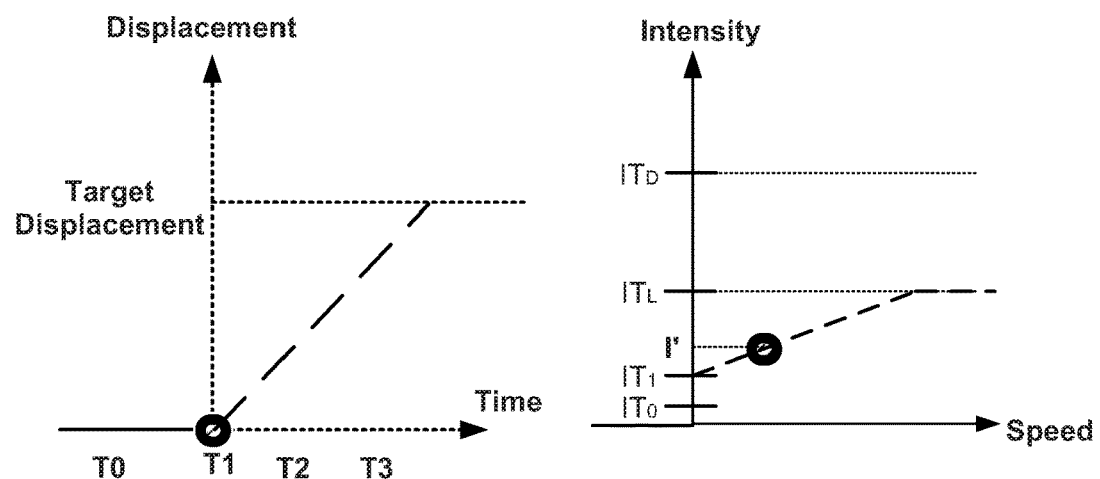
Figure 5X:
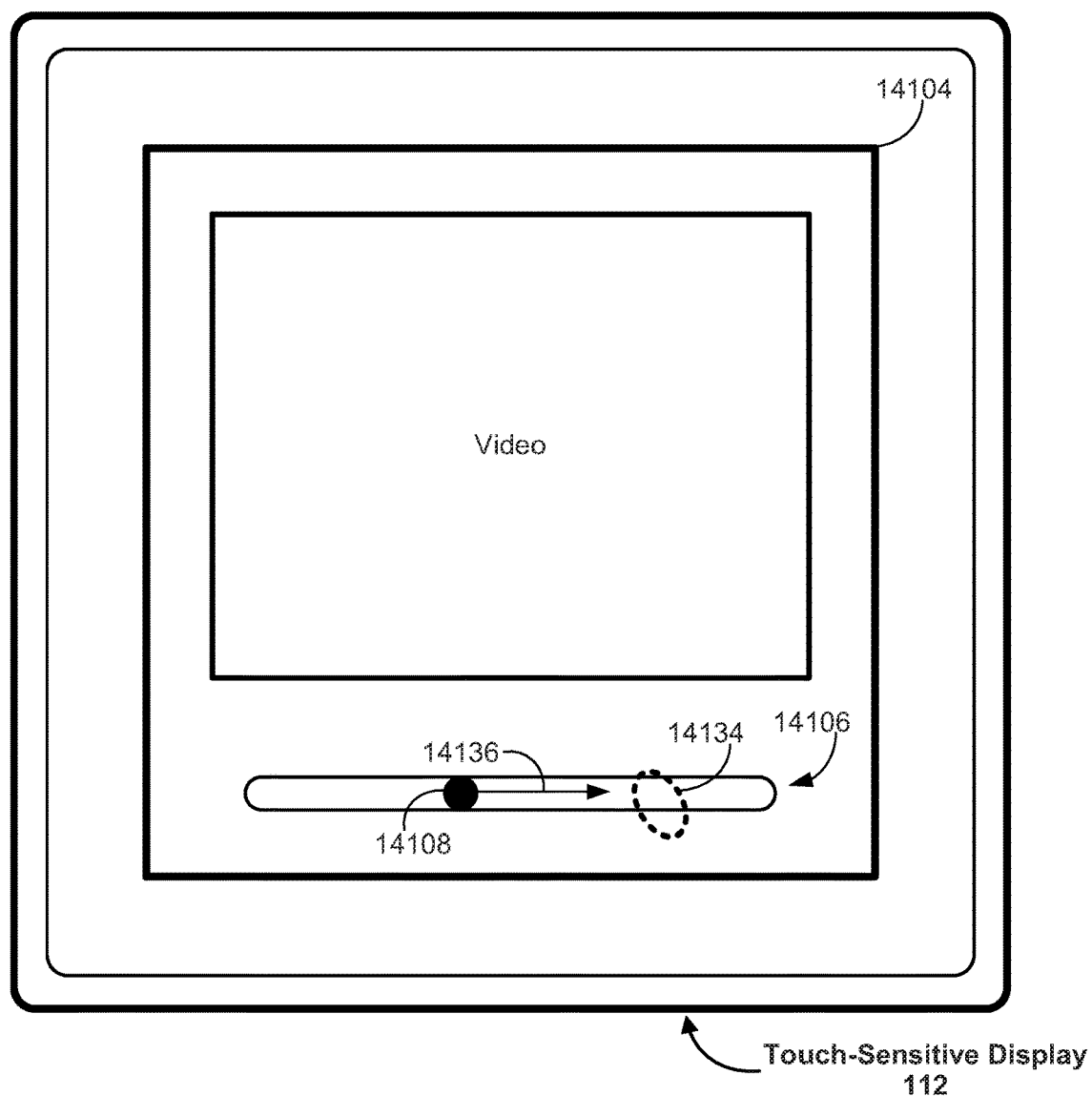
Figure 5X:
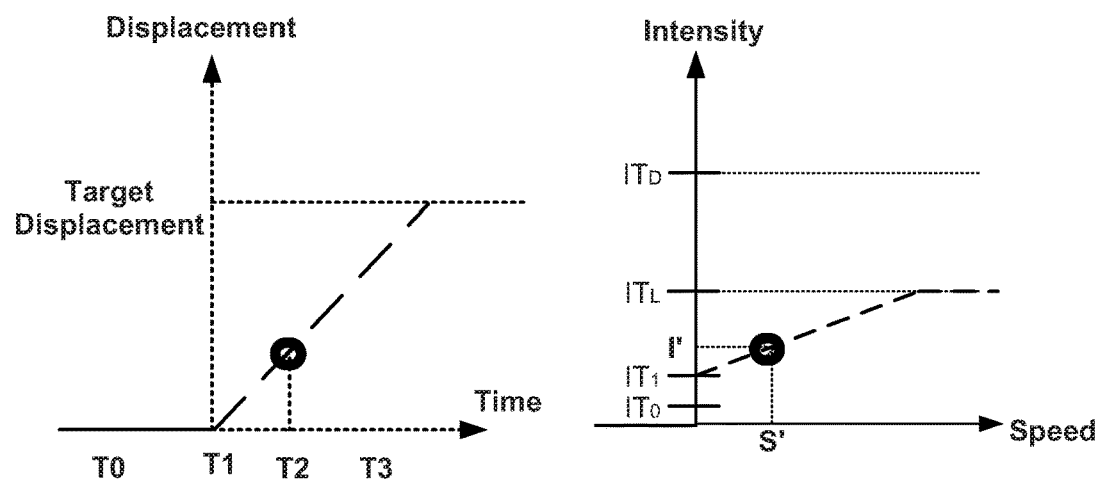
Figure 5Y:
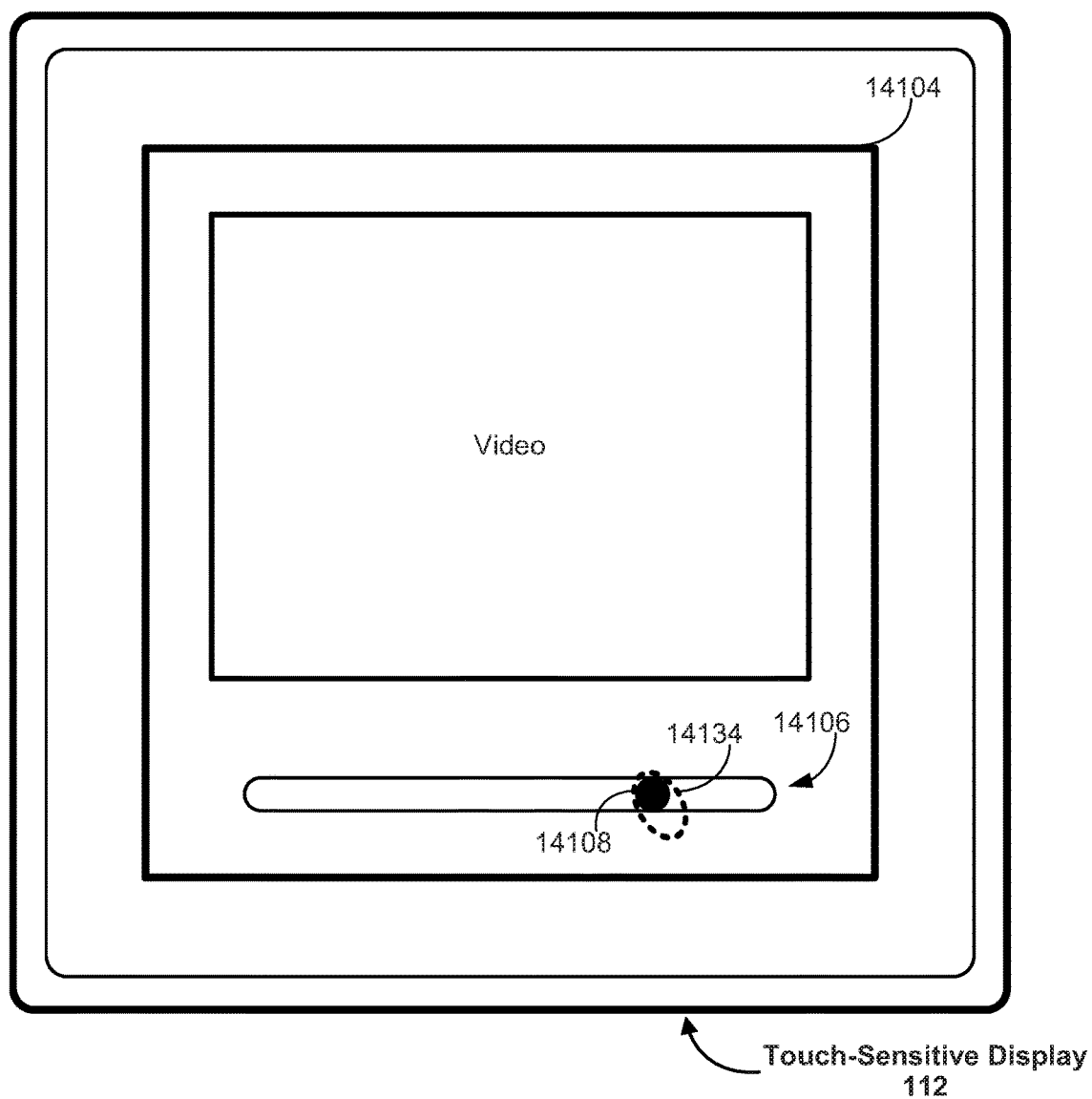
Figure 5Y:
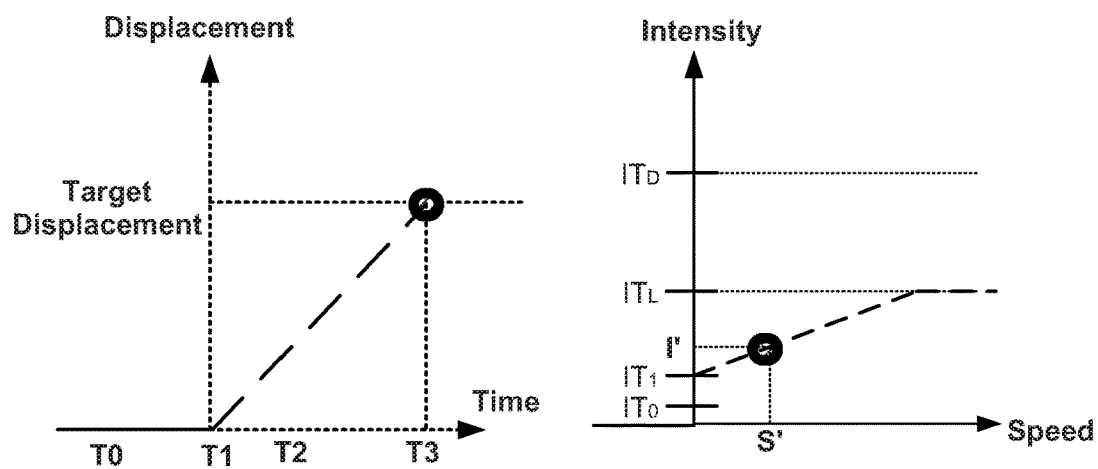
Figure 6A:
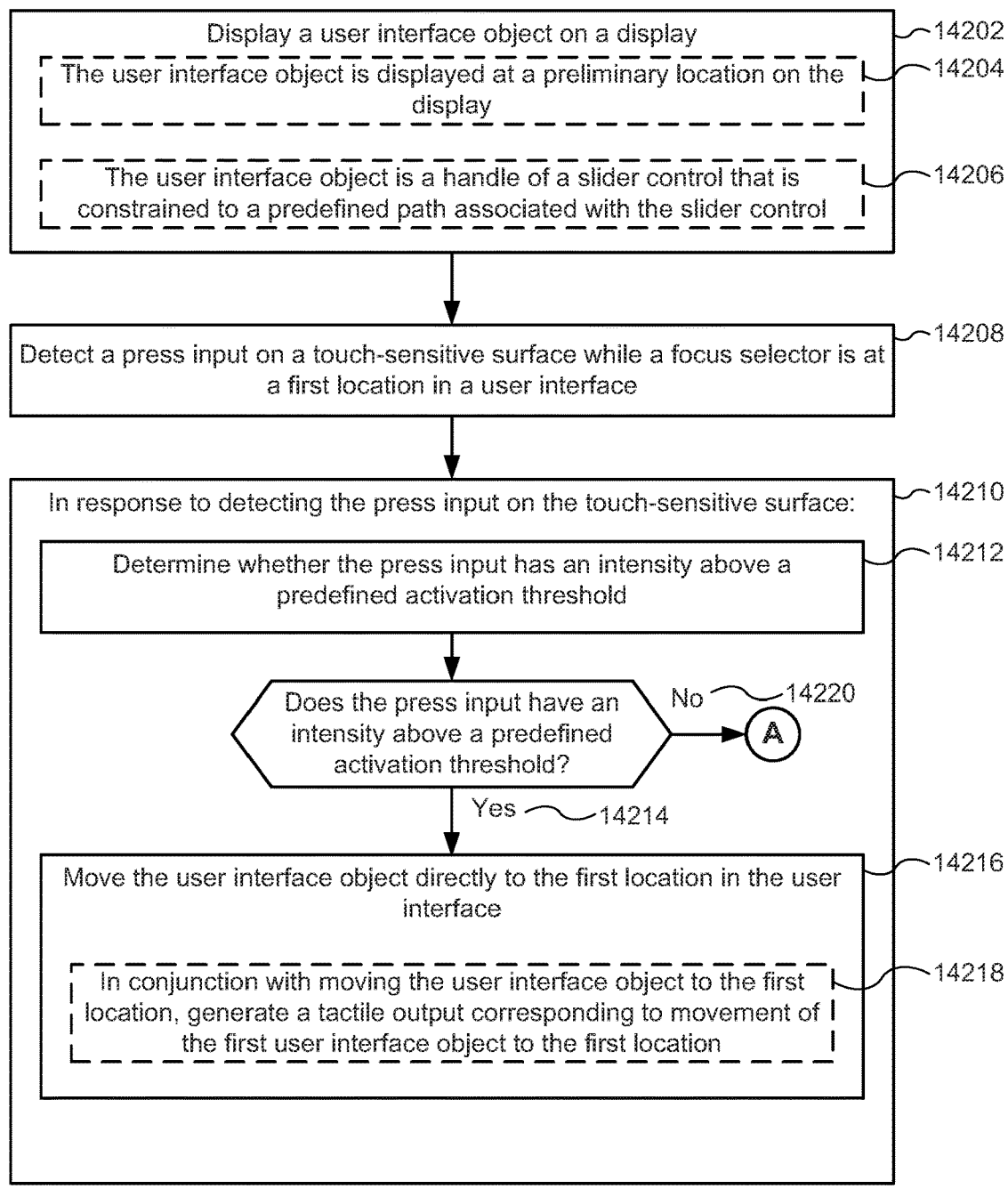
FIGS. 6A-6D are flow diagrams illustrating a method of moving user interface objects at varying speeds or through varying displacements based on variable intensities of a press input, in accordance with some embodiments.
Figure 6B:
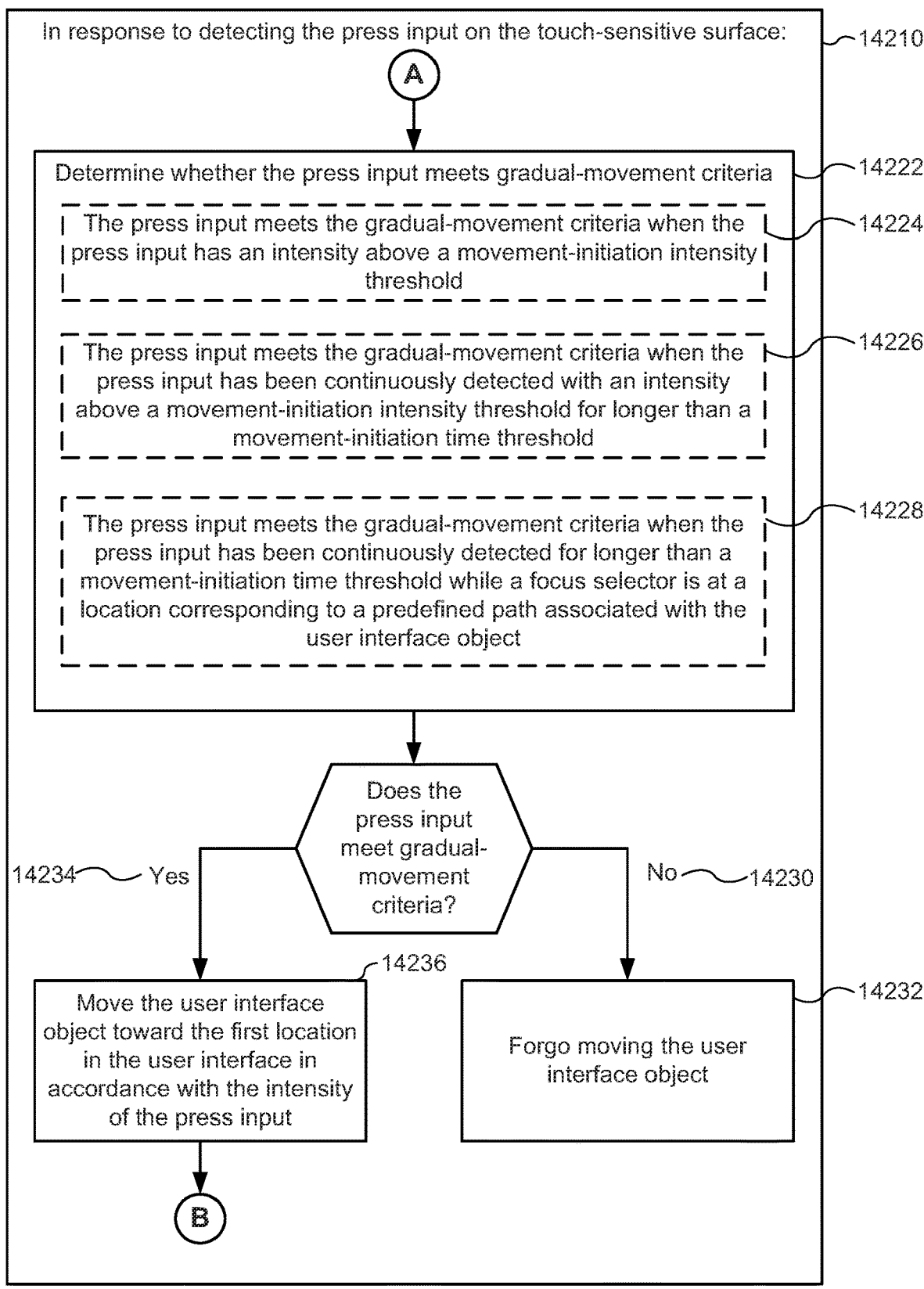
Figure 6C:
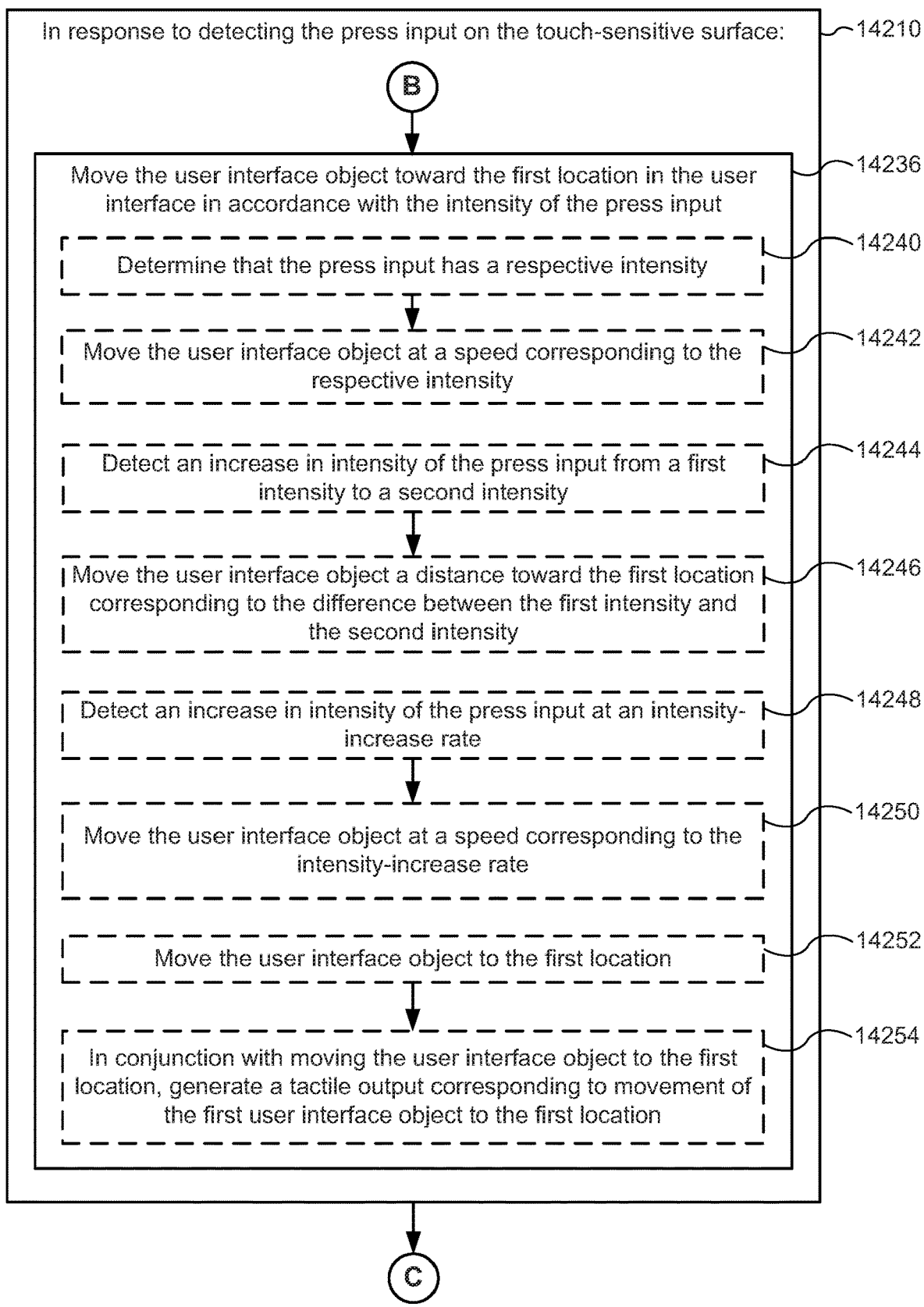
Figure 6D:
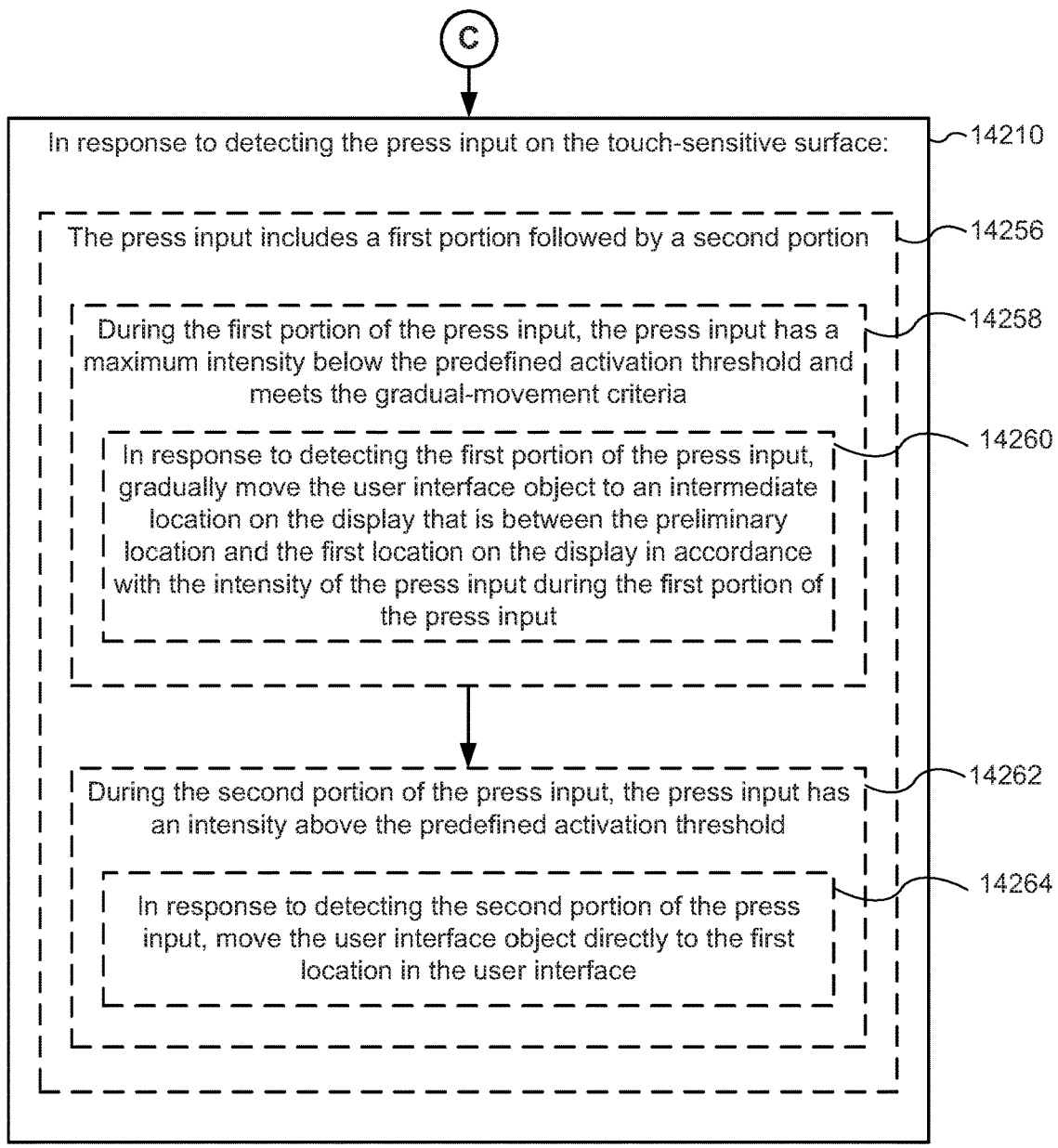

FIGS. 5W-5Y illustrate, in response to a detected press input on touch-sensitive display 112, moving the user interface object toward the first location corresponding to the location of a focus selector (e.g., contact 14134) in the user interface in accordance with (or based on) the intensity of the contact, when the contact has an intensity that is below (e.g., lower than) the predefined activation threshold and when gradual-movement criteria are met (e.g., when the contact or press input has an intensity above a movement-initiation intensity threshold).

In FIG. 5W, at time T1, a contact (e.g., contact 14134 in FIG. 5W) is detected on the touch-sensitive display 112 while a focus selector (e.g., corresponding to contact 14134) is at the first location in user interface 14104. As shown in FIG. 5W, contact 14134 has an intensity I' that is below (e.g., lower than) predefined activation threshold (e.g., intensity threshold $IT_L$) and meets gradual-movement criteria (e.g., intensity I' is greater than or above a movement-initiation intensity threshold $IT_1$). In FIG. 5X, at a time T2, after T1, when the contact has an intensity I' that is below (e.g., lower than) predefined activation threshold (e.g., intensity threshold $IT_L$) and meets gradual-movement criteria (e.g., intensity I' is greater than or above a movement-initiation intensity threshold $IT_1$), user interface object 14108 (e.g., the handle of the slider control) is moved, from its preliminary location to an intermediate location in accordance with the intensity of the contact (e.g., at a speed S' corresponding to the intensity I' of the contact), toward the first location (corresponding to the location of the focus selector associated with contact 14134). In FIG. 5X, at a time T3 after T2 contact 14134 continues to have an intensity I' that is below (e.g., lower than) predefined activation threshold (e.g., intensity threshold $IT_L$) and continues to meet gradual-movement criteria (e.g., intensity I' is greater than or above a movement-initiation intensity threshold $IT_1$), and so user interface object 14108 is moved, from its intermediate location (shown in FIG. 5W) to the first location (e.g., corresponding to the location of the focus selector associated with contact 14134), in accordance with the intensity of the contact (e.g., at a speed S' corresponding to the intensity I' of the contact).

FIGS. 6A-6D are flow diagrams illustrating a method 14200 of moving user interface objects at varying speeds or through varying displacements based on variable intensities of a press input, in accordance with some embodiments. The method 14200 is performed at an electronic device (e.g., device 300, FIG. 3, or portable multifunction device 100, FIG. 1A) with a display and a touch-sensitive surface. In some embodiments, the display is a touch screen display and the touch-sensitive surface is on the display. In some embodiments, the display is separate from the touch-sensitive surface. Some operations in method 14200 are, optionally, combined and/or the order of some operations is, optionally, changed.

As described below, the method 14200 provides an intuitive way to move user interface objects at varying speeds or through varying displacements based on variable intensities of a press input. The method reduces the cognitive burden on a user when moving user interface objects, thereby creating a more efficient human-machine interface. For battery-operated electronic devices, enabling a user to move user interface objects faster and more efficiently conserves power and increases the time between battery charges.

The device displays (14202) a user interface object on the display. In some embodiments, the user interface object is displayed (14204) at a preliminary location on the display. In some embodiments, the user interface object is (14206) a handle of a slider control that is constrained to a predefined path associated with the slider control. For example, the user interface object is a thumb of a volume or content slider/scrubber. For example, as shown in FIG. 5A, user interface object 14108 (e.g., a handle of a slider control) is displayed at a preliminary location in user interface 14104 (e.g., a video display). In some embodiments, the user interface object is not constrained to a predefined path. For example, the user interface object is an icon on a desktop of a user that is currently selected, and when the user increases the intensity of a contact while a focus selector is at the first location on the display the icon moves toward the first location (e.g., in straight line). As another example, the user interface object is an image or a graphical object in a document editing application and the device moves the user interface object towards the focus selector in response to detecting an increase in intensity of the contact.

The device detects (14208) a press input on the touch-sensitive surface while a focus selector is at a first location in a user interface. In response to (14210) detecting the press input on the touch-sensitive surface, the device performs one or more of the operations 14212-14264.

The device determines (14212) whether the press input has an intensity above a predefined activation threshold. In accordance with a determination that the press input has an intensity above (14214) a predefined activation threshold, the device moves (14216) the user interface object directly to the first location in the user interface. For example, as explained above with reference to FIGS. 5A-5C, in accordance with a determination that the press input (e.g., a press input corresponding to contact 14112 on touch-sensitive surface 451) has an intensity above predefined activation threshold (e.g., above intensity threshold $IT_L$), the device moves user interface object 14108 directly to the first location (corresponding to the location of the focus selector, cursor 14110) in user interface 14104. As another example, as explained with reference to FIGS. 5U-5V, in accordance with a determination that the press input (e.g., a press input corresponding to contact 14132 on touch-sensitive display 112) has an intensity above predefined activation threshold (e.g., above intensity threshold $IT_L$), the device moves user interface object 14108 directly to the first location (corresponding to the location of contact 14132 on touch-sensitive display 112) in user interface 14104.

In some embodiments, in conjunction with moving the user interface object to the first location, the device generates (14218) a tactile output corresponding to movement of the first user interface object to the first location. For example, the device generates a predefined tactile output, that corresponds to a "click" tactile sensation for the user, when the intensity of the contact reaches (or exceeds) the predefined activation threshold to indicate to the user that the user interface object has been moved all the way to the first location. This tactile feedback preserves an expected behavior in many situations where a user operating a track pad with a physical actuator switch that controls object selection would expect to feel a "click" of the physical actuator switch in response to pressing down on the track pad with an intensity greater than an activation intensity of the physical actuator switch.

In accordance with a determination that the press input has an intensity below (14220) the predefined activation threshold, the device determines (14222) whether the press input meets gradual-movement criteria. In some embodiments, the press input meets (14224) the gradual-movement criteria when the press input has an intensity above a movement-initiation intensity threshold. For example, for press inputs below the movement-initiation threshold there is no movement of the user interface object, so that the user does not accidentally move the user interface object. For example, as explained above with reference to FIGS. 5D-5G, the gradual-movement criteria are met when the press input (or contact) has an intensity (e.g., intensity I', FIGS. 5E-5G) above a movement-initiation intensity threshold (e.g., intensity threshold $IT_1$, FIGS. 5E-5G). An advantage of waiting until a press input meets gradual-movement criteria before moving the user interface object is that, for press inputs below the movement-initiation threshold there is no movement of the user interface object, so that the user does not accidentally move the user interface object.

In some embodiments, the press input meets (14226) the gradual-movement criteria when the press input has been continuously detected with an intensity above a movement-initiation intensity threshold for longer than a movement-initiation time threshold. For example, unless the press input has an intensity above the movement-initiation intensity threshold for more than a predefined period of time there is no movement of the user interface object, so that the user does not accidentally move the user interface object. However, in some situations, if the press input is above the predefined activation threshold, the user interface object sill moves directly to the first location (e.g., so that there is no unexpected gradual movement of the user interface object when the user quickly places the focus selector in the first location and presses on the touch-sensitive surface). In some embodiments, the press input meets (14228) the gradual-movement criteria when the press input has been continuously detected for longer than a movement-initiation time threshold while a focus selector is at a location corresponding to a predefined path associated with the user interface object.

After the device determines (14222) whether the press input meets gradual-movement criteria, In accordance with a determination that the press input does not (14230) meet gradual-movement criteria, the device forgoes (14232) moving the user interface object. In contrast, in accordance with a determination that the press input does (14234) meet gradual-movement criteria, the device moves (14236) the user interface object toward the first location in the user interface in accordance with the intensity of the press input, as described with respect to operations 14240-14254. In some embodiments, moving the user interface object toward the first location in the user interface in accordance with the intensity of the press input includes gradually moving the user interface object on the display at a speed or rate determined in accordance with the intensity or rate of change of intensity of the press input. For example, as explained above with reference to FIGS. 5D-5G, when press input (e.g., contact 14114 on touch-sensitive surface 451) has an intensity (e.g., intensity I') below the predefined activation threshold (e.g., below intensity threshold $IT_L$), the device moves user interface object 14108 gradually toward the first location (corresponding to the location of the focus selector 14110) in user interface 14104 at a speed or rate determined in accordance with the intensity (I') or rate of change of intensity of contact 14114. However, in this example, if the intensity of contact 14114 was below $IT_1$, at time T1, user interface object 14108 would not be moved until the intensity of contact 14114 increased above $IT_1$. As another example, as explained above with reference to FIGS. 5W-5Y, when press input (e.g., contact 14134 on touch-sensitive display 112) has an intensity (e.g., intensity I') below the predefined activation threshold (e.g., below intensity threshold $IT_L$), the device moves user interface object 14108 gradually toward the first location (corresponding to the location of the focus selector associated with contact 14134 on touch-sensitive display 112) in user interface 14104 at a speed or rate determined in accordance with the intensity (e.g., I') or rate of change of intensity of contact 14134. However, in this example, if the intensity of contact 14134 was below $IT_1$, at time T1, user interface object 14108 would not be moved until the intensity of contact 14134 increased above $IT_1$.

In some embodiments, the device determines (14240) that the press input has a respective intensity. In some embodiments, the device moves (14242) the user interface object at a speed corresponding to the respective intensity. For example, as explained with reference to FIGS. 5H-5L, when press input (e.g., contact 14114) has an intensity (e.g., intensity I', FIGS. 5I-5J) below the predefined activation threshold (e.g., below intensity threshold $IT_L$), the device moves user interface object 14108 toward the first location (corresponding to the location of the focus selector 14110) in user interface 14104 at a corresponding speed (e.g., speed S', FIG. 5J). On the other hand, when press input (e.g., contact 14114) has a different intensity (e.g., intensity I", FIGS. 5K-5L), below the predefined activation threshold (e.g., below intensity threshold $IT_L$), the device moves user interface object 14108 toward the first location (corresponding to the location of the focus selector 14110) in user interface 14104 at a different speed (e.g., speed S", FIG. 5L).

In some embodiments, particular contact intensity levels are mapped to particular user interface object movement speeds. For example, as shown in FIG. 5K, intensity level I' is mapped to speed S' and intensity level I" is mapped to speed S" based, for example, on a linear intensity-to-speed mapping. As previously noted with reference to FIGS. 5K-5L, although the intensity-to-speed mapping or correspondence shown in FIGS. 5K-5L is a linear function, the intensity of a contact corresponding to the press input could, alternatively, be mapped to the speed of the user interface object as any monotonically increasing function (e.g., a quadratic function, an exponential function, a piece-wise linear function, and the like).

In some embodiments, the device detects (14244) an increase in intensity of the press input from a first intensity to a second intensity. In some embodiments, the device moves (14246) the user interface object a distance toward the first location corresponding to the difference between the first intensity and the second intensity. For example, as explained above with reference to FIGS. 5R-5T, when the intensity of the press input that includes contact 14124 changes (e.g., increases) from a first intensity (e.g., I', FIG. 5S) to a second intensity (e.g., I", FIG. 5T), the displacement or distance (e.g., D2, FIG. 5T) by which the user interface object travels toward the first location corresponds to a difference between the first and the second intensity (e.g., D2 corresponds to the difference in intensity (I"−I')).

In some embodiments, the device detects (14248) an increase in intensity of the press input at an intensity-increase rate. In some embodiments, the device moves (14250) the user interface object at a speed corresponding to the intensity-increase rate.

In some embodiments, the device moves (14252) the user interface object to the first location (e.g., as illustrated in FIGS. 5C, 5G. 5Q, 5V, and 5Y). In some embodiments, in conjunction with moving the user interface object to the first location, the device generates (14254) a tactile output corresponding to movement of the first user interface object to the first location. For example, the device generates a predefined tactile output "click" at the predefined activation threshold to indicate to the user that the user interface object has been moved all the way to the first location. This tactile feedback preserves an expected behavior in many situations where a user expects to be able to "click" a button to move an icon to a predefined location corresponding to the focus selector.

In some embodiments, the press input includes (14256) a first portion followed by a second portion. In some embodiments, during the first portion of the press input, the press input has (14258) a maximum intensity below the predefined activation threshold and meets the gradual-movement criteria. In such embodiments, in response to detecting the first portion of the press input, the device gradually moves (14260) the user interface object to an intermediate location on the display that is between the preliminary location and the first location on the display in accordance with the intensity of the press input during the first portion of the press input. In some embodiments, during the first portion of the press input, the device gradually moves the user interface object on the display at a speed/rate determined in accordance with the intensity or rate of change of intensity of the press input during the first portion of the press input. For example, as explained above with reference to FIGS. 5M-5O, in the first portion of the press input including contact 14122, when contact 14122 has an intensity I' (FIG. 5N) that is below (e.g., lower than) predefined activation threshold (e.g., intensity threshold $IT_L$) and meets gradual-movement criteria (e.g., intensity I' is greater than or above a movement-initiation intensity threshold $IT_1$), user interface object 14108 (e.g., the handle of the slider control) is moved, from its preliminary location (e.g., 14108 in FIG. 5O) to an intermediate location (e.g., 14108 in FIG. 5P) in accordance with the intensity of contact 14122 (e.g., at a speed S' corresponding to the intensity I' of the contact 14122, FIG. 5O), toward the first location (corresponding to the location of the focus selector 14110).

Further, in such embodiments, during the second portion of the press input, the press input has (14262) an intensity above the predefined activation threshold. In such embodiments, in response to detecting the second portion of the press input, the device moves (14264) the user interface object directly to the first location in the user interface. For example, the user can decide at any time to press down (e.g., to increase the intensity of the contact corresponding to the press input to an intensity above the predefined activation threshold) and, in response, the device will move the user interface object directly to the first location. For example, as explained above with reference to FIGS. 5P-5Q, in the second portion of the press input (e.g., contact 14122), when contact 14122 has an intensity that is above (e.g., greater than) predefined activation threshold (e.g., intensity threshold $IT_L$, FIG. 5Q), user interface object 14108 (e.g., the handle of the slider control) is moved directly to the first location (e.g., 14108 in FIG. 5Q, corresponding to the location of the focus selector 14110).

It should be understood that the particular order in which the operations in FIGS. 6A-6D have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., those listed in the fifth paragraph of the Description of Embodiments) are also applicable in an analogous manner to method 14200 described above with respect to FIGS. 6A-6D. For example, the contacts, gestures, user interface objects, tactile sensations, intensity thresholds, focus selectors described above with reference to method 14200 optionally have one or more of the characteristics of the contacts, gestures, user interface objects, tactile sensations, intensity thresholds, focus selectors described herein with reference to other methods described herein (e.g., those listed in the fifth paragraph of the Description of Embodiments). For brevity, these details are not repeated here.

Figure 7:
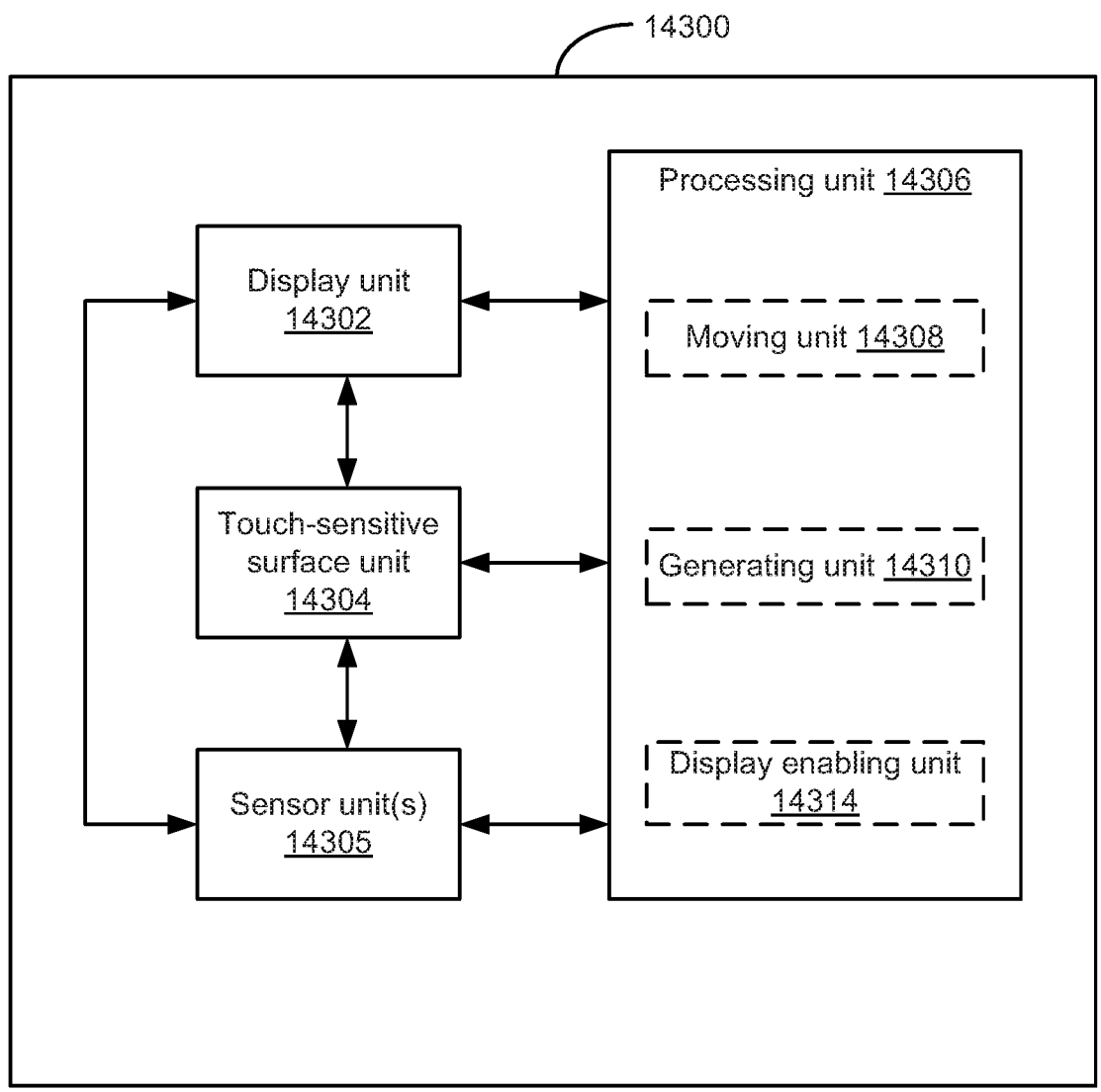
FIG. 7 is a functional block diagram of an electronic device in accordance with some embodiments.

In accordance with some embodiments, FIG. 7 shows a functional block diagram of an electronic device 14300 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 7 are, optionally, combined or separated into sub-blocks to implement the principles of the various described embodiments. Therefore, the description herein optionally supports any possible combination or separation or further definition of the functional blocks described herein.

As shown in FIG. 7, an electronic device 14300 includes a display unit 14302 configured to display a user interface object; a touch-sensitive surface unit 14304 configured to receive a press input on the touch-sensitive surface unit 14304; one or more sensor unit(s) 14305 configured to detect intensity of contacts with the touch-sensitive surface unit 14304; and a processing unit 14306 coupled to the display unit 14302, the touch-sensitive surface unit 14304, and the one or more sensor unit(s) 14305. In some embodiments, the processing unit 14306 includes a moving unit 14308, a generating unit 14310, and a display enabling unit 14314.

The processing unit 14306 is configured to: enable display of a user interface object on the display unit 14302 (e.g., with a display enabling unit 14314), detect a press input on the touch-sensitive surface unit 14304 while a focus selector is at a first location in a user interface. In response to detecting the press input on the touch-sensitive surface unit 14304, processing unit 14306 is configured to: in accordance with a determination that the press input has an intensity above a predefined activation threshold, move the user interface object directly to the first location in the user interface (e.g., with moving unit 14308); and in accordance with a determination that the press input has an intensity below the predefined activation threshold and meets gradual-movement criteria, move the user interface object toward the first location in the user interface in accordance with the intensity of the press input (e.g., with moving unit 14308).

In some embodiments, moving the user interface object toward the first location in the user interface in accordance with the intensity of the press input includes: determining that the press input has a respective intensity; and moving the user interface object at a speed corresponding to the respective intensity.

In some embodiments, moving the user interface object toward the first location in the user interface in accordance with the intensity of the press input includes: detecting an increase in intensity of the press input from a first intensity to a second intensity; and moving the user interface object a distance toward the first location corresponding to the difference between the first intensity and the second intensity.

In some embodiments, moving the user interface object toward the first location in the user interface in accordance with the intensity of the press input includes: detecting an increase in intensity of the press input at an intensity-increase rate; and moving the user interface object at a speed corresponding to the intensity-increase rate.

In some embodiments, the press input meets the gradual-movement criteria when the press input has an intensity above a movement-initiation intensity threshold.

In some embodiments, the press input meets the gradual-movement criteria when the press input has been continuously detected with an intensity above a movement-initiation intensity threshold for longer than a movement-initiation time threshold.

In some embodiments, the press input meets the gradual-movement criteria when the press input has been continuously detected for longer than a movement-initiation time threshold while a focus selector is at a location corresponding to a predefined path associated with the user interface object.

In some embodiments, the processing unit 14306 is configured to: move the user interface object to the first location (e.g., with moving unit 14308); and in conjunction with moving the user interface object to the first location, generate a tactile output corresponding to movement of the first user interface object to the first location (e.g., with generating unit 14310).

In some embodiments, the user interface object is a handle of a slider control that is constrained to a predefined path associated with the slider control.

In some embodiments, prior to detecting the press input, the user interface object is displayed at a preliminary location on the display unit 14302; the press input includes a first portion followed by a second portion; during the first portion of the press input, the press input has a maximum intensity below the predefined activation threshold and meets the gradual-movement criteria; during the second portion of the press input, the press input has an intensity above the predefined activation threshold. In some embodiments, the processing unit 14306 is configured to: in response to detecting the first portion of the press input, gradually move the user interface object to an intermediate location on the display unit 14302 that is between the preliminary location and the first location on the display unit 14302 in accordance with the intensity of the press input during the first portion of the press input (e.g., with moving unit 14308); and in response to detecting the second portion of the press input, move the user interface object directly to the first location in the user interface (e.g., with moving unit 14308).

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 6A-6D are, optionally, implemented by components depicted in FIGS. 1A-1B or FIG. 7. For example, display operation 14202, detection operation 14208, and determination operations 14212 and 14222 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Providing an Indication to a User on how a Control Responds to Inputs

Many electronic devices have graphical user interfaces that include various types of controls and it is often preferable to have different control types respond to inputs in different manners. When different control types respond to inputs in different manners then there is a need to provide an indication to a user on how a particular control type will respond to inputs. For example, appearance options for a display optionally include controls for brightness, contrast, warmth, and saturation. In this example, the controls are, optionally, one of two types: a first type of control that responds to inputs by incrementally adjusting a corresponding parameter in accordance with intensity of the input; and a second type of control that responds to inputs by performing a discrete operation in response to reaching a predefined intensity threshold. Therefore, in this example, there is a need to distinguish between the first control type and the second control type in order for the user to identify which control is of which control type. The embodiments described below provide a fast, efficient, and convenient way of providing an indication to a user on how a control responds to inputs by changing an appearance of a control to a three dimensional appearance so as to indicate that the control responds to inputs by incrementally adjusting a corresponding parameter rather than by performing a discreet operation. These methods reduce the cognitive burden on a user and produce a more efficient human-machine interface.

FIGS. 8A-8I illustrate exemplary user interfaces for providing an indication to a user on how a control responds to inputs in accordance with some embodiments. The user interfaces in these figures are used to illustrate the processes described below, including the processes described below with reference to FIGS. 9A-9E. FIGS. 8A-8I include intensity diagrams that show the current intensity of the contact on the touch-sensitive surface relative to a plurality of intensity thresholds including a predefined intensity threshold (e.g., "$IT_L$"). In some embodiments, operations similar to those described below with reference to "$IT_L$" are performed with reference to a different intensity threshold (e.g., "$IT_D$").

In some embodiments, the device is an electronic device with a separate display (e.g., display 450) and a separate touch-sensitive surface (e.g., touch-sensitive surface 451). In some embodiments, the device is portable multifunction device 100, the display is touch-sensitive display system 112, and the touch-sensitive surface includes tactile output generators 167 on the display (FIG. 1A). For convenience of explanation, the embodiments described with reference to FIGS. 8A-8I and FIG. 9A-9D will be discussed with reference to display 450 and a separate touch-sensitive surface 451, however analogous operations are, optionally, performed on a device with a touch-sensitive display system 112 in response to detecting the contacts described in FIGS. 8A-8I on the touch-sensitive display system 112 while displaying the user interfaces shown in FIGS. 8A-8I on the touch-sensitive display system 112; in such embodiments, the focus selector is, optionally: a respective contact, a representative point corresponding to a contact (e.g., a centroid of a respective contact or a point associated with a respective contact), or a centroid of two or more contacts detected on the touch-sensitive display system 112, in place of cursor 15906.

Figure 8A:
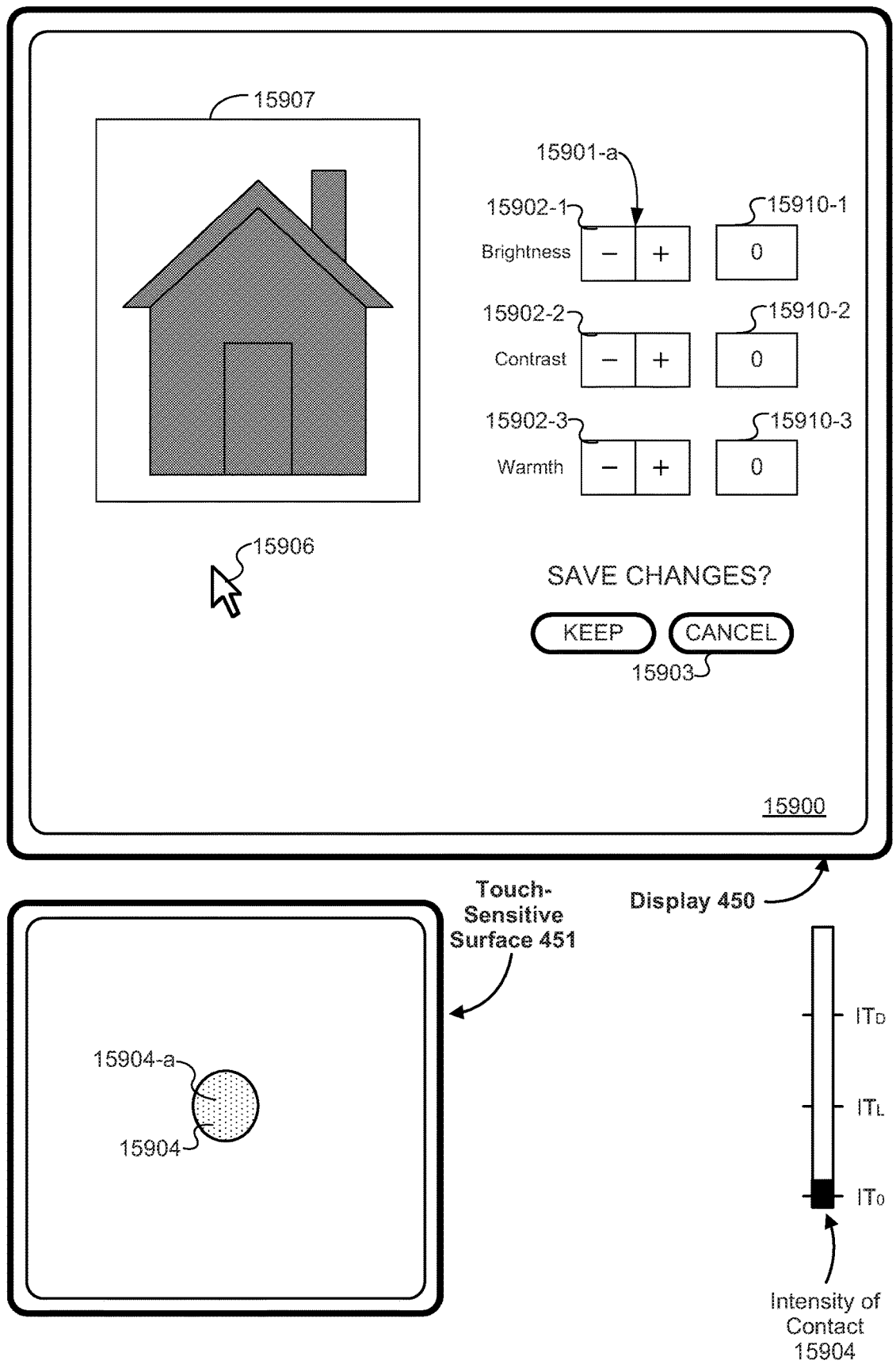
FIGS. 8A-8I illustrate exemplary user interfaces for providing an indication to a user on how a control responds to inputs in accordance with some embodiments.

FIG. 8A illustrates an example of a user interface that includes various controls of different types. User interface 15900 is displayed on display 450 of a device (e.g., device 300) and is responsive to contacts (e.g., a finger contact) on touch-sensitive surface 451. User interface 15900 includes controls 15902 of a first type (e.g., controls for adjusting graphical properties of an image 15907 within ranges of values), including control 15902-1 having appearance 15901-a, and control 15903 of a second type (e.g., a control for deciding whether to keep or cancel adjustments to graphical properties of the image 15907). In accordance with some embodiments, user interface 15900 also includes current value displays 15910 for controls 15902. FIG. 8A further illustrates contact 15904 at position 15904-a on touch-sensitive surface 451 and a displayed representation of focus selector (e.g., cursor 15906), at position 15906-a, corresponding to contact 15904.

Figure 8B:
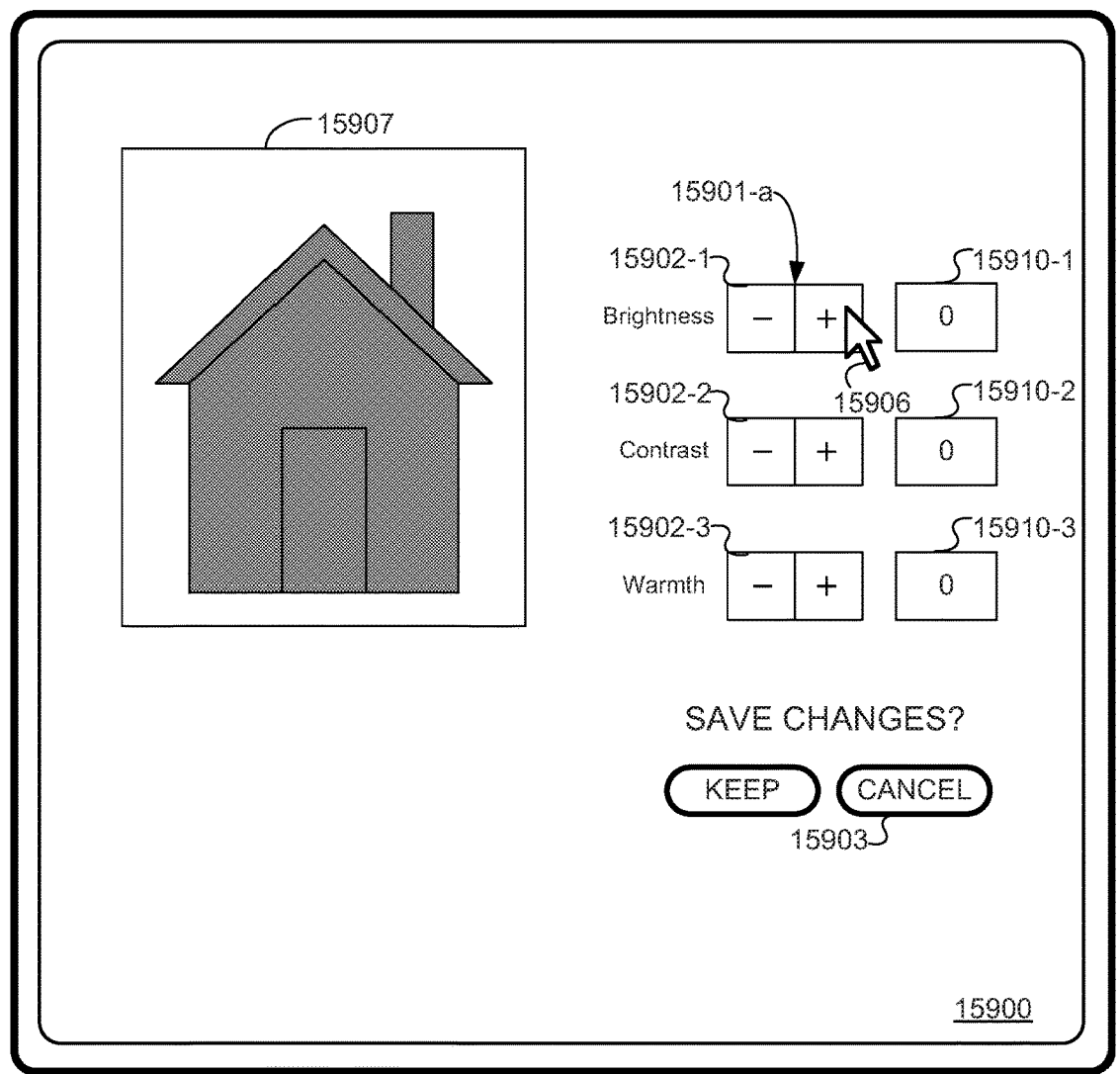
Figure 8B:
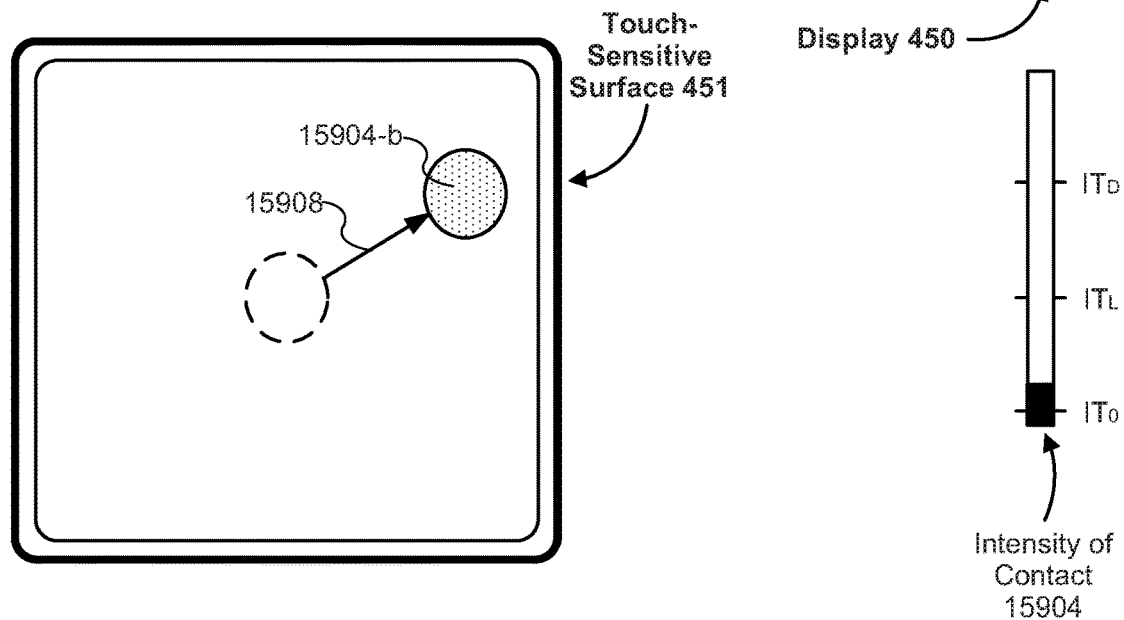
Figure 8C:
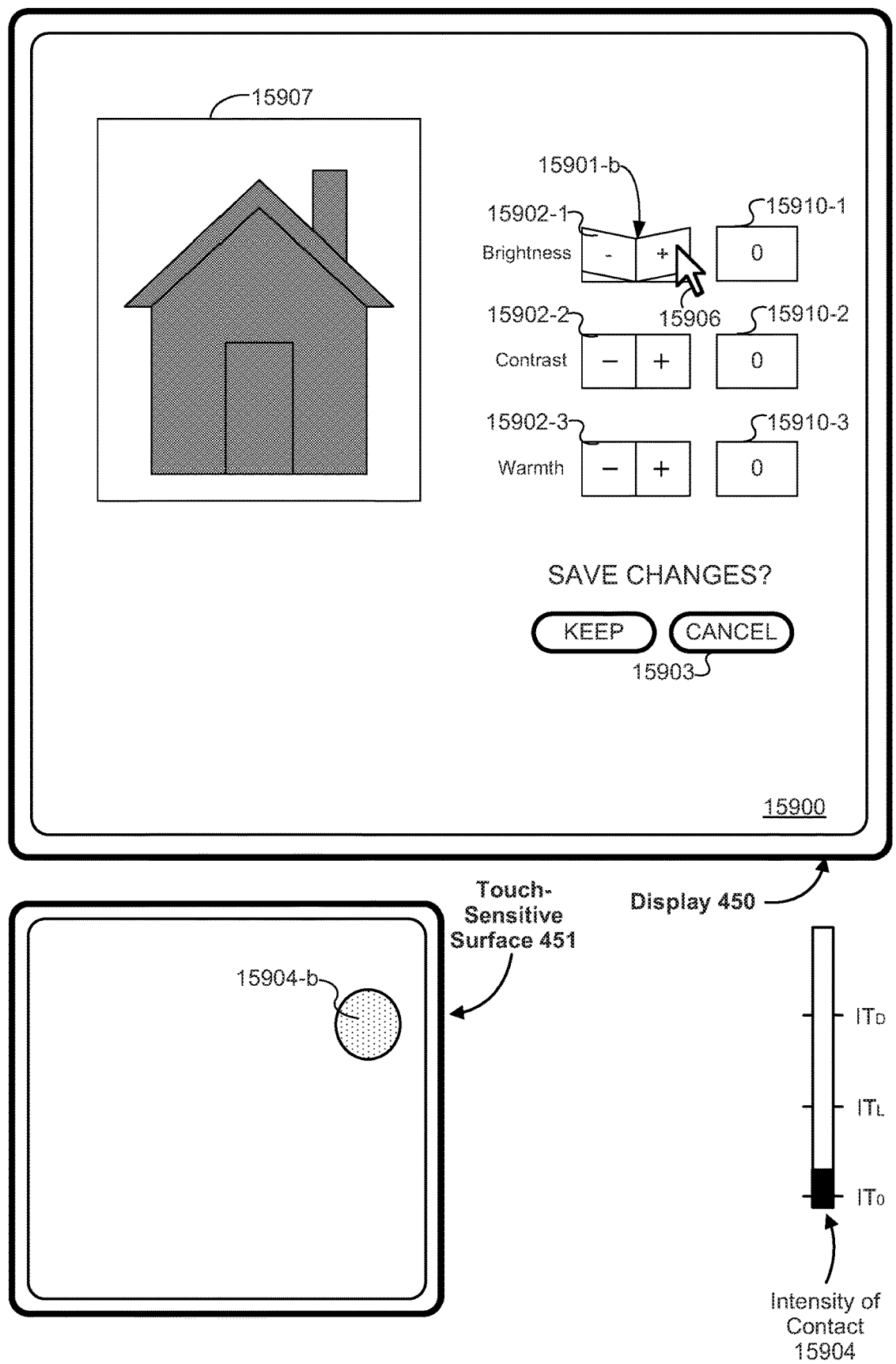

FIGS. 8B-8C illustrate an example of changing an appearance of a respective control from a two-dimensional appearance to a three-dimensional appearance. In this example, contact 15904 is detected at position 15904-a, as shown in FIG. 8A. In FIG. 8B, contact 15904 moves 15908 to position 15904-b. Movement of cursor 15906 corresponds to movement of contact 15904 and therefore cursor 15906 moves to position 15906-b over control 15902-1. The device changes the appearance of control 15902-1 from two-dimensional appearance 15901-a in FIG. 8B to three-dimensional appearance 15901-b in FIG. 8C.

Figure 8D:
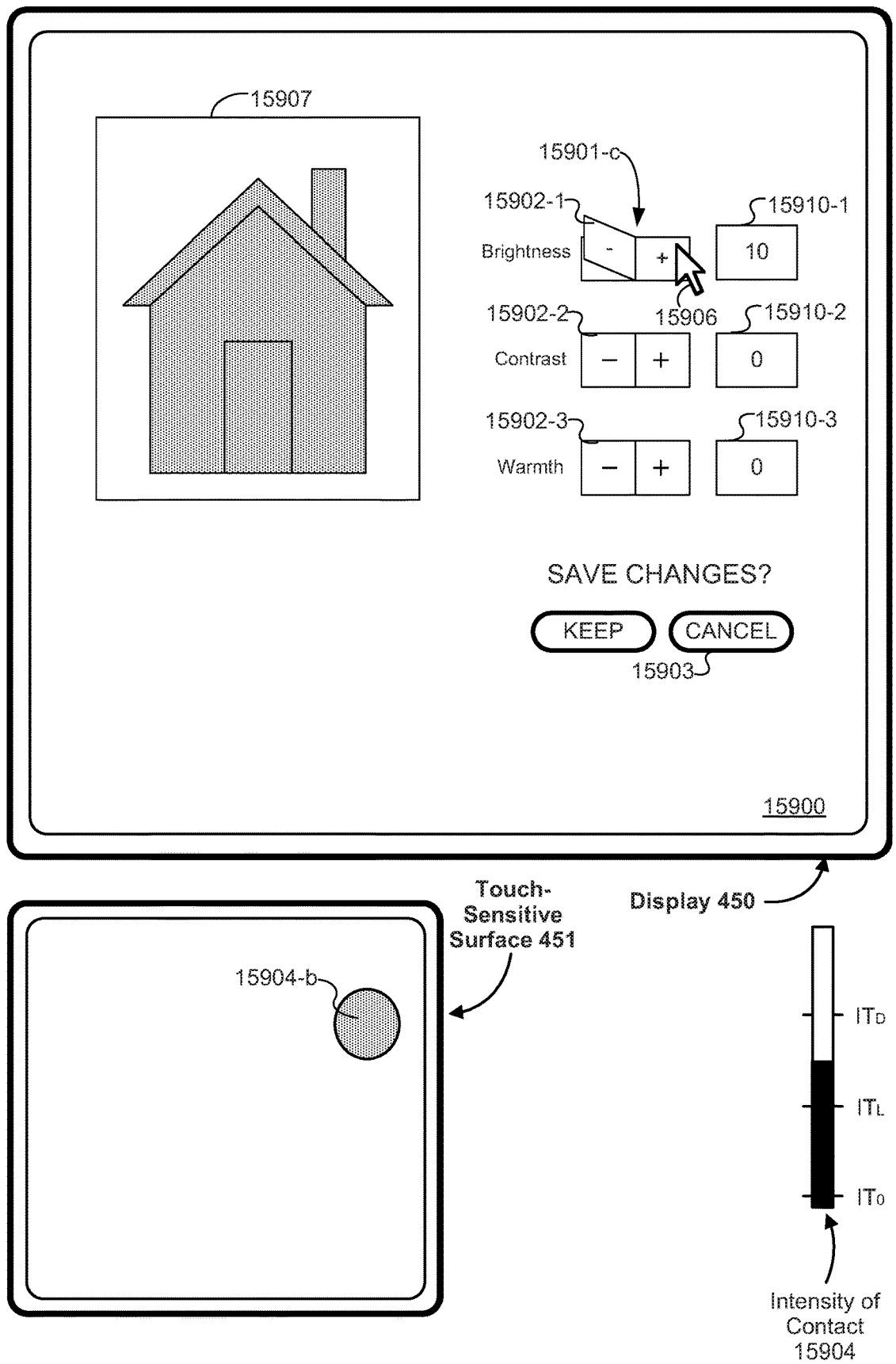
Figure 8E:
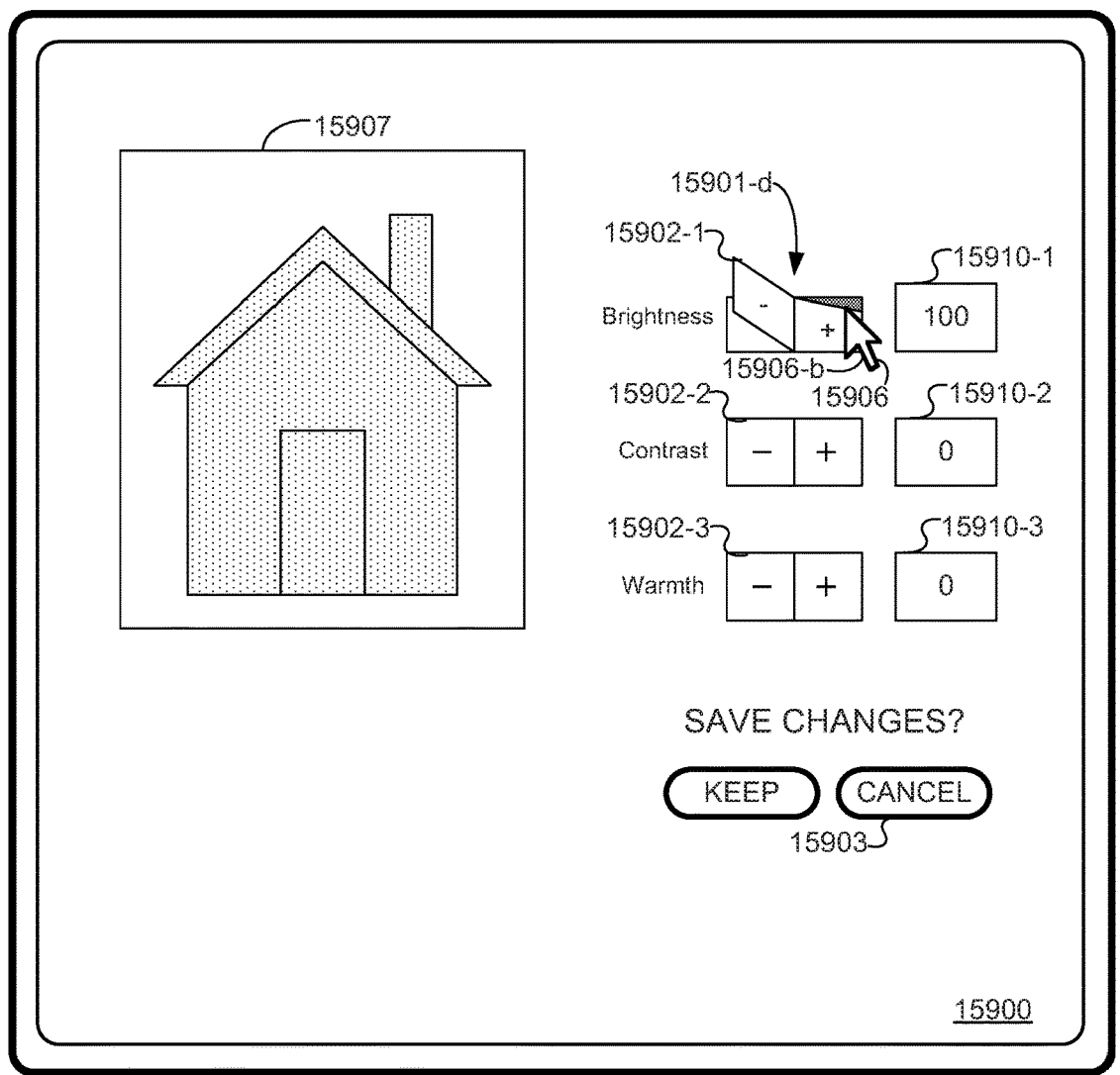
Figure 8E:
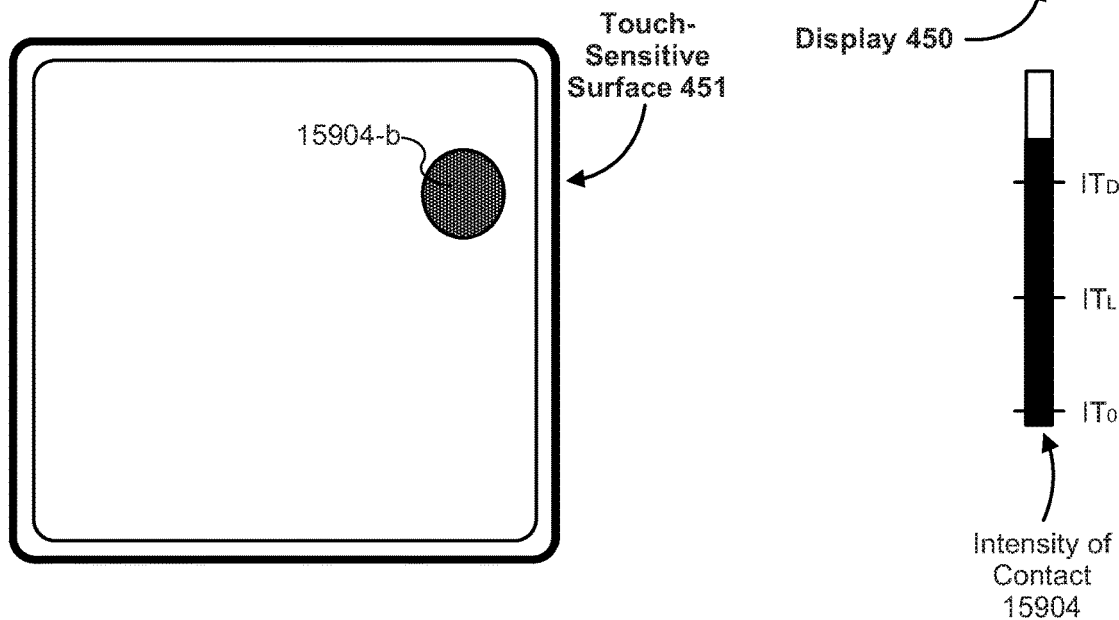

In accordance with some embodiments, FIGS. 8D-8E illustrate an example of a control changing its three-dimensional appearance in accordance with an increase in intensity of a contact. In this example, contact 15904 at position 15904-b increases in intensity from an intensity below a first intensity threshold (e.g., below $IT_L$) in FIG. 8C to an intensity above the first intensity threshold (e.g., above $IT_L$) in FIG. 8D. In accordance with the increase in intensity, the device changes the three-dimensional appearance of control 15902-1 from 15901-b FIG. 8C to 15901-c in FIG. 8D. In FIG. 8E, intensity of contact 15904 further increases to an intensity above a second intensity threshold (e.g., above $IT_D$) and the device changes the three-dimensional appearance of control 15902-1 changes from 15901-c FIG. 8D to 15901-d in FIG. 8E. In some embodiments, in conjunction with changing the appearance of control 15902-1, the device changes a value of a parameter associated with the control (e.g., brightness of image 15907) and, optionally, changes the appearance of an image 15907 associated with control 15902-1.

Figure 8F:
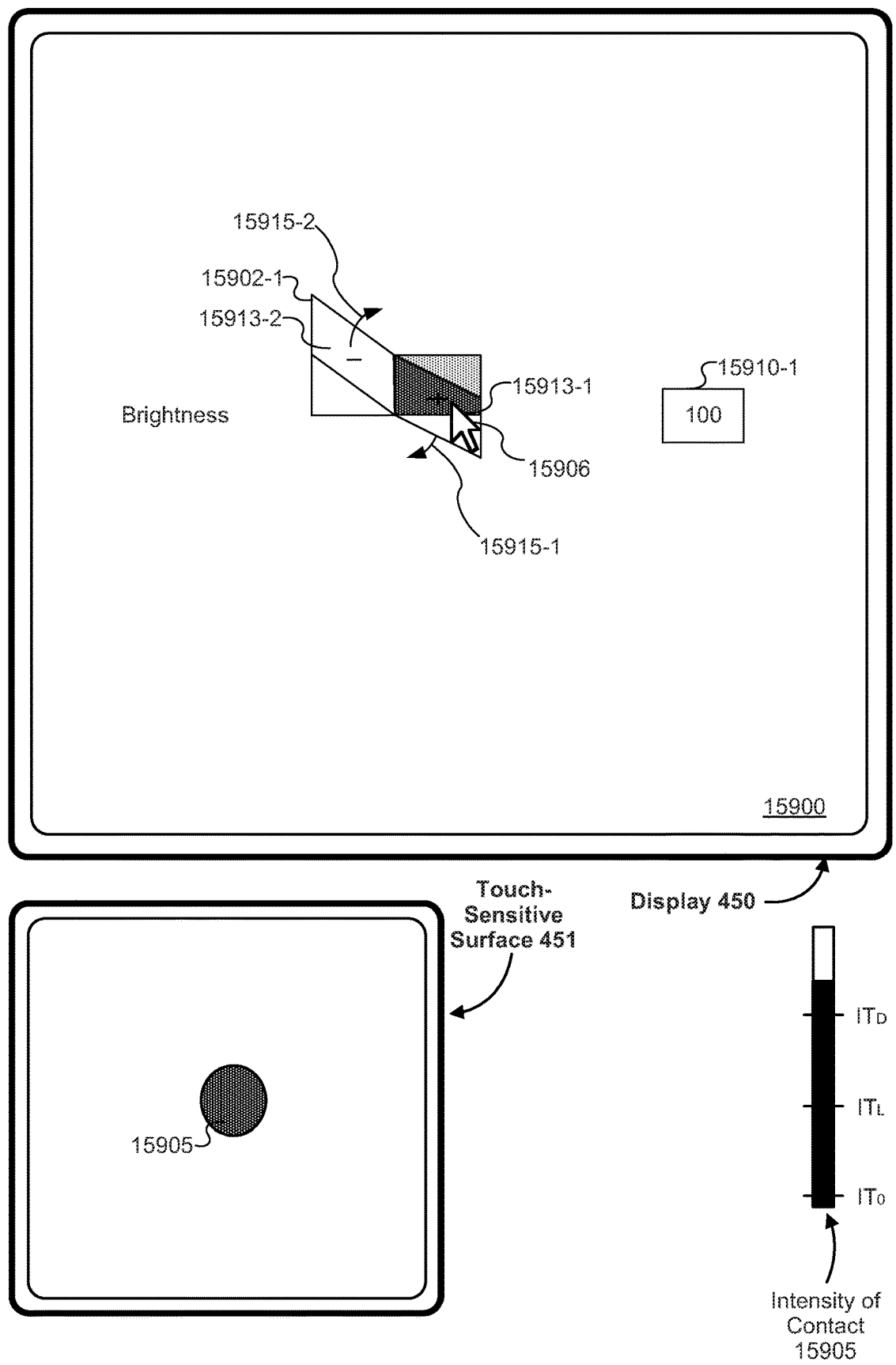

In accordance with some embodiments, FIG. 8F illustrates an example of a control having first region associated with increasing a parameter and a second region associated with decreasing the parameter and displaying an animation so that the first region appears to rotate into the display and the second region appears to rotate out of the display. In FIG. 8F, contact 15905 is detected on touch-sensitive surface 451 and a focus selector (e.g., cursor 15906), corresponding to contact 15905, is located over region 15913-1 of control 15902-1 (e.g., a region associated with increasing a value of a parameter associated with the control). In accordance with the position of the focus selector (e.g., cursor 15906) and intensity of contact 15905, region 15913-1 appears to rotate into display 450 and region 15913-2 appears to rotate out of display 450. In contrast, in a situation where the focus selector is placed over a different region 15913-2 of the control (e.g., a region associated with decreasing a value of the parameter associated with the control), in accordance with the position of cursor 15906 and intensity of contact 15905, region 15913-2 would appear to rotate into display 450 and region 15913-1 would appear to rotate out of display 450.

Figure 8G:
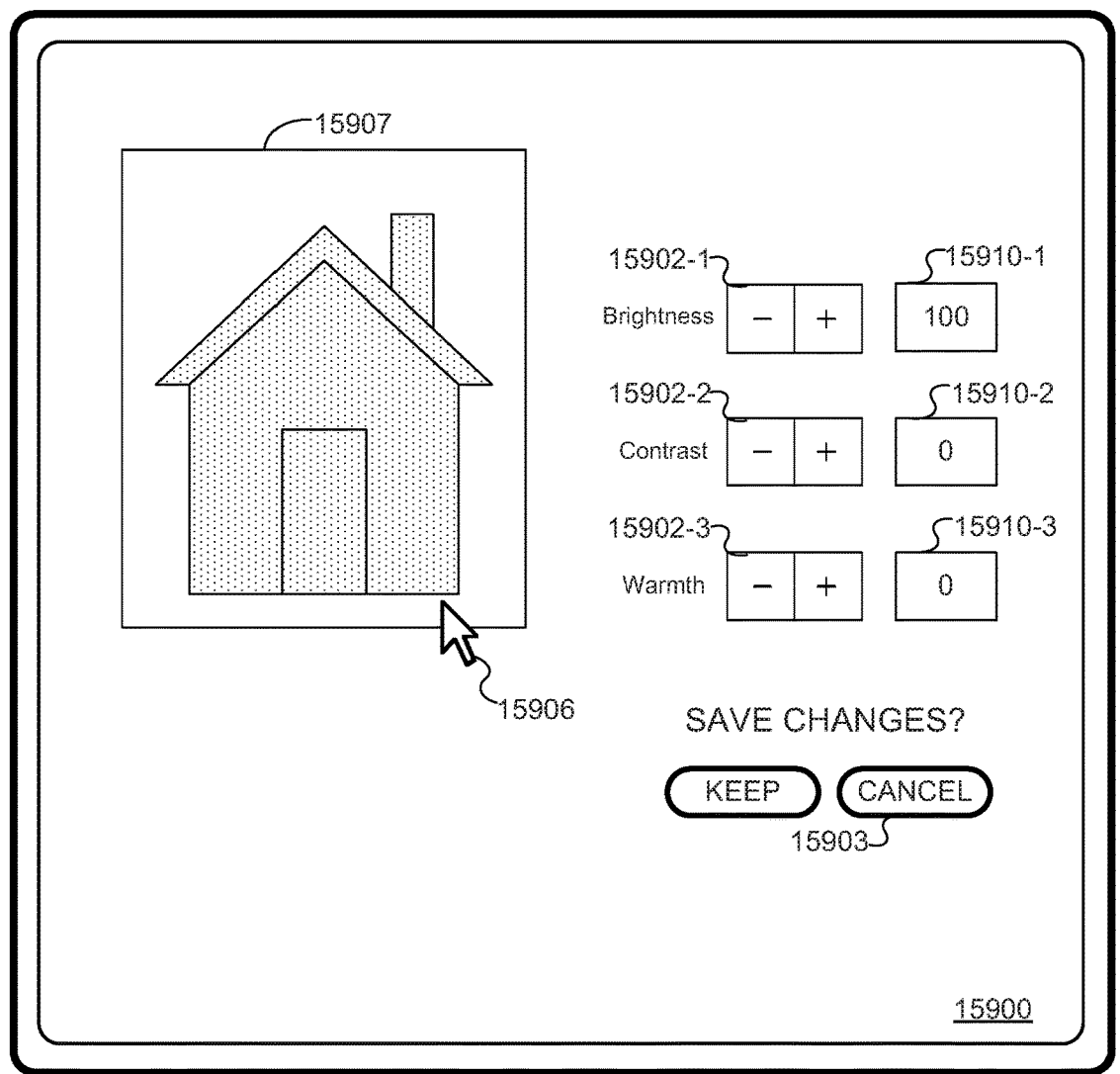
Figure 8G:
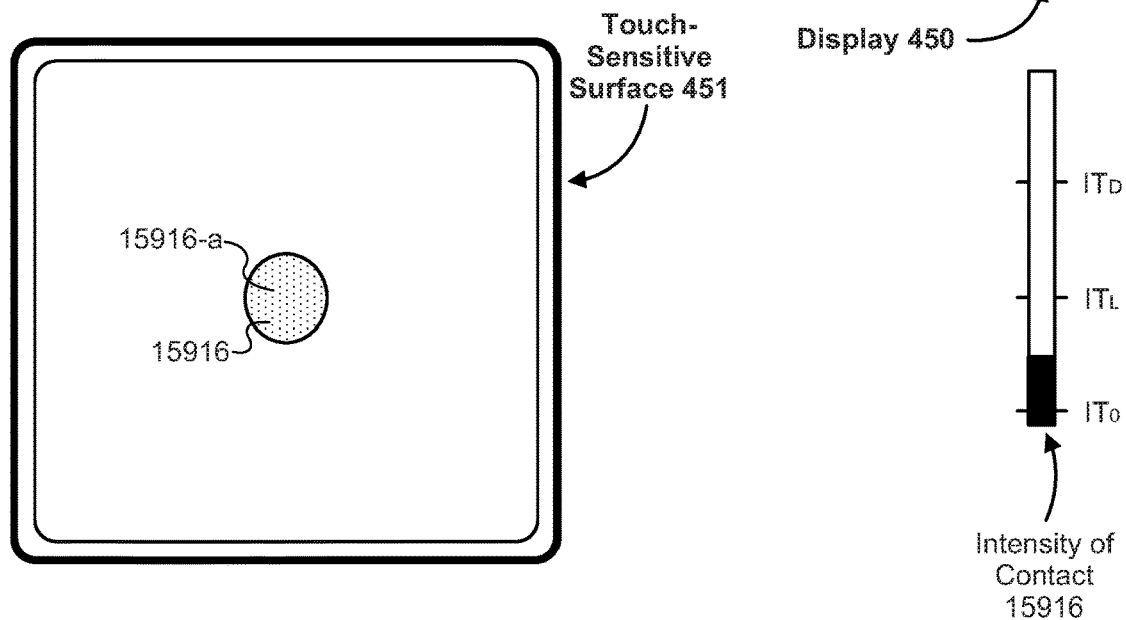
Figure 8H:
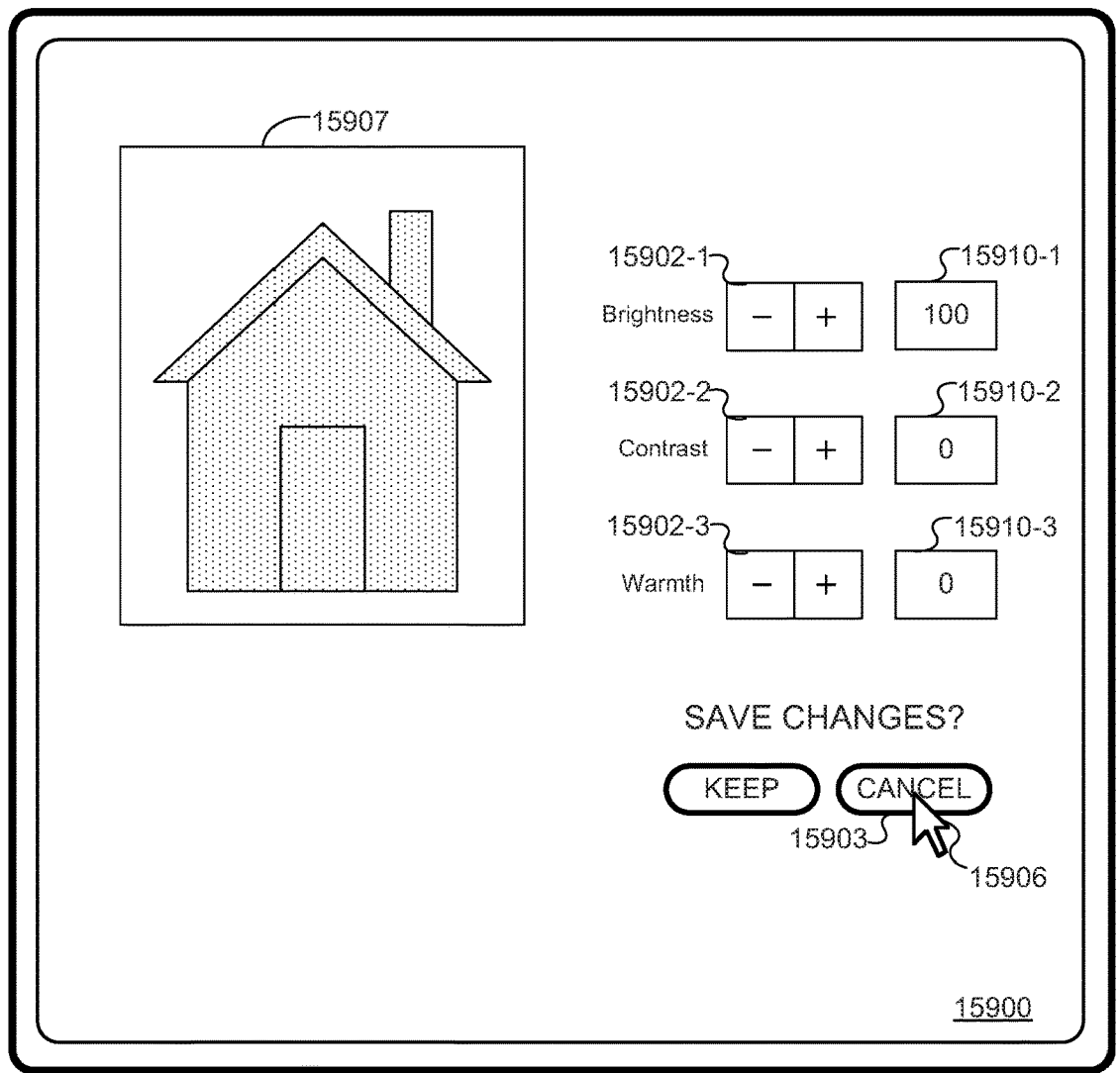
Figure 8H:
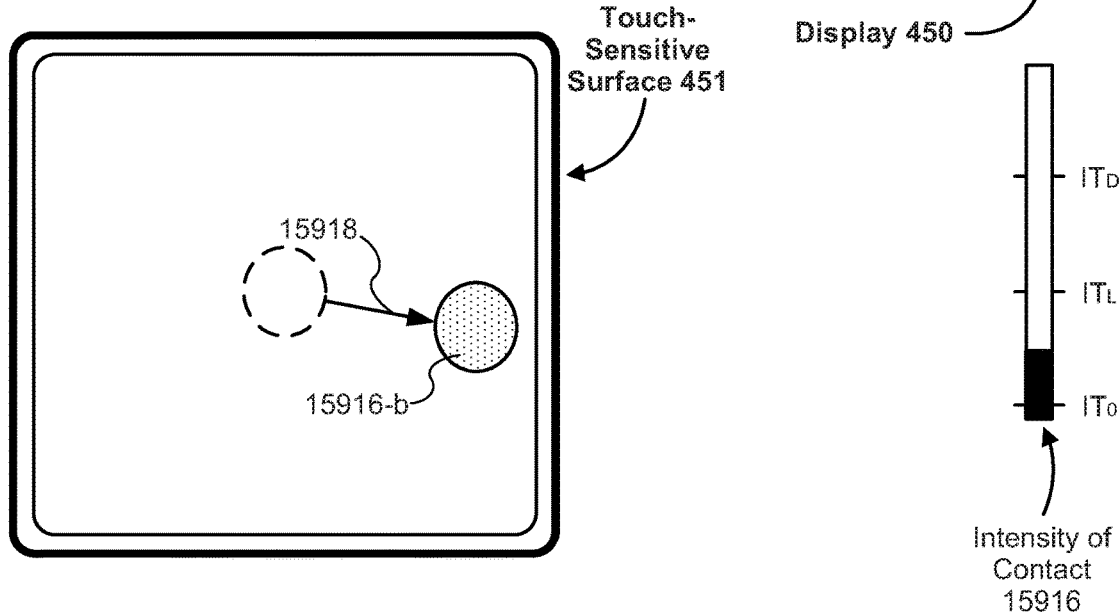
Figure 8I:
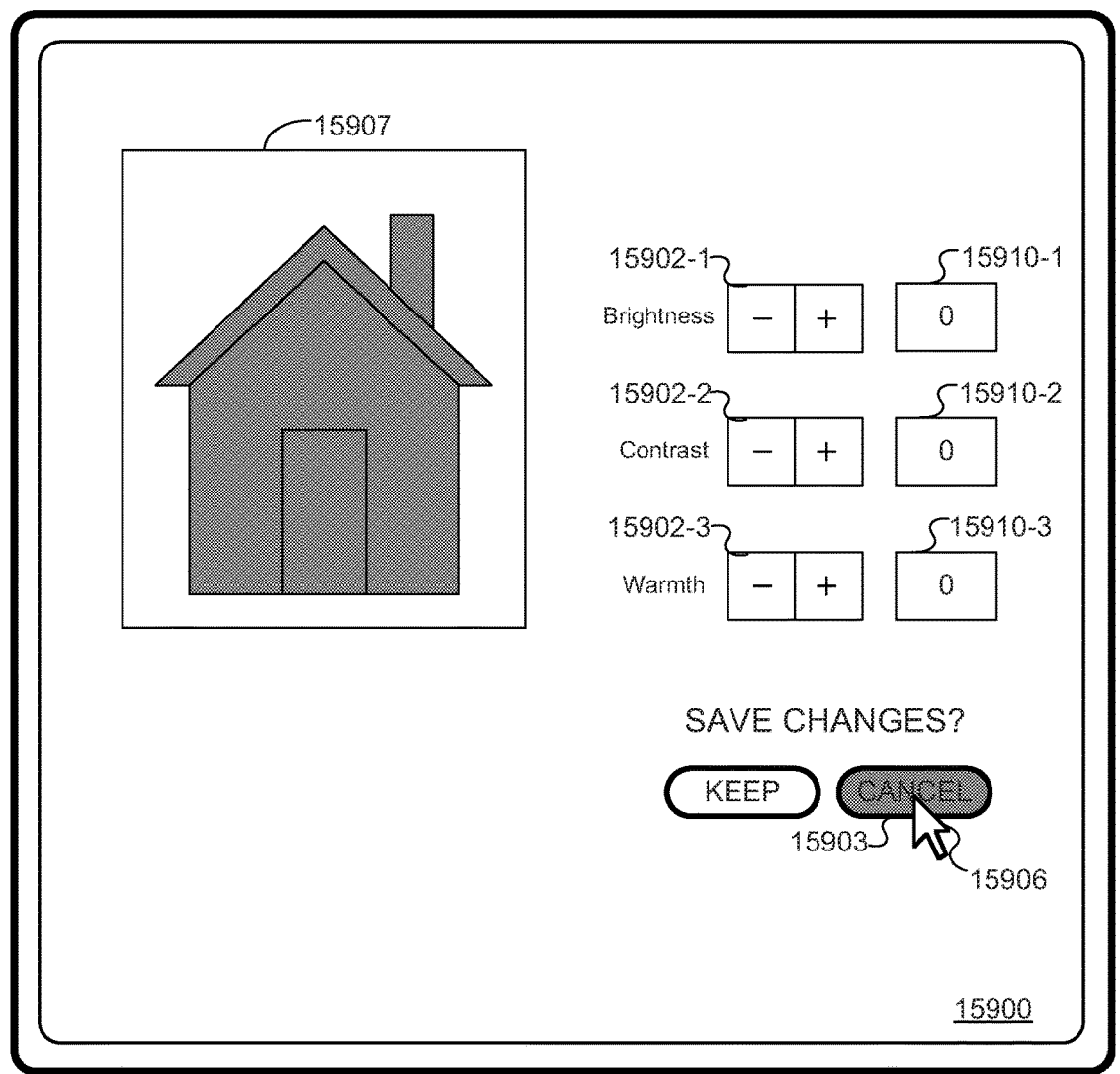
Figure 8I:
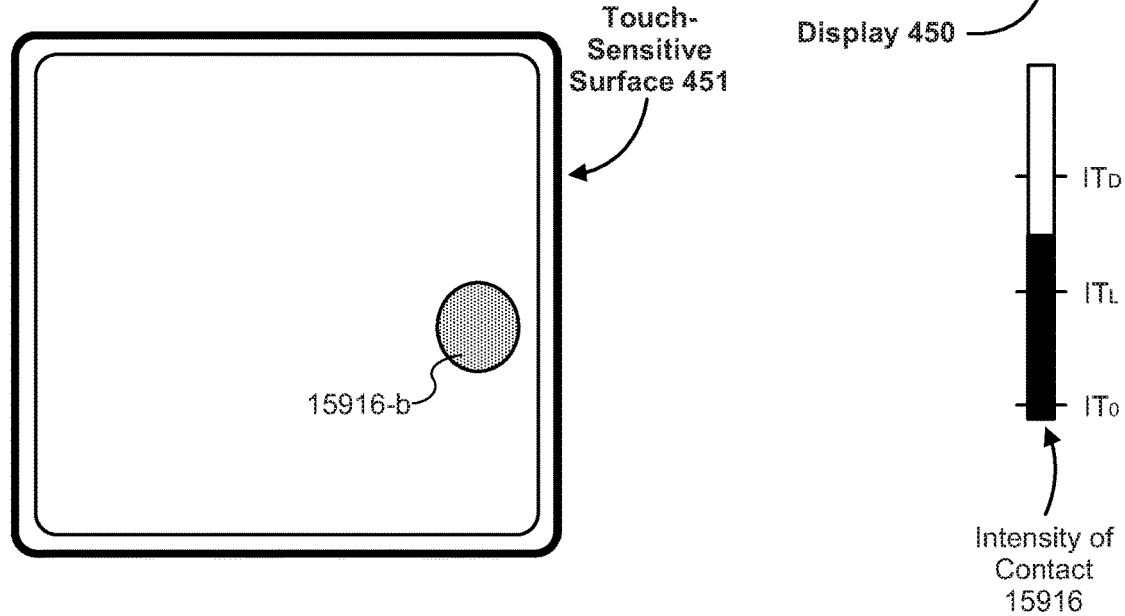
Figure 9A:
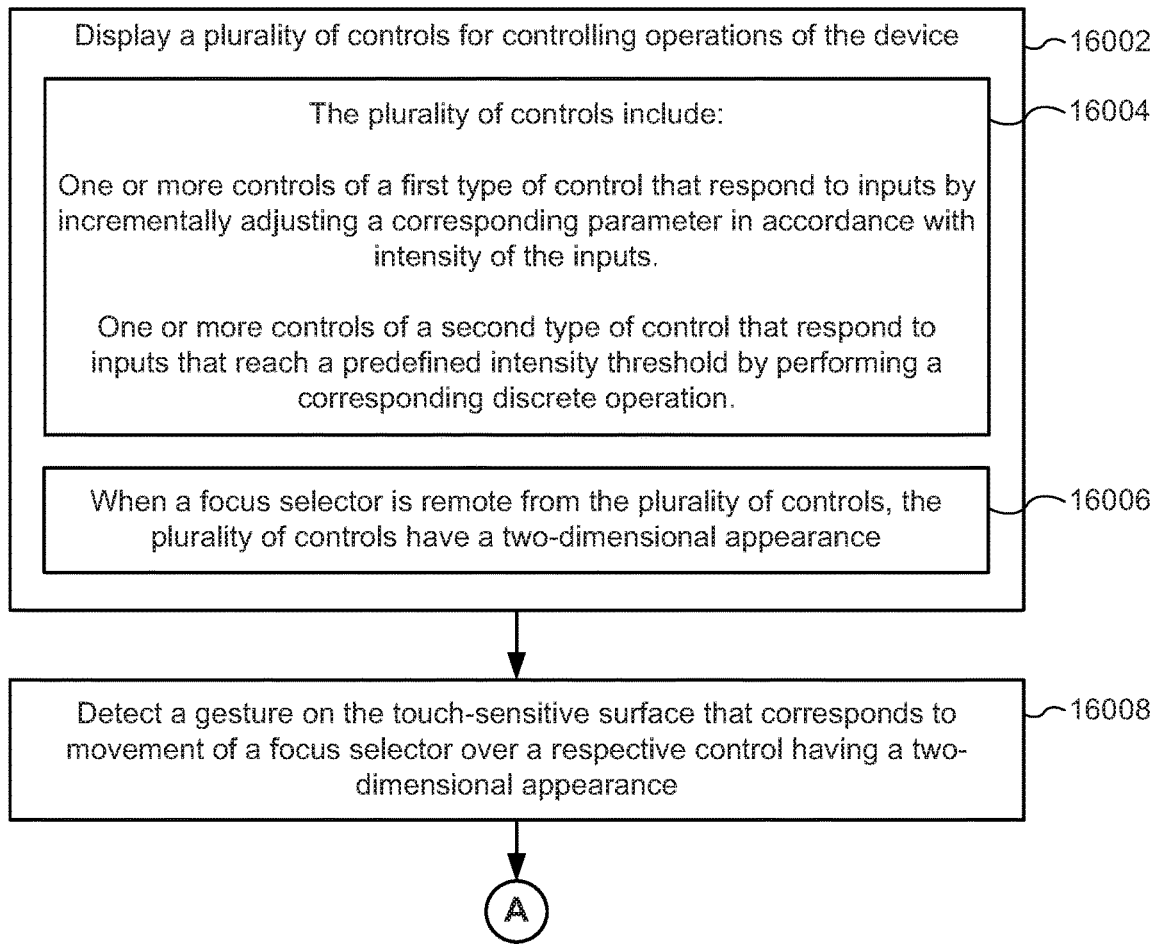
FIGS. 9A-9E are flow diagrams illustrating a method of providing an indication to a user on how a control responds to inputs in accordance with some embodiments.
Figure 9B:
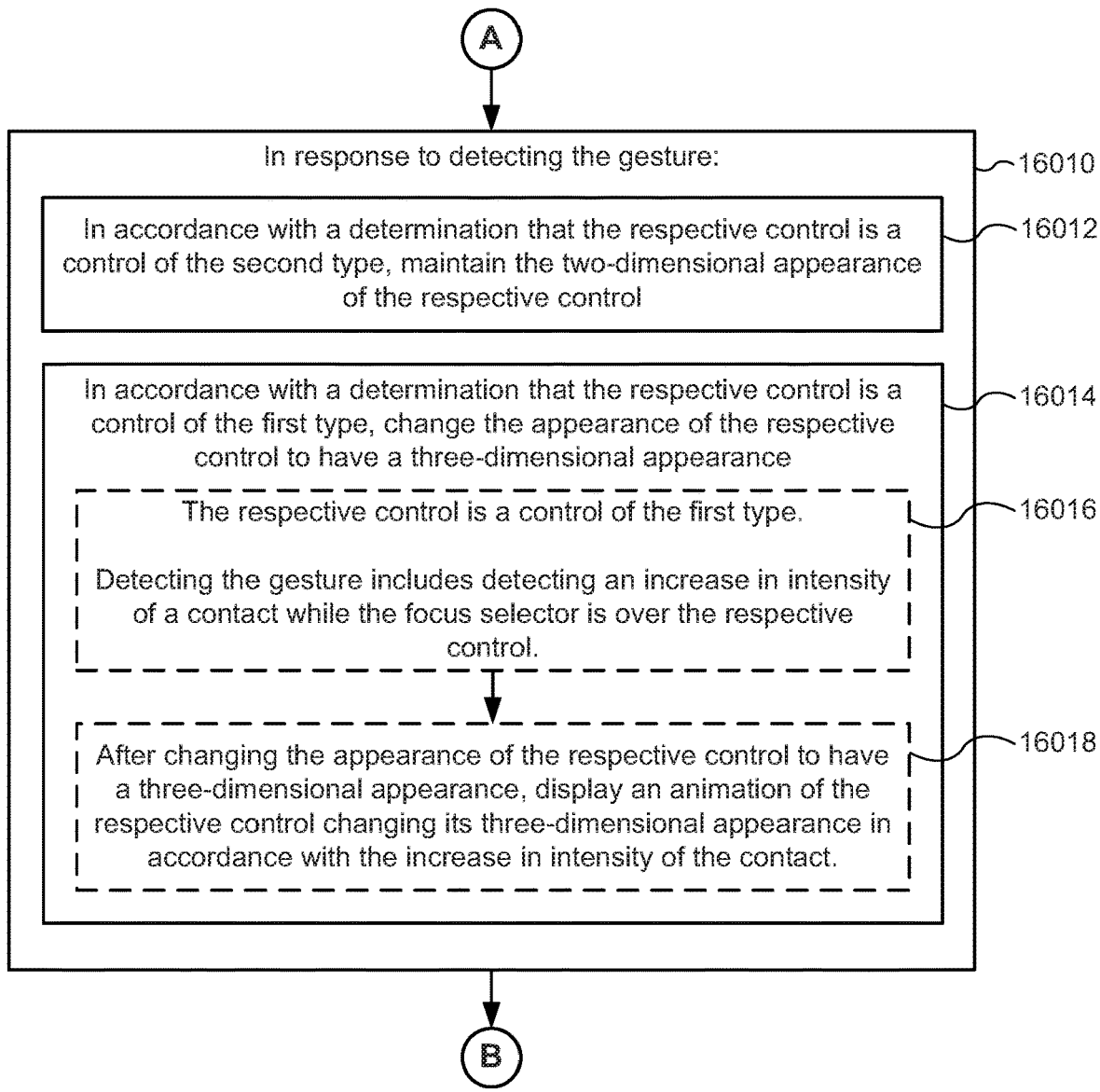
Figure 9C:
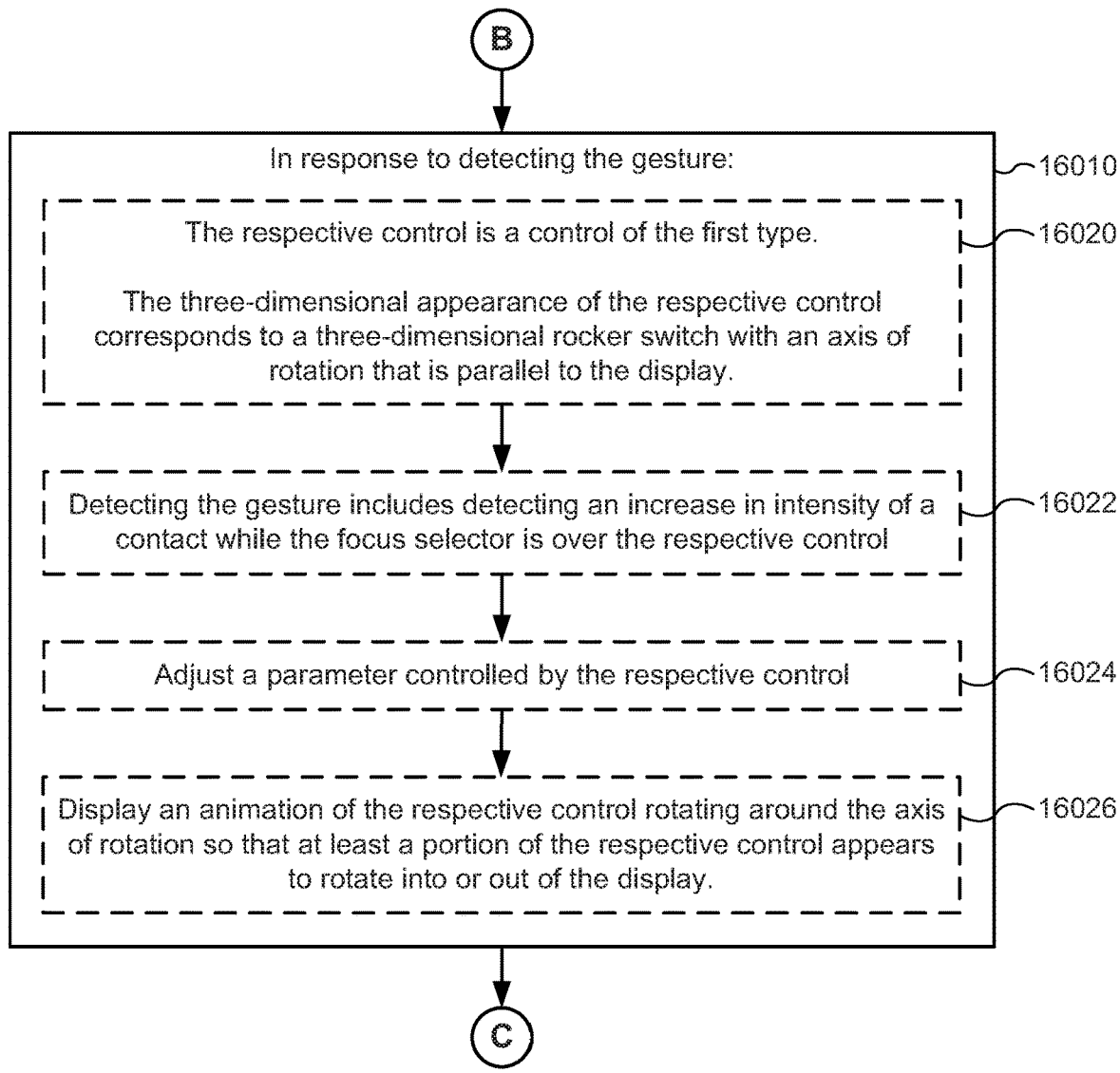
Figure 9D:
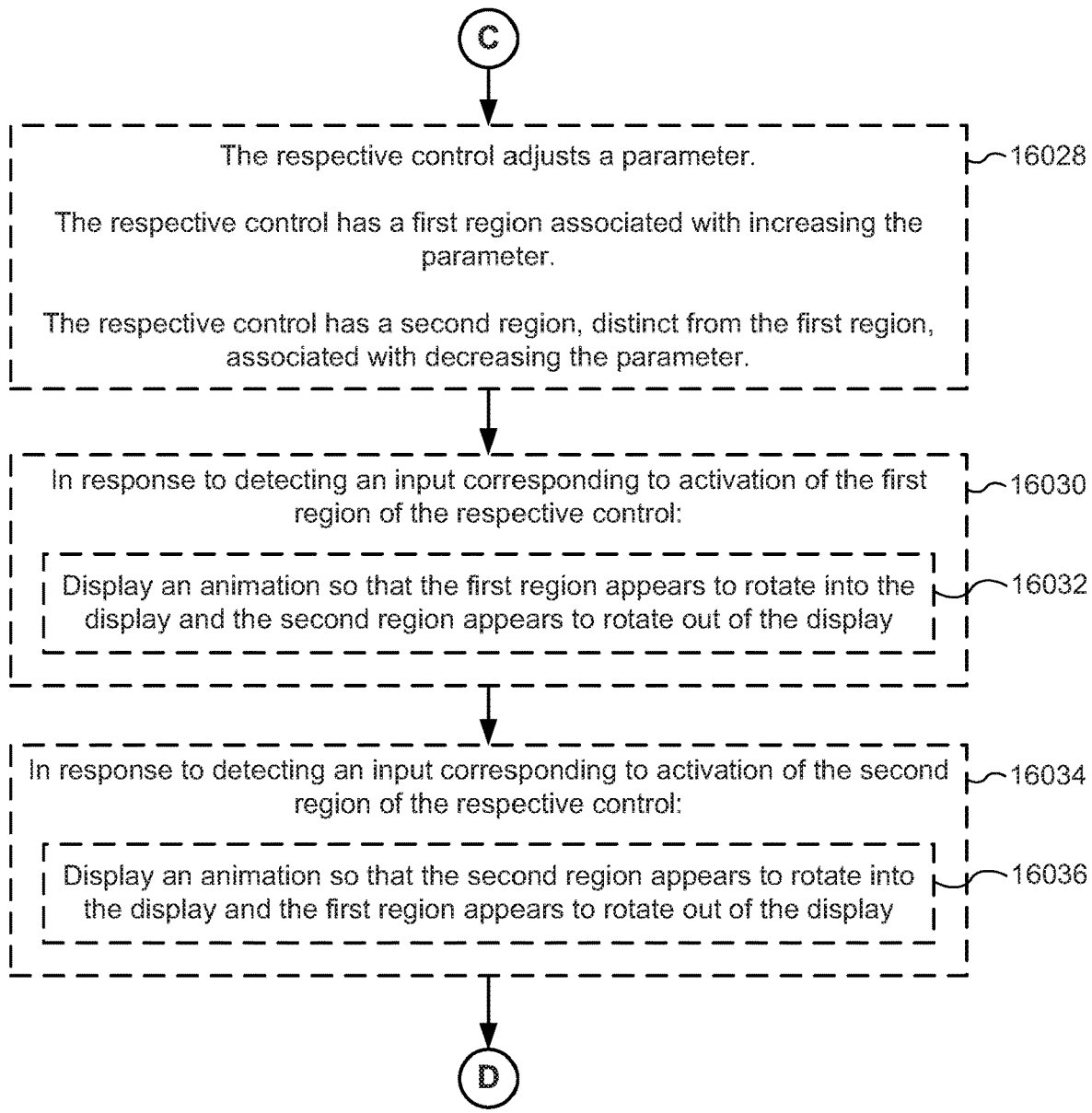
Figure 9E:
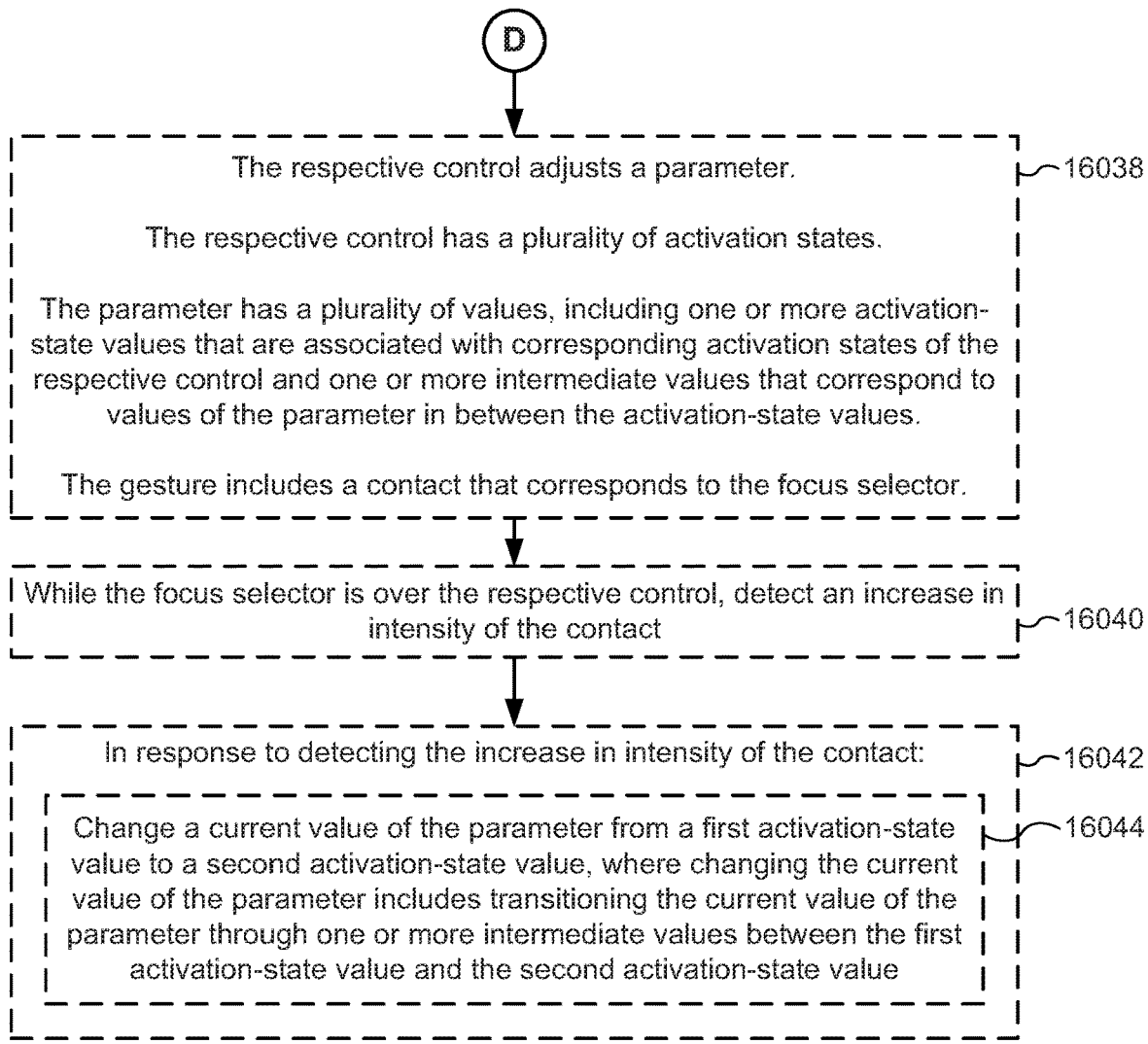

FIGS. 8G-8I illustrate an example of a performing a discrete operation in response to a contact reaching a predefined intensity threshold. In this example, contact 15916 is detected at position 15916-a. In FIG. 8H, contact 15916 moves 15918 to position 15916-b. Movement of cursor 15906 corresponds to movement of contact 15916 and therefore cursor 15906 moves over control 15903. The appearance of control 15903 does not change from a two-dimensional appearance. In this example, contact 15916 at position 15916-b increases in intensity from an intensity below a respective predefined intensity threshold (e.g., below $IT_L$) in FIG. 8H to an intensity above the respective predefined intensity threshold (e.g., above $IT_L$) in FIG. 8I. In accordance with the increase in intensity of contact 15916 above $IT_L$, in this example, the device cancels the changes in the brightness of image 15907 and, as shown in FIG. 8I, where the brightness adjustment has returned to the same value that it had in FIG. 8A (e.g., "0").

FIGS. 9A-9E are flow diagrams illustrating a method 16000 of providing an indication to a user on how a control responds to inputs in accordance with some embodiments. Method 16000 is performed at an electronic device (e.g., device 300, FIG. 3, or portable multifunction device 100, FIG. 1A) with a display and a touch-sensitive surface. In some embodiments, the display is a touch screen display and the touch-sensitive surface is on the display. In some embodiments, the display is separate from the touch-sensitive surface. Some operations in method 16000 are, optionally, combined and/or the order of some operations is, optionally, changed.

As described below, the method 16000 provides an intuitive way to provide an indication to a user on how a control responds to inputs. The method reduces the cognitive burden on a user when interacting with a control, thereby creating a more efficient human-machine interface. For battery-operated electronic devices, enabling a user to interact with a control faster and more efficiently conserves power and increases the time between battery charges.

The device displays (16002) a plurality of controls for controlling operations of the device. The plurality of controls include (16004) one or more controls of a first type of control (e.g., incremental controls) that respond to inputs by incrementally adjusting a corresponding parameter in accordance with intensity of the inputs and one or more controls of a second type of control (e.g., discrete controls) that respond to inputs that reach a predefined intensity threshold by performing a corresponding discrete operation. When a focus selector is remote from the plurality of controls, the plurality of controls have (16006) a two-dimensional appearance. In some circumstances, incrementally adjusting a corresponding parameter includes adjusting the corresponding parameter through three or more different values of the corresponding parameter. In these circumstances, incrementally adjusting the corresponding parameter is not a selection of a binary (e.g., "on/off") state. FIG. 8A, for example, shows controls 15902 of a first type (e.g., controls for adjusting graphical properties of an image 15907 within ranges of values) and control 15903 of a second type (e.g., a control for deciding whether to keep or cancel adjustments to graphical properties of the image 15907), displayed in graphical user interface 15900. FIG. 8A further shows cursor 15906 at position remote from controls 15902 and control 15903. A control for controlling an operation on the device can be represented in the user interface in any of a number of different ways. In some embodiments, a control is represented in the user interface by an icon. In some embodiments, a control is represented in the user interface by selectable text (e.g., a hyperlink or menu item). In some embodiments a control is represented in the user interface by an image or a preview of content. In some embodiments a control is represented by a dynamic user interface object such as a virtual slider or knob.

While displaying the plurality of controls, the device detects (16008) a gesture on the touch-sensitive surface that corresponds to movement of a focus selector over a respective control having a two-dimensional appearance. For example, FIGS. 8A-8B shows contact 15904 initially at position 15904-*a* and movement 15908 of contact 15904 to position 15904-*b* on touch-sensitive surface 451.

In response to detecting the gesture (16010), in accordance with a determination that the respective control is a control of the second type (e.g., a discrete control), the device maintains (16012) the two-dimensional appearance of the respective control. For example, in FIGS. 8G-8I contact 15916 moves 15918 from position 15916-*a* to position 15916-*b* and control 15903 maintains its two-dimensional appearance.

In response to detecting the gesture (16010), in accordance with a determination that the respective control is a control of the first type (e.g., an incremental control), the device changes (16014) the appearance of the respective control to have a three-dimensional appearance. For example, in FIGS. 8A-8C contact 15904 moves 15908 from position 15904-*a* to position 15904-*b* and appearance 15901 of control 15902-1 changes from two-dimensional appearance 15901-*a* in FIG. 8B to three-dimensional appearance 15901-*b* in FIG. 8C.

In some embodiments, the respective control is (16016) a control of the first type (e.g., an incremental control), detecting the gesture includes detecting an increase in intensity of a contact while the focus selector is over the respective control, and after changing the appearance of the respective control to have a three-dimensional appearance, the device displays (16018) an animation of the respective control changing its three-dimensional appearance in accordance with the increase in intensity of the contact. For example, FIGS. 8C-8E show cursor 15906 at a position over control 15902-1 and the intensity of contact 15904 increasing from the intensity of contact 15904 in FIG. 8C to the intensity of contact 15904 in FIG. 8D to the intensity of contact 15904 in FIG. 8E. FIGS. 8C-8E further illustrate appearance 15901 of control 15902-1 changing from appearance 15901-*b* in FIG. 8C to appearance 15901-*c* in FIG. 8D then to appearance 15901-*d* in FIG. 8E.

In some embodiments, the respective control is (16020) a control of the first type (e.g., an incremental control). The three-dimensional appearance of the respective control corresponds to a three-dimensional rocker switch with an axis of rotation that is parallel to the display. For example, in some embodiments, the axis of rotation is parallel to a plane or surface of the display. In some of these embodiments, detecting the gesture includes detecting an increase (16022) in intensity of a contact while the focus selector is over the respective control, the device adjusts (16024) a parameter controlled by the respective control, and the device displays (16026) an animation of the respective control rotating around the axis of rotation so that at least a portion of the respective control appears to rotate into or out of the display. For example, FIGS. 8C-8E illustrate a focus selector (e.g., cursor 15906) at position 15906-*b* over control 15902-1 and the intensity of contact 15904 increasing from the intensity of contact 15904 in FIG. 8C to the intensity of contact 15904 in FIG. 8D to the intensity of contact 15904 in FIG. 8E. FIGS. 8C-8E further illustrate appearance 15901 of control 15902-1 changing from appearance 15901-*b* in FIG. 8C to appearance 15901-*c* in FIG. 8D then to appearance 15901-*d* in FIG. 8E. FIGS. 8D-8E also show current value display 15910-1 changing corresponding to adjustments of a value of the brightness parameter.

In some embodiments, the respective control adjusts (16028) a parameter (e.g., a parameter of the device such as screen brightness or screen volume, or a parameter of an application running on the device such as contrast or saturation of an image displayed in the application). The respective control has a first region associated with increasing the parameter. The respective control has a second region, distinct from the first region, associated with decreasing the parameter. In response to detecting (16030) an input corresponding to activation of the first region of the respective control (e.g., detecting a press input of a contact while the focus selector is on the first region of a button, or detecting a press input while a contact is on a portion of the touch-sensitive surface corresponding to the first region of the button, or detecting a press input of a contact while the contact is on a portion of the touch-sensitive surface associated with the first region of the button), the device displays (16032) an animation so that the first region appears to rotate into the display (e.g., into the z-plane of the display) and the second region appears to rotate out of the display (e.g., out of the z-plane of the display). In response to detecting (16034) an input corresponding to activation of the second region of the respective control, (e.g., detecting a press input of a contact while the focus selector is on the second region of a button, or detecting a press input while a contact is on a portion of the touch-sensitive surface corresponding to the second region of the button, or detecting a press input of a contact while the contact is on a portion of the touch-sensitive surface associated with the second region of the button), the device displays (16036) an animation so that the second region appears to rotate into the display (e.g., into the z-plane of the display) and the first region appears to rotate out of the display (e.g., out of the z-plane of the display). For example, FIG. 8F shows control 15902-1 having first region 15913-1 and second region 15913-2. FIG. 8F also shows cursor 15906 over first region 15913-1 that is associated with increasing a value of a brightness parameter associated with control 15902-1 and contact 15905 detected on touch-sensitive surface 451. FIG. 8F further illustrates first region 15913-1 appearing to rotate into display 450, as shown by directional arrow 15915-1, and second region 15913-2 appearing to rotate out of display 450, as shown by directional arrow 15915-2.

In some embodiments, the respective control adjusts (16038) a parameter (e.g., a parameter of the device such as screen brightness or screen volume, or a parameter of an application running on the device such as contrast or saturation of an image displayed in the application), the respective control has a plurality of activation states. In some of these embodiments, the parameter has a plurality of values, including one or more activation-state values that are associated with corresponding activation states of the respective control and one or more intermediate values that correspond to values of the parameter in between the activation-state values, and the gesture includes a contact that corresponds to the focus selector. In some of these embodiments, while the focus selector is over the respective control, the device detects (16040) an increase in intensity of the contact. In response to detecting the increase in intensity of the contact (16042), the device changes (16044) a current value of the parameter from a first activation-state value to a second activation-state value, where changing the current value of the parameter includes transitioning the current value of the parameter through one or more intermediate values between the first activation-state value and the second activation-state value. In some embodiments, the device transitions through the intermediate values in response to a plurality of discrete inputs that correspond to changing the current value of the parameter (e.g., a plurality of quick press inputs while the focus selector is on one side of the control). In some embodiments, the device transitions through the intermediate values in accordance with a duration of a continuous input (e.g., a long press input while the focus selector is on one side of the control). FIGS. 8C-8E, for example, illustrate cursor 15906 at position 15906-b over control 15902-1 and the intensity of contact 15904 increasing from the intensity of contact 15904 in FIG. 8C (e.g., an intensity below $IT_L$) to the intensity of contact 15904 in FIG. 8D (e.g., an intensity above $IT_L$ and below $IT_D$) to the intensity of contact 15904 in FIG. 8E (e.g., an intensity above $IT_D$). FIGS. 8C-8E further illustrate current value display 15910-1 changing from 0 in FIG. 8C to 10 in FIG. 8D to 100 in FIG. 8E, corresponding to adjustments of a value of the brightness parameter. In accordance with these embodiments, in this example, value 0 in FIG. 8C is a first activation-state value, value 10 in FIG. 8D is a second activation-state value, and value 100 in FIG. 8E is a third activation-state value. An example of intermediate values in accordance with these embodiments, are values between value 0 in FIG. 8C and value 10 in FIG. 8D (e.g., 1, 2, 3, . . . , 9).

It should be understood that the particular order in which the operations in FIGS. 9A-9E have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., those listed in the fifth paragraph of the Description of Embodiments) are also applicable in an analogous manner to method 16000 described above with respect to FIGS. 9A-9E. For example, the contacts, movements, controls, and focus selectors described above with reference to method 16000 optionally have one or more of the characteristics of contacts, movements, controls, and focus selectors described herein with reference to other methods described herein (e.g., those listed the fifth paragraph of the Description of Embodiments). For brevity, these details are not repeated here.

Figure 10:
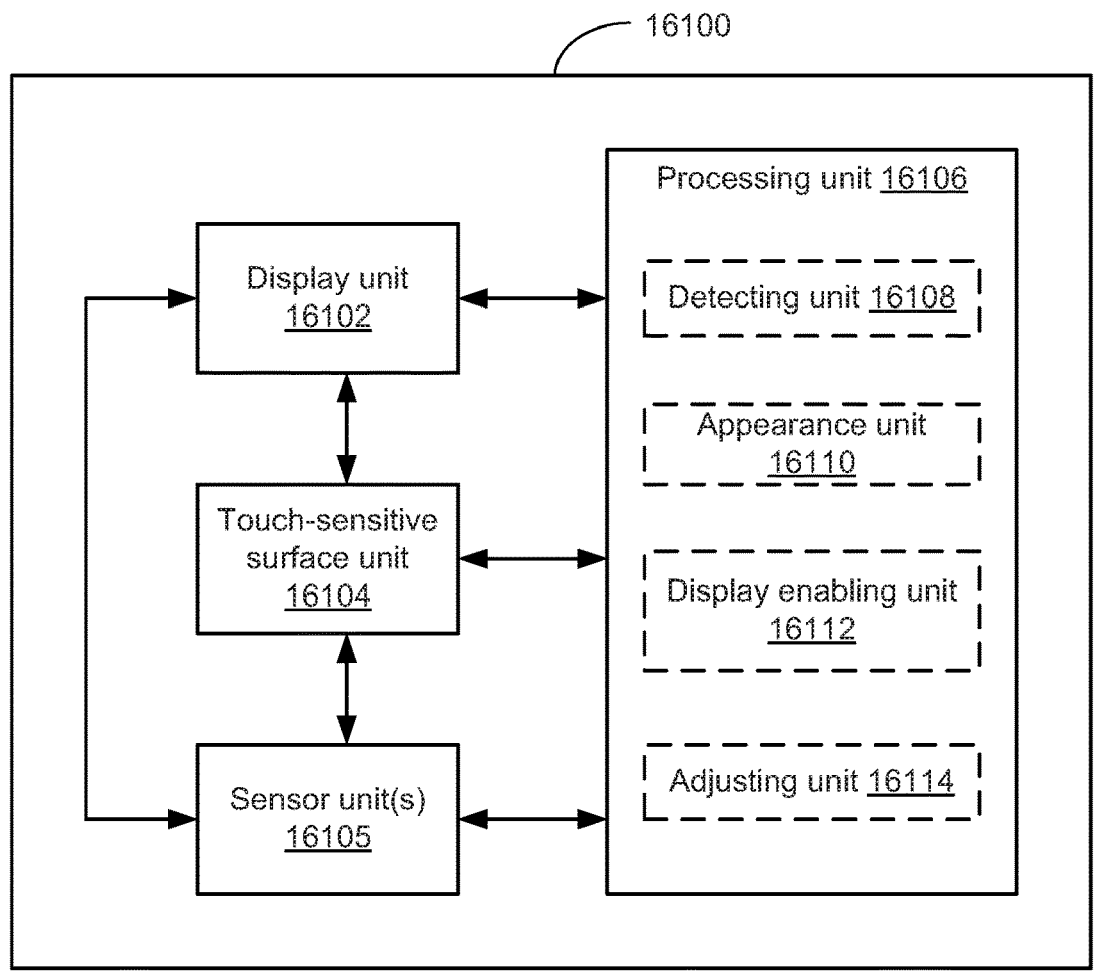
FIG. 10 is a functional block diagram of an electronic device in accordance with some embodiments.

In accordance with some embodiments, FIG. 10 shows a functional block diagram of an electronic device 16100 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 10 are, optionally, combined or separated into sub-blocks to implement the principles of the various described embodiments. Therefore, the description herein optionally supports any possible combination or separation or further definition of the functional blocks described herein.

As shown in FIG. 10, an electronic device 16100 includes a display unit 16102 configured to display a plurality of controls for controlling operations of the device, where the plurality of controls include one or more controls of a first type of control that respond to inputs by incrementally adjusting a corresponding parameter in accordance with intensity of the inputs, and one or more controls of a second type of control that respond to inputs that reach a predefined intensity threshold by performing a corresponding discrete operation, and when a focus selector is remote from the plurality of controls, the plurality of controls have a two-dimensional appearance. Electronic device 16100 further includes a touch-sensitive surface unit 16104 configured to detect user gestures, one or more sensor units 16105 configured to detect intensity of contacts with the touch-sensitive surface unit 16104; and a processing unit 16106 coupled to display unit 16102, touch-sensitive surface unit 16104 and the one or more sensor units 16105. In some embodiments, the processing unit includes a detecting unit 16108, an appearance unit 16110, a display enabling unit 16112, and an adjusting unit 16114.

The processing unit 16106 is configured to detect a gesture on the touch-sensitive surface unit (e.g., with detecting unit 16108) that corresponds to movement of a focus selector over a respective control having a two-dimensional appearance, and in response to detecting the gesture, in accordance with a determination that the respective control is a control of the first type, change the appearance (e.g., with appearance unit 16110) of the respective control to have a three-dimensional appearance, and in accordance with a determination that the respective control is a control of the second type, maintain the two-dimensional appearance (e.g., with appearance unit 16110) of the respective control.

In some embodiments, the respective control is a control of the first type, detecting the gesture (e.g., with detecting unit 16108) includes detecting an increase in intensity of a contact while the focus selector is over the respective control, and the processing unit is further configured to, after changing the appearance of the respective control to have a three-dimensional appearance, enable display of (e.g., with display enabling unit 16112) an animation of the respective control changing its three-dimensional appearance in accordance with the increase in intensity of the contact.

In some embodiments, the respective control is a control of the first type, the three-dimensional appearance of the respective control corresponds to a three-dimensional rocker switch with an axis of rotation that is parallel to the display unit, and detecting the gesture (e.g., with detecting unit 16108) includes detecting an increase in intensity of a contact while the focus selector is over the respective control. In some embodiments, the processing unit is further configured to, in response to detecting the gesture, adjust a parameter controlled by the respective control (e.g., with adjusting unit 16114); and enable display of (e.g., with display enabling unit 16112) an animation of the respective control rotating around the axis of rotation so that at least a portion of the respective control appears to rotate into or out of the display unit.

In some embodiments, the respective control adjusts a parameter, the respective control has a first region associated with increasing the parameter, and the respective control has a second region, distinct from the first region, associated with decreasing the parameter. In some embodiments, the processing unit 16106 is further configured to, in response to detecting an input corresponding to activation of the first region of the respective control, enable display of (e.g., with display enabling unit 16112) an animation so that the first region appears to rotate into the display and the second region appears to rotate out of the display, and in response to detecting an input corresponding to activation of the second region of the respective control, enable display of (e.g., with display enabling unit 16112) an animation so that the second region appears to rotate into the display and the first region appears to rotate out of the display.

In some embodiments, the respective control adjusts a parameter, the respective control has a plurality of activation states, the parameter has a plurality of values, including one or more activation-state values that are associated with corresponding activation states of the respective control and one or more intermediate values that correspond to values of the parameter in between the activation-state values, and the gesture includes a contact that corresponds to the focus selector. In some embodiments, the processing unit 16106 is further configured to, while the focus selector is over the respective control, detect (e.g., with detecting unit 16108) an increase in intensity of the contact, and in response to detecting the increase in intensity of the contact, change a current value of the parameter (e.g., with adjusting unit 16114) from a first activation-state value to a second activation-state value, where changing the current value of the parameter includes transitioning the current value of the parameter through one or more intermediate values between the first activation-state value and the second activation-state value.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 9A-9E are, optionally, implemented by components depicted in FIGS. 1A-1B or FIG. 10. For example, detection operation 16008, maintaining operation 16012, and changing operation 16014 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Adjusting a Bidirectional User Interface Element on an Electronic Device

Many electronic devices have graphical user interfaces that include bidirectional user interface elements. For example, a photo album will often contain more photos than can be displayed at one time. In this example, the photo album will have a scroll bar, slider control, or another type of bidirectional user interface element, adjustable by the user, to shift or scroll through the photos. There is often a need to provide a fast, efficient, and convenient way for users to adjust the bidirectional user interface element (e.g., scrolling the photo album so as to view additional photos in the photo album). These methods reduce the cognitive burden on a user and produce a more efficient human-machine interface.

FIGS. 11A-11N illustrate exemplary user interfaces for adjusting bidirectional user interface elements in accordance with some embodiments. The user interfaces in these figures are used to illustrate the processes described below, including the processes described below with reference to FIGS. 12A-12C. FIGS. 11A-11N include intensity diagrams that show the current intensity of the contact on the touch-sensitive surface relative to a plurality of intensity thresholds including a light press intensity threshold (e.g., "$IT_L$") and a deep press intensity threshold (e.g., "$IT_D$").

In some embodiments, the device is an electronic device with a separate display (e.g., display 450) and a separate touch-sensitive surface (e.g., touch-sensitive surface 451). In some embodiments, the device is portable multifunction device 100, the display is touch-sensitive display system 112, and the touch-sensitive surface includes tactile output generators 167 on the display (FIG. 1A). For convenience of explanation, the embodiments described with reference to FIGS. 11A-11I and FIGS. 12A-12D will be discussed with reference to display 450 and a separate touch-sensitive surface 451, however analogous operations are, optionally, performed on a device with a touch-sensitive display system 112 in response to detecting the contacts described in FIGS. 11A-11I on the touch-sensitive display system 112 while displaying the user interfaces shown in FIGS. 11A-11I on the touch-sensitive display system 112; in such embodiments, the focus selector is, optionally: a respective contact, a representative point corresponding to a contact (e.g., a centroid of a respective contact or a point associated with a respective contact), or a centroid of two or more contacts detected on the touch-sensitive display system 112, in place of cursor 16204.

FIG. 11A illustrates an example of a user interface that includes a bidirectional user interface element. User interface 16200 is displayed on display 450 of a device (e.g., device 300) and is responsive to contacts (e.g., a finger contact) on touch-sensitive surface 451. User interface 16200 includes bidirectional user interface element 16202, which in some embodiments includes visual position indicator 16212, and images 16210 within viewer 16211. In some embodiments, viewer 16211 is another bidirectional user interface element. FIG. 11A further illustrates a displayed representation of a focus selector (e.g., cursor 16204).

Figure 11B:
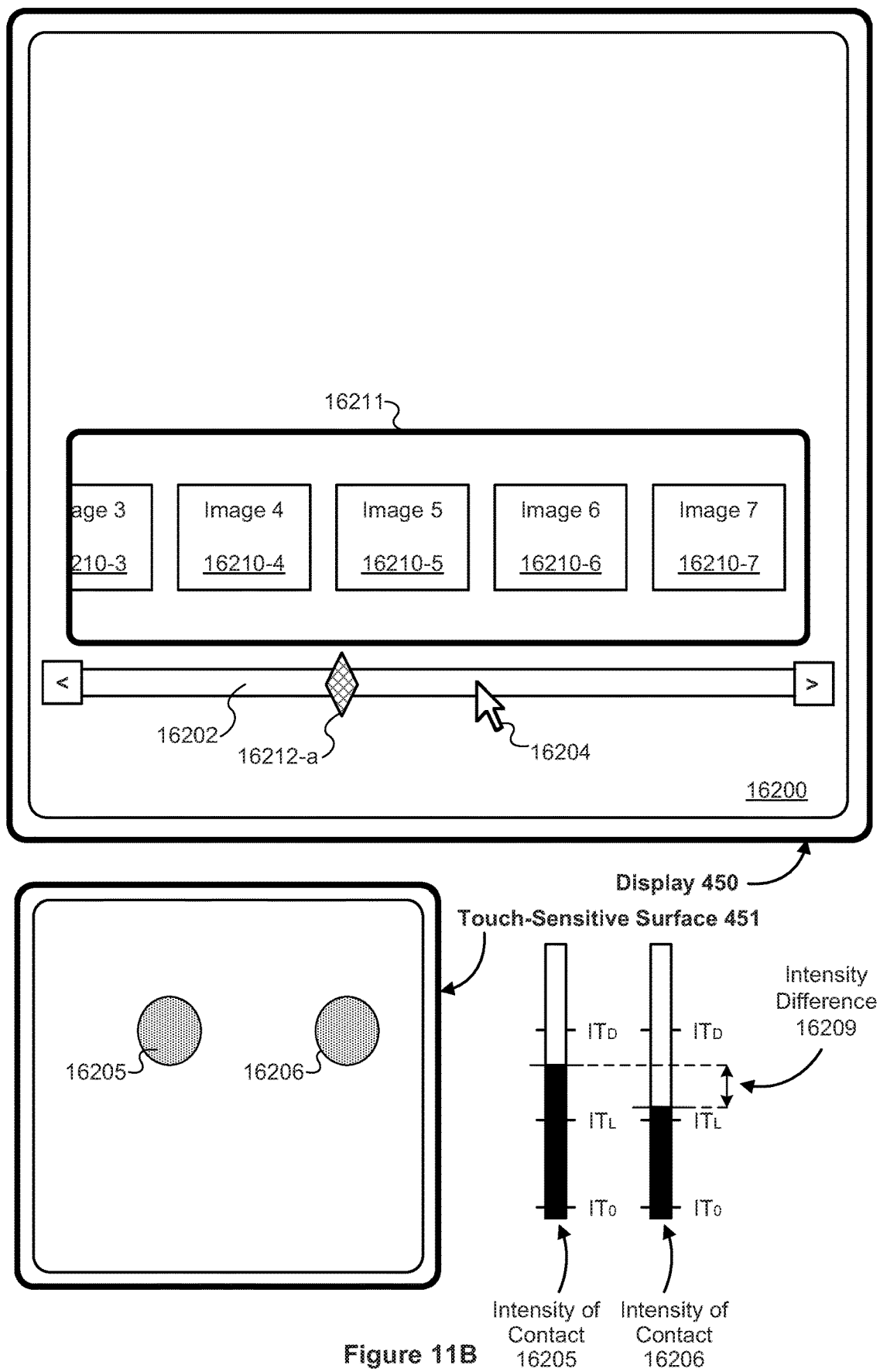
Figure 11C:
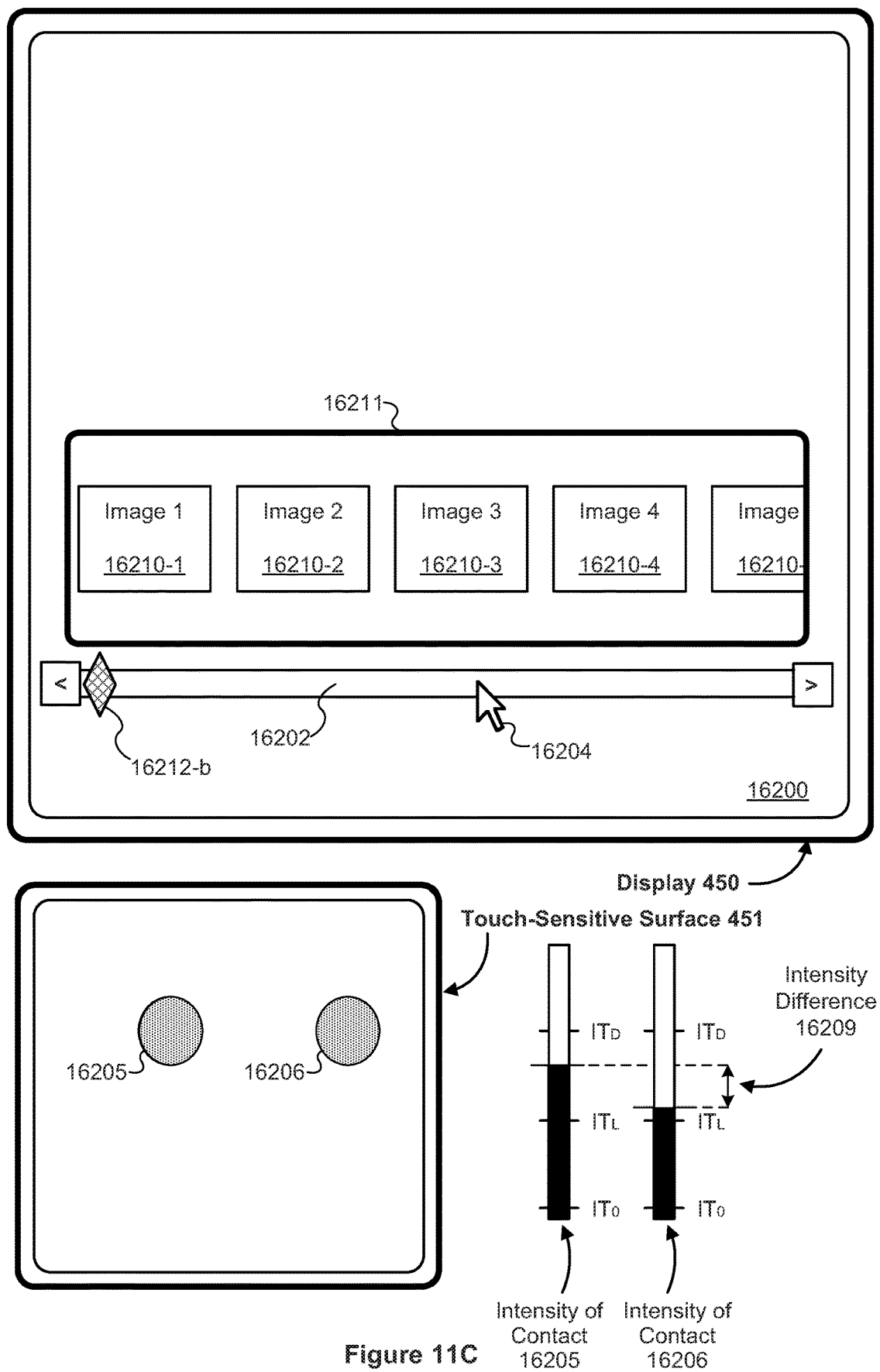

FIGS. 11B-11C illustrate an example of adjusting a bidirectional user interface element in accordance with an input on a touch-sensitive surface. In FIGS. 11B-11C, the intensity of contact 16205 is greater than the intensity of contact 16206 and, therefore, bidirectional user interface element 16202 is adjusted by moving visual position indicator 16212 from position 16212-a in FIG. 11B to position 16212-b in FIG. 11C in accordance with intensity difference 16209. In this example, images 16210 are concurrently moved from left to right within viewer 16211. In some other embodiments, the images move from right to left in response to the contact on the right having a greater intensity than the contact on the left.

Figure 11D:
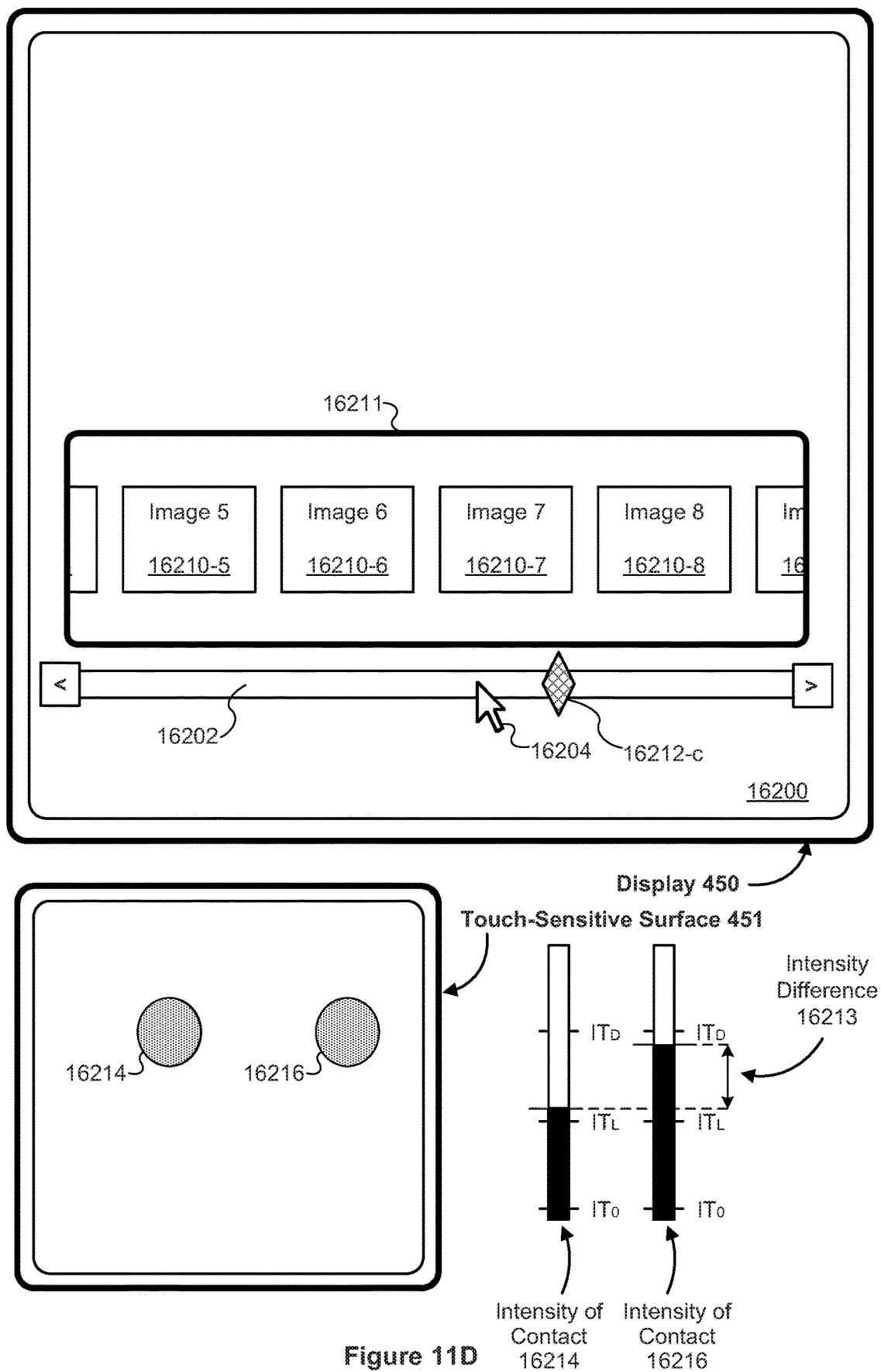
Figure 11E:
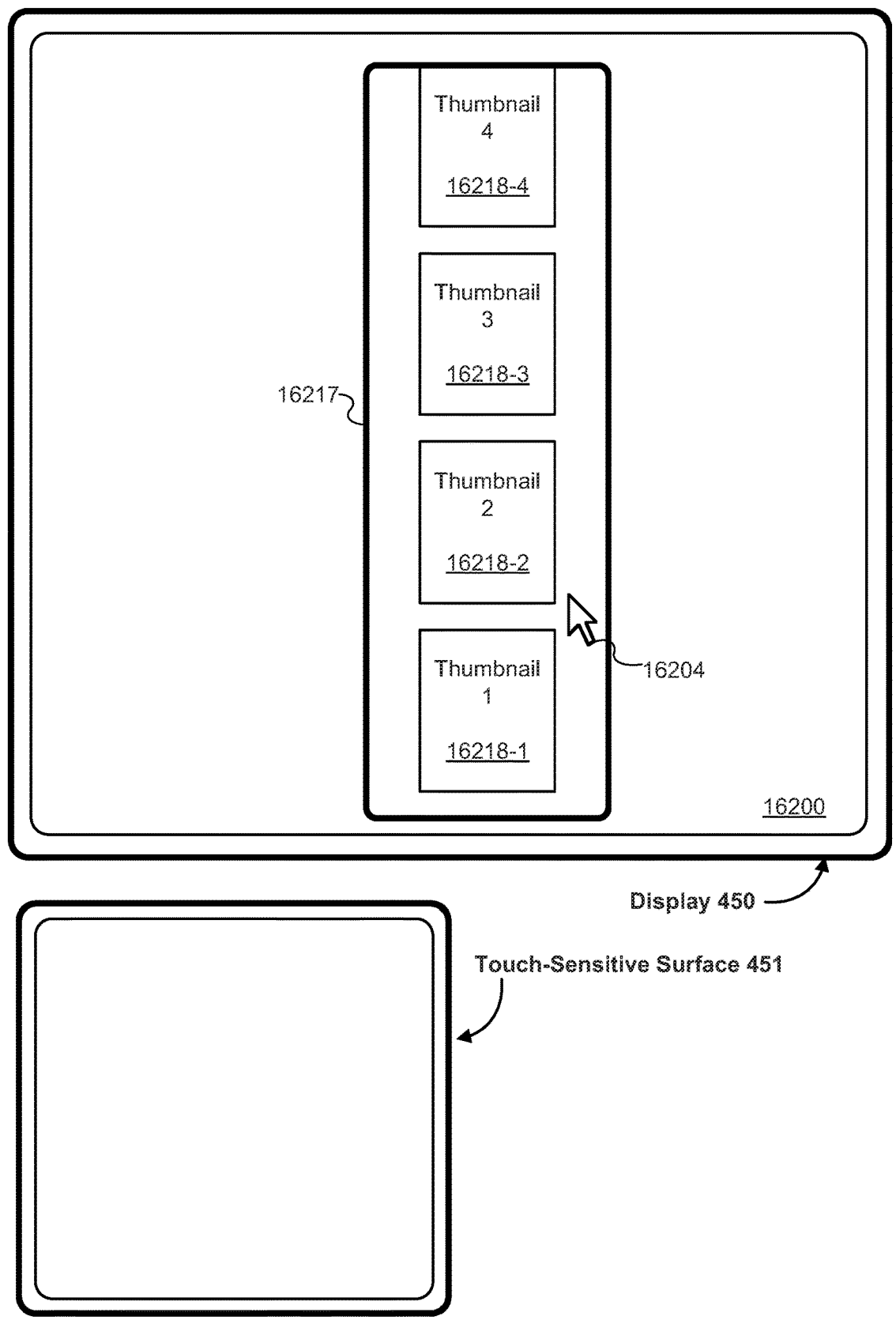

FIG. 11D illustrates a further example of adjusting a bidirectional user interface element in accordance with an input on a touch-sensitive surface. In FIG. 11D, the intensity of contact 16214 is less than the intensity of contact 16216 and, therefore, bidirectional user interface element 16202 is adjusted by moving visual position indicator 16212 from position 16212-b in FIG. 11C to position 16212-c in FIG. 11D in accordance with intensity difference 16213. Furthermore, in this example, images 16210 are concurrently moved from right to left within viewer 16211.

Figure 11F:
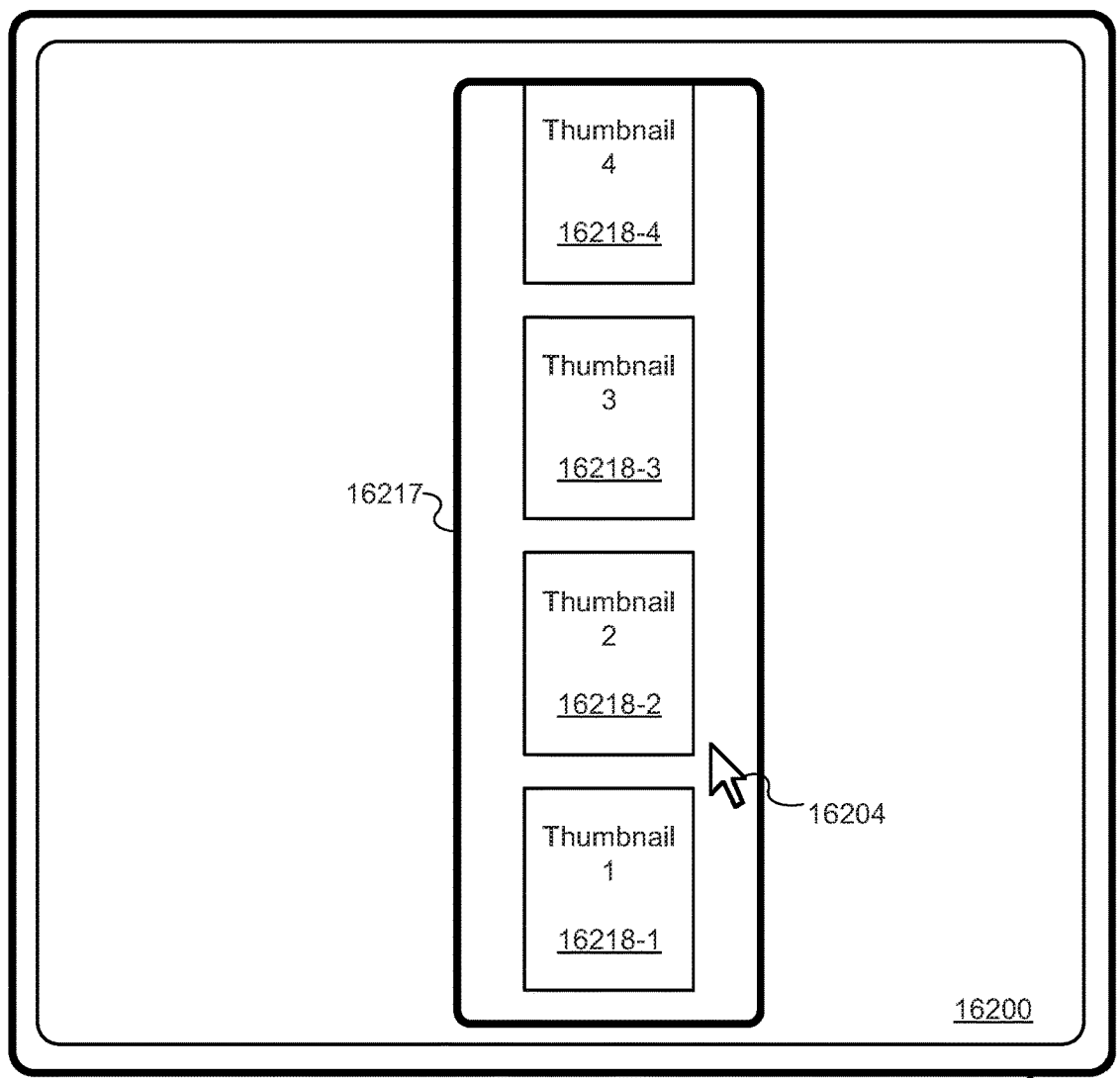
Figure 11F:
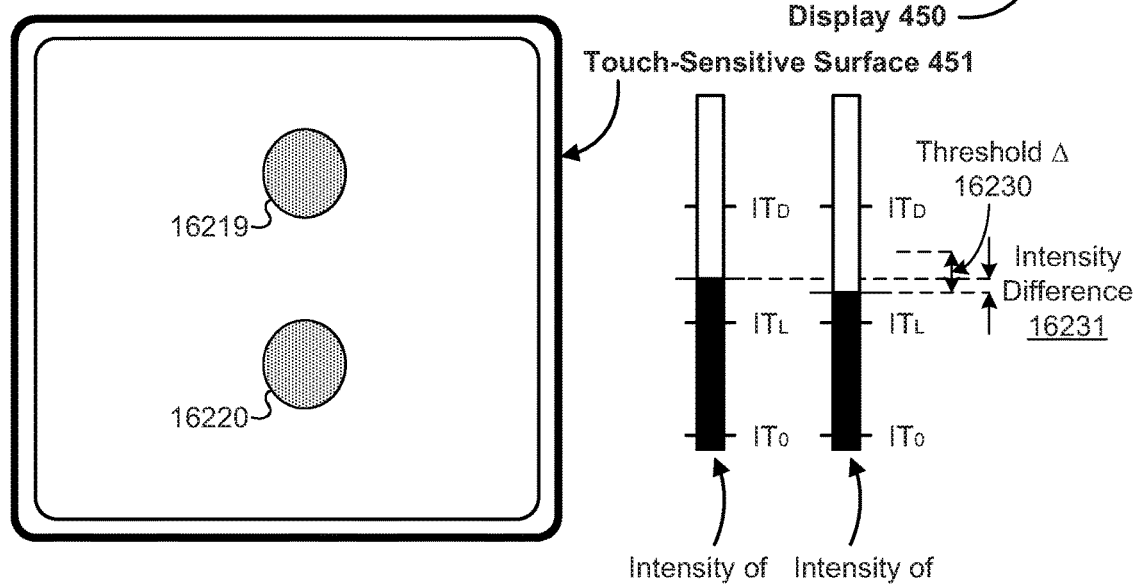
Figure 11G:
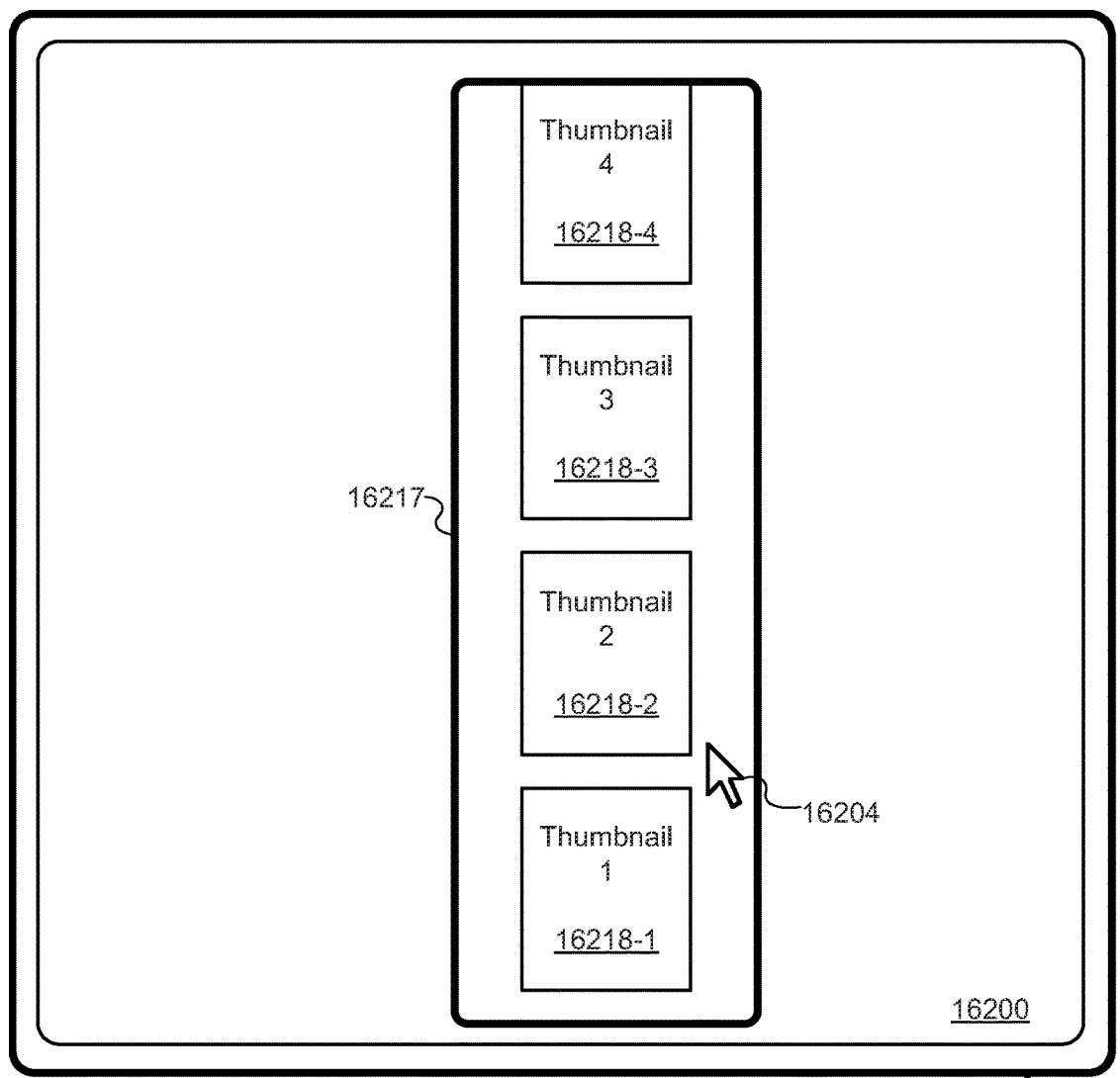
Figure 11G:
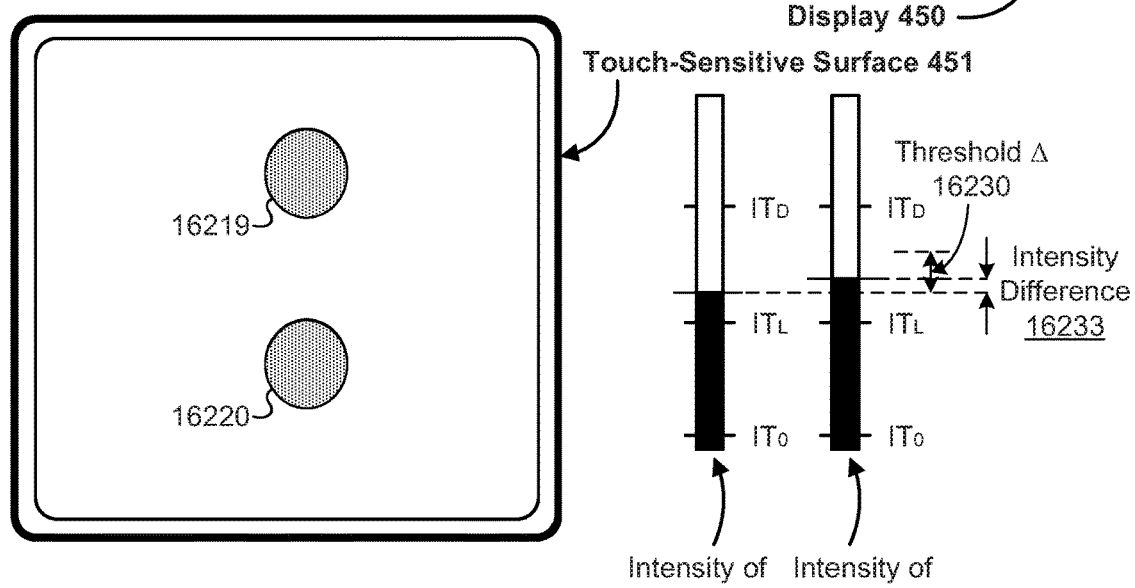
Figure 11H:
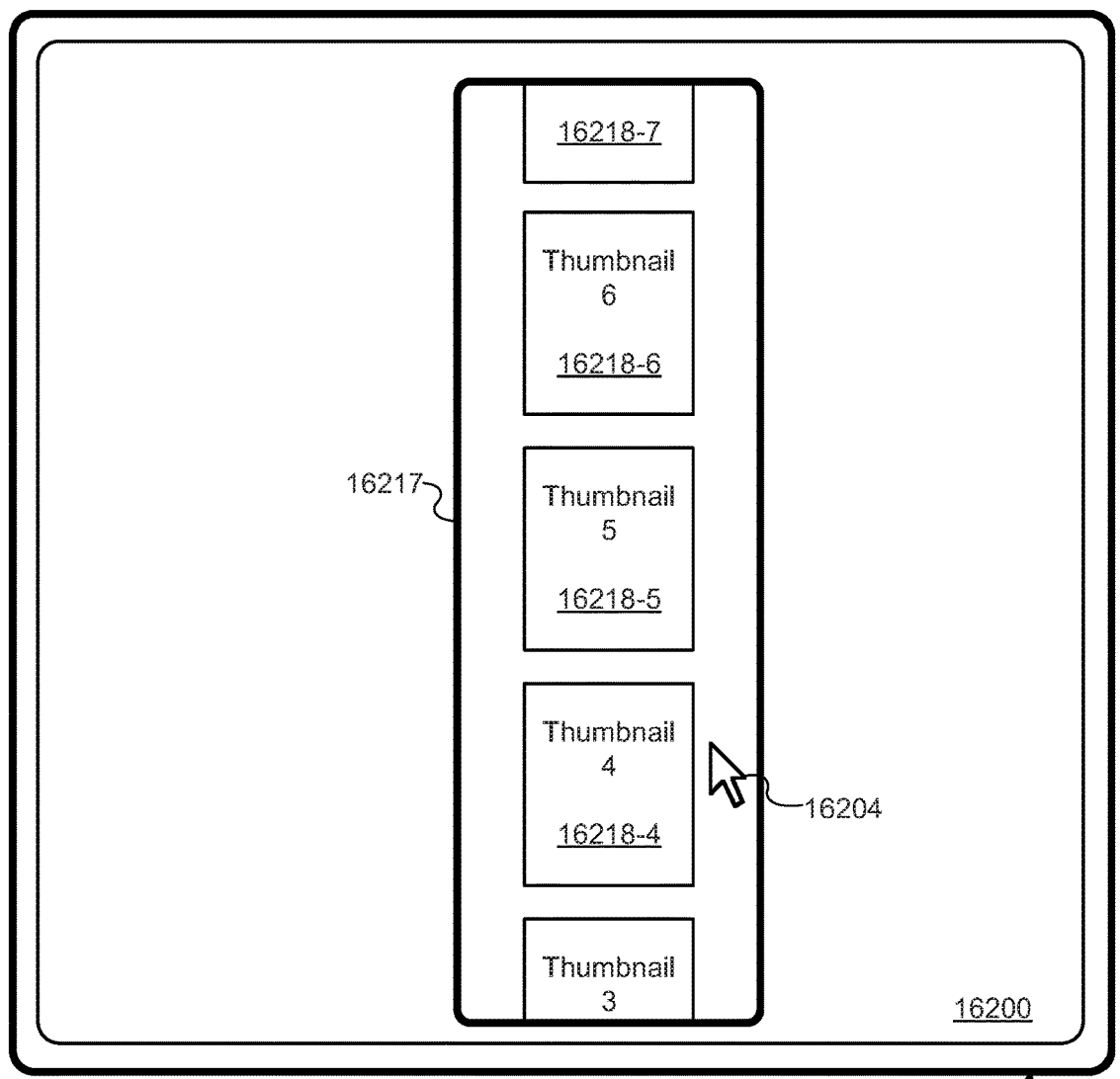
Figure 11H:
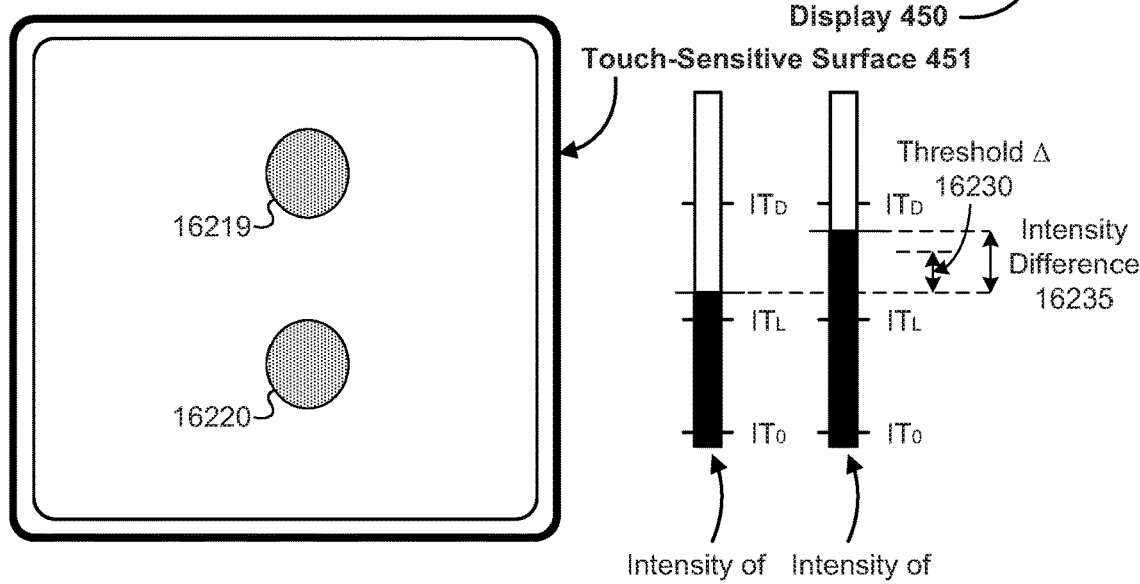

In accordance with some embodiments, FIGS. 11E-11H illustrate an example of adjusting a bidirectional user interface element in accordance with inputs on a touch-sensitive surface and a predefined threshold. In this example, user interface 16200 includes thumbnails 16218 within viewer 16217, which is, in this example, a bidirectional user interface element. In this example, the bidirectional user interface element does not have a visual indicator and is determined to have focus when the focus selector (e.g., cursor 16204) is within viewer 16217. In FIG. 11F, although the intensity of contact 16219 is greater than the intensity of contact 16220, intensity difference 16231 is below predefined threshold 16230 (e.g., a predefined intensity difference threshold) and therefore bidirectional user interface 16217 is not adjusted. Similarly in FIG. 11G, although the intensity of contact 16220 is greater than the intensity of contact 16219, intensity difference 16233 is below predefined threshold 16230 and the bidirectional user interface (e.g., viewer 16217) is not adjusted. In FIG. 11H, the intensity of contact 16220 is greater than the intensity of contact 16219 and intensity difference 16235 is above predefined threshold 16230, and therefore the bidirectional user element (e.g., viewer 16217) is adjusted by moving thumbnails 16218 from top to bottom within viewer 16217. In some other embodiments, the thumbnails move from bottom to top in response to the contact on the bottom having a greater intensity than the contact on the top.

Figure 11I:
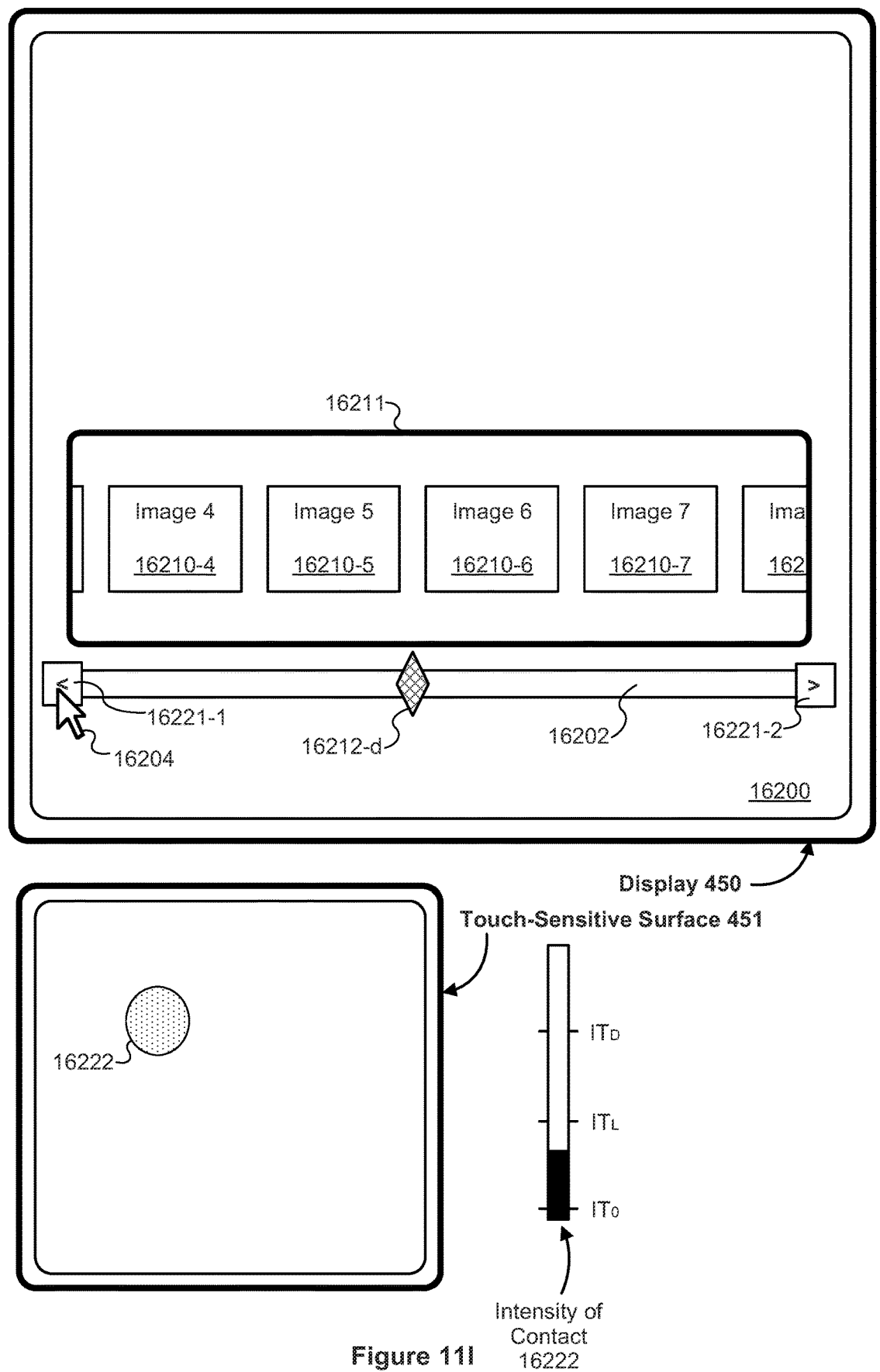
Figure 11J:
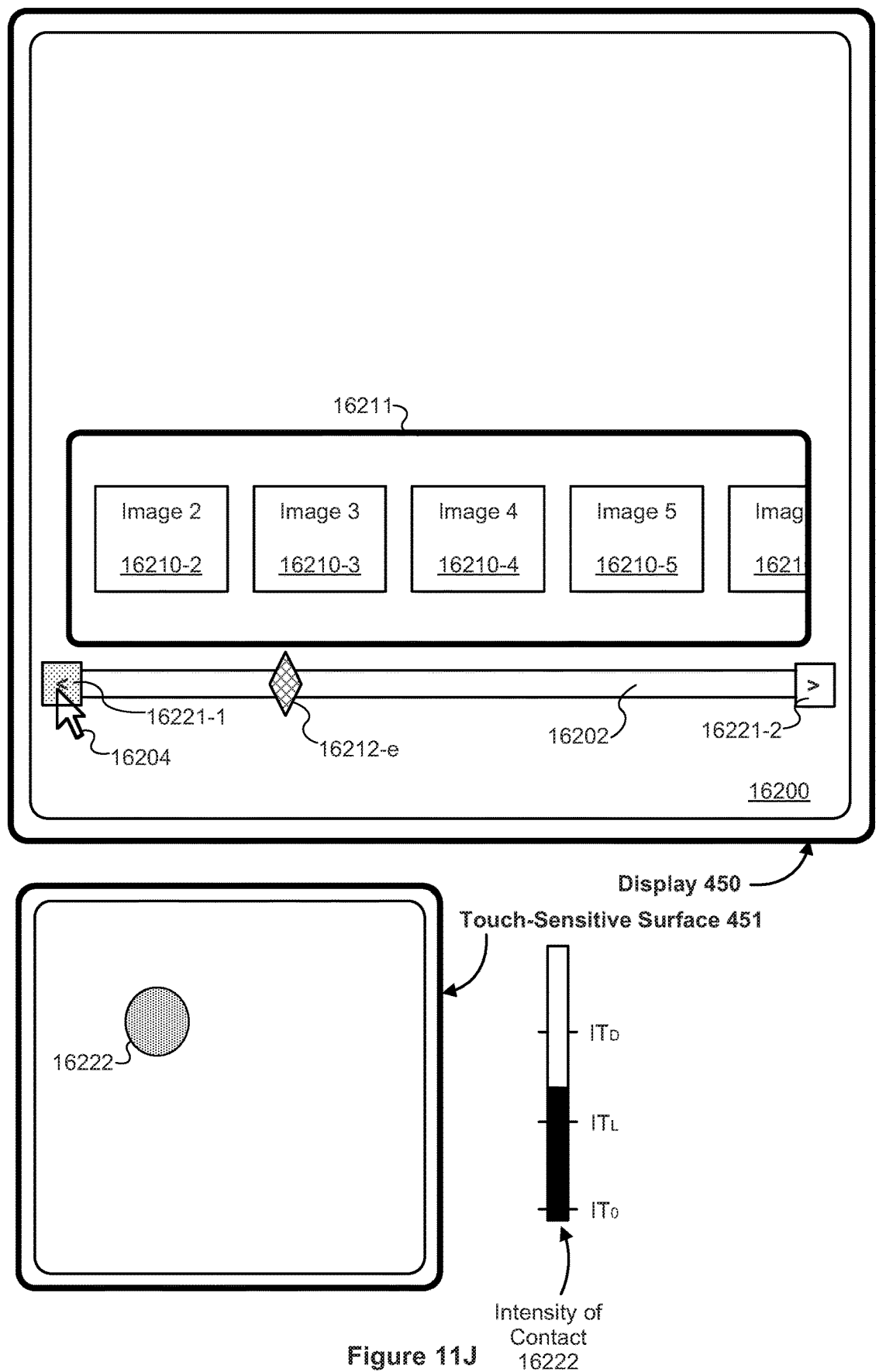

In accordance with some embodiments, FIGS. 11I-11J illustrate an example of adjusting a bidirectional user interface element in accordance with a second input on a touch-sensitive surface. In FIGS. 11I-11J, cursor 16204 is over portion 16221-1 of bidirectional user interface element 16202 that corresponds to a scroll arrow. In FIG. 11I, contact 16222 is detected on touch-sensitive surface 451 and, in response to detecting an increase in intensity of contact 16222 above $IT_L$ as shown in FIG. 11J, images 16210 are scrolled from left to right within viewer 16211 and visual position indicator is moved from position 16212-d in FIG. 11I to position 16212-e in FIG. 11J. Conceptually, in this example, the position of the visual position indicator 16212 corresponds to the position of a sliding window over the images 16210 in viewer 16211, and detection of the increase in intensity of contact 16222 while cursor 16204 is over portion 16221-1 of bidirectional user interface element 16202 causes the sliding window to move to the left over the images 16210 in viewer 16211 or, conversely, causes the images 16210 to move to the right under viewer 16211. Similarly, if the device were to detect an increase in intensity of contact 16222, while cursor 16204 is over portion 16221-2 of bidirectional user interface element 16202 that corresponds to a different scroll arrow, the device would scroll the images in the opposite direction (e.g., scrolling the images 16210 to the left with respect to viewing window 16211).

Figure 11K:
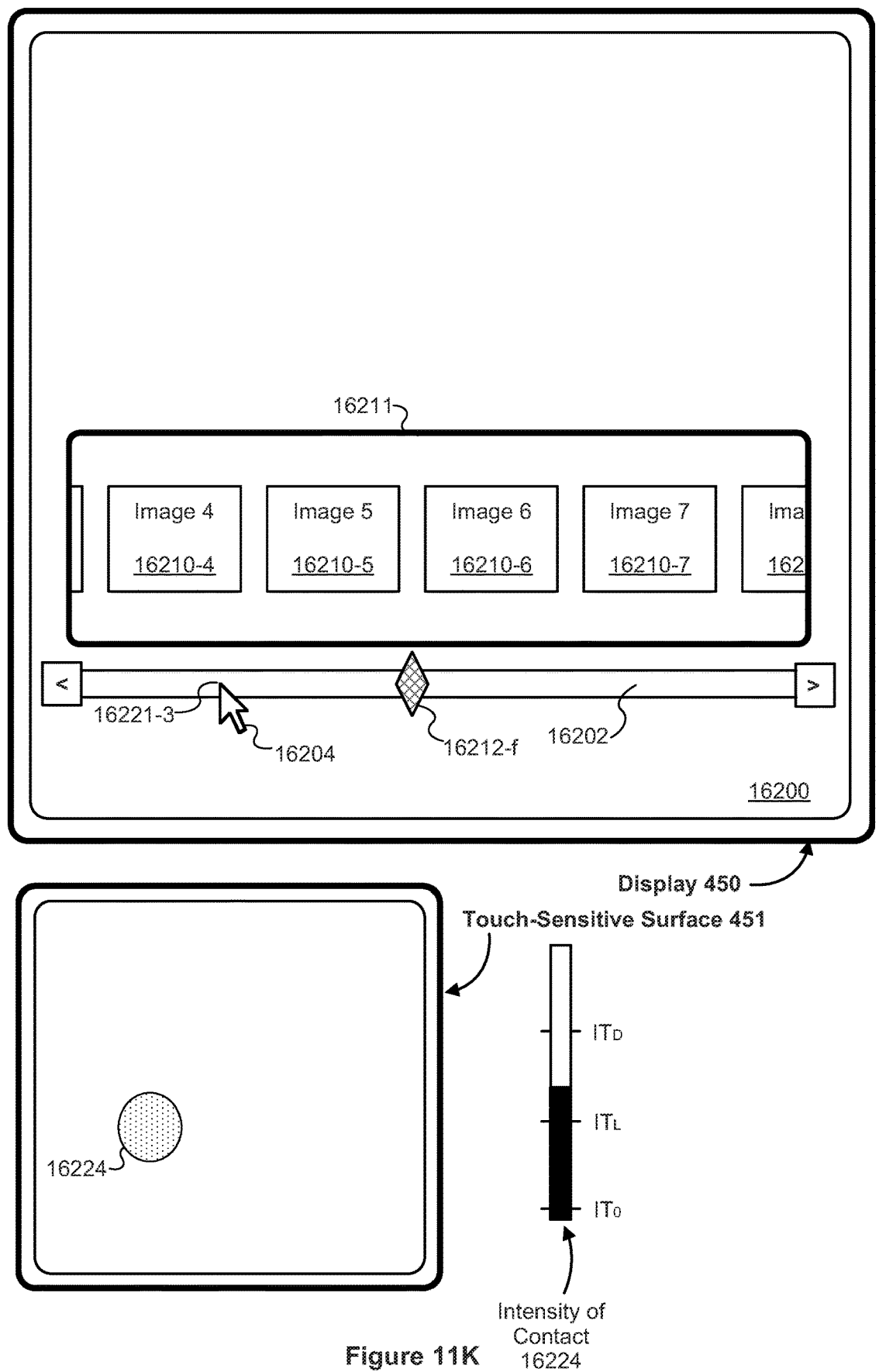
Figure 11L:
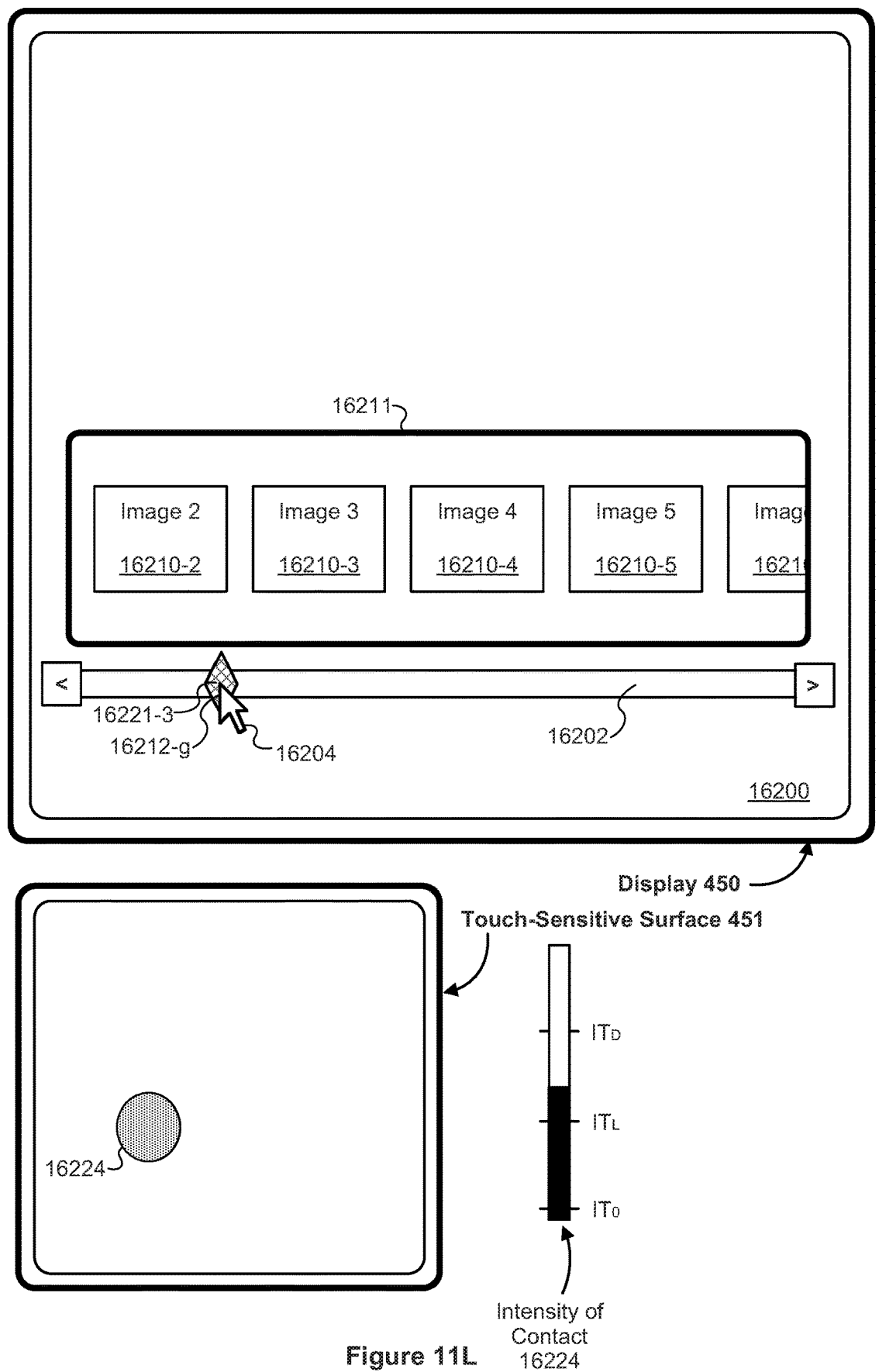

In accordance with some embodiments, FIGS. 11K-11L illustrate another example of adjusting a bidirectional user interface element in accordance with a second input on a touch-sensitive surface. In FIGS. 11K-11L, cursor 16204 is over portion 16221-3 of bidirectional user interface element 16202. In FIG. 11K, contact 16224 is detected on touch-sensitive surface 451 and, in response to detecting an increase in intensity of contact 16224 above $IT_L$ as shown in FIG. 11L, images 16210 are scrolled from left to right within viewer 16211 and visual position indicator is moved from position 16212-f in FIG. 11K to position 16212-g in FIG. 11L. Conceptually, in this example, the position of the visual position indicator 16212 corresponds to the position of a sliding window over the images 16210 in viewer 16211, and detection of the increase in intensity of contact 16224 while cursor 16204 is over portion 16221-3 of bidirectional user interface element 16202 causes the sliding window to move to the left over the images 16210 in viewer 16211 or, conversely, causes the images 16210 to move to the right under viewer 16211. Similarly, if the device were to detect an increase in intensity of contact 16224, while cursor 16204 is over a portion of bidirectional user interface element 16202 that is to the right of visual position indicator 16212, the device would scroll the images in the opposite direction (e.g., scrolling the images 16210 to the left with respect to viewing window 16211).

Figure 11M:
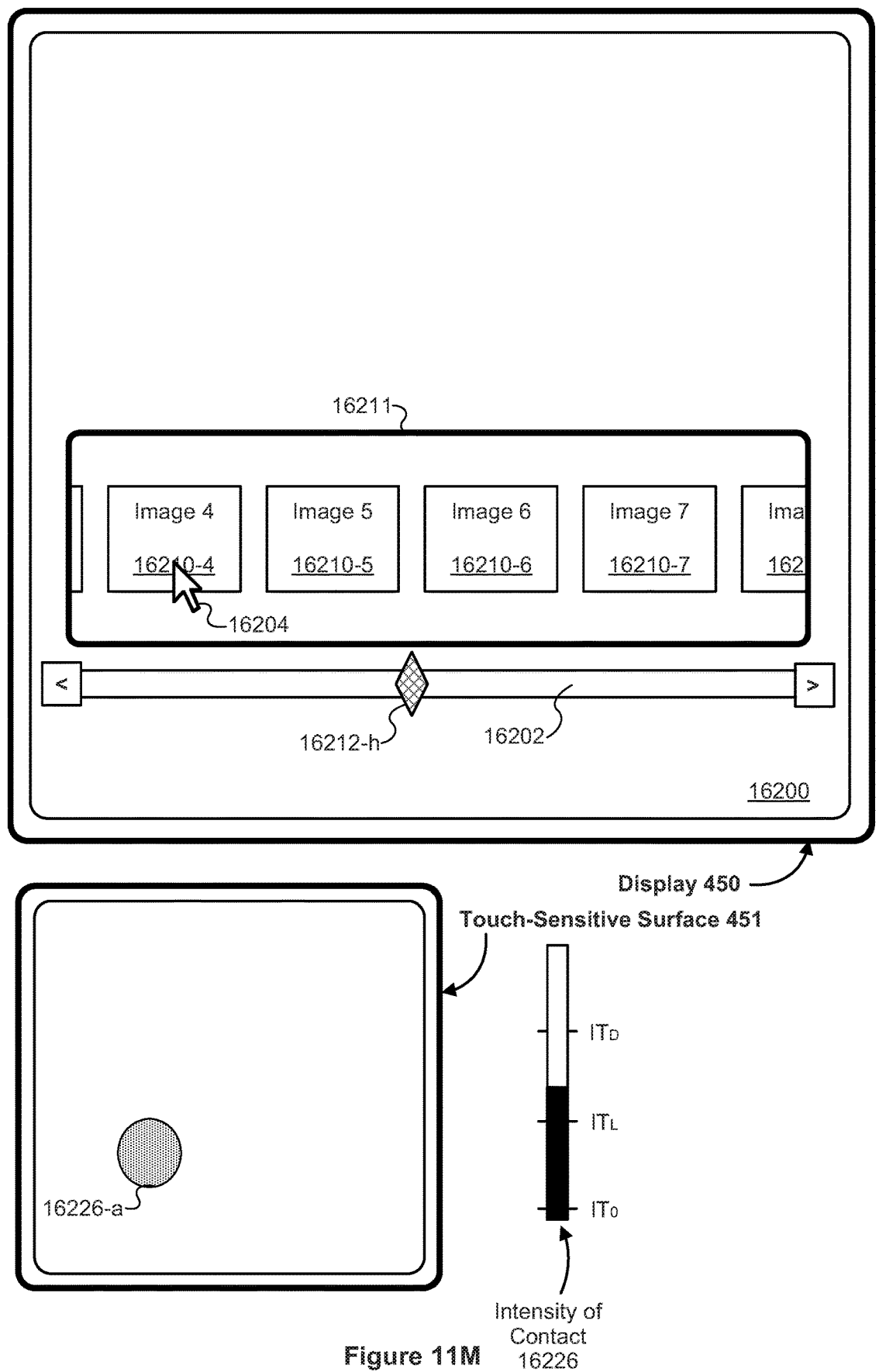
Figure 11N:
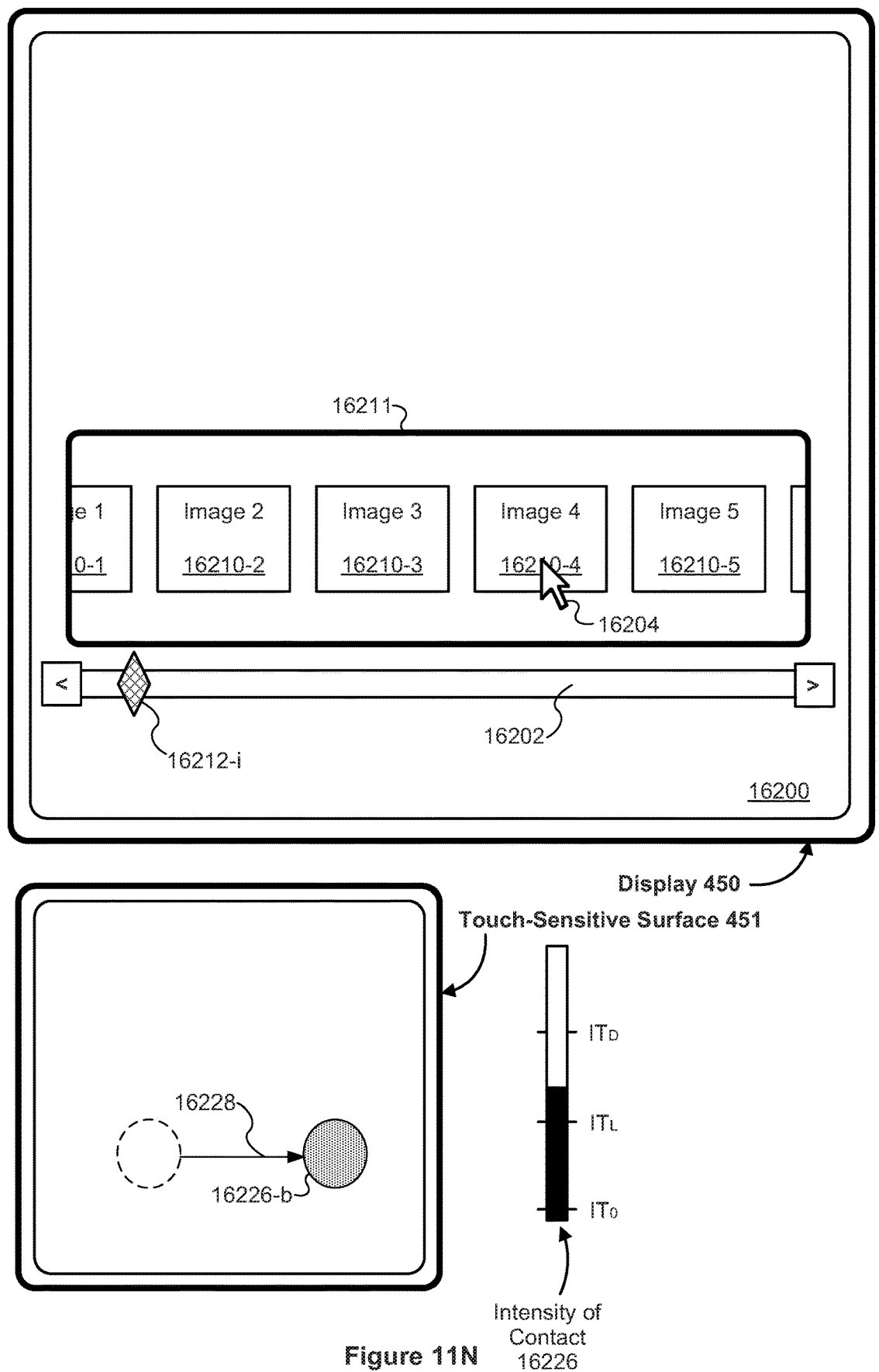
Figure 12A:
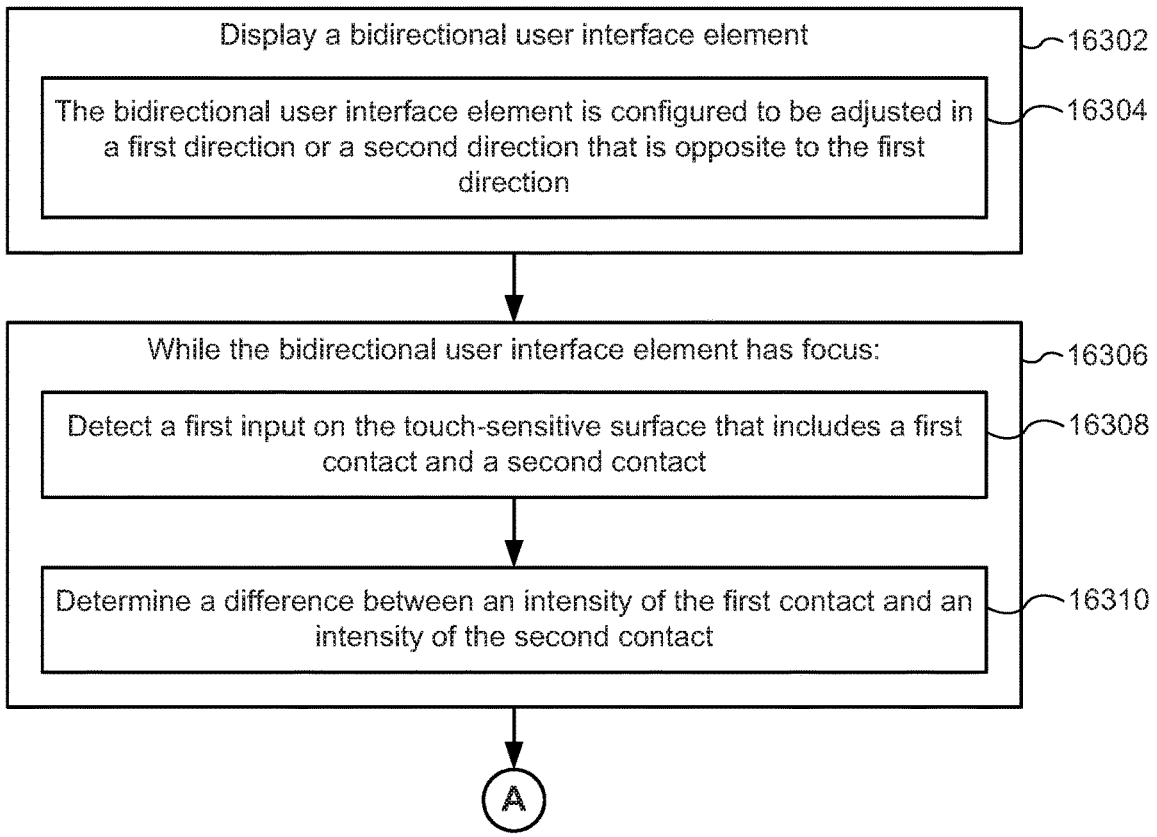
Figure 12B:
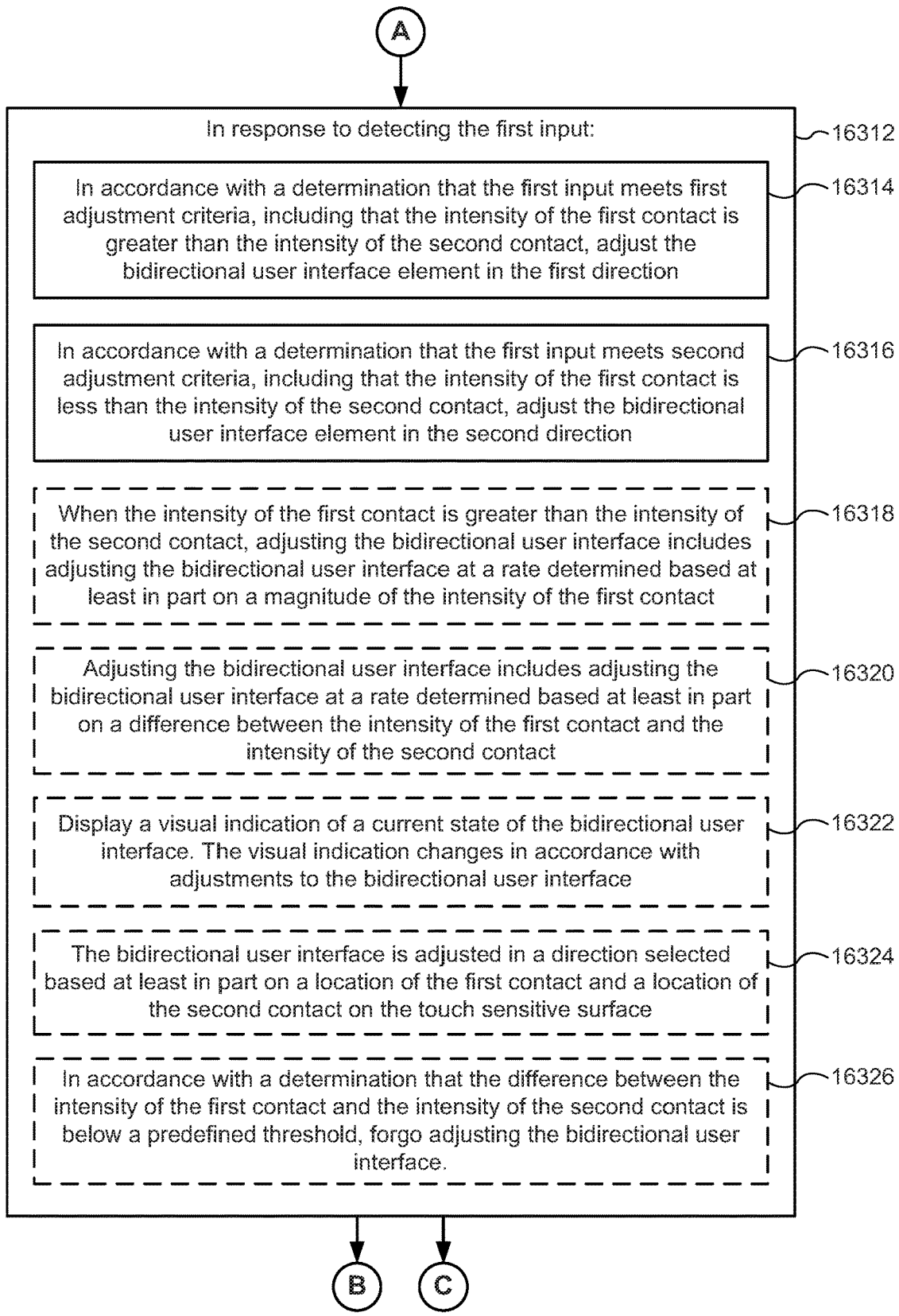

In accordance with some embodiments, FIGS. 11M-11N illustrate another example of adjusting a bidirectional user interface element in accordance with a second input on a touch-sensitive surface. In FIG. 11N, contact 16226 and movement 16228 of contact 16226 from position 16226-a in FIG. 11M to position 16226-b in FIG. 11N is detected on touch-sensitive surface 451 while cursor 16204 is over viewer 16211 and, in response, images 16210 are scrolled from right to left within viewer 16211 and visual position indicator is moved from position 16212-h in FIG. 11M to position 16212-i in FIG. 11N. Conceptually, in this example, the position 16212 of the visual position indicator corresponds to the position of a sliding window over the images 16210 in viewer 16211, and detection of contact 16226 moving from left to right causes the sliding window to move from left to right over the images 16210 in viewer 16211 or, conversely, causes the images 16210 to move to the right under viewer 16211. Similarly, if the device were to detect a right to left movement of contact 16226, while cursor 16204 is over viewer 16211, the device would scroll the images in the opposite direction (e.g., scrolling the images 16210 to the left with respect to viewing window 16211).

FIGS. 12A-12C are flow diagrams illustrating a method 16300 of adjusting a bidirectional user interface element in accordance with some embodiments. Method 16300 is performed at an electronic device (e.g., device 300, FIG. 3, or portable multifunction device 100, FIG. 1A) with a display and a touch-sensitive surface. In some embodiments, the display is a touch screen display and the touch-sensitive surface is on the display. In some embodiments, the display is separate from the touch-sensitive surface. Some operations in method 16300 are, optionally, combined and/or the order of some operations is, optionally, changed.

As described below, the method 16300 provides an intuitive way to adjust a bidirectional user interface element. The method reduces the cognitive burden on a user when adjusting a bidirectional user interface element, thereby creating a more efficient human-machine interface. For battery-operated electronic devices, enabling a user to adjust a bidirectional user interface element faster and more efficiently conserves power and increases the time between battery charges.

The device displays (16302) a bidirectional user interface element. The bidirectional user interface element is configured to be adjusted (16304) in a first direction or a second direction that is opposite to the first direction. FIG. 11A, for example, shows bidirectional user interface element 16202, configured to be adjusted left (a first direction) or right (a second direction opposite the first direction) on display 450.

While the bidirectional user interface element has focus (16306), the device detects (16308) a first input on the touch-sensitive surface that includes a first contact (e.g., a finger contact) and a second contact (e.g., a finger contact). For example, FIG. 11B shows contact 16205 and contact 16206 detected on touch-sensitive surface 451. The device determines (16310) a difference between an intensity of the first contact and an intensity of the second contact. For example, FIG. 11B shows intensity difference 16209 between the intensity of contact 16205 and the intensity of contact 16206.

In response to detecting the first input (16312), in accordance with a determination that the first input meets first adjustment criteria, including that the intensity of the first contact is greater than the intensity of the second contact, the device adjusts (16314) the bidirectional user interface element in the first direction. For example, FIG. 11C the device detects contact 16205 and contact 16206 on the touch-sensitive surface 451, where there is an intensity difference 16209 between the intensity of contact 16205 and contact 16206 such that the intensity of contact 16205 is greater than the intensity of contact 16206. In this example, in response to detecting the intensity difference between contact 16205 and contact 16206, bidirectional user interface element 16202 is adjusted to the left as visual position indicator 16212 moves from position 16212-a in FIG. 11B to position 16212-b in FIG. 11C and images 16210 are moved from left to right within viewer 16211.

In response to detecting the first input (16312), in accordance with a determination that the first input meets second adjustment criteria, including that the intensity of the first contact is less than the intensity of the second contact, the device adjusts (16316) the bidirectional user interface element in the second direction. For example, FIG. 11D the device detects contact 16214 and contact 16216 on the touch-sensitive surface 451, where there is an intensity difference 16213 between the intensity of contact 16205 and contact 16206 such that the intensity of contact 16205 is less than the intensity of contact 16206. In this example, in response to detecting the intensity difference between contact 16214 and contact 16216, bidirectional user interface element 16202 is adjusted to the right as visual position indicator 16212 moves from position 16212-b in FIG. 11C to position 16212-c in FIG. 11D and images 16210 are moved from right to left within viewer 16211.

In some embodiments, when the intensity of the first contact is greater than the intensity of the second contact, the device adjusts (16318) the bidirectional user interface, which includes adjusting the bidirectional user interface at a rate determined based at least in part on a magnitude of the intensity of the first contact. For example, after determining which of the contacts has a higher intensity, the device uses the absolute intensity of the contact with higher intensity to determine the rate of adjustment of the bidirectional user interface, optionally without regard to the intensity of the contact with lower intensity. As an example of some of these embodiments, in FIG. 11B, bidirectional user interface element 16202 is adjusted at a rate determined at least in part on the magnitude of intensity of contact 16205 in FIG. 11B.

In some embodiments, adjusting the bidirectional user interface includes adjusting (16320) the bidirectional user interface at a rate determined based at least in part on a difference between the intensity of the first contact and the intensity of the second contact. In some embodiments, the rate of adjustment is determined by the device based on an absolute difference in intensities of the first contact and the second contact. Thus, in some embodiments, if the intensity of both of the contacts increases simultaneously by the same (or substantially the same) amount, the rate of change of adjustment of the bidirectional user interface is not affected. In some embodiments, the rate of adjustment is determined by the device based on a relative difference in intensities of the first contact and the second contact, such as the difference in intensities of the first contact and the second contact divided by the average intensity of the first contact and the second contact. Thus, in some embodiments, if the intensity of both of the contacts increases simultaneously while maintaining the same relative difference in intensities, the rate of change of adjustment of the bidirectional user interface is not affected. In these embodiments, in FIG. 11B, for example, bidirectional user interface element 16202 is adjusted at a rate determined at least in part on intensity difference 16209 between the intensity of contact 16205 and the intensity of contact 16206.

In some embodiments, the device displays (16322) a visual indication of a current state of the bidirectional user interface, where the visual indication changes in accordance with adjustments to the bidirectional user interface. For example, the device displays a thumb/handle in a slider control or scroll bar, or a row of content such as photos that moves or scrolls as the bidirectional user interface is adjusted. FIG. 11A, for example, shows visual position indicator 16212 and FIGS. 11B-11C show visual position indicator 16212 moving from position 16212-a in FIG. 11B to position 16212-b in FIG. 11C in accordance with adjustments to bidirectional user interface element 16202.

In some embodiments, the bidirectional user interface is adjusted (16324) in a direction selected based at least in part on a location of the first contact and a location of the second contact on the touch sensitive surface. For example, when the first contact has a greater intensity than the second contact and the first contact is closer to a first side of the touch-sensitive surface than the second contact, where the first side of the touch-sensitive surface is associated with the first direction, the bidirectional user interface is adjusted in the first direction; in contrast, when the first contact has a greater intensity than the second contact and the first contact is closer to a second side of the touch-sensitive surface than the second contact, where the second side of the touch-sensitive surface is associated with the second direction, the bidirectional user interface is adjusted in the second direction. Therefore, in this example, when a first contact is detected on a touch-sensitive surface (e.g., touch pad or touchscreen) to the right of a second contact, and the device detects that the first contact has a greater intensity than the second contact, the bidirectional user interface (e.g., a thumb/handle of a slider control or scroll bar) is moved to the right or a row of thumbnails is scrolled from the right to the left so as to display additional thumbnails that were hidden on the right side, whereas, in this example, the bidirectional user interface would be adjusted in the opposite direction if the first contact were to the left of the second contact. FIGS. 11B-11C, for example, show contact 16205 to the left of contact 16206 and in response to contact 16205 having an intensity greater than the intensity of contact 16206, bidirectional user interface element is adjusted to the left and visual position indicator 16212 moves from position 16212-*a* in FIG. 11B to position 16212-*b* in FIG. 11C. In contrast, in FIGS. 11C-11D, for example, show contact 16205 to the left of contact 16206 and in response to contact 16205 having an intensity lower than the intensity of contact 16206, bidirectional user interface element is adjusted to the right and visual position indicator 16212 moves from position 16212-*b* in FIG. 11C to position 16212-*c* in FIG. 11D.

In some embodiments, in accordance with a determination that the difference between the intensity of the first contact and the intensity of the second contact is below a predefined threshold, the device forgoes adjusting (16326) the bidirectional user interface. For example, if the difference between the intensity of the two contacts is not above a nominal level, the device ignores the input, so that the user does not unintentionally adjust the bidirectional user interface. In some embodiments, the first adjustment criteria and the second adjustment criteria both include one or more anti jitter criteria including a criterion that the difference between the intensity of the first contact and the intensity of the second contact is greater than the predefined threshold. Alternative anti jitter criteria are optionally based on absolute intensity measurement, for example, the first and second adjustment criteria optionally include (in addition to, or instead of, the relative intensity criteria described above) criteria specifying that the device forgoes adjusting the bidirectional criteria unless either the intensity of the first contact or the intensity of the second contact is above a minimum intensity threshold. FIGS. 11F-11G illustrate examples of the difference between the intensity of the first contact and the intensity of the second contact being below a predefined threshold. In FIG. 11F, the intensity of contact 16219 is greater than the intensity of contact 16220, but intensity difference 16231 is below predefined threshold 16230 and bidirectional user interface element 16217 is not adjusted. Similarly, in FIG. 11G, bidirectional user interface element 16217 is not adjusted even though the intensity of contact 16220 is greater than the intensity of contact 16219 because intensity difference 16233 is below predefined threshold 16230. In contrast, in FIG. 11H, when the intensity difference 16235 between the intensity of contact 16219 and the intensity of contact 16220 is greater than the predefined threshold 16230, the device adjusts bidirectional user interface element 16217.

In some embodiments, the device detects (16328), on the touch-sensitive surface, a second input associated with the bidirectional user interface, where the second input includes a single contact detected while the focus selector is over a respective portion of the bidirectional user interface. In response to detecting the second input, the device performs (16330) an operation associated with the respective portion of the bidirectional user interface. For example, in response to detecting a tap gesture on a slider control or scroll bar, the device moves the thumb/handle of a scroll bar to a location corresponding to a location of the focus selector on the slider control or scroll bar. FIGS. 11I-11J illustrate, for example, cursor 16204 over portion 16221-1 (e.g., a scroll arrow) of bidirectional user interface element 16202. In FIG. 11I, contact 16222 is detected and in response to detecting an increase in intensity of contact 16222 over $IT_L$ in FIG. 11J, the device adjusts bidirectional user interface element 16202, moves visual position indicator 16212 from position 16212-*d* in FIG. 11I to position 16212-*e* in FIG. 11J, and moves images 16210 are from left to right in viewer 16211. As another example, FIGS. 11K-11L illustrate cursor 16204 over portion 16221-3 of bidirectional user interface element 16202. In FIG. 11K, contact 16224 is detected and in response to detecting an increase in intensity of contact 16224 over $IT_L$ in FIG. 11L, the device adjusts bidirectional user interface element 16202, moves visual position indicator 16212 from position 16212-*f* in FIG. 11K to position 16212-*g* in FIG. 11L, and moves images 16210 from left to right in viewer 16211.

In some embodiments, the device detects (16332), on the touch-sensitive surface, a second input associated with the bidirectional user interface, where the second input includes movement of a contact across the touch-sensitive surface in a respective direction (e.g., a swipe movement or gesture). In response to detecting the second input, the device adjusts (16334) the bidirectional user interface in accordance with the respective direction of the movement of the contact. For example, in response to detecting a swipe gesture on a list or a row of thumbnails, the device scrolls the list or row of thumbnails on the display in a direction corresponding to the direction of the swipe gesture. FIGS. 11M-11N illustrate, for example, cursor 16204 over the bidirectional user interface element (e.g., viewer 16211). In FIG. 11N, contact 16226 and movement 16228 of contact 16226 from position 16226-*a* in FIG. 11M to position 16226-*b* in FIG. 11N is detected on touch-sensitive surface 451 and the bidirectional user interface element (e.g., viewer 16211) is adjusted in accordance with the relative direction of movement 16228 by moving images 16210 from right to left in viewer 16211.

It should be understood that the particular order in which the operations in FIGS. 12A-12C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., those listed in the fifth paragraph of the Description of Embodiments) are also applicable in an analogous manner to method 16300 described above with respect to FIGS. 12A-12C. For example, the contacts, movements, user interface objects, focus selectors, and intensities described above with reference to method 16300 optionally have one or more of the characteristics of contacts, movements, user interface objects, focus selectors, and intensities described herein with reference to other methods described herein (e.g., those listed in the fifth paragraph of the Description of Embodiments). For brevity, these details are not repeated here.

Figure 13:
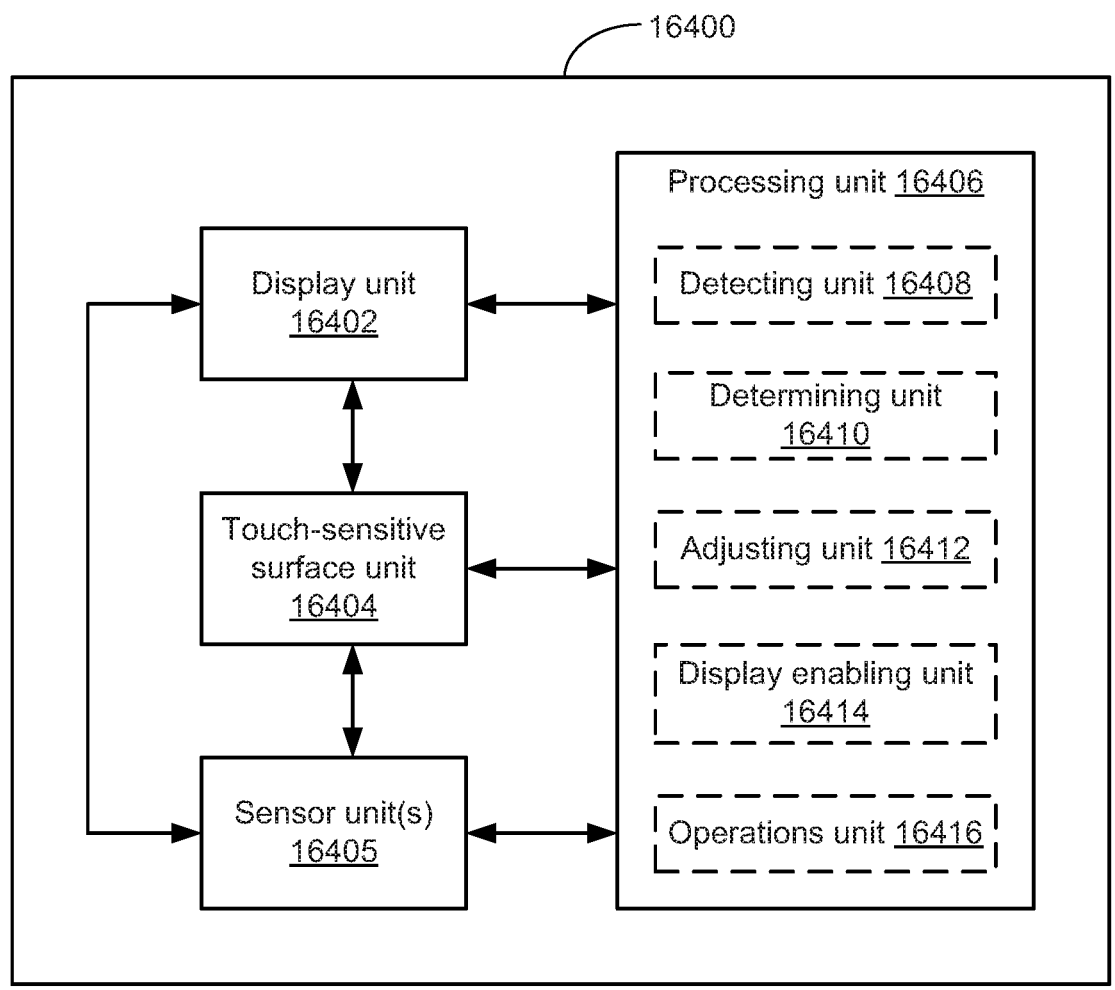
FIG. 13 is a functional block diagram of an electronic device in accordance with some embodiments.

In accordance with some embodiments, FIG. 13 shows a functional block diagram of an electronic device 16400 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 13 are, optionally, combined or separated into sub-blocks to implement the principles of the various described embodiments. Therefore, the description herein optionally supports any possible combination or separation or further definition of the functional blocks described herein.

As shown in FIG. 13, an electronic device 16400 includes a display unit 16402 configured to display a bidirectional user interface element, where the bidirectional user interface element is configured to be adjusted in a first direction or a second direction that is opposite to the first direction; a touch-sensitive surface unit 16404 configured to detect user inputs; and a processing unit 16406 coupled to display unit 16402 and touch-sensitive surface unit 16404. In some embodiments, the processing unit includes a detecting unit 16408, a determining unit 16410, an adjusting unit 16412, a display enabling unit 16414, and an operations unit 16416.

The processing unit 16406 is configured to, while the bidirectional user interface element has focus, detect (e.g., with detecting unit 16408) a first input on the touch-sensitive surface unit that includes a first contact and a second contact and determine (e.g., with determining unit 16410) a difference between an intensity of the first contact and an intensity of the second contact. The processing unit 16406 is further configured to, in response to detecting the first input, in accordance with a determination that the first input meets first adjustment criteria, including that the intensity of the first contact is greater than the intensity of the second contact, adjust (e.g., with adjusting unit 16412) the bidirectional user interface element in the first direction, and in accordance with a determination that the first input meets second adjustment criteria, including that the intensity of the first contact is less than the intensity of the second contact, adjust (e.g., with adjusting unit 16412) the bidirectional user interface element in the second direction.

In some embodiments, when the intensity of the first contact is greater than the intensity of the second contact, adjusting the bidirectional user interface includes adjusting (e.g., with adjusting unit 16412) the bidirectional user interface at a rate determined based at least in part on a magnitude of the intensity of the first contact.

In some embodiments, adjusting the bidirectional user interface includes adjusting (e.g., with adjusting unit 16412) the bidirectional user interface at a rate determined based at least in part on a difference between the intensity of the first contact and the intensity of the second contact.

In some embodiments, processing unit 16406 is further configured to enable display (e.g., with display enabling unit 16414) of a visual indication of a current state of the bidirectional user interface, where the visual indication changes in accordance with adjustments (e.g., with adjusting unit 16412) to the bidirectional user interface.

In some embodiments, the bidirectional user interface is adjusted (e.g., with adjusting unit 16412) in a direction selected based at least in part on a location of the first contact and a location of the second contact on touch sensitive surface unit 16404.

In some embodiments, processing unit 16406 is further configured to forgo adjusting (e.g., with adjusting unit 16412) the bidirectional user interface, in accordance with a determination (e.g., with determining unit 16410) that the difference between the intensity of the first contact and the intensity of the second contact is below a predefined threshold.

In some embodiments, processing unit 16406 is further configured to detect (e.g., with detecting unit 16408), on touch-sensitive surface unit 16404, a second input associated with the bidirectional user interface, where the second input includes a single contact detected (e.g., with detecting unit 16408) while the focus selector is over a respective portion of the bidirectional user interface, and in response to detecting the second input, perform an operation (e.g., with operations unit 16416) associated with the respective portion of the bidirectional user interface.

In some embodiments, processing unit 16406 is further configured to detect (e.g., with detecting unit 16408), on touch-sensitive surface unit 16404, a second input associated with the bidirectional user interface, where the second input includes movement of a contact across touch-sensitive surface unit 16404 in a respective direction, and in response to detecting the second input, adjust (e.g., with adjusting unit 16412) the bidirectional user interface in accordance with the respective direction of the movement of the contact.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 12A-12C are, optionally, implemented by components depicted in FIGS. 1A-1B or FIG. 13. For example, detection operation 16308, determining operation 16310, and adjusting operations 16314 and 16316 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Managing Activation of a Control Based on Contact Intensity

Many electronic devices have graphical user interfaces with controls which, upon activation, perform various operations at the device. However, some controls control more important functions than other controls and thus it would be helpful to provide users with feedback indicating whether or not the control controls an important function (e.g., buttons in a user interface that allow users to permanently delete user accounts, modify security settings on files or folders, change account passwords, and the like). For example, an electronic device can make a button or other control harder to activate by enforcing a time and/or intensity thresholds for buttons performing important options that are different from time and/or intensity thresholds for buttons for performing less important operations. In some situations, a device optionally requires a user to actively and deliberately confirm intent to delete a user account by enabling activation of an account deletion button only after the user has pressed on a touch-sensitive surface with an intensity above a predefined intensity threshold. However, these different thresholds for buttons associated with important operations may be confusing for a user, as the thresholds are different from thresholds used for other controls in the user interface. As such, in it would be advantageous to provide visual feedback to the user so as to indicate progress toward meeting the time and/or intensity thresholds for activating controls associated with important operation. However, there is a need for an additional layer of safeguard against accidental or inadvertent activation of such controls by users in a user interface, by providing adaptive, continuous, real-time, visual feedback to the user attempting to activate such controls—based on the user's input (e.g., based on an intensity or duration of the user's contact, for instance, on a touch-sensitive surface; the contact having time-varying intensity or pressure).

The disclosed embodiments provide a method, system, and user interface for managing activation of controls in a user interface (e.g., for managing activation of a button to permanently delete a user account, or to change security settings on an important file or folder, or to reset a password in a user account), by providing visual feedback to the user based on an intensity (e.g., pressure) and/or a duration of the user's contact. Such visual feedback is provided, for example, by changing the appearance of the control based on the intensity (e.g., pressure) and/or the duration of the user-contact or by displaying a visual confirmation (e.g., based on the intensity and/or the duration of the user contact) that the control will be activated upon termination of the user-contact. As a result, the disclosed embodiments help to ensure that the user does not accidentally activate such controls while providing visual feedback so that the user is informed of the additional intensity and/or time thresholds associated with activation of such controls. Such methods provide an added layer of security and safeguard to a user in order to prevent accidental or inadvertent activation of such controls by the user while providing additional feedback to the user so that the user is aware of the different intensity and/or time thresholds that are applied to the controls.

FIGS. 14A-14M illustrate exemplary user interfaces for governing or managing activation of controls on a user interface based on the intensity (e.g., pressure) and/or duration of a contact, in accordance with some embodiments. The user interfaces in these figures are used to illustrate the processes described below, including the processes in FIGS. 15A-15D. FIGS. 14A-14K include intensity diagrams that show the current intensity of the contact on the touch-sensitive surface relative to a first intensity threshold ("$IT_L$") and a second threshold ("$IT_D$"), higher than the first intensity threshold. In some embodiments, operations similar to those described below with reference to $IT_D$ are performed with reference to a different intensity threshold (e.g., "$IT_L$").

Figure 14A:
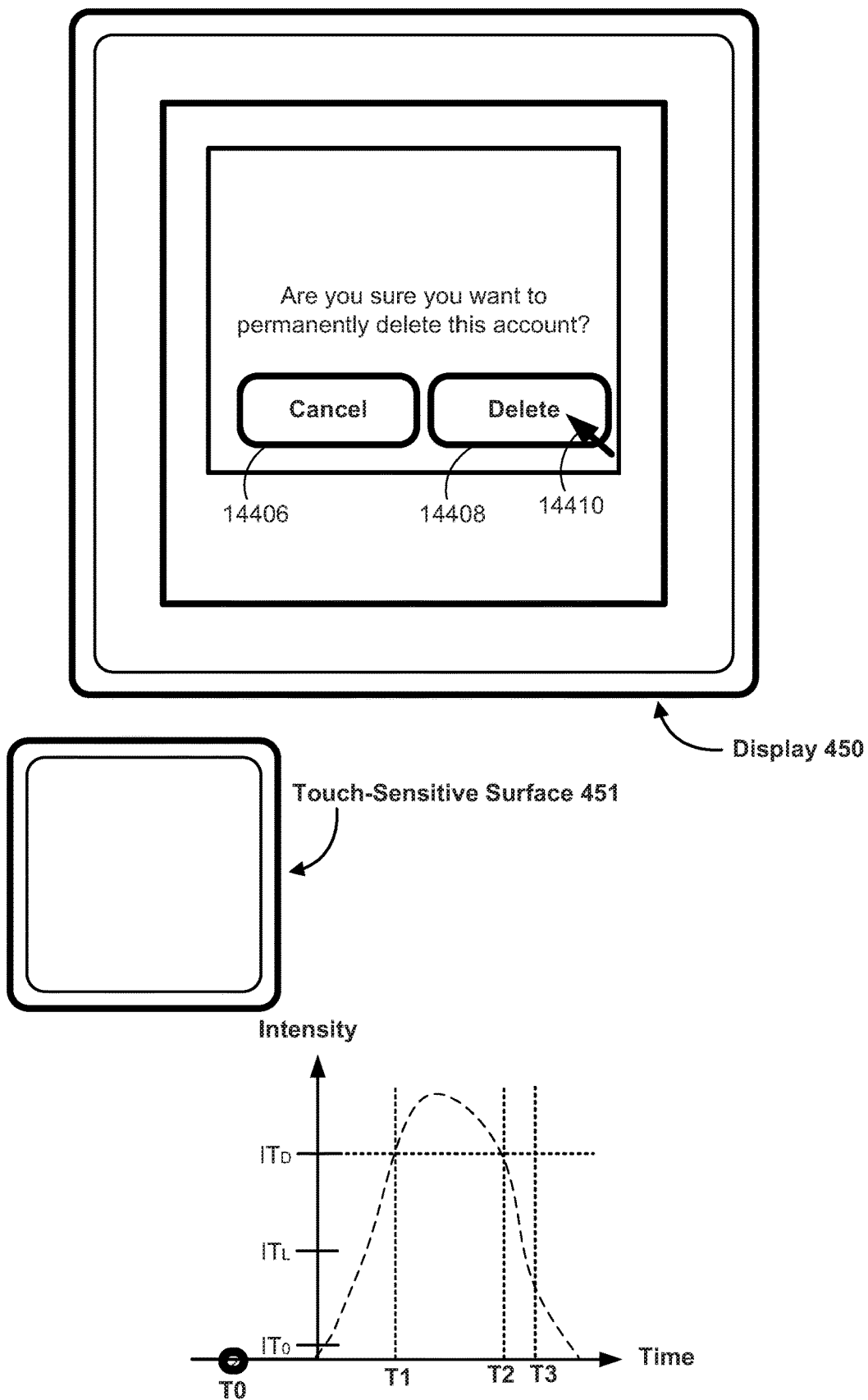
FIGS. 14A-14M illustrate exemplary user interfaces for managing activation of controls based on the intensity and/or duration of a contact in accordance with some embodiments.

FIG. 14A illustrates a user interface (e.g., a dialog box requesting a user for affirmation of user intent prior to performing a user-initiated action, such as a user-initiated request for an irreversible deletion of a file, a user account, or the like), with one or more controls (e.g., control buttons, such as control 14406 and control 14408), that is displayed on display 450.

Figure 14B:
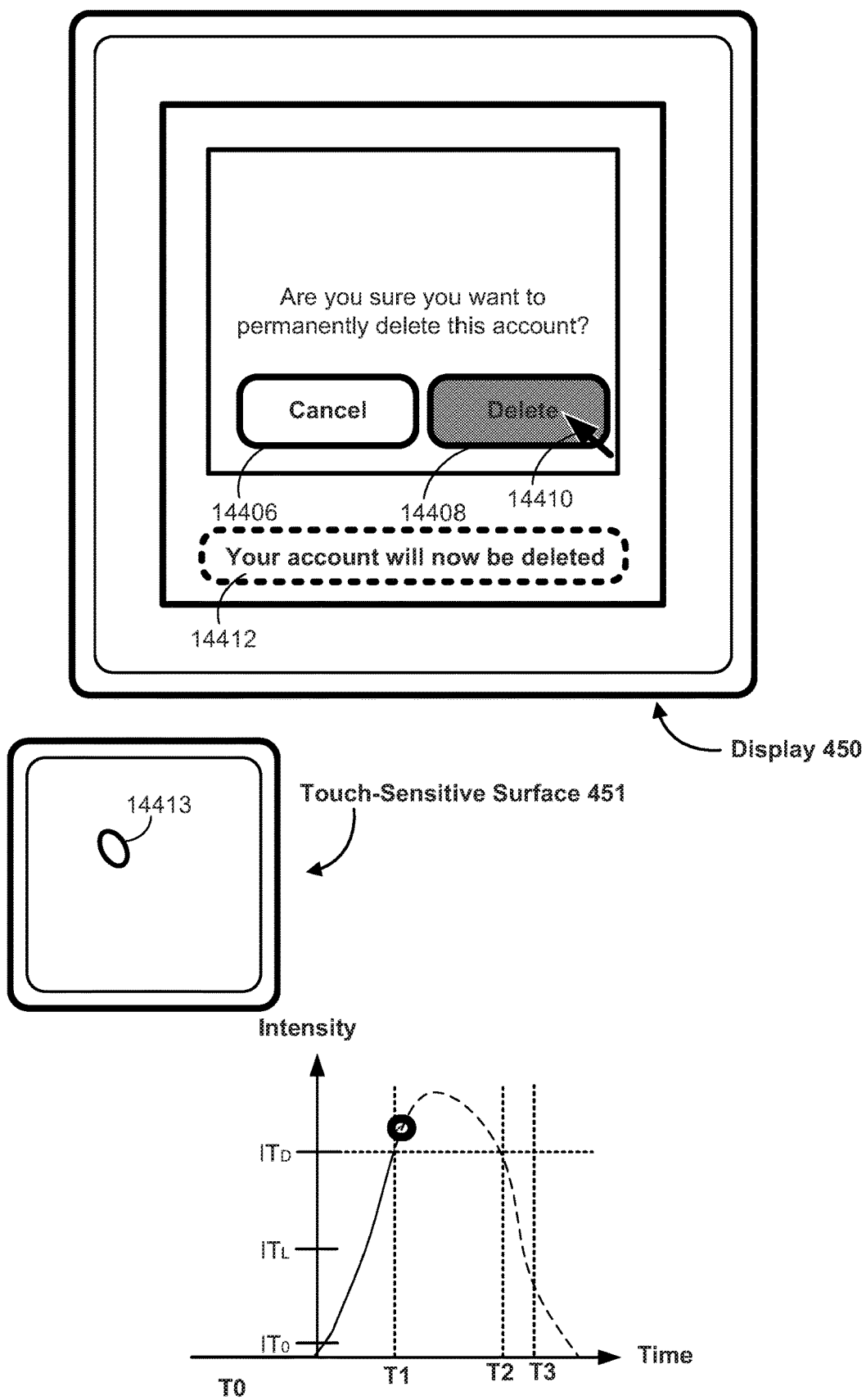
Figure 14C:
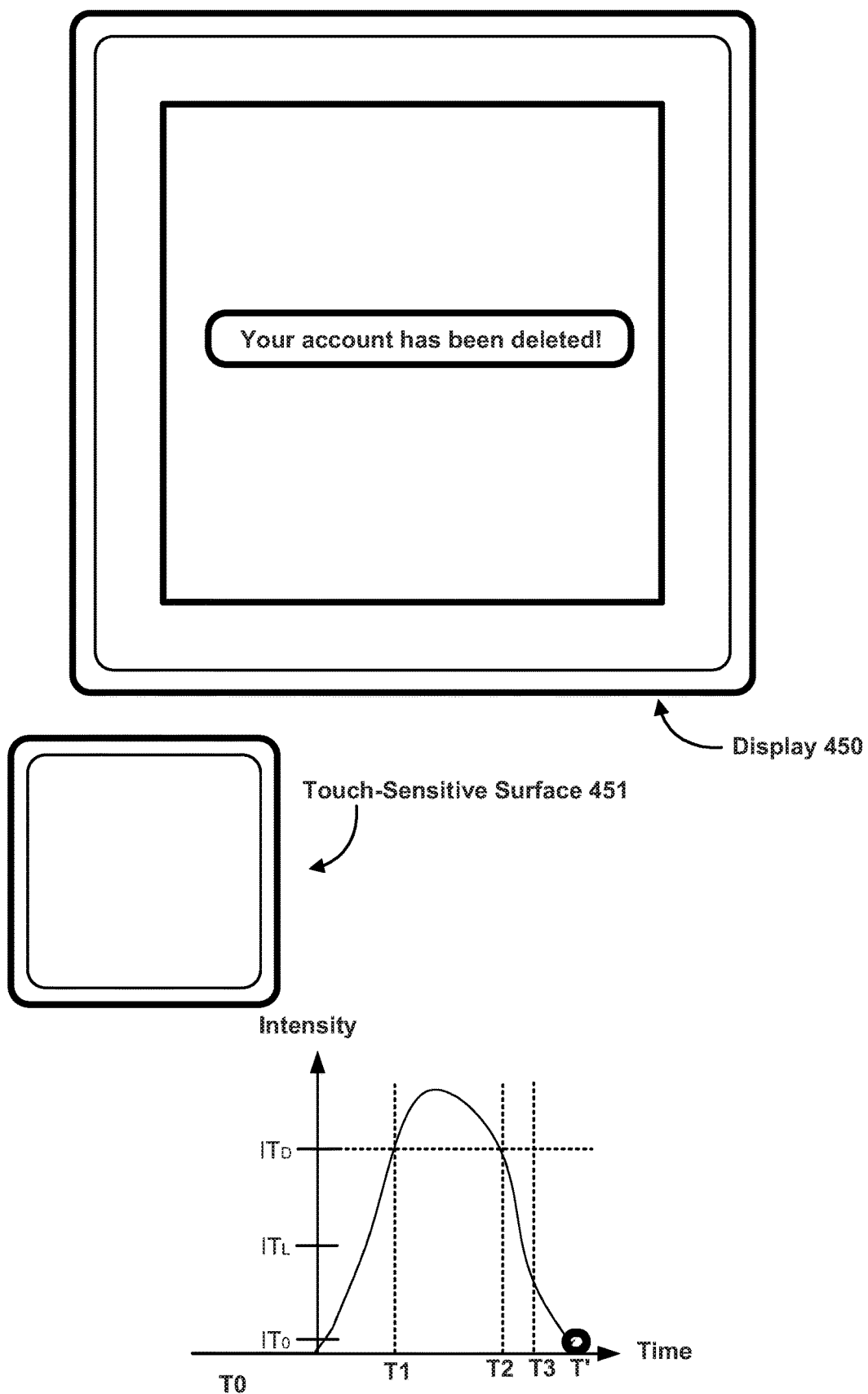

FIGS. 14A-14C illustrate providing the user a confirmation that a respective control (e.g., control 14408, FIG. 14A) will be activated—e.g., a user account will be irreversibly deleted—in response to a gesture (e.g., upon termination of the gesture), if the gesture includes a contact that meets predefined contact intensity criteria (e.g., if the contact has an intensity above a contact intensity threshold). FIGS. 14A-14C also illustrate optionally activating the respective control (e.g., control 14408, FIG. 14A)—for example, deleting the user account—upon termination of the gesture if the gesture includes a contact that meets predefined contact intensity criteria (e.g., if the contact has an intensity above a contact intensity threshold, such as $IT_D$).

In FIG. 14A, at time T0, no contact is present or detected on touch-sensitive surface 451. A focus selector 14410 is at a location on display 450 corresponding to a respective control (e.g., control 14408, FIG. 14A). In FIG. 14B, at time T1, a contact or a gesture that includes a contact (e.g., contact 14413 in FIG. 14B) is detected on the touch-sensitive surface 451. As shown in FIG. 14B, while focus selector 14410 is at the location on display 450 corresponding to the respective control (e.g., control 14408, FIG. 14B), the contact (e.g., contact 14413 on the touch-sensitive surface 451) meets predefined contact intensity criteria. In the example shown in FIG. 14B, the predefined contact intensity criteria include a contact intensity threshold, such that if an intensity of contact 14413 exceeds the contact intensity threshold, then contact 14413 meets the predefined contact intensity criteria. In some embodiments, the predefined contact intensity criteria include a contact intensity threshold and a respective delay time period. In the example shown in FIG. 14B, in such embodiments, if an intensity of contact 14413 exceeds the contact intensity threshold (e.g., "$IT_D$") for at least a delay time $T_{delay}$=T2–T1, then contact 14413 meets the predefined contact intensity criteria. As another example, referring to FIG. 14B, when the predefined contact intensity criteria include a contact intensity threshold and a respective delay time period, the respective delay time period is a predefined time period (e.g., $T_{delay}$=T3–T1) since (e.g., after) the respective contact intensity threshold is met (e.g., time period starting at time T1, FIG. 14B) in which contact 14413 must continue to be detected, even if the contact intensity is not maintained at or above the respective contact intensity threshold (e.g., "$IT_D$").

Continuing along the example illustrated in FIG. 14B, since contact 14413 meets the predefined contact intensity criteria (e.g., an intensity of contact 14413 exceeds the contact intensity threshold), a confirmation is provided to the user indicating that control 14408 will be activated upon detecting the end of the gesture (e.g., upon detecting finger lift-off). In the example shown in FIG. 14B, the confirmation is optionally shown as control 14408 completely filling up with a different color compared to a color of control 14408 prior to time T1 (e.g., prior to contact 14413 meeting the predefined contact intensity criteria, as shown in FIG. 14A). Alternatively, or in addition, as shown in FIG. 14B, the confirmation is provided to the user as verbal or textual confirmation 14412 indicating that control 14408 will be activated (e.g., the user account will be deleted) upon termination of the gesture.

In FIG. 14C, at time T' subsequent to time T1, upon detecting termination of the gesture or termination of contact 14413 (e.g., upon detecting finger lift-off), control 14408 (FIG. 14B) is activated (e.g., the user account is deleted).

If, on the other hand, the gesture does not include a contact that meets the predefined contact intensity criteria (for example, if contact 14413 does not have an intensity above the contact intensity threshold), then the control (e.g., control 14408) is not activated in response to the gesture (e.g., in response to detecting termination of the gesture). Consequently, the user is not provided with a confirmation that the control will be activated in response to the gesture (e.g., upon termination of the gesture). Instead, in some embodiments, if the gesture does not include a contact 14413 that meets the predefined contact intensity criteria, the user would continue to view the user interface shown in FIGS. 14A-14B unless the user chooses to cancel the deletion of the user account by activating control 14406. In some embodiments, the user chooses to cancel the deletion of the user account by activating control by placing focus selector 14410 over "Cancel" button 14406 and increasing the intensity of contact 14413 above a lower contact intensity threshold (e.g., "$IT_L$") than the contact intensity threshold (e.g., "$IT_D$") at which "Delete" button 14408 is activated and then lifting the contact off of the touch-sensitive surface.

Thus, in some embodiments, the device determines if the gesture includes a contact that meets contact intensity criteria (e.g., if the intensity of the contact is above or greater than an intensity threshold) while the focus selector is at a location corresponding to a control on the display. If the contact meets the contact intensity criteria, the device provides the user with a confirmation that the contact will be activated upon detecting the end of the gesture. As a result, the user has the improved convenience of receiving real-time confirmation of user-intent (e.g., to activate the control) based on the user input (e.g., based on intensity and/or duration of user-contact). This additional confirmation provides the user a safeguard against accidental and inadvertent activation of the control by the user.

FIGS. 14D-14H illustrate detecting a user gesture, corresponding to a control (e.g., control 14408), on a touch-sensitive surface 451; the gesture including a contact (e.g., having time-varying intensity or pressure detected by the touch-sensitive surface or sensors associated with the touch-sensitive surface). FIGS. 14D-14H further illustrate providing the user a visual indication or feedback of progress toward the contact meeting predefined contact intensity criteria (e.g., providing a visual indication that the time-varying intensity of the contact is approaching or increasing toward meeting a predefined contact intensity threshold, for instance as the user pushes down harder on the touch-sensitive surface). FIGS. 14D-14H additionally illustrate providing a confirmation to the user that the control (e.g., control 14408, FIG. 14D) will be activated—e.g., a user account will be irreversibly deleted—in response to the gesture (e.g., upon termination of the gesture) if the contact meets the predefined contact intensity criteria. FIGS. 14D-14H illustrate subsequently activating the control (e.g., control 14408)—for example, deleting the user account—upon termination of the gesture if the contact meets predefined contact intensity criteria.

Figure 14D:
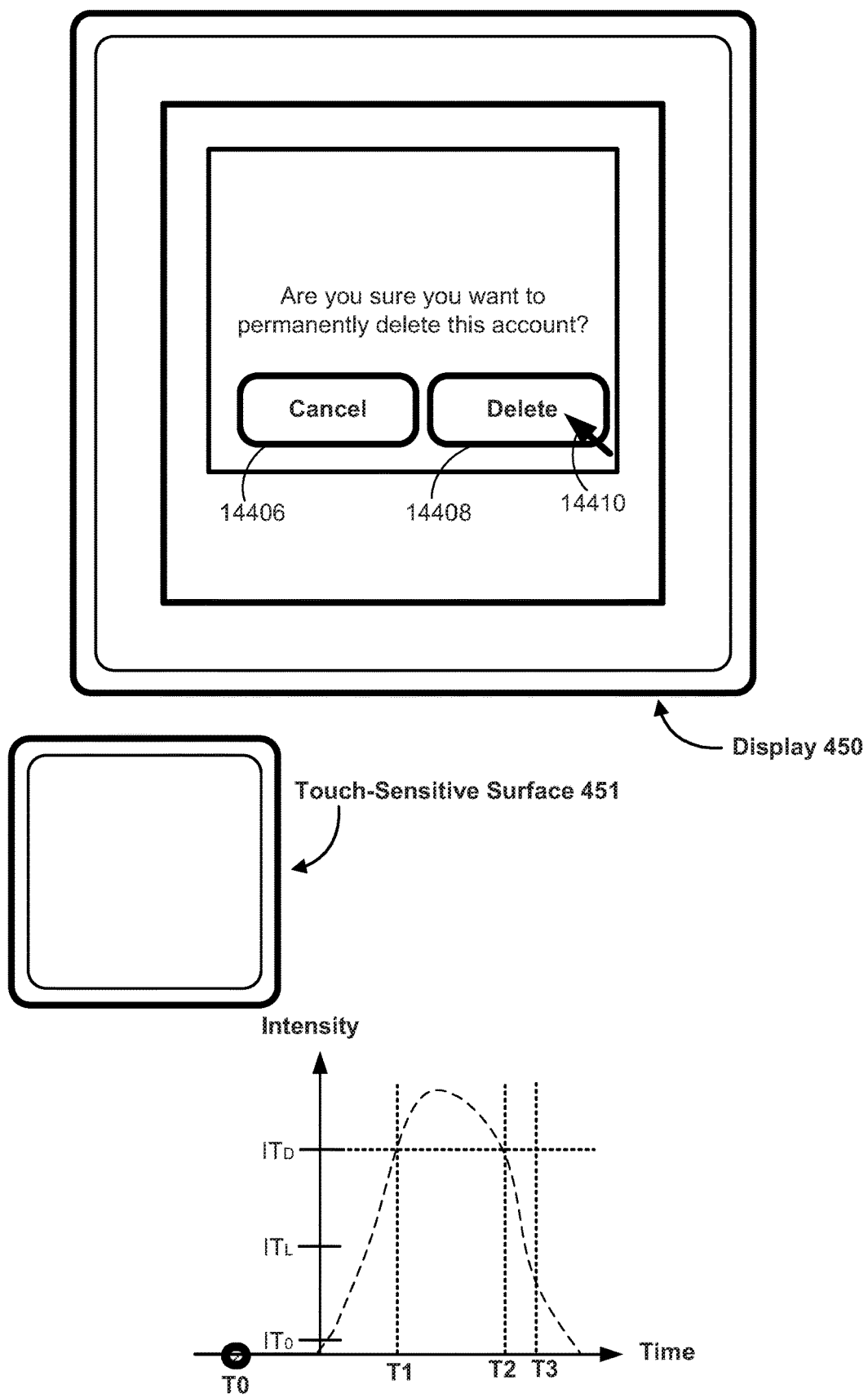
Figure 14E:
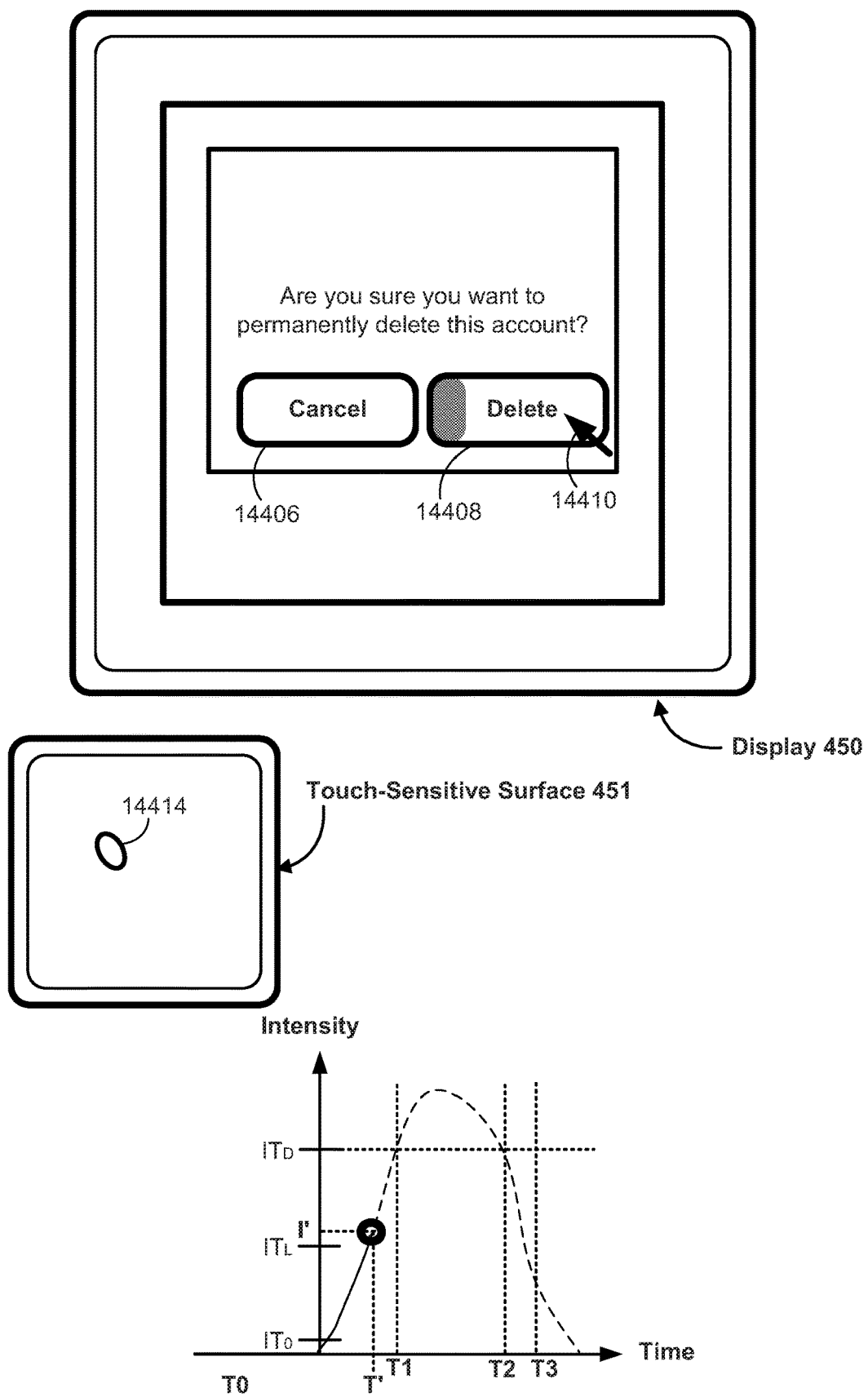

In FIG. 14D, at time T0, no contact is present or detected on touch-sensitive surface 451. A focus selector 14410 is at a location on display 450 corresponding to a respective control (e.g., control 14408, FIG. 14D). In FIG. 14E, at time T', a contact or a gesture that includes a contact (e.g., contact 14414 in FIG. 14E) is detected on touch-sensitive surface 451. As shown in FIG. 14E, at time T', while focus selector 14410 is still at the location on display 450 corresponding to the respective control (e.g., control 14408, FIG. 14E), contact 14414 has an intensity I', lower than the contact intensity threshold (e.g., "$IT_D$") and, optionally above a different button activation intensity threshold (e.g., "$IT_L$"). In response to detecting a user contact of intensity I' (lower than the contact intensity threshold), the user is provided a visual indication of progress toward contact 14414 meeting the predefined contact intensity criteria. For example, as shown in FIG. 14E, control 14408 changes appearance (compared to its appearance in FIG. 14D), for instance as a progress bar is displayed in control 14408. As another example, control 14408 changes appearance by displaying an indication of a difference (e.g., corresponding to a portion of control 14408 that is not filled in with gray) between a current intensity of contact 14414 (e.g., corresponding to the grayed or filled out portion of control 14408) on touch-sensitive surface 451 and the contact intensity threshold.

Figure 14F:
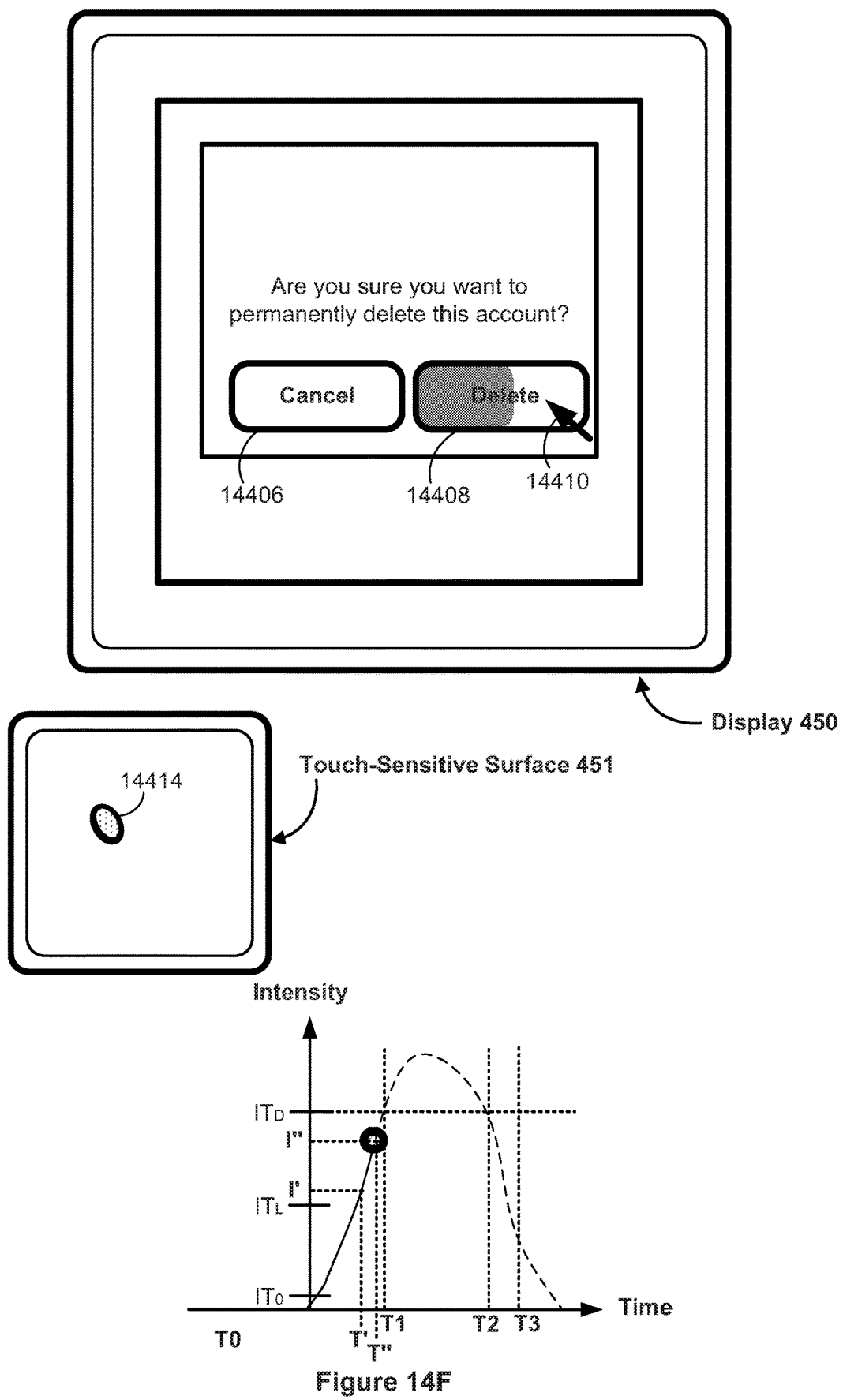

Similarly, as shown in FIG. 14F, at time T", while focus selector 14410 is still at the location on display 450 corresponding to the respective control (e.g., control 14408, FIG. 14F), contact 14414 has an intensity I", lower than the contact intensity threshold (e.g., "$IT_D$"). In response to detecting an intensity I" of contact 14414 (lower than the contact intensity threshold, but greater than the intensity I' of contact 14414 at time T' shown in FIG. 14E), the user is provided a visual indication of progress toward contact 14414 meeting or approaching the predefined contact intensity criteria. As shown in FIG. 14F, control 14408 further changes appearance (compared to its appearance in FIG. 14D and subsequently in FIG. 14E), for example as the progress bar displayed in control 14408 increases in size (relative to FIG. 14E) in response to the increased intensity of contact 14414 (again, relative to FIG. 14E) toward the contact intensity threshold. As another example, control 14408 further changes appearance by displaying an indication of the difference (e.g., corresponding to a portion of control 14408 that is not filled in with gray) between the current intensity (I") of contact 14414 (e.g., corresponding to the grayed or filled out portion of control 14408) on touch-sensitive surface 451 and the contact intensity threshold. In some embodiments intensity I" is above a different button activation intensity threshold (e.g., "$IT_L$") for activating "Cancel" button 14406 (e.g., if the focus selector were over "Cancel" button 14406 in FIG. 14F, "Cancel" button would have been activated).

Figure 14G:
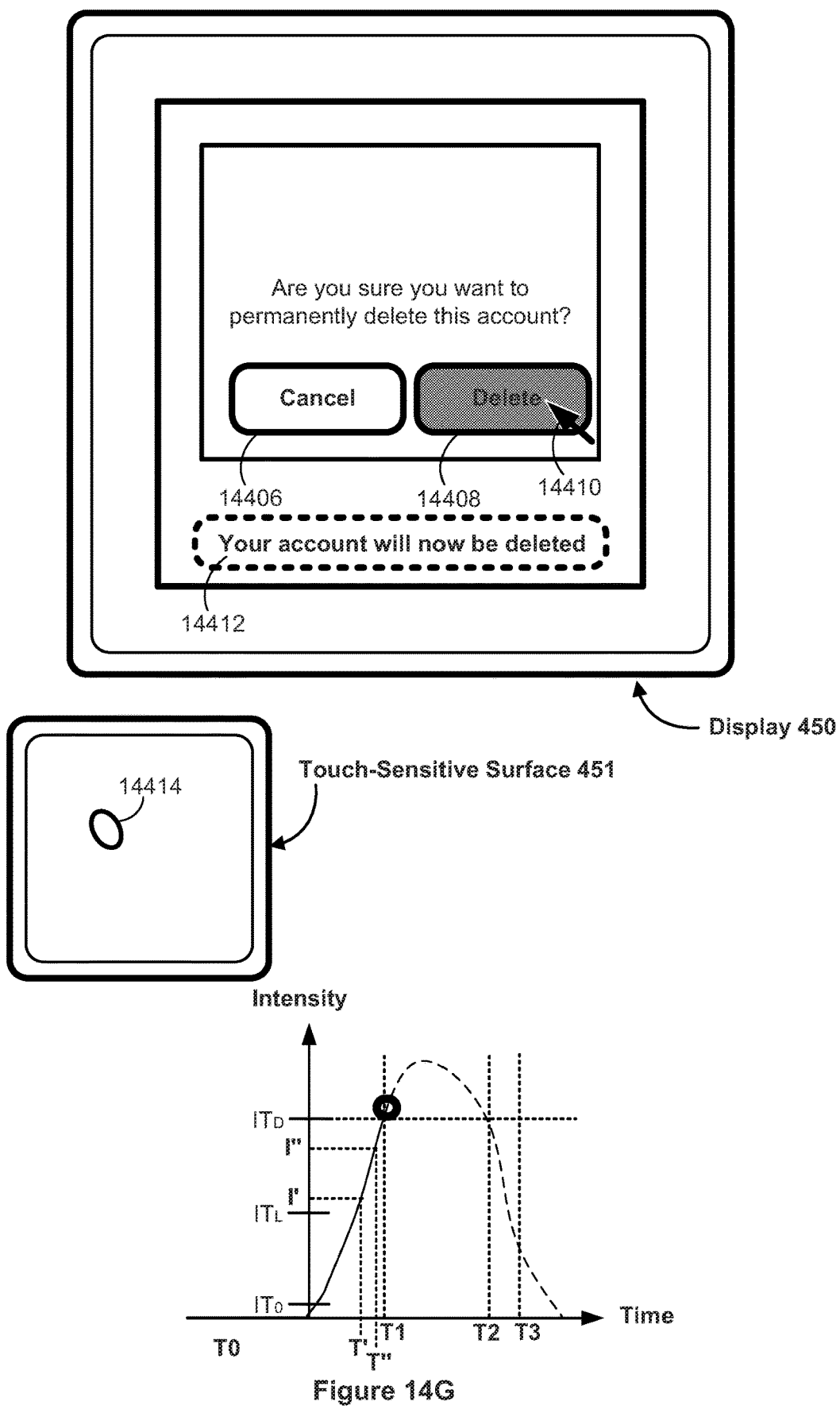

As shown in FIG. 14G, at time T1, while focus selector 14410 is still at the location on display 450 corresponding to the respective control (e.g., control 14408, FIG. 14G), contact 14414 on the touch-sensitive surface 451 meets predefined contact intensity criteria. In the example shown in FIG. 14G, the predefined contact intensity criteria include a contact intensity threshold (e.g., "$IT_D$"). As a result, if and when the intensity of contact 14414 reaches or exceeds the contact intensity threshold, contact 14414 meets the predefined contact intensity criteria. Since contact 14414 meets the predefined contact intensity criteria at time T1, a confirmation is optionally provided to the user to indicate that control 14408 will be activated (e.g., the user account will be permanently deleted) upon detecting the end of the gesture (e.g., upon detecting lift-off of contact 14413). In the example shown in FIG. 14G, the confirmation is optionally shown as control 14408 completely filling up with a different color compared to a color of control 14408 prior to time T1 (e.g., prior to contact 14414 meeting the predefined contact intensity criteria), as shown in FIGS. 14D-14F. Alternatively, or in addition, as shown in FIG. 14G, the confirmation is provided to the user as verbal or textual confirmation 14412 indicating that control 14408 will be activated (e.g., the user account will be deleted) upon termination of the gesture.

As noted previously with reference to FIGS. 14A-14C, in some embodiments, the predefined contact intensity criteria include a contact intensity threshold (e.g., "$IT_D$") and a respective delay time period. In the example shown in FIG. 14G, in such embodiments, contact 14414 meets the predefined contact intensity criteria if the intensity of contact 14414 exceeds the contact intensity threshold for at least a delay time $T_{delay}=T2-T1$. In such embodiments, the progress bar displayed in control 14408 increases in size (e.g., starts to fill up) after the intensity of contact 14414 exceeds the contact intensity threshold, throughout the duration of the delay time. Conversely, in such embodiments, contact 14414 does not meet the predefined contact intensity criteria if the intensity of contact 14414 does not exceed the contact intensity threshold for at least a delay time $T_{delay}=T2-T1$. As another example, referring to FIG. 14G, contact 14414 meets the predefined contact intensity criteria if contact 14414 continues to be detected for a predefined time period (e.g., $T_{delay}=T3-T1$) since (e.g., after) the intensity of contact 14414 exceeds the contact intensity threshold (e.g., time period starting at time T1, FIG. 14G), even if the contact intensity is not maintained at or above the respective contact intensity threshold for the entire predefined time period.

Figure 14H:
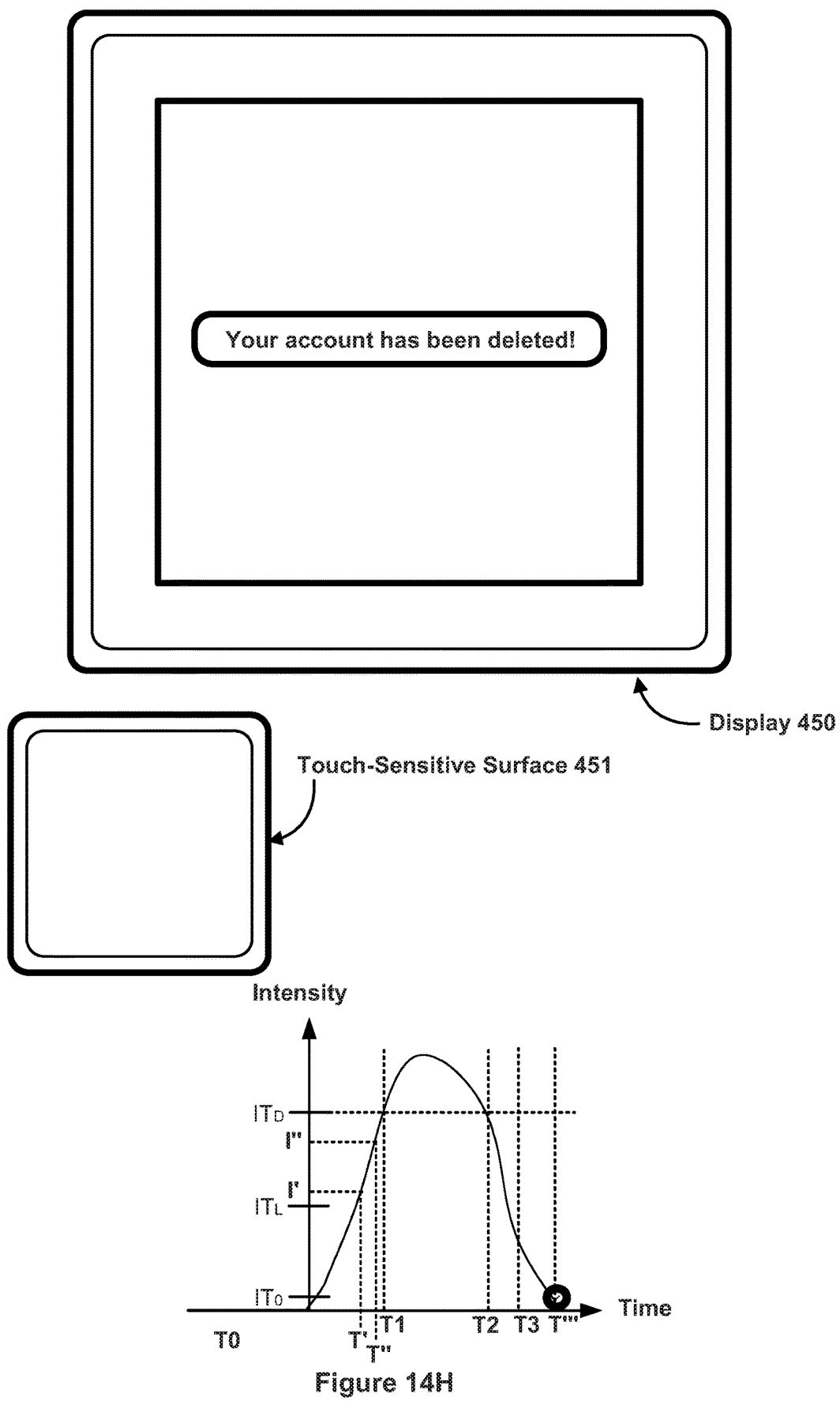

In FIG. 14H, at time T''' subsequent to time T1, upon detecting termination of the gesture or termination of contact 14414 (e.g., upon detecting lift-off of contact 14413), control 14408 (FIGS. 14D-14G) is activated (e.g., the user account is deleted) since the contact is determined to meet the predefined contact intensity criteria (e.g., in FIG. 14G).

On the other hand, as noted with reference to FIGS. 14A-14C, in some embodiments, if the gesture does not include a contact that meets the predefined contact intensity criteria (for example, if contact 14414 does not, at an end of the gesture, have an intensity above the contact intensity threshold), then the control (e.g., control 14408) is not activated in response to the gesture (e.g., upon termination of the gesture). Consequently, the user is not provided with a confirmation that the control will be activated in response to the gesture (e.g., upon termination of the gesture). In some embodiments, the user is provided with a confirmation that the control will not be activated (e.g., by displaying "Delete" button 14408 that is not completely filled up with gray, as illustrated in FIG. 14F). Instead, in some embodiments, if the gesture does not include a contact that meets the predefined contact intensity criteria, the user would continue to view a user interface similar to the user interface shown in FIGS. 14D-14F (e.g., with the extent of visual indication provided in control corresponding to an instantaneous intensity level of the contact 14414). In some embodiments, the user may optionally choose to cancel the deletion of the user account by activating control 14406.

Thus, in some embodiments, the device determines if the gesture includes a contact that meets predefined contact intensity criteria (e.g., if the intensity of the contact is above or greater than an intensity threshold) while the focus selector is at a location corresponding to a control on the display. If the contact meets the contact intensity criteria, the device optionally provides the user with a confirmation that the contact will be activated upon detecting the end of the gesture. If the contact does not yet meet the contact intensity criteria, the device provides the user a visual indication of progress toward meeting the contact intensity based on a current state of user input (e.g., based on the time-varying intensity and/or duration of contact). As a result, the user has the improved convenience of receiving real-time indication of progress toward activation of the control based on the user's input (e.g., based on the time-varying intensity and/or duration of the user's contact), and, in response, the option to adjust the user's input (e.g., adjusting the pressure of the contact by pushing harder or more lightly) to affirm or reverse intent to activate the control. This additional visual indication and requirement for active user-affirmation provides the user with additional information that enables the user to understand how to activate a control that is protected by these extra safeguards against accidental activation of the control by the user.

FIGS. 14I-14M illustrate detecting a user gesture corresponding to a control (e.g., control 14408) on a touch-sensitive display 112, the gesture including a contact (e.g., contact 14420, having time-varying intensity or pressure detected by the touch-sensitive display 112 or sensors associated with the touch-sensitive display 112). FIGS. 14I-14M further illustrate providing the user a visual indication or feedback indicating progress toward the contact meeting predefined contact intensity criteria (e.g., providing a visual indication that the time-varying intensity of the contact is approaching or increasing toward a predefined contact intensity threshold (e.g., "$IT_D$"), for instance as the user pushes down harder on the touch-sensitive surface). FIGS. 14I-14M additionally illustrate providing a confirmation to the user that a respective control (e.g., control 14408, FIG. 14I) will be activated—e.g., a user account will be irreversibly deleted—in response to the gesture (e.g., upon termination of the gesture) if the contact meets the predefined contact intensity criteria. FIGS. 14I-14M also illustrate subsequently activating the control (e.g., control 14408)—for example, deleting the user account—upon termination of the gesture if the contact meets predefined contact intensity criteria.

Figure 14I:
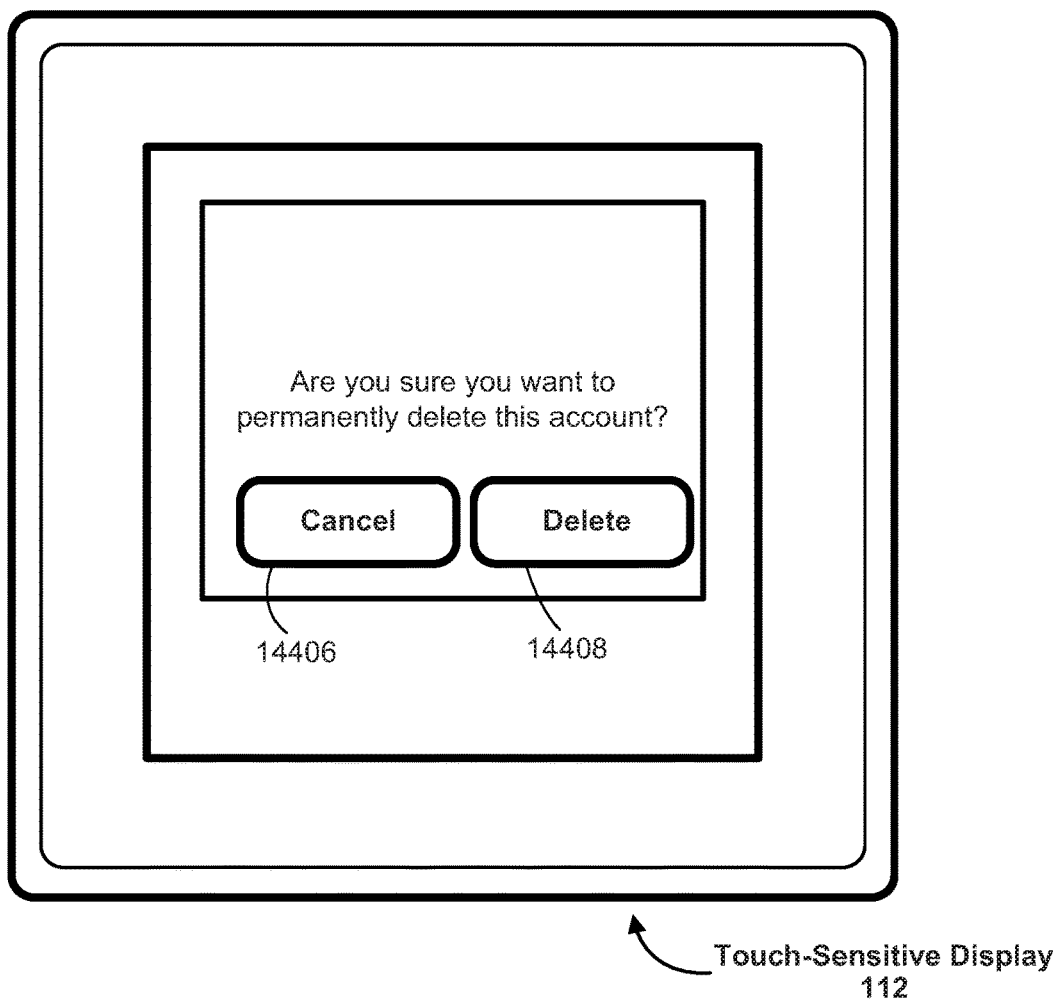
Figure 14I:
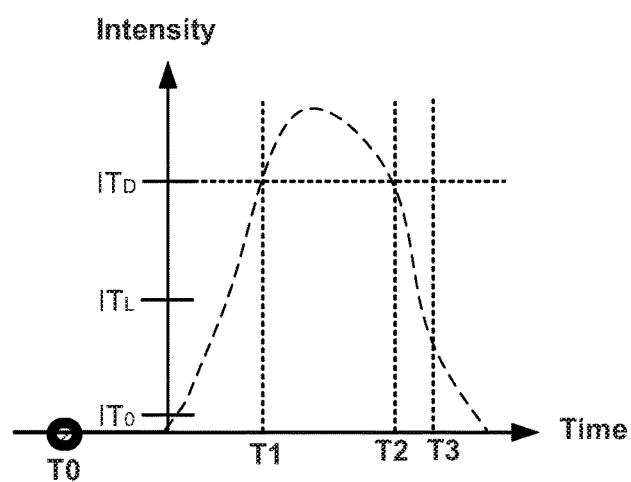
Figure 14J:
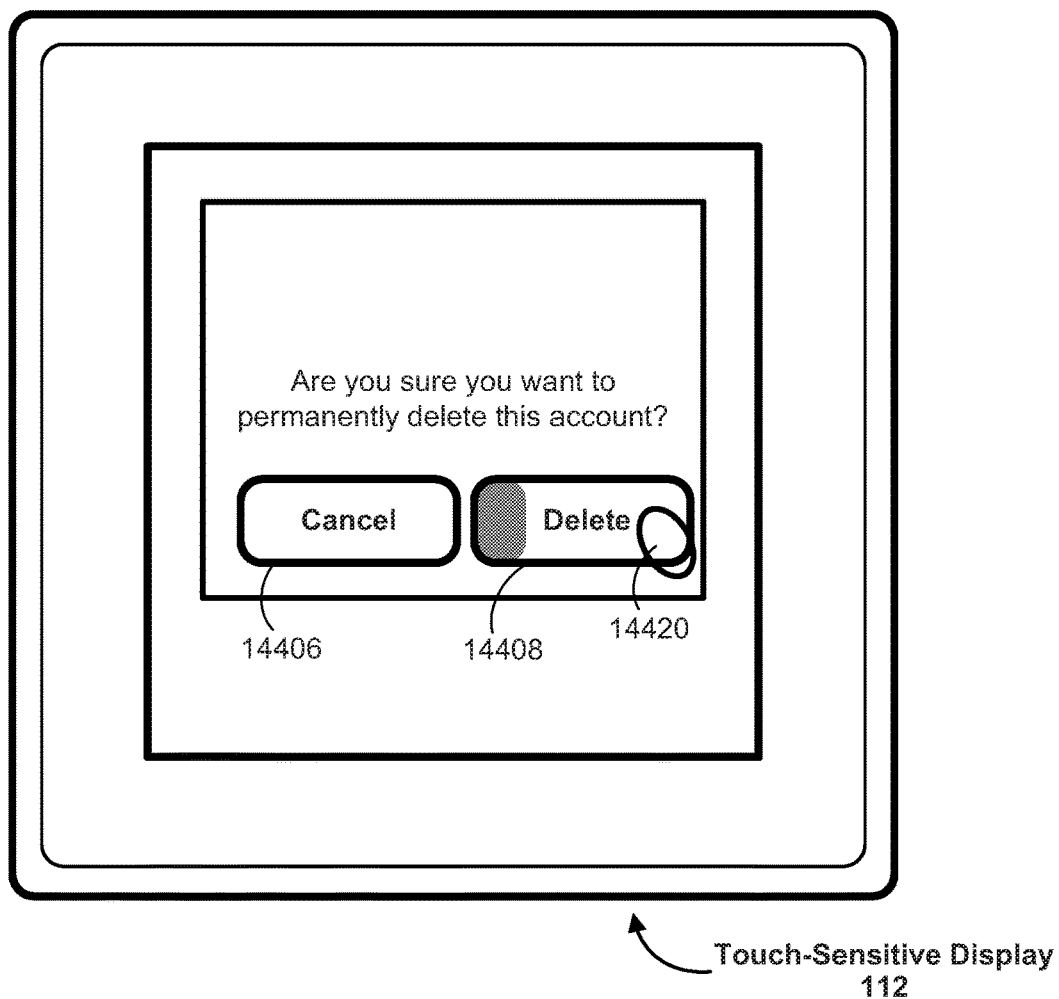
Figure 14J:
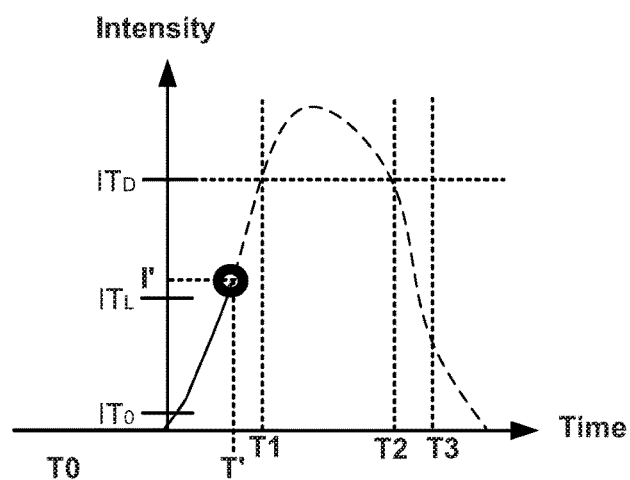

In FIG. 14I, at time T0, no contact is present or detected on touch-sensitive display 112. In FIG. 14J, at time T', a contact or a gesture that includes a contact (e.g., contact 14420 in FIG. 14J) is detected on touch-sensitive display 112. A focus selector (corresponding to contact 14420) is at a location on display 112 corresponding to a respective control (e.g., control 14408, FIG. 14J). As shown in FIG. 14J, at time T', while focus selector 14410 is still at the location on touch-sensitive display 112 corresponding to the respective control (e.g., control 14408, FIG. 14J), contact 14420 has an intensity I', lower than the contact intensity threshold (e.g., "$IT_D$"). In response to detecting a user contact of intensity I' (lower than the contact intensity threshold), the user is provided a visual indication of progress toward contact 14420 meeting predefined contact intensity criteria. For example, as shown in FIG. 14J, control 14408 changes appearance (compared to its appearance in FIG. 14I), for instance as a progress bar is displayed in control 14408. As another example, control 14408 changes appearance by displaying an indication of a difference (e.g., corresponding to a portion of control 14408 that is not filled in with gray) between a current intensity of contact 14420 (e.g., corresponding to the grayed or filled out portion of control 14408) on touch-sensitive display 112 and the contact intensity threshold.

Figure 14K:
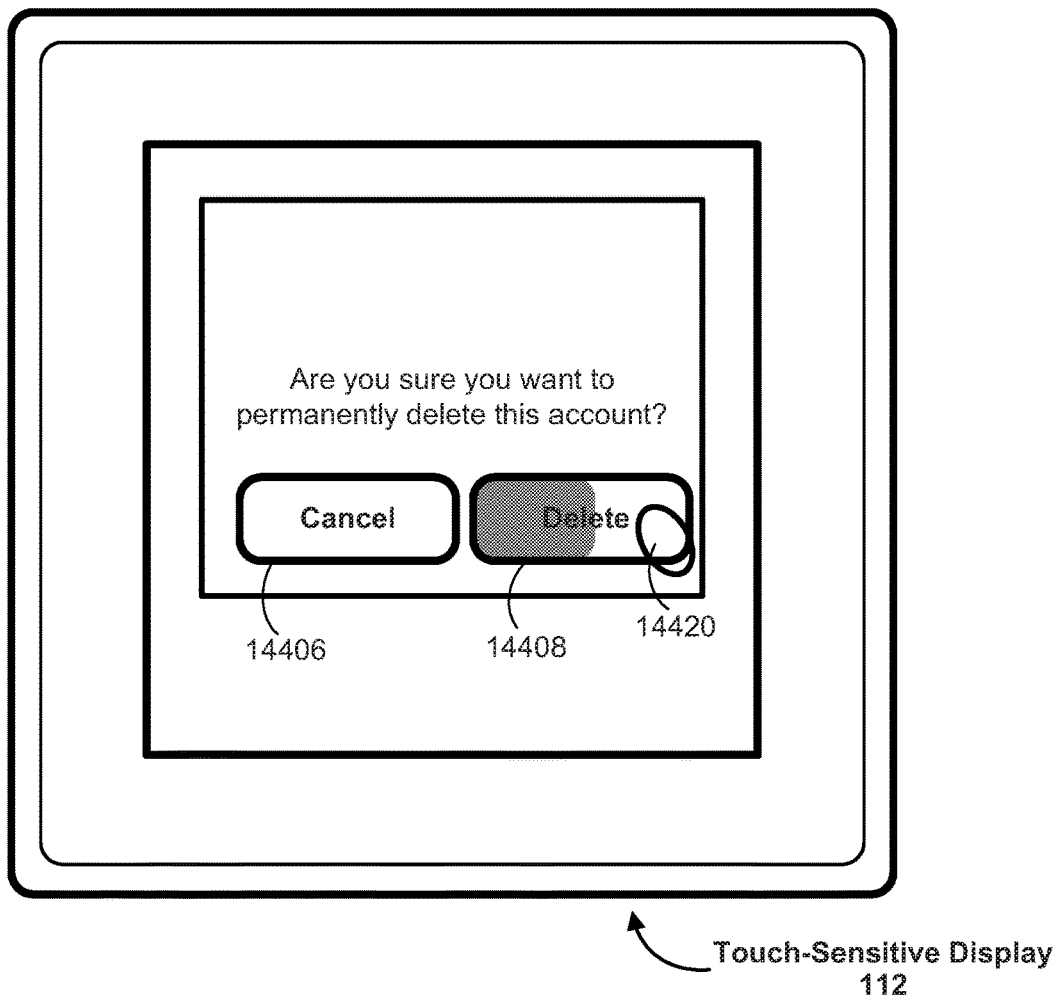
Figure 14K:
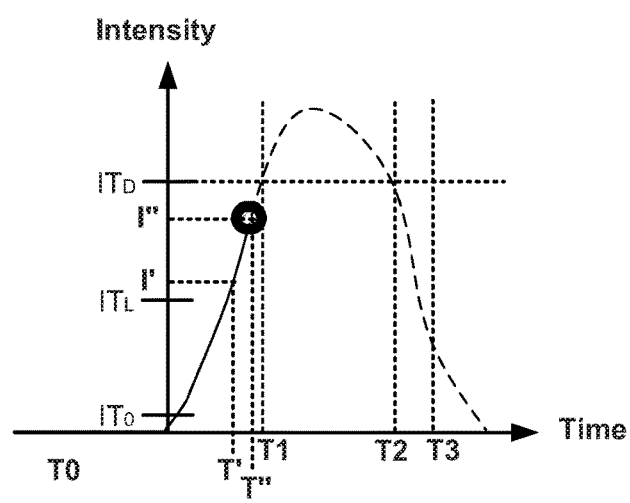

Similarly, as shown in FIG. 14K, at time T'', while focus selector 14410 is still at the location on touch-sensitive display 112 corresponding to the respective control (e.g., control 14408, FIG. 14K), contact 14420 has an intensity I'', lower than the contact intensity threshold. In response to detecting an intensity I'' of contact 14420 (lower than the contact intensity threshold (e.g., "$IT_D$"), but greater than the intensity I' of contact 14420 at time T' shown in FIG. 14J), the user is provided a visual indication of progress toward contact 14420 meeting or approaching the predefined contact intensity criteria. As shown in FIG. 14K, control 14408 further changes appearance (compared to its appearance in FIG. 14I and subsequently in FIG. 14J), for example as the progress bar displayed in control 14408 increases in size (relative to FIG. 14J) in response to the increased intensity of contact 14420 (again, relative to FIG. 14J) toward the contact intensity threshold.

Figure 14L:
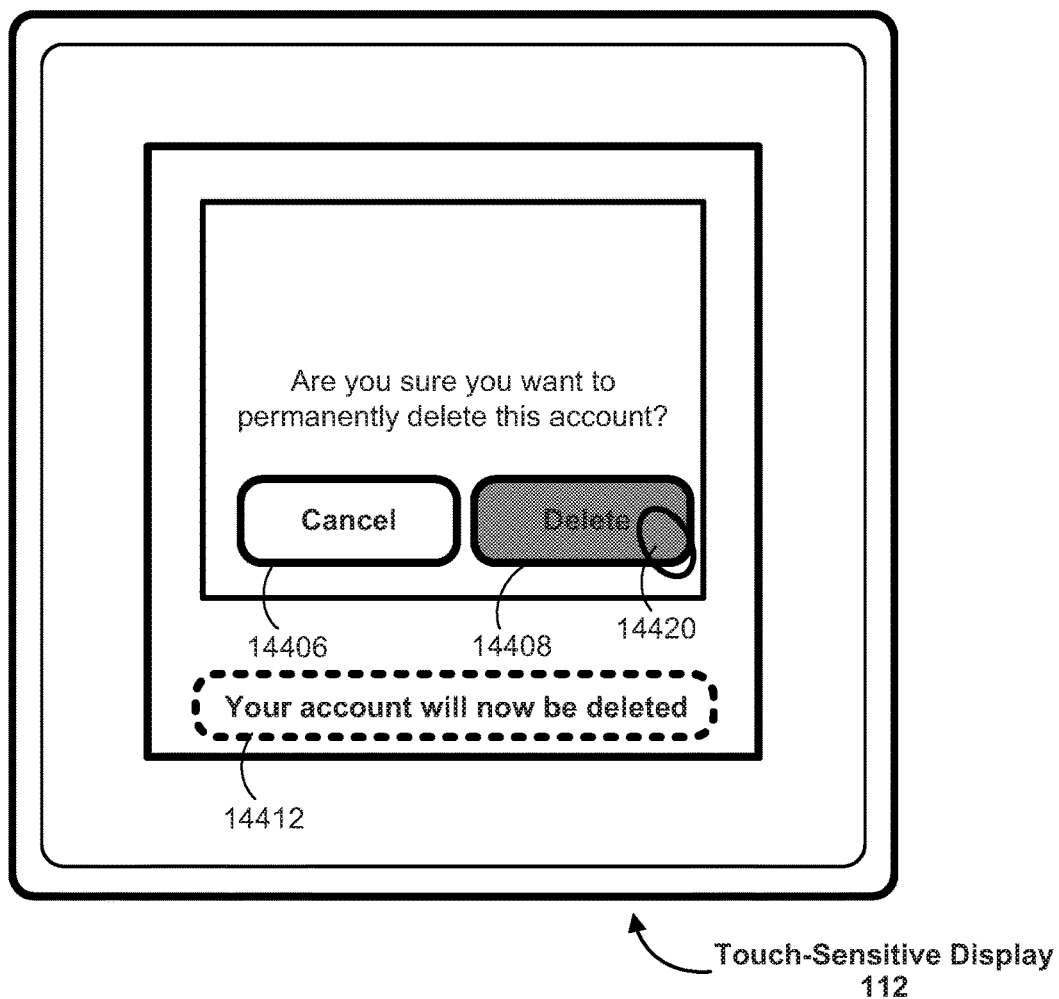
Figure 14L:
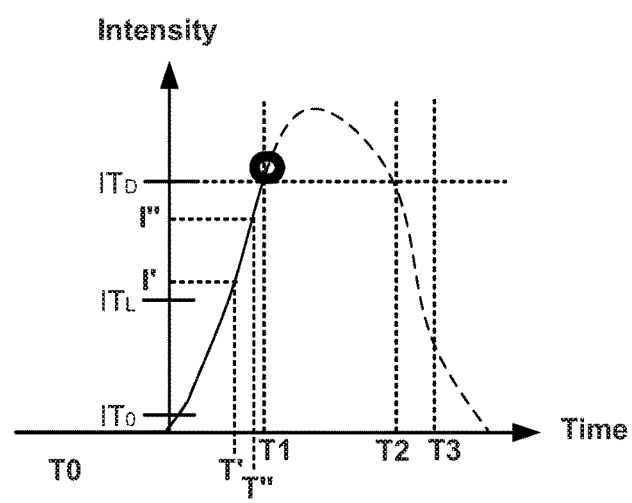

As shown in FIG. 14L, at time T1, while focus selector 14410 is still at the location on touch-sensitive display 112 corresponding to the respective control (e.g., control 14408, FIG. 14L), contact 14420 on the touch-sensitive display 112 meets predefined contact intensity criteria. In the example shown in FIG. 14L, the predefined contact intensity criteria include a contact intensity threshold (e.g., "$IT_D$"). As a result, when the intensity of contact 14420 reaches or exceeds the contact intensity threshold, then contact 14420 meets the predefined contact intensity criteria. Since contact 14420 meets the predefined contact intensity criteria, a confirmation is optionally provided to the user to indicate that control 14408 will be activated (e.g., the user account will be permanently deleted) upon detecting the end of the gesture (e.g., upon detecting lift-off of contact 14420). In the example shown in FIG. 14L, the confirmation is optionally shown as control 14408 completely filling up with a different color compared to a color of control 14408 prior to time T1 (e.g., prior to contact 14420 meeting the predefined contact intensity criteria), as shown in FIGS. 14I-14K. Alternatively, or in addition, as shown in FIG. 14L, the confirmation is provided to the user as verbal or textual confirmation 14412 indicating that control 14408 will be activated (e.g., the user account will be deleted) upon termination of the gesture.

As noted previously with reference to FIGS. 14A-14C, and with reference to FIGS. 14D-14H, in some embodiments, the predefined contact intensity criteria include a contact intensity threshold (e.g., "$IT_D$") and a respective delay time period. In the example shown in FIG. 14L, in such embodiments, contact 14420 meets the predefined contact intensity criteria if the intensity of contact 14420 exceeds the contact intensity threshold for at least a delay time $T_{delay}$=T2−T1. Conversely, in such embodiments, contact 14420 does not meet the predefined contact intensity criteria if the intensity of contact 14420 does not exceed the contact intensity threshold for at least a delay time $T_{delay}$=T2−T1. As another example, referring to FIG. 14L, contact 14420 meets the predefined contact intensity criteria if the contact continues to be detected for a predefined time period (e.g., $T_{delay}$=T3−T1) since (e.g., after) the intensity of contact 14420 exceeds the contact intensity threshold (e.g., time period starting at time T1, FIG. 14L), even if the contact intensity is not maintained at or above the respective contact intensity threshold for the entire predefined time period.

Figure 14M:
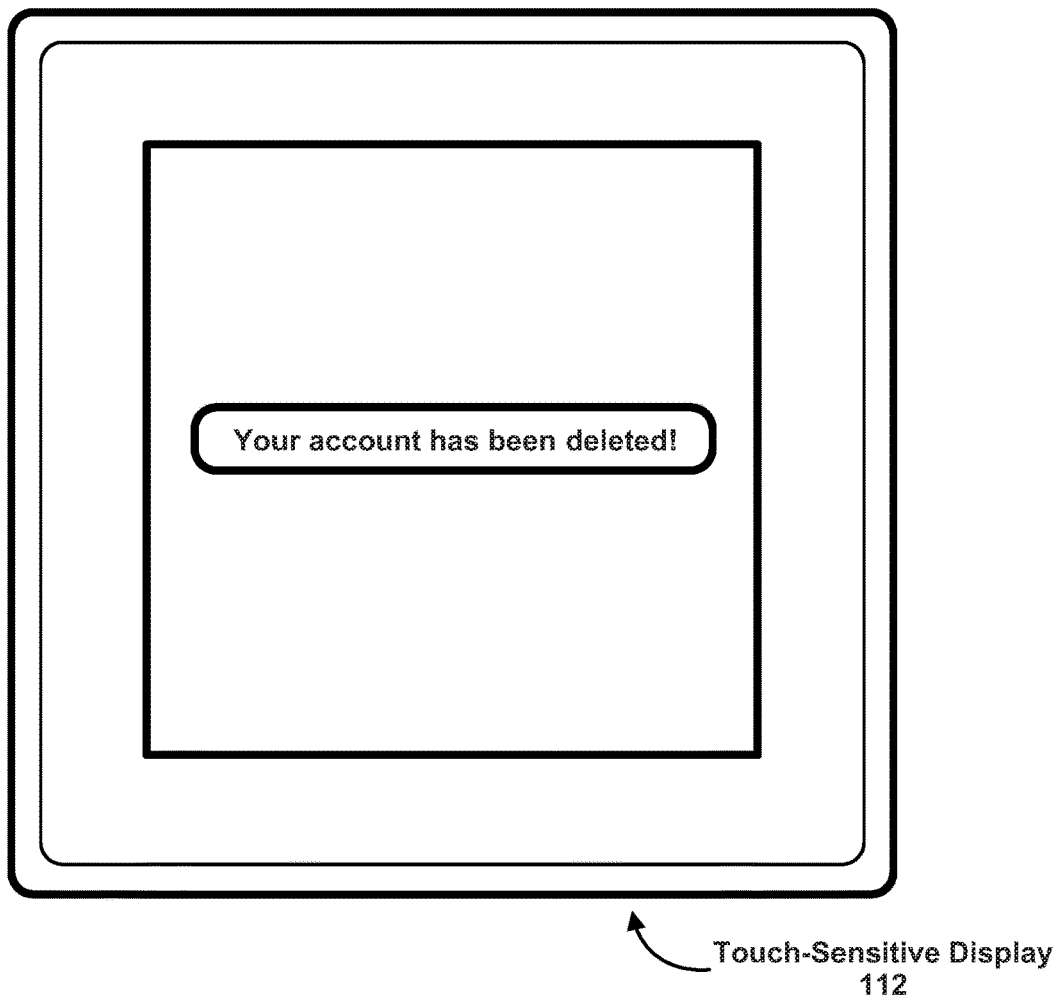
Figure 14M:
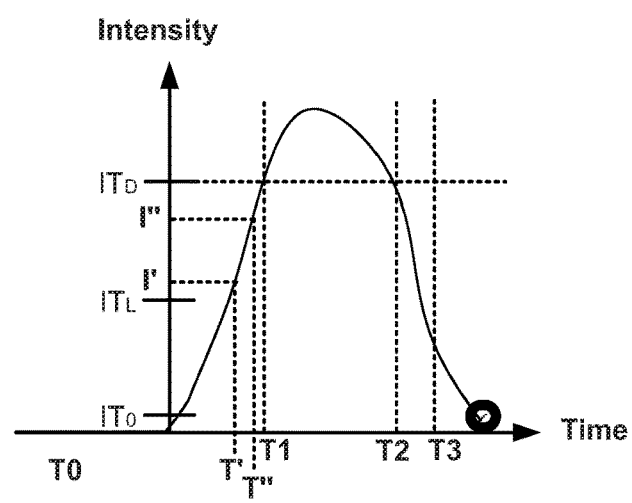
Figure 15A:
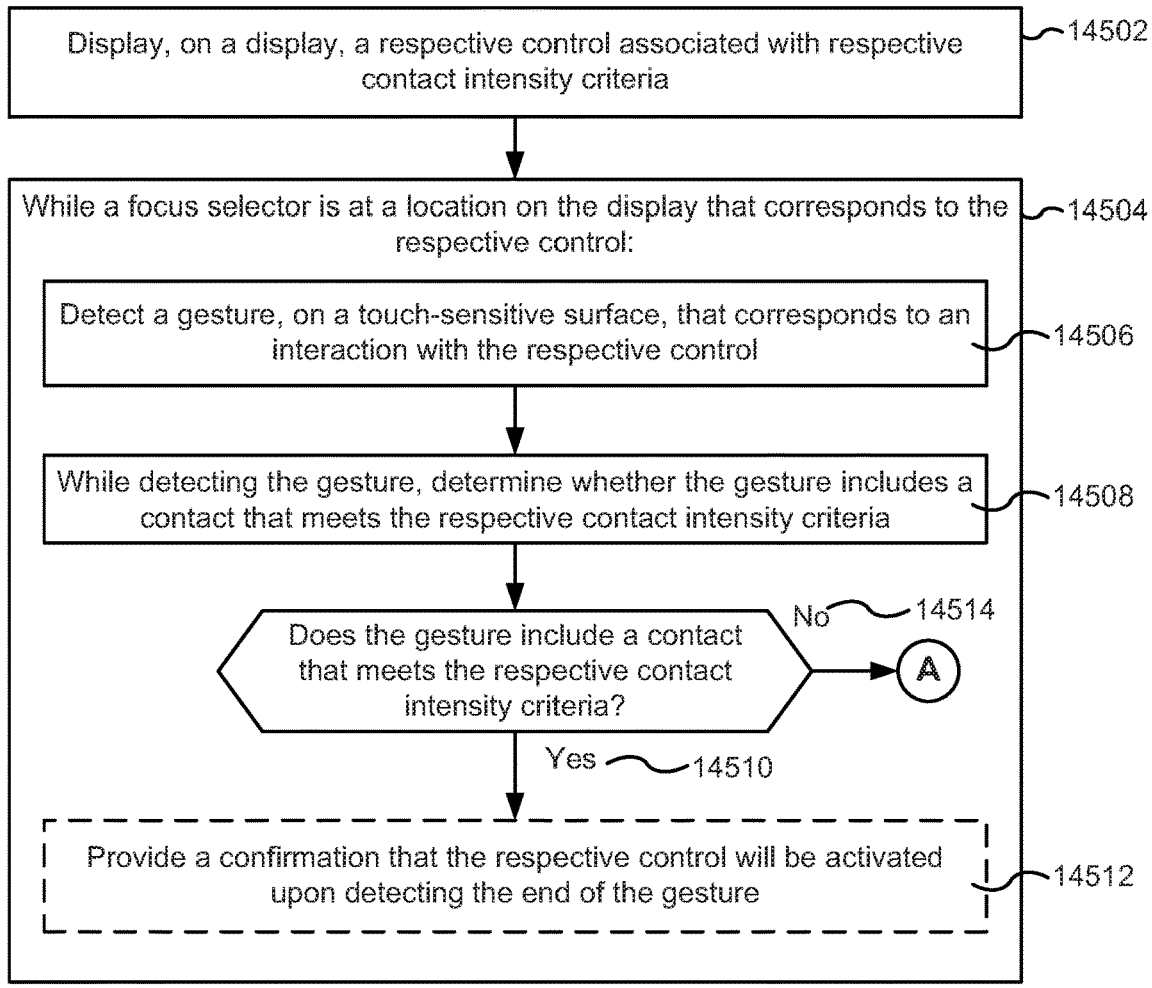
Figure 15C:
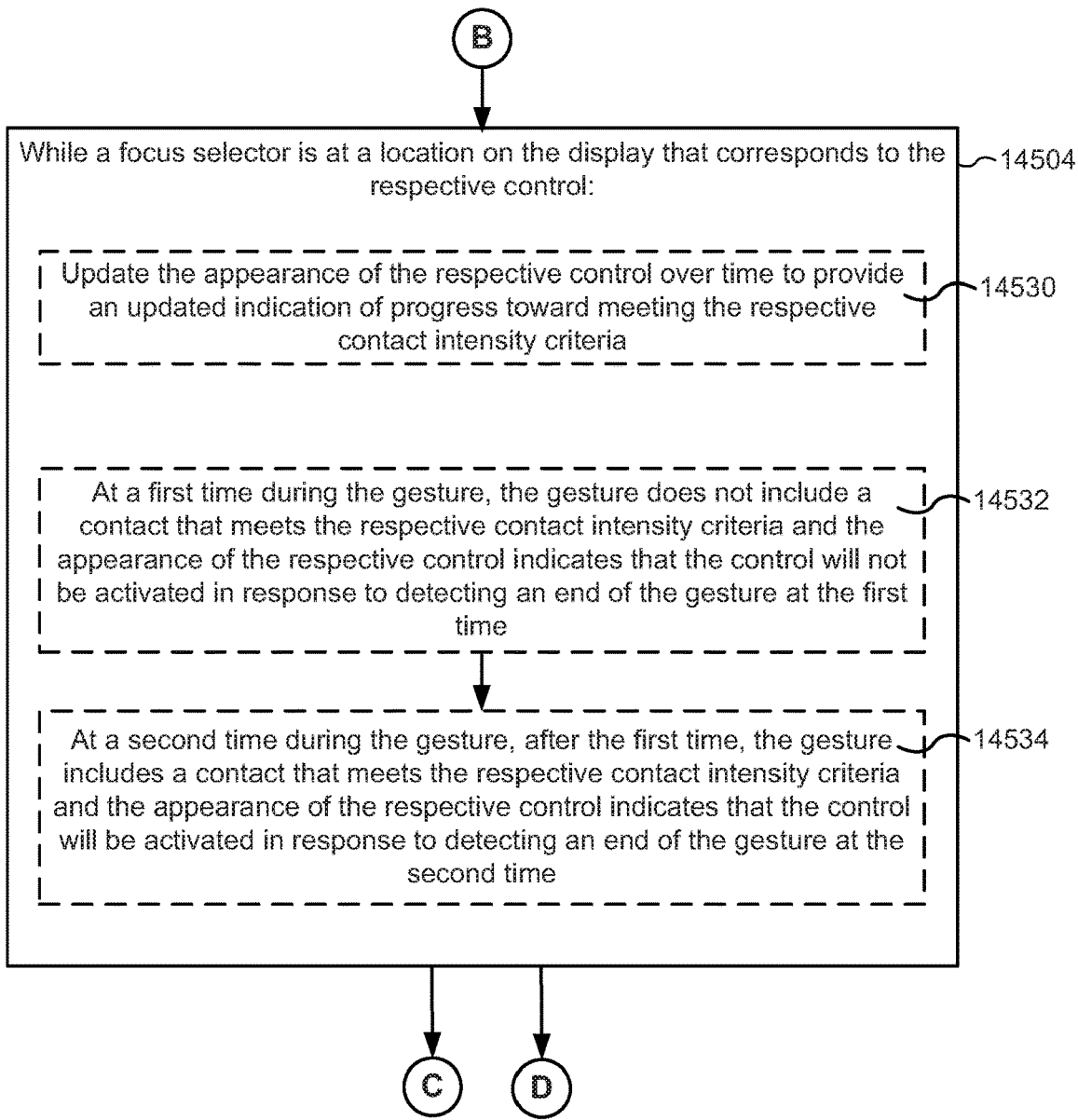
Figure 15D:
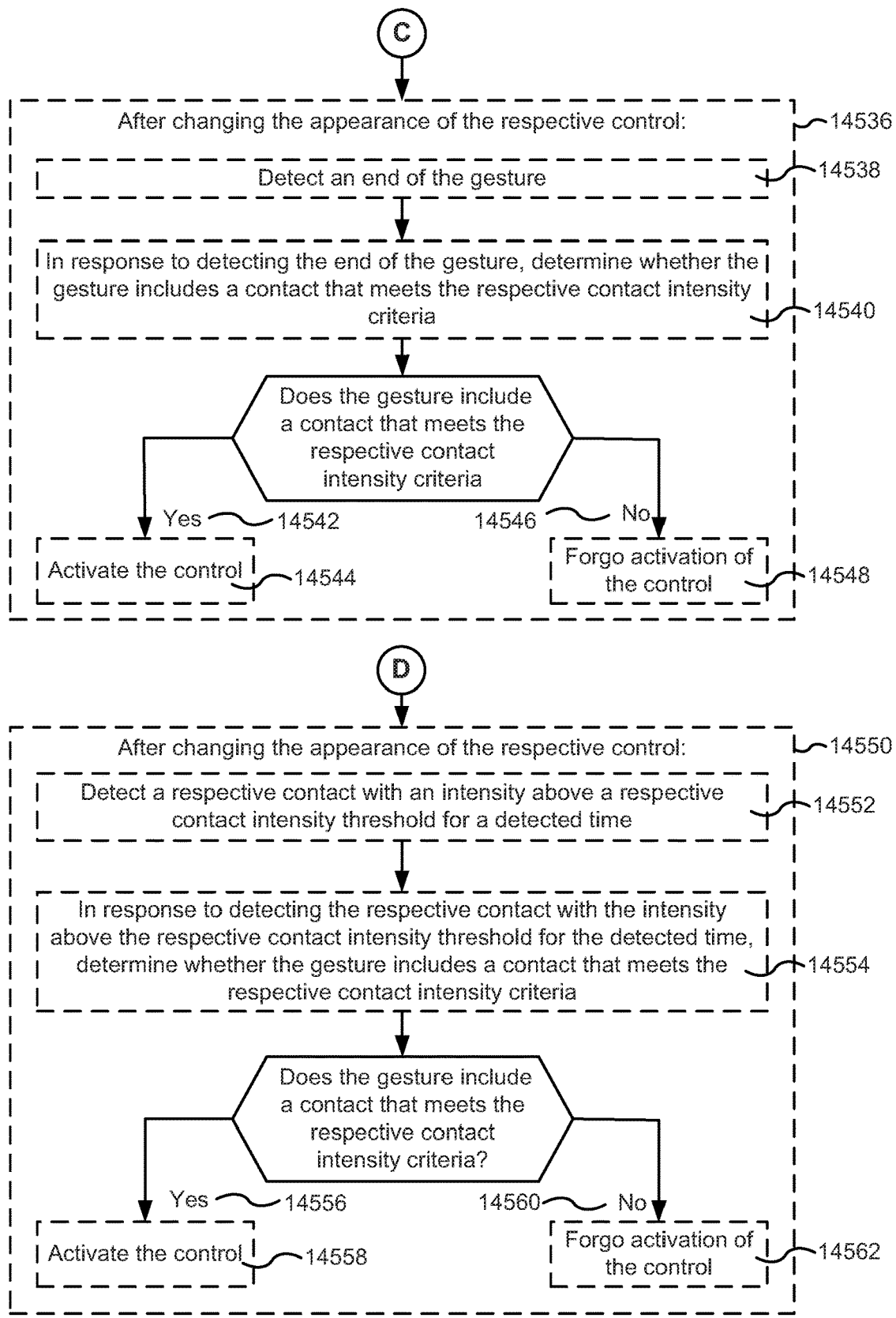

In FIG. 14M, at time T''' subsequent to time T1, upon detecting termination of the gesture or termination of contact 14420 (e.g., upon detecting lift-off of contact 14420), control 14408 (FIGS. 14I-14L) is activated (e.g., the user account is deleted).

On the other hand, as noted with reference to FIGS. 14A-14C, in some embodiments, if the gesture does not include a contact that meets the predefined contact intensity criteria (for example, if contact 14420 does not, at an end of the gesture, have an intensity above the contact intensity threshold), then the control (e.g., control 14408) is not activated in response to the gesture (e.g., upon termination of the gesture). Consequently, the user is not provided with a confirmation that the control will be activated in response to the gesture (e.g., upon termination of the gesture). In some embodiments, the user is provided with a confirmation that the control will not be activated (e.g., by displaying "Delete" button 14408 that is not completely filled up with gray, as illustrated in FIG. 14K). Instead, in some embodiments, if the gesture does not include a contact that meets the predefined contact intensity criteria, the user would continue to view a user interface similar to those shown in FIGS. 14I-14K (e.g., with the extent of visual indication provided in control corresponding to an instantaneous intensity level of the contact 14420). In some embodiments, the user may optionally choose to cancel the deletion of the user account by activating control 14406.

FIGS. 15A-15D are flow diagrams illustrating a method 14500 of governing or managing activation of controls based on the intensity of a contact in accordance with some embodiments. The method 14500 is performed at an electronic device (e.g., device 300, FIG. 3, or portable multifunction device 100, FIG. 1A) with a display and a touch-sensitive surface. In some embodiments, the display is a touch screen display and the touch-sensitive surface is on the display. In some embodiments, the display is separate from the touch-sensitive surface. Some operations in method 14500 are, optionally, combined and/or the order of some operations is, optionally, changed.

As described below, the method 14500 provides an intuitive way to manage activation of controls based on the intensity of a contact. The method reduces the cognitive burden on a user when managing activation of controls based on the intensity of a contact, thereby creating a more efficient human-machine interface. For battery-operated electronic devices, enabling a user to manage activation of controls based on the intensity of a contact faster and more efficiently conserves power and increases the time between battery charges.

The device displays (14502), on a display, a respective control (e.g., a button or slider) associated with respective contact intensity criteria. For example, the respective control has a corresponding predefined contact intensity threshold (e.g., "$IT_D$") that needs to be met by a detected contact in order to activate the control. For example, as described with reference to FIGS. 14A-14C, control 14408 (e.g., a control to delete a user account) displayed on display 450 is associated with a contact intensity threshold (e.g., "$IT_D$") that needs to be met by a contact detected on touch-sensitive surface 451 in order to activate control 14408.

While a focus selector is (14504) at a location on the display that corresponds to the respective control: the device performs one or more of operations 14506-14534.

The device detects (14506) a gesture, on a touch-sensitive surface, that corresponds to an interaction with the respective control. For example, as explained with reference to FIGS. 14A-14C, while focus selector 14410 is at a location on display 450 corresponding to control 14408, a gesture (e.g., including contact 14413, FIG. 14B) is detected on touch-sensitive surface 451.

While detecting the gesture, the device determines (14508) whether the gesture includes a contact that meets the respective contact intensity criteria. In some embodiments, in accordance with a determination that the gesture includes (14510) a contact that meets the respective contact intensity criteria, the device provides (14512) a confirmation that the respective control will be activated upon detecting the end of the gesture. For example, as shown in FIG. 14B, upon determining that intensity of contact 14413 is above the contact intensity threshold (e.g., "$IT_D$"), the device displays an updated appearance of the progress indicator, such as displaying the control (e.g., control 14408, FIG. 14B) filling completely up with a different color (e.g., control 14408, with a white background, fills up with gray). As another example, as shown in FIG. 14B, upon determining that intensity of contact 14413 is above the contact intensity threshold, the device displays a verbal or textual confirmation 14412 indicating that control 14408 will be activated (e.g., the user account will be deleted) upon termination of the gesture.

In accordance with a determination that the gesture does not (e.g., yet) (14514) include a contact that meets the respective contact intensity criteria, the device performs one or more of operations 14516-14562.

In accordance with a determination that the gesture does not (e.g., yet) (14514) include a contact that meets the respective contact intensity criteria, the device changes (14516) the appearance of the respective control to indicate progress toward meeting the respective contact intensity criteria, as described with reference to operations 14518-14528. For example, as explained with reference to FIGS.

14D-14F above, upon determining that an intensity of contact 14414 (e.g., intensity I' at time T', and intensity I" at time T'" corresponding to increasing contact pressure applied by the user) is lower than the contact intensity threshold, the device changes (14516) the appearance of control 14408 to indicate progress toward meeting the contact intensity threshold (e.g., as a progress bar is displayed in control 14408 or as control 14408 gradually fills up with a gray color).

In some embodiments, the respective contact intensity criteria include (14518) a respective contact intensity threshold (e.g., "$IT_D$") and a respective delay time period. For example, as explained with reference to FIG. 14G, the respective delay time period is a predefined time period in which the contact intensity meets or exceeds the respective contact intensity threshold (e.g., $T_{delay}$=T2–T1, FIG. 14G). Alternatively, as explained with reference to FIG. 14G, the respective delay time period is a predefined time period since (after) the respective contact intensity threshold is met (e.g., since time T1) in which the contact continues to be detected, even if the contact intensity is not maintained at or above the respective contact intensity threshold (e.g., $T_{delay}$=T3–T1, FIG. 14G). In some embodiments, changing the appearance of the control includes displaying an indication of an amount of time remaining before the respective delay time period has elapsed. In some embodiments, in response to detecting an end of the gesture, such as liftoff of the contact, if the gesture meets the respective contact intensity criteria, including the respective delay time period, the device performs an operation associated with the control (e.g., the device deletes the user account upon detecting lift-off of contact 14414, as explained with reference to FIG. 14H). In some embodiments, as soon as the gesture meets the respective contact intensity criteria, including the respective delay time period, the device performs an operation associated with the control, without waiting to detect an end of the gesture, such as liftoff of the contact (e.g., in response to detecting that the gesture includes a contact with an intensity above the respective contact intensity threshold).

In some embodiments, the respective contact intensity criteria include (14520) a respective contact intensity threshold (e.g., "$IT_D$"), optionally, without a corresponding delay time period. For example, as explained with reference to FIG. 14G, when the intensity (e.g., pressure) of contact 14414 on touch-sensitive surface 451 reaches or exceeds the contact intensity threshold, then contact 14414 meets the predefined contact intensity criteria. In some embodiments, changing the appearance of the control includes displaying an indication of a difference between a current intensity of a contact on the touch-sensitive surface and the respective contact intensity threshold. For example, as explained with reference to FIGS. 14D-14F, control 14408 further changes appearance by displaying an indication of the difference (e.g., corresponding to a portion of control 14408 that is not filled in with gray) between the current intensity (I") of contact 14414 (e.g., corresponding to the grayed or filled out portion of control 14408) on touch-sensitive surface 451 and the contact intensity threshold. In some embodiments, the device displays an indication of an additional amount of intensity (e.g., pressure) that a user needs to apply in order to activate the control. For example, if the respective contact intensity threshold is 2X, and the detected intensity of the contact is X, then the "Delete" button would be filled up fifty percent of the way. In some embodiments, in response to detecting an end of the gesture, such as liftoff of the contact, if the gesture meets the respective contact intensity criteria, the device performs an operation associated with the control (e.g., the device deletes the user account upon detecting lift-off of contact 14414, as explained with reference to FIG. 14H). In some embodiments, as soon as the gesture meets the respective contact intensity criteria, the device performs an operation associated with the control, without waiting to detect an end of the gesture, such as liftoff of the contact.

In some embodiments, changing the appearance of the control includes (14522) displaying a progress bar in the control. For example, as explained with reference to FIGS. 14D-14H, control 14408 changes appearance (e.g., in FIG. 14E as compared to its appearance in FIG. 14D), for instance as a progress bar is displayed in control 14408 when the intensity of the contact changes.

In some embodiments, changing the appearance of the control includes (14524) changing color of at least a portion of the control in accordance with the intensity of the contact. For example, as explained with reference to FIGS. 14D-14H, control 14408 changes appearance (e.g., in FIG. 14E as compared to its appearance in FIG. 14D), as at least a portion of the control 14408 changes color (from white to gray) when the intensity of the contact changes.

In some embodiments, changing the appearance of the control includes (14526) changing color of at least a portion of the control in accordance with a length of time that the contact has continuously met a respective contact intensity threshold (e.g., "$IT_D$"). For example, the appearance of the control changes color with the time elapsed while the contact has continuously maintained an intensity at or above a predefined contact intensity. For example, if the respective time threshold is 2X (e.g., 1 second), and the detected time that the contact has maintained the respective contact intensity threshold is X (e.g., 0.5 seconds), then the "Delete" button would be filled up fifty percent of the way.

In some embodiments, changing the appearance of the control includes (14528) changing color of at least a portion of the control in accordance with a length of time since the contact met a respective contact intensity threshold (e.g., "$IT_D$"). For example, the appearance of the control changes with the time elapsed since the contact met a predefined contact intensity without regard to whether or not the contact has maintained the predefined contact intensity. For example, if the respective time threshold is 2X (e.g., 1 second), and the detected time that the contact has been detected since the contact reached the respective contact intensity threshold is X (e.g., 0.5 seconds), then the "Delete" button would be filled up fifty percent of the way.

In some embodiments, the device updates (14530) the appearance of the respective control over time to provide an updated indication of progress toward meeting the respective contact intensity criteria. For example, as explained with reference to FIGS. 14D-14G, control 14408 (e.g., a button) gradually fills up with (e.g., gray) color in accordance with a gradually increasing intensity of contact 14414 on touch-sensitive surface 451 (e.g., as the user pushes harder on touch-sensitive surface 451). As another example, as explained with reference to FIGS. 14D-14G, control 14408 (e.g., a button) gradually fills with (e.g., gray) color as contact 14414 is maintained at an intensity above a respective contact intensity threshold (e.g., "$IT_D$") for a predefined period of time (e.g., $T_{delay}$=T2–T1, FIG. 14G) needed to activate the button (e.g., control 14408).

In some embodiments, at a first time during the gesture, the gesture does not include (14532) a contact that meets the respective contact intensity criteria and the appearance of the respective control indicates that the control will not be activated in response to detecting an end of the gesture at the first time. In such embodiments, at a second time during the gesture, after the first time, the gesture includes (14534) a contact that meets the respective contact intensity criteria and the appearance of the respective control indicates that the control will be activated in response to detecting an end of the gesture at the second time. For example, the contact increases in intensity and/or duration during the gesture and thus at the end of the gesture, the control is activated. For example, as explained with reference to FIGS. 14D-14H, the intensity of contact 14414 increases from zero intensity (no contact, FIG. 14D) to intensity I' (FIG. 14E) to intensity I" (FIG. 14F)—as the user pushes harder on touch-sensitive surface 451—during which times contact 14414 does not meet contact intensity criteria. At these times, the appearance of control 14408 (e.g., control 14408 is not completely filled in gray color) indicates that control 14408 will not be activated (e.g., user account will not be deleted) in response to detecting an end of the gesture at these times. However, when the intensity of contact 14414 exceeds contact intensity threshold at time T1 (FIG. 14G), contact 14414 meets contact intensity criteria. At this time, the appearance of control 14408 (e.g., control 14408 is completely filled in with gray color) indicates that control 14408 will be activated (e.g., user account will be deleted) in response to detecting an end of the gesture at this time.

In some embodiments, after changing (14536) the appearance of the respective control: the device detects (14538) an end of the gesture. For example, as explained with reference to FIGS. 14D-14E, after changing the appearance of the respective control 14408, the device detects liftoff of contact 14414 (FIG. 14E). In response to detecting the end of the gesture, the device determines (14540) whether the gesture includes a contact that meets the respective contact intensity criteria. In accordance with a determination that the gesture includes (14542) a contact that meets the respective contact intensity criteria, the device activates (14544) the control. For example, the device performs an operation associated with activation of the control (e.g., the device deletes the user account, as shown in FIG. 14H). In accordance with a determination that the gesture does not include (14546) a contact that meets the respective contact intensity criteria, the device forgoes (14548) activation of the control. For example, as explained with reference to FIGS. 14D-14H, upon determining that the gesture does not include a contact that meets the respective contact intensity criteria the device does not delete the user account, but rather returns the user to the user interface shown in FIG. 14D.

In some embodiments, after changing (14550) the appearance of the respective control: the device detects (14552) a respective contact with an intensity above a respective contact intensity threshold (e.g., "$IT_D$") for a detected time. In some embodiments, the respective contact is a contact of the gesture, such as a contact corresponds to a press input on the touch-sensitive surface while the focus selector is at the location on the display that corresponds to the respective control. In response to detecting the respective contact with the intensity above the respective contact intensity threshold for the detected time, the device determines (14554) whether the gesture includes a contact that meets the respective contact intensity criteria. In accordance with a determination that the gesture includes (14556) a contact that meets the respective contact intensity criteria, the device activates (14558) the control. For example, the device performs an operation associated with activation of the control without waiting to detect an end of the gesture (e.g., prior to lift off of the finger contact). In accordance with a determination that the gesture does not (14560) include a contact that meets the respective contact intensity criteria, the device forgoes (14562) activation of the control.

It should be understood that the particular order in which the operations in FIGS. 15A-15D have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., those listed in the fifth paragraph of the Description of Embodiments) are also applicable in an analogous manner to method 14500 described above with respect to FIGS. 15A-15D. For example, the contacts, gestures, controls, user interface objects, intensity thresholds, focus selectors described above with reference to method 14500 optionally have one or more of the characteristics of the contacts, gestures, controls, user interface objects, intensity thresholds, focus selectors described herein with reference to other methods described herein (e.g., those listed in the fifth paragraph of the Description of Embodiments). For brevity, these details are not repeated here.

Figure 16:
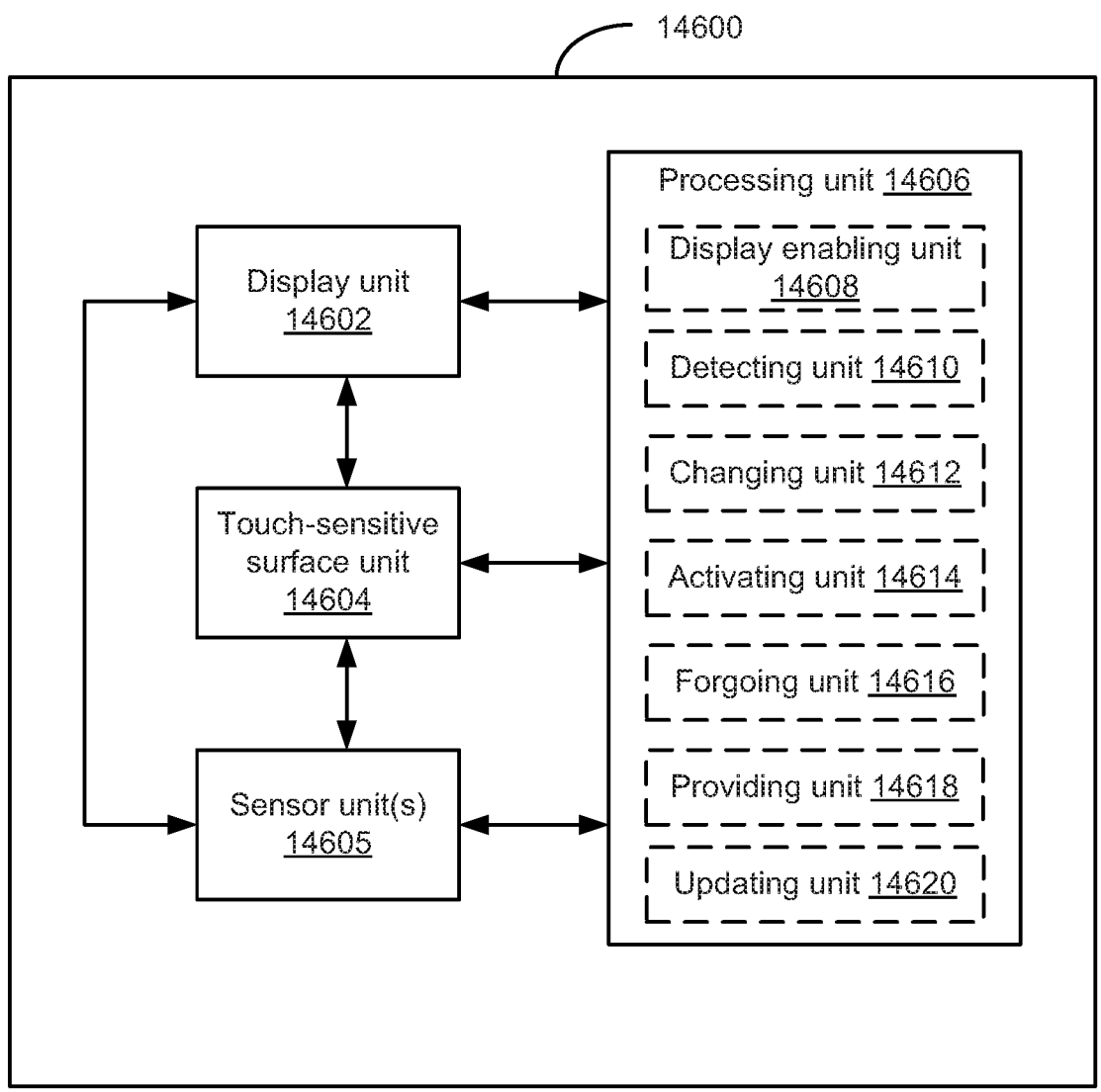
FIG. 16 is a functional block diagram of an electronic device in accordance with some embodiments.

In accordance with some embodiments, FIG. 16 shows a functional block diagram of an electronic device 14600 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 16 are, optionally, combined or separated into sub-blocks to implement the principles of the various described embodiments. Therefore, the description herein optionally supports any possible combination or separation or further definition of the functional blocks described herein.

As shown in FIG. 16, an electronic device 14600 includes a display unit 14602 configured to display on the display unit 14602, a respective control associated with respective contact intensity criteria; a touch-sensitive surface unit 14604 configured to receive a contact on the touch-sensitive surface unit; one or more sensor units 14605 configured to detect intensity of contacts with the touch-sensitive surface unit 14604; and a processing unit 14606 coupled to the display unit 14602. In some embodiments, the processing unit 14606 includes a display enabling unit 14608, a detecting unit 14610, a changing unit 14612, an activating unit 14614, a providing unit 14618, and an updating unit 14620.

The processing unit 14606 is configured to: display, on the display unit 14602, a respective control associated with respective contact intensity criteria; and while a focus selector is at a location on the display unit 14602 that corresponds to the respective control: detect a gesture, on the touch-sensitive surface unit 14604, that corresponds to an interaction with the respective control (e.g., with the detecting unit 14610); and while detecting the gesture, in accordance with a determination that the gesture does not include a contact that meets the respective contact intensity criteria, change the appearance of the respective control to indicate progress toward meeting the respective contact intensity criteria (e.g., with the changing unit 14612).

In some embodiments, the processing unit 14606 is further configured to, after changing the appearance of the respective control: detect an end of the gesture (e.g., with the detecting unit 14610); and in response to detecting the end of the gesture: in accordance with a determination that the gesture includes a contact that meets the respective contact intensity criteria, activate the control (e.g., with the activating unit 14614); and in accordance with a determination that the gesture does not include a contact that meets the respective contact intensity criteria, forgo activation of the control (e.g., with the activating unit 14614).

In some embodiments, the processing unit 14606 is further configured to, while detecting the gesture, in accordance with a determination that the gesture includes a contact that meets the respective contact intensity criteria, provide a confirmation that the respective control will be activated upon detecting the end of the gesture (e.g., with the providing unit 14618).

In some embodiments, the processing unit 14606 is further configured to, after changing the appearance of the respective control: detect a respective contact with an intensity above a respective contact intensity threshold for a detected time (e.g., with the detecting unit 14610); and in response to detecting the respective contact with the intensity above the respective contact intensity threshold for the detected time: in accordance with a determination that the gesture includes a contact that meets the respective contact intensity criteria, activate the control (e.g., with the activating unit 14614); and in accordance with a determination that the gesture does not include a contact that meets the respective contact intensity criteria, forgo activation of the control (e.g., with the activating unit 14614).

In some embodiments, at a first time during the gesture, the gesture does not include a contact that meets the respective contact intensity criteria and the appearance of the respective control indicates that the control will not be activated in response to detecting an end of the gesture at the first time; and at a second time during the gesture, after the first time, the gesture includes a contact that meets the respective contact intensity criteria and the appearance of the respective control indicates that the control will be activated in response to detecting an end of the gesture at the second time.

In some embodiments, the processing unit 14606 is further configured to update the appearance of the respective control over time to provide an updated indication of progress toward meeting the respective contact intensity criteria (e.g., with the updating unit 14620).

In some embodiments, the respective contact intensity criteria include a respective contact intensity threshold and a respective delay time period; and changing the appearance of the control includes displaying an indication of an amount of time remaining before the respective delay time period has elapsed.

In some embodiments, the respective contact intensity criteria include a respective contact intensity threshold; and changing the appearance of the control includes displaying an indication of a difference between a current intensity of a contact on the touch-sensitive surface unit 14604 and the respective contact intensity threshold.

In some embodiments, changing the appearance of the control includes displaying a progress bar in the control (e.g., with the changing unit 14612).

In some embodiments, changing the appearance of the control includes changing color of at least a portion of the control in accordance with the intensity of the contact (e.g., with the changing unit 14612).

In some embodiments, changing the appearance of the control includes changing color of at least a portion of the control in accordance with a length of time that the contact has continuously met a respective contact intensity threshold (e.g., with the changing unit 14612).

In some embodiments, changing the appearance of the control includes changing color of at least a portion of the control in accordance with a length of time since the contact met a respective contact intensity threshold (e.g., with the changing unit 14612).

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 15A-15D are, optionally, implemented by components depicted in FIGS. 1A-1B or FIG. 16. For example, displaying operation 14502, detecting operation 14506, and determining operation 14508 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

It should be understood that the particular order in which the operations have been described above is merely exemplary and is not intended to indicate that the described order is the only order in which the operations could be performed. One of ordinary skill in the art would recognize various ways to reorder the operations described herein. Additionally, it should be noted that the various processes separately described herein (e.g., those listed in the fifth paragraph of the Description of Embodiments) can be combined with each other in different arrangements. For example, the contacts, user interface objects, tactile sensations, intensity thresholds, and/or focus selectors described above with reference to any one of the various processes separately described herein (e.g., those listed in the fifth paragraph of the Description of Embodiments) optionally have one or more of the characteristics of the contacts, gestures, user interface objects, tactile sensations, intensity thresholds, and focus selectors described herein with reference to one or more of the other methods described herein (e.g., those listed in the fifth paragraph of the Description of Embodiments). For brevity, all of the various possible combinations are not specifically enumerated here, but it should be understood that the claims described above may be combined in any way that is not precluded by mutually exclusive claim features.

The foregoing description, for purpose of explanation, has been described with reference to specific embodiments. However, the illustrative discussions above are not intended to be exhaustive or to limit the various described embodiments to the precise forms disclosed. Many modifications and variations are possible in view of the above teachings.

The embodiments were chosen and described in order to best explain the principles of the various described embodiments and their practical applications, to thereby enable others skilled in the art to best utilize the various described embodiments with various modifications as are suited to the particular use contemplated.

What is claimed is:

1. A non-transitory computer readable storage medium storing one or more programs, the one or more programs comprising instructions which, when executed by an electronic device with a display, a touch-sensitive surface, and one or more sensors to detect intensities of contacts with the touch-sensitive surface, cause the electronic device to:
    display, on the display, a respective control associated with respective contact intensity criteria that is used to determine whether or not a function associated with the respective control will be performed, wherein the respective control is a user interface element, activation of which initiates performance of the function associated with the respective control;
    while a focus selector is at a location on the display that corresponds to the respective control:
        detect a gesture, on the touch-sensitive surface, that corresponds to an interaction with the respective control; and
        while detecting the gesture, in accordance with a determination that the gesture does not include a contact that meets the respective contact intensity criteria, change appearance of the respective control to indicate progress toward meeting the respective contact intensity criteria that is used to determine whether or not a function associated with the respective control will be performed; and
    in response to detecting activation of the respective control, in accordance with the detected gesture including a contact that meets the respective contact intensity criteria, perform the function associated with the respective control.

2. The storage medium of claim 1, including instructions which, when executed by the electronic device, cause the electronic device to, after changing the appearance of the respective control:
    detect an end of the gesture; and
    in response to detecting the end of the gesture:
        in accordance with a determination that the gesture includes a contact that meets the respective contact intensity criteria, activate the respective control; and
        in accordance with a determination that the gesture does not include a contact that meets the respective contact intensity criteria, forgo activation of the respective control.

3. The storage medium of claim 1, including instructions which, when executed by the electronic device, cause the electronic device to, while detecting the gesture, in accordance with a determination that the gesture includes a contact that meets the respective contact intensity criteria, provide a confirmation that the respective control will be activated upon detecting an end of the gesture.

4. The storage medium of claim 1, including instructions which, when executed by the electronic device, cause the electronic device to, after changing the appearance of the respective control:
    detect a respective contact with an intensity above a respective contact intensity threshold for a detected time; and
    in response to detecting the respective contact with the intensity above the respective contact intensity threshold for the detected time:
        in accordance with a determination that the gesture includes a contact that meets the respective contact intensity criteria, activate the respective control; and
        in accordance with a determination that the gesture does not include a contact that meets the respective contact intensity criteria, forgo activation of the respective control.

5. The storage medium of claim 1, wherein:
    at a first time during the gesture, the gesture does not include a contact that meets the respective contact intensity criteria and the appearance of the respective control indicates that the respective control will not be activated in response to detecting an end of the gesture at the first time; and
    at a second time during the gesture, after the first time, the gesture includes a contact that meets the respective contact intensity criteria and the appearance of the respective control indicates that the respective control will be activated in response to detecting an end of the gesture at the second time.

6. The storage medium of claim 1, including instructions which, when executed by the electronic device, cause the electronic device to continue to update the appearance of the respective control over time to provide an updated indication of progress toward meeting the respective contact intensity criteria.

7. The storage medium of claim 1, wherein:
    the respective contact intensity criteria include a respective contact intensity threshold and a respective delay time period; and
    changing the appearance of the respective control includes displaying an indication of an amount of time remaining before the respective delay time period has elapsed.

8. The storage medium of claim 1, wherein:
    the respective contact intensity criteria include a respective contact intensity threshold; and
    changing the appearance of the respective control includes displaying an indication of a difference between a current intensity of a contact on the touch-sensitive surface and the respective contact intensity threshold.

9. The storage medium of claim 1, wherein changing the appearance of the respective control includes displaying a progress bar in the respective control.

10. The storage medium of claim 1, wherein changing the appearance of the respective control includes changing color of at least a portion of the respective control in accordance with intensity of the contact.

11. The storage medium of claim 1, wherein changing the appearance of the respective control includes changing color of at least a portion of the respective control in accordance with a length of time that the contact has continuously met a respective contact intensity threshold.

12. The storage medium of claim 1, wherein changing the appearance of the respective control includes changing color of at least a portion of the respective control in accordance with a length of time since the contact met a respective contact intensity threshold.

13. An electronic device, comprising:
    a display;
    a touch-sensitive surface;
    one or more sensors to detect intensities of contacts with the touch-sensitive surface;

one or more processors;
memory; and
one or more programs, wherein the one or more programs are stored in the memory and configured to be executed by the one or more processors, the one or more programs including instructions for:
displaying, on the display, a respective control associated with respective contact intensity criteria that is used to determine whether or not a function associated with the respective control will be performed, wherein the respective control is a user interface element, activation of which initiates performance of the function associated with the respective control;
while a focus selector is at a location on the display that corresponds to the respective control:
detecting a gesture, on the touch-sensitive surface, that corresponds to an interaction with the respective control; and
while detecting the gesture, in accordance with a determination that the gesture does not include a contact that meets the respective contact intensity criteria, changing the appearance of the respective control to indicate progress toward meeting the respective contact intensity criteria that is used to determine whether or not a function associated with the respective control will be performed; and
in response to detecting activation of the respective control, in accordance with the detected gesture including a contact that meets the respective contact intensity criteria, performing the function associated with the respective control.

14. The electronic device of claim 13, wherein the one or more programs further include instructions for, after changing the appearance of the respective control:
detecting an end of the gesture; and
in response to detecting the end of the gesture:
in accordance with a determination that the gesture includes a contact that meets the respective contact intensity criteria, activating the respective control; and
in accordance with a determination that the gesture does not include a contact that meets the respective contact intensity criteria, forgoing activation of the respective control.

15. The electronic device of claim 13, wherein the one or more programs further include instructions for, while detecting the gesture, in accordance with a determination that the gesture includes a contact that meets the respective contact intensity criteria, providing a confirmation that the respective control will be activated upon detecting an end of the gesture.

16. The electronic device of claim 13, wherein the one or more programs further include instructions for, after changing the appearance of the respective control:
detecting a respective contact with an intensity above a respective contact intensity threshold for a detected time; and
in response to detecting the respective contact with the intensity above the respective contact intensity threshold for the detected time:
in accordance with a determination that the gesture includes a contact that meets the respective contact intensity criteria, activating the respective control; and
in accordance with a determination that the gesture does not include a contact that meets the respective contact intensity criteria, forgoing activation of the respective control.

17. The electronic device of claim 13, wherein:
at a first time during the gesture, the gesture does not include a contact that meets the respective contact intensity criteria and the appearance of the respective control indicates that the respective control will not be activated in response to detecting an end of the gesture at the first time; and
at a second time during the gesture, after the first time, the gesture includes a contact that meets the respective contact intensity criteria and the appearance of the respective control indicates that the respective control will be activated in response to detecting an end of the gesture at the second time.

18. The electronic device of claim 13, wherein the one or more programs further include instructions for continuing to update the appearance of the respective control over time to provide an updated indication of progress toward meeting the respective contact intensity criteria.

19. The electronic device of claim 13, wherein:
the respective contact intensity criteria include a respective contact intensity threshold and a respective delay time period; and
changing the appearance of the respective control includes displaying an indication of an amount of time remaining before the respective delay time period has elapsed.

20. The electronic device of claim 13, wherein:
the respective contact intensity criteria include a respective contact intensity threshold; and
changing the appearance of the respective control includes displaying an indication of a difference between a current intensity of a contact on the touch-sensitive surface and the respective contact intensity threshold.

21. The electronic device of claim 13, wherein changing the appearance of the respective control includes displaying a progress bar in the respective control.

22. The electronic device of claim 13, wherein changing the appearance of the respective control includes changing color of at least a portion of the respective control in accordance with intensity of the contact.

23. The electronic device of claim 13, wherein changing the appearance of the respective control includes changing color of at least a portion of the respective control in accordance with a length of time that the contact has continuously met a respective contact intensity threshold.

24. The electronic device of claim 13, wherein changing the appearance of the respective control includes changing color of at least a portion of the respective control in accordance with a length of time since the contact met a respective contact intensity threshold.

25. A method, comprising:
at an electronic device with a touch-sensitive surface and a display, wherein the electronic device includes one or more sensors to detect intensities of contacts with the touch-sensitive surface:
displaying, on the display, a respective control associated with respective contact intensity criteria that is used to determine whether or not a function associated with the respective control will be performed, wherein the respective control is a user interface element, activation of which initiates performance of the function associated with the respective control;

while a focus selector is at a location on the display that corresponds to the respective control:
  detecting a gesture, on the touch-sensitive surface, that corresponds to an interaction with the respective control; and
  while detecting the gesture, in accordance with a determination that the gesture does not include a contact that meets the respective contact intensity criteria, changing the appearance of the respective control to indicate progress toward meeting the respective contact intensity criteria that is used to determine whether or not a function associated with the respective control will be performed; and
  in response to detecting activation of the respective control, in accordance with the detected gesture including a contact that meets the respective contact intensity criteria, performing the function associated with the respective control.

26. The method of claim 25, further comprising, after changing the appearance of the respective control:
  detecting an end of the gesture; and
  in response to detecting the end of the gesture:
    in accordance with a determination that the gesture includes a contact that meets the respective contact intensity criteria, activating the respective control; and
    in accordance with a determination that the gesture does not include a contact that meets the respective contact intensity criteria, forgoing activation of the respective control.

27. The method of claim 25, further comprising, while detecting the gesture, in accordance with a determination that the gesture includes a contact that meets the respective contact intensity criteria, providing a confirmation that the respective control will be activated upon detecting an end of the gesture.

28. The method of claim 25, further comprising, after changing the appearance of the respective control:
  detecting a respective contact with an intensity above a respective contact intensity threshold for a detected time; and
  in response to detecting the respective contact with the intensity above the respective contact intensity threshold for the detected time:
    in accordance with a determination that the gesture includes a contact that meets the respective contact intensity criteria, activating the respective control; and
    in accordance with a determination that the gesture does not include a contact that meets the respective contact intensity criteria, forgoing activation of the respective control.

29. The method of claim 25, wherein:
  at a first time during the gesture, the gesture does not include a contact that meets the respective contact intensity criteria and the appearance of the respective control indicates that the respective control will not be activated in response to detecting an end of the gesture at the first time; and
  at a second time during the gesture, after the first time, the gesture includes a contact that meets the respective contact intensity criteria and the appearance of the respective control indicates that the respective control will be activated in response to detecting an end of the gesture at the second time.

30. The method of claim 25, including continuing to update the appearance of the respective control over time to provide an updated indication of progress toward meeting the respective contact intensity criteria.

31. The method of claim 25, wherein:
  the respective contact intensity criteria include a respective contact intensity threshold and a respective delay time period; and
  changing the appearance of the respective control includes displaying an indication of an amount of time remaining before the respective delay time period has elapsed.

32. The method of claim 25, wherein:
  the respective contact intensity criteria include a respective contact intensity threshold; and
  changing the appearance of the respective control includes displaying an indication of a difference between a current intensity of a contact on the touch-sensitive surface and the respective contact intensity threshold.

33. The method of claim 25, wherein changing the appearance of the respective control includes displaying a progress bar in the respective control.

34. The method of claim 25, wherein changing the appearance of the respective control includes changing color of at least a portion of the respective control in accordance with intensity of the contact.

35. The method of claim 25, wherein changing the appearance of the respective control includes changing color of at least a portion of the respective control in accordance with a length of time that the contact has continuously met a respective contact intensity threshold.

36. The method of claim 25, wherein changing the appearance of the respective control includes changing color of at least a portion of the respective control in accordance with a length of time since the contact met a respective contact intensity threshold.

* * * * *